US012112497B2

(12) United States Patent
Blau et al.

(10) Patent No.: US 12,112,497 B2
(45) Date of Patent: Oct. 8, 2024

(54) LIDAR-CAMERA FUSION WHERE LIDAR AND CAMERA VALIDLY SEE DIFFERENT THINGS

(71) Applicant: MOBILEYE VISION TECHNOLOGIES LTD., Jerusalem (IL)

(72) Inventors: Chaim Blau, New York, NY (US); Ofer Springer, Jerusalem (IL); Kevin Rosenblum, Jerusalem (IL); Alon Ziv, Motza Illit (IL); Erez Dagan, Rishpon (IL); David Boublil, Jerusalem (IL); Nadav Shaag, Jerusalem (IL); David Neuhof, Jerusalem (IL); Jeffrey Moskowitz, Tel Aviv (IL); Gal Topel, Jerusalem (IL); Yotam Stern, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 206 days.

(21) Appl. No.: 17/809,612

(22) Filed: Jun. 29, 2022

(65) Prior Publication Data

US 2022/0324437 A1    Oct. 13, 2022

Related U.S. Application Data

(63) Continuation of application No. PCT/US2020/067753, filed on Dec. 31, 2020.

(Continued)

(51) Int. Cl.
*G01S 17/42* (2006.01)
*B60W 10/04* (2006.01)
(Continued)

(52) U.S. Cl.
CPC ............ *G06T 7/55* (2017.01); *B60W 10/04* (2013.01); *B60W 10/18* (2013.01); *B60W 10/20* (2013.01);
(Continued)

(58) Field of Classification Search
CPC ............ G06T 7/55; G06T 2207/10028; G06T 2207/20081; G06T 2207/20084;
(Continued)

(56) References Cited

U.S. PATENT DOCUMENTS

2018/0314253 A1    11/2018   Mercep et al.
2019/0025841 A1    1/2019    Haynes et al.

FOREIGN PATENT DOCUMENTS

JP       2016156973 A       9/2016
WO    WO 2018063245 A1    4/2018

OTHER PUBLICATIONS

International Search Report and Written Opinion of the International Searching Authority dated Jun. 8, 2021, PCT/US2020/067753.

(Continued)

*Primary Examiner* — Mathew Franklin Gordon
(74) *Attorney, Agent, or Firm* — FINNEGAN, HENDERSON, FARABOW, GARRETT & DUNNER LLP

(57) ABSTRACT

A navigation system for a host vehicle may include a processor programmed to: receive from a camera onboard the host vehicle at least one captured image representative of an environment of the host vehicle, wherein the camera is positioned at a first location relative to the host vehicle; receive point cloud information from a LIDAR system onboard the host vehicle, wherein the LIDAR system is positioned at a second location relative to the host vehicle; analyze the at least one captured image and the received (Continued)

point cloud information to detect one or more objects in the shared field of view region; determine whether a vantage point difference between the first location of the camera and the second location of the LIDAR system accounts for the one or more detected objects being represented in only one of the at least one captured image or the received point cloud information.

23 Claims, 69 Drawing Sheets

Related U.S. Application Data

(60) Provisional application No. 63/082,619, filed on Sep. 24, 2020, provisional application No. 62/957,000, filed on Jan. 3, 2020.

(51) Int. Cl.

| | |
|---|---|
| *B60W 10/18* | (2012.01) |
| *B60W 10/20* | (2006.01) |
| *B60W 30/09* | (2012.01) |
| *B60W 60/00* | (2020.01) |
| *G01B 11/22* | (2006.01) |
| *G01C 21/00* | (2006.01) |
| *G01C 21/16* | (2006.01) |
| *G01C 21/30* | (2006.01) |
| *G01S 7/481* | (2006.01) |
| *G01S 17/58* | (2006.01) |
| *G01S 17/86* | (2020.01) |
| *G01S 17/89* | (2020.01) |
| *G01S 17/931* | (2020.01) |
| *G06T 7/55* | (2017.01) |
| *H04N 23/698* | (2023.01) |
| *H04N 23/90* | (2023.01) |

(52) U.S. Cl.
CPC .......... *B60W 30/09* (2013.01); *B60W 60/001* (2020.02); *G01B 11/22* (2013.01); *G01C 21/1652* (2020.08); *G01C 21/1656* (2020.08); *G01C 21/30* (2013.01); *G01C 21/3885* (2020.08); *G01S 7/4817* (2013.01); *G01S 17/42* (2013.01); *G01S 17/58* (2013.01); *G01S 17/86* (2020.01); *G01S 17/89* (2013.01); *G01S 17/931* (2020.01); *H04N 23/698* (2023.01); *H04N 23/90* (2023.01); *B60W 2420/403* (2013.01); *B60W 2420/408* (2024.01); *B60W 2554/20* (2020.02); *B60W 2554/4042* (2020.02); *B60W 2554/802* (2020.02); *B60W 2556/45* (2020.02); *B60W 2720/10* (2013.01); *B60W 2720/24* (2013.01); *G06T 2207/10028* (2013.01); *G06T 2207/20081* (2013.01); *G06T 2207/20084* (2013.01); *G06T 2207/30252* (2013.01)

(58) Field of Classification Search
CPC ......... G06T 2207/30252; G01S 17/931; G01S 17/86; G01S 7/4817; G01S 17/42; G01S 17/58; G01S 17/89; B60W 60/001; B60W 10/04; B60W 10/18; B60W 10/20; B60W 30/09; B60W 2554/20; B60W 2554/4042; B60W 2556/45; B60W 2554/802; B60W 2420/408; B60W 2420/403; B60W 2720/10; B60W 2720/24; G01C 21/1656; G01C 21/1652; G01C 21/3885; G01C 21/30; H04N 23/90; H04N 23/698; G01B 11/22

See application file for complete search history.

(56) References Cited

OTHER PUBLICATIONS

Cho Kuk et al., "Pedestrian and car detection and classification for unmanned ground vehicle . . . ," Unmanned Systems Technology, vol. 8045, No. 1, May 13, 2011.

Sergio A F Rodriguez et al., "An embedded multi-modal system for object localization . . . ," IEEE Intelligent Transportation Systems Magazine, vol. 4, No. 4, pp. 42-53, Jan. 2012.

Extended European Search Report dated Jun. 13, 2024, for corresponding European Application No. 24157351.8-1009/4345419.

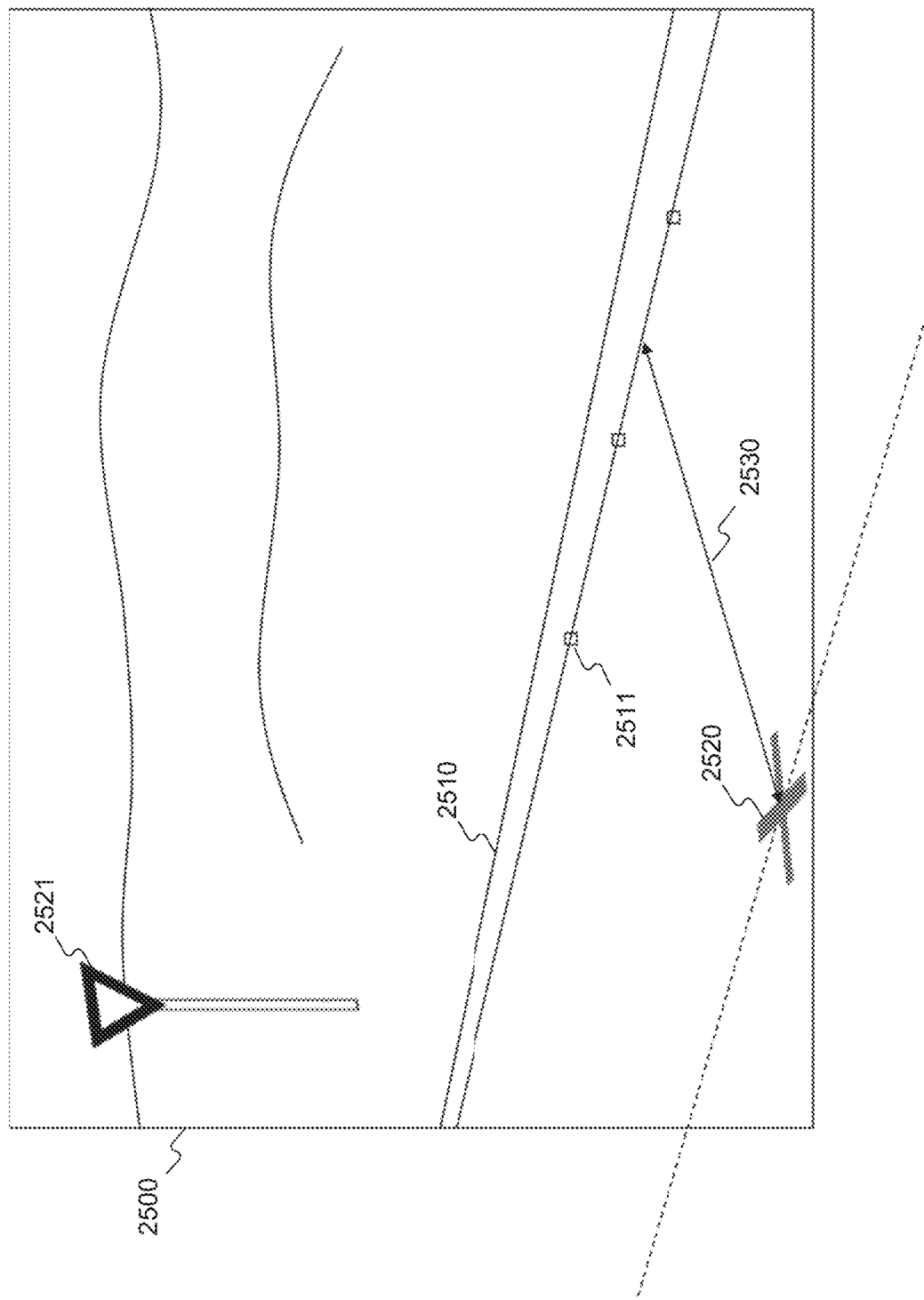

3100

```
┌─────────────────────────────────────────────────────────────┐
│ DETERMINE AT LEAST ONE INDICATOR OF EGO MOTION OF A HOST VEHICLE │
│                           3101                               │
└─────────────────────────────────────────────────────────────┘
                              │
                              ▼
┌─────────────────────────────────────────────────────────────┐
│ RECEIVE, FROM A LIDAR SYSTEM ASSOCIATED WITH THE HOST VEHICLE AND BASED │
│ ON A FIRST LIDAR SCAN OF A FIELD OF VIEW OF THE LIDAR SYSTEM, A FIRST POINT │
│ CLOUD INCLUDING A FIRST REPRESENTATION OF AT LEAST          │
│                 A PORTION OF AN OBJECT                      │
│                           3102                              │
└─────────────────────────────────────────────────────────────┘
                              │
                              ▼
┌─────────────────────────────────────────────────────────────┐
│ RECEIVE, FROM THE LIDAR SYSTEM AND BASED ON A SECOND LIDAR SCAN OF THE │
│ FIELD OF VIEW OF THE LIDAR SYSTEM, A SECOND POINT CLOUD INCLUDING A │
│ SECOND REPRESENTATION OF THE AT LEAST A PORTION OF THE OBJECT │
│                           3103                              │
└─────────────────────────────────────────────────────────────┘
                              │
                              ▼
┌─────────────────────────────────────────────────────────────┐
│ DETERMINE A VELOCITY OF THE OBJECT BASED ON THE AT LEAST ONE INDICATOR │
│ OF EGO MOTION OF THE HOST VEHICLE, AND BASED ON A COMPARISON OF THE │
│        FIRST POINT CLOUD AND THE SECOND POINT CLOUD         │
│                           3104                              │
└─────────────────────────────────────────────────────────────┘
```

```
┌─────────────────────────────────────────────────────────────┐
│ RECEIVE, FROM AN ENTITY REMOTELY LOCATED RELATIVE TO THE HOST│
│ VEHICLE, A SPARSE MAP ASSOCIATED WITH AT LEAST ONE ROAD      │
│ SEGMENT TO BE TRAVERSED BY THE HOST VEHICLE                  │
│                          3601                                │
└─────────────────────────────────────────────────────────────┘
                              │
                              ▼
┌─────────────────────────────────────────────────────────────┐
│ RECEIVE POINT CLOUD INFORMATION FROM A LIDAR SYSTEM ONBOARD  │
│                     THE HOST VEHICLE                         │
│                          3602                                │
└─────────────────────────────────────────────────────────────┘
                              │
                              ▼
┌─────────────────────────────────────────────────────────────┐
│ COMPARE THE RECEIVED POINT CLOUD INFORMATION WITH AT LEAST   │
│ ONE OF THE PLURALITY OF MAPPED NAVIGATIONAL LANDMARKS IN THE │
│ SPARSE MAP TO PROVIDE A LIDAR-BASED LOCALIZATION OF THE HOST │
│ VEHICLE RELATIVE TO THE AT LEAST ONE TARGET TRAJECTORY       │
│                          3603                                │
└─────────────────────────────────────────────────────────────┘
                              │
                              ▼
┌─────────────────────────────────────────────────────────────┐
│ DETERMINE AT LEAST ONE NAVIGATIONAL ACTION FOR THE HOST      │
│ VEHICLE BASED ON THE LIDAR-BASED LOCALIZATION OF THE HOST    │
│ VEHICLE RELATIVE TO THE AT LEAST ONE TARGET TRAJECTORY       │
│                          3604                                │
└─────────────────────────────────────────────────────────────┘
                              │
                              ▼
┌─────────────────────────────────────────────────────────────┐
│ CAUSE THE AT LEAST ONE NAVIGATIONAL ACTION TO BE TAKEN BY THE│
│                     HOST VEHICLE                             │
│                          3605                                │
└─────────────────────────────────────────────────────────────┘
```

```
┌─────────────────────────────────────────────────────────────────┐
│ RECEIVE FROM A CENTER CAMERA ONBOARD A HOST VEHICLE AT LEAST ONE │
│ CAPTURED CENTER IMAGE, RECEIVE FROM A LEFT SURROUND CAMERA ONBOARD│
│ THE HOST VEHICLE AT LEAST ONE CAPTURED LEFT SURROUND IMAGE, AND  │
│ RECEIVE FROM A RIGHT SURROUND CAMERA ONBOARD THE HOST VEHICLE AT │
│           LEAST ONE CAPTURED RIGHT SURROUND IMAGE                │
│                              4501                                │
└─────────────────────────────────────────────────────────────────┘
                               │
                               ▼
┌─────────────────────────────────────────────────────────────────┐
│  PROVIDE THE AT LEAST ONE CAPTURED CENTER IMAGE, THE AT LEAST ONE│
│   CAPTURED LEFT SURROUND IMAGE, AND THE AT LEAST ONE CAPTURED    │
│  RIGHT SURROUND IMAGE TO AN ANALYSIS MODULE CONFIGURED TO GENERATE│
│   AN OUTPUT RELATIVE TO THE AT LEAST ONE CAPTURED CENTER IMAGE   │
│  BASED ON ANALYSIS OF THE AT LEAST ONE CAPTURED CENTER IMAGE,    │
│    THE AT LEAST ONE CAPTURED LEFT SURROUND IMAGE, AND THE AT     │
│             LEAST ONE CAPTURED RIGHT SURROUND IMAGE              │
│                              4502                                │
└─────────────────────────────────────────────────────────────────┘
                               │
                               ▼
┌─────────────────────────────────────────────────────────────────┐
│ CAUSE AT LEAST ONE NAVIGATIONAL ACTION BY THE HOST VEHICLE BASED │
│    ON THE GENERATED OUTPUT INCLUDING THE PER-PIXEL DEPTH         │
│    INFORMATION FOR THE AT LEAST ONE REGION OF THE CAPTURED       │
│                         CENTER IMAGE.                            │
│                              4503                                │
└─────────────────────────────────────────────────────────────────┘
```

*FIG. 45*

LIDAR-CAMERA FUSION WHERE LIDAR AND CAMERA VALIDLY SEE DIFFERENT THINGS

CROSS-REFERENCE TO RELATED APPLICATIONS

This application is a continuation of International Application No. PCT/US2020/067753, filed Dec. 31, 2020, which claims the benefit of priority of U.S. Provisional Application No. 62/957,000, filed on Jan. 3, 2020; and U.S. Provisional Application No. 63/082,619, filed on Sep. 24, 2020. The foregoing applications are incorporated herein by reference in their entirety.

BACKGROUND

Technical Field

The present disclosure relates generally to autonomous vehicle navigation.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera) and may also use information obtained from other sources (e.g., from a GPS unit, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, and travel from one road to another road at appropriate intersections or interchanges. Harnessing and interpreting vast volumes of information collected by an autonomous vehicle as the vehicle travels to its destination poses a multitude of design challenges. The sheer quantity of data (e.g., captured image data, map data, GPS data, sensor data, etc.) that an autonomous vehicle may need to analyze, access, and/or store poses challenges that can in fact limit or even adversely affect autonomous navigation. Furthermore, if an autonomous vehicle relies on traditional mapping technology to navigate, the sheer volume of data needed to store and update the map poses daunting challenges.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras.

In an embodiment, a navigation system for a host vehicle including at least one processor programmed to determine at least one indicator of ego motion of the host vehicle. The at least one processor may also be programmed to receive, from a LIDAR system associated with the host vehicle and based on a first LIDAR scan of a field of view of the LIDAR system, a first point cloud including a first representation of at least a portion of an object. The at least one processor may further be programmed to receive, from a LIDAR system associated with the host vehicle and based on a first LIDAR scan of a field of view of the LIDAR system, a first point cloud including a first representation of at least a portion of an object. The at least one processor may also be programmed to receive, from the LIDAR system and based on a second LIDAR scan of the field of view of the LIDAR system, a second point cloud including a second representation of the at least a portion of the object. The at least one processor may further be programmed to determine a velocity of the object based on the at least one indicator of ego motion of the host vehicle, and based on a comparison of the first point cloud, including the first representation of the at least a portion of the object, and the second point cloud, including the second representation of the at least a portion of the object.

In an embodiment, a method for detecting an object in an environment of a host vehicle may include determining at least one indicator of ego motion of the host vehicle. The method may also include receiving, from a LIDAR system associated with the host vehicle and based on a first LIDAR scan of a field of view of the LIDAR system, a first point cloud including a first representation of at least a portion of an object. The method may further include receiving, from the LIDAR system and based on a second LIDAR scan of the field of view of the LIDAR system, a second point cloud including a second representation of the at least a portion of the object. The method may also include determining a velocity of the object based on the at least one indicator of ego motion of the host vehicle, and based on a comparison of the first point cloud, including the first representation of the at least a portion of the object, and the second point cloud, including the second representation of the at least a portion of the object.

In an embodiment, a navigation system for a host vehicle may include at least one processor programmed to receive, from an entity remotely located relative to a vehicle, a sparse map associated with at least one road segment to be traversed by the vehicle. The sparse map may include a plurality of mapped navigational landmarks and at least one target trajectory. Both the plurality of mapped navigational landmarks and the at least one target trajectory may be generated based on drive information collected from a plurality of vehicles that traveled previously along the at least one road segment. The at least one processor may also be programmed to receive point cloud information from a lidar system onboard the vehicle. The point cloud information may be representative of distances to various objects in an environment of the vehicle. The at least one processor may further be programmed to compare the received point cloud information with at least one of the plurality of mapped navigational landmarks in the sparse map to provide a lidar-based localization of the vehicle relative to the at least one target trajectory. The at least one processor may also be programmed to determine at least one navigational action for the vehicle based on the lidar-based localization of the vehicle relative to the at least one target trajectory. The at least one processor may further be programmed to cause the at least one navigational action to be taken by the vehicle.

In an embodiment, a method for controlling a navigation system for a host vehicle may include receiving, from an entity remotely located relative to a vehicle, a sparse map associated with at least one road segment to be traversed by the vehicle. The sparse map may include a plurality of mapped navigational landmarks and at least one target trajectory. Both the plurality of mapped navigational landmarks and the at least one target trajectory may be generated based on drive information collected from a plurality of vehicles that traveled previously along the at least one road segment. The method may also include receiving point cloud information from a lidar system onboard the vehicle. The point cloud information being representative of distances to various objects in an environment of the vehicle. The method may also include comparing the received point cloud information with at least one of the plurality of mapped navigational landmarks in the sparse map to provide a lidar-based localization of the vehicle relative to the at least one target trajectory. The method may further include determining at least one navigational action for the vehicle based on the lidar-based localization of the vehicle relative to the at least one target trajectory. The method may also include causing the at least one navigational action to be taken by the vehicle.

In an embodiment, a navigation system for a host vehicle may include at least one processor programmed to receive from a camera onboard the host vehicle at least one captured image representative of an environment of the host vehicle. The at least one processor may also be programmed to receive point cloud information from a LIDAR system onboard the host vehicle. The point cloud information may be representative of distances to various objects in the environment of the host vehicle. The at least one processor may further be programmed to correlate the point cloud information with the at least one captured image to provide per-pixel depth information for one or more regions of the at least one captured image. The at least one processor may also be programmed to determine at least one navigational action for the host vehicle based on the per-pixel depth information for one or more regions of the at least one captured image, and cause the at least one navigational action to be taken by the host vehicle.

In an embodiment, a method for determining a navigational action for a host vehicle may include receiving point cloud information from a LIDAR system onboard the host vehicle. The point cloud information may be representative of distances to a plurality of objects in the environment of the host vehicle. The method may also include correlating the point cloud information with the at least one captured image to provide per-pixel depth information for one or more regions of the at least one captured image. The method may further include determining at least one navigational action for the host vehicle based on the per-pixel depth information for one or more regions of the at least one captured image, and causing the at least one navigational action to be taken by the host vehicle.

In an embodiment, a navigation system for a host vehicle may include at least one processor programmed to receive from a camera onboard the host vehicle at least one captured image representative of an environment of the host vehicle. The camera may be positioned at a first location relative to the host vehicle. The at least one processor may also be programmed to receive point cloud information from a LIDAR system onboard the host vehicle. The point cloud information may be representative of distances to various objects in an environment of the host vehicle. The LIDAR system may be positioned at a second location relative to the host vehicle, and the second location may be different from the first location. A field of view of the camera may at least partially overlap with a field of view of the LIDAR system to provide a shared field of view region. The at least one processor may further be programmed to analyze the at least one captured image and the received point cloud information to detect one or more objects in the shared field of view region. The detected one or more objects may be represented in only one of the at least one captured image or the received point cloud information. The at least one processor may also be programmed to determine whether a vantage point difference between the first location of the camera and the second location of the LIDAR system accounts for the one or more detected objects being represented in only one of the at least one captured image or the received point cloud information. The at least one processor may be programmed to cause at least one remedial action to be taken if the vantage point difference does not account for the one or more detected objects being represented in only one of the at least one captured image or the received point cloud information. The at least one processor may be programmed to determine at least one navigational action to be taken by the host vehicle based on the one or more detected objects and cause the at least one navigational action to be taken by the host vehicle if the vantage point difference does account for the one or more detected objects being represented in only one of the at least one captured image or the received point cloud information.

In an embodiment, a method for determining a navigational action for a host vehicle may include receiving from a camera onboard the host vehicle at least one captured image representative of an environment of the host vehicle. The camera may be positioned at a first location relative to the host vehicle. The method may also include receiving point cloud information from a LIDAR system onboard the host vehicle. The point cloud information may be representative of distances to various objects in an environment of the host vehicle. The LIDAR system may be positioned at a second location relative to the host vehicle, and the second location may be different from the first location. A field of view of the camera may at least partially overlap with a field of view of the LIDAR system to provide a shared field of view region. The method may further include analyzing the at least one captured image and the received point cloud information to detect one or more objects in the shared field of view region. The detected one or more objects may be represented in only one of the at least one captured image or the received point cloud information. The method may also include determining whether a vantage point difference between the first location of the camera and the second location of the LIDAR system accounts for the one or more detected objects being represented in only one of the at least one captured image or the received point cloud information. The method may further include, if the vantage point difference does not account for the one or more detected objects being represented in only one of the at least one captured image or the received point cloud information, then causing at least one remedial action to be taken. The method may also include, if the vantage point difference does account for the one or more detected objects being represented in only one of the at least one captured image or the received point cloud information, then determining at least one navigational action to be taken by the host vehicle based on the one or more detected objects and cause the at least one navigational action to be taken by the host vehicle.

In an embodiment, a navigation system for a host vehicle may include at least one processor programmed to receive from a center camera onboard the host vehicle at least one captured center image including a representation of at least a portion of an environment of the host vehicle, receive from a left surround camera onboard the host vehicle at least one captured left surround image including a representation of at least a portion of the environment of the host vehicle, and receive from a right surround camera onboard the host vehicle at least one captured right surround image including a representation of at least a portion of the environment of the host vehicle. A field of view of the center camera may at least partially overlap with both a field of view of the left surround camera and a field of view of the right surround camera. The at least one processor may also be programmed to provide the at least one captured center image, the at least one captured left surround image, and the at least one captured right surround image to an analysis module configured to generate an output relative to the at least one captured center image based on analysis of the at least one captured center image, the at least one captured left surround image, and the at least one captured right surround image. The generated output includes per-pixel depth information for at least one region of the captured center image. The at least one processor may further be programmed to cause at least one navigational action by the host vehicle based on the generated output including the per-pixel depth information for the at least one region of the captured center image.

In an embodiment, a method for determining a navigational action for a host vehicle may include receiving from a center camera onboard the host vehicle at least one captured center image including a representation of at least a portion of an environment of the host vehicle, receive from a left surround camera onboard the host vehicle at least one captured left surround image including a representation of at least a portion of the environment of the host vehicle, and receive from a right surround camera onboard the host vehicle at least one captured right surround image including a representation of at least a portion of the environment of the host vehicle. A field of view of the center camera at least partially overlaps with both a field of view of the left surround camera and a field of view of the right surround camera. The method may also include providing the at least one captured center image, the at least one captured left surround image, and the at least one captured right surround image to an analysis module configured to generate an output relative to the at least one captured center image based on analysis of the at least one captured center image, the at least one captured left surround image, and the at least one captured right surround image. The generated output includes per-pixel depth information for at least one region of the captured center image. The method may further include causing at least one navigational action by the host vehicle based on the generated output including the per-pixel depth information for the at least one region of the captured center image.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 25A shows an exemplary image of a vehicle's surrounding environment for navigation based on the mapped lane marks consistent with the disclosed embodiments.

FIG. 31 is a flowchart showing an exemplary process for determining a velocity of an object consistent with disclosed embodiments.

FIG. 36 is a flowchart showing an exemplary process for determining a navigational action for a host vehicle consistent with disclosed embodiments.

FIG. 45 is a flowchart showing an exemplary process for determining a navigational action for a host vehicle consistent with disclosed embodiments.

DETAILED DESCRIPTION

Figure 1:
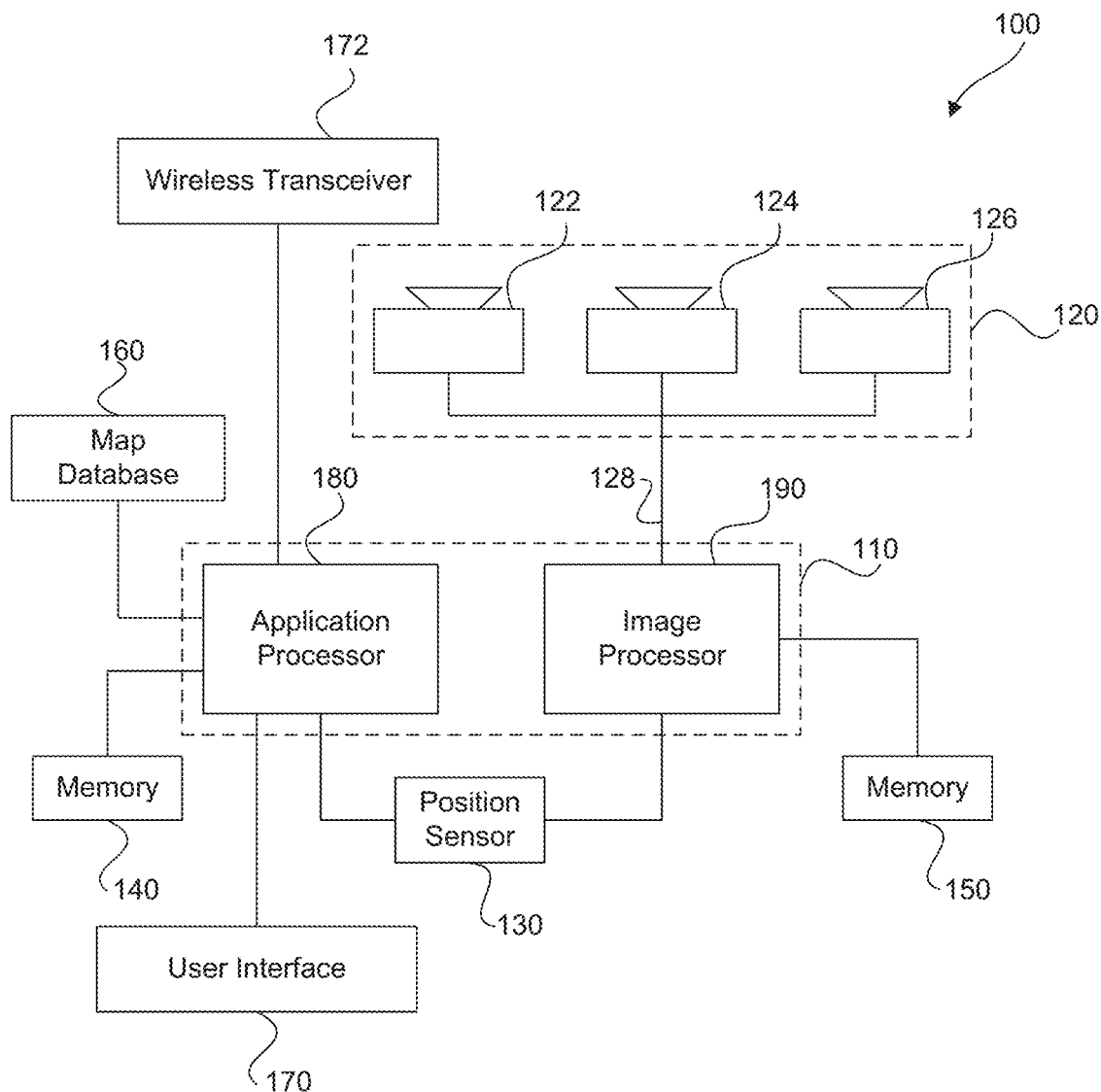
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

As human drivers typically rely on visual cues and observations to control a vehicle, transportation infrastructures are built accordingly, with lane markings, traffic signs, and traffic lights are all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while the vehicle is traveling, and the vehicle (as well as other vehicles) may use the information to localize itself on the model.

In some embodiments in this disclosure, an autonomous vehicle may use information obtained while navigating (e.g., from a camera, GPS device, an accelerometer, a speed sensor, a suspension sensor, etc.). In other embodiments, an autonomous vehicle may use information obtained from past navigations by the vehicle (or by other vehicles) while navigating. In yet other embodiments, an autonomous vehicle may use a combination of information obtained while navigating and information obtained from past navigations. The following sections provide an overview of a system consistent with the disclosed embodiments, followed by an overview of a forward-facing imaging system and methods consistent with the system. The sections that follow disclose systems and methods for constructing, using, and updating a sparse map for autonomous vehicle navigation.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of processing devices. For example, either or both of applications processor 180 and image processor 190 may include a microprocessor, preprocessors (such as an image preprocessor), a graphics processing unit (GPU), a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), a graphics processing unit (GPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The GPU may also comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory (RAM), read only memory (ROM), flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a tachometer, a speedometer) for measuring a speed of vehicle 200 and/or an accelerometer (either single axis or multiaxis) for measuring acceleration of vehicle 200.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Systems and methods of generating such a map are discussed below with references to FIGS. 8-19.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
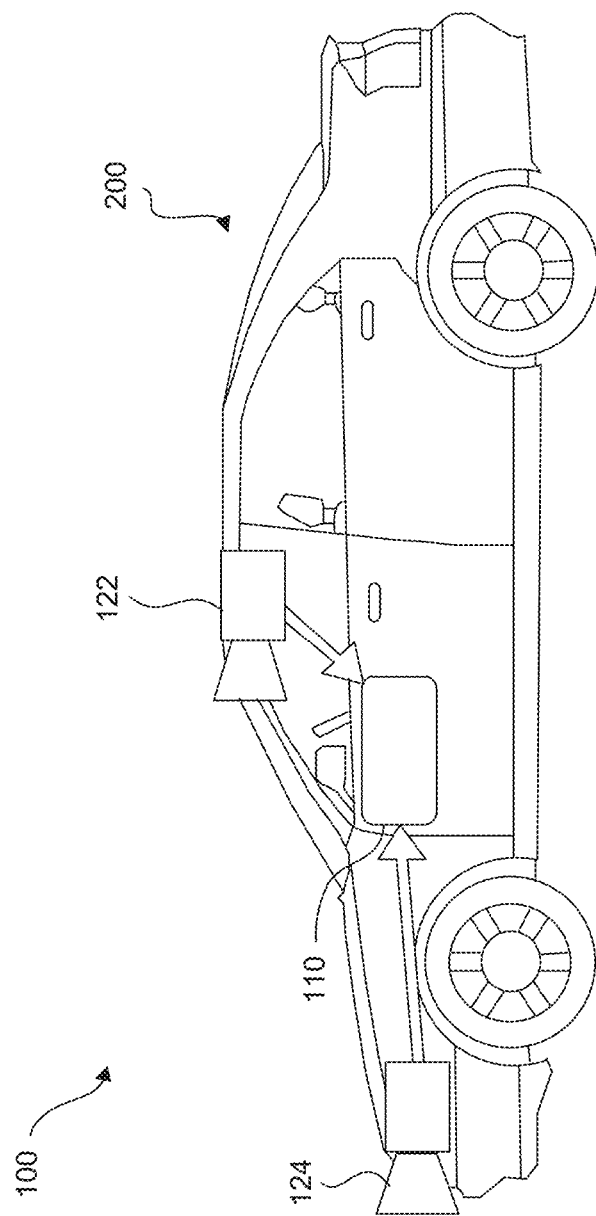
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from by system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead of transmit data, such as captured images and/or limited location information related to a route.

Other privacy levels are contemplated. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
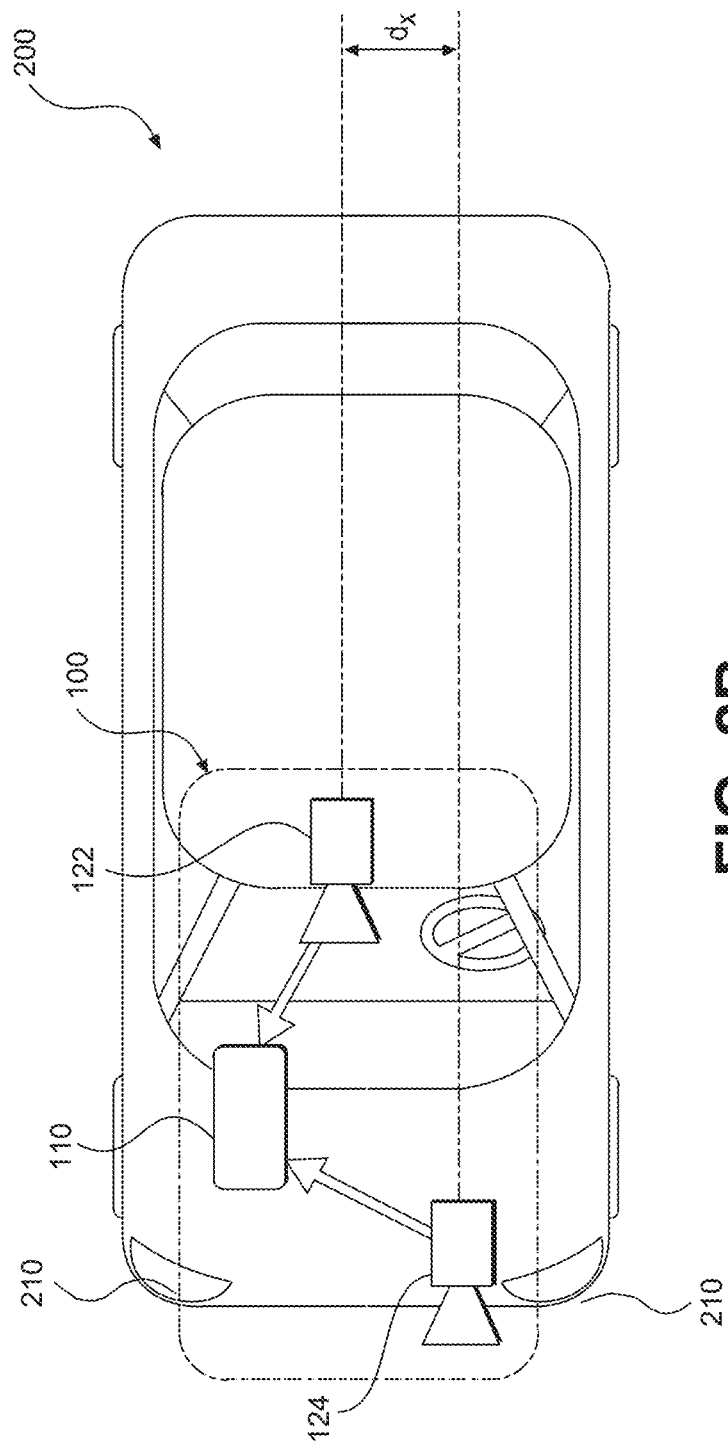
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
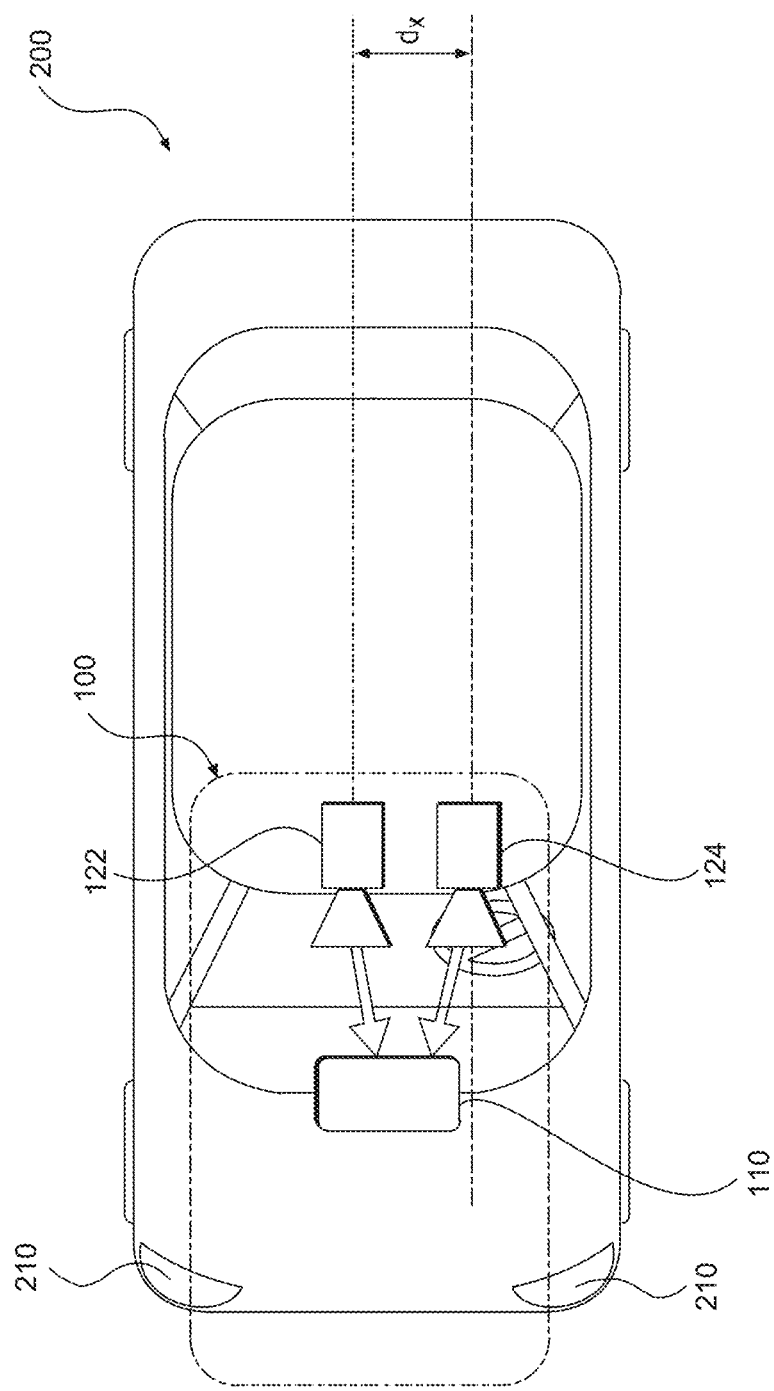
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
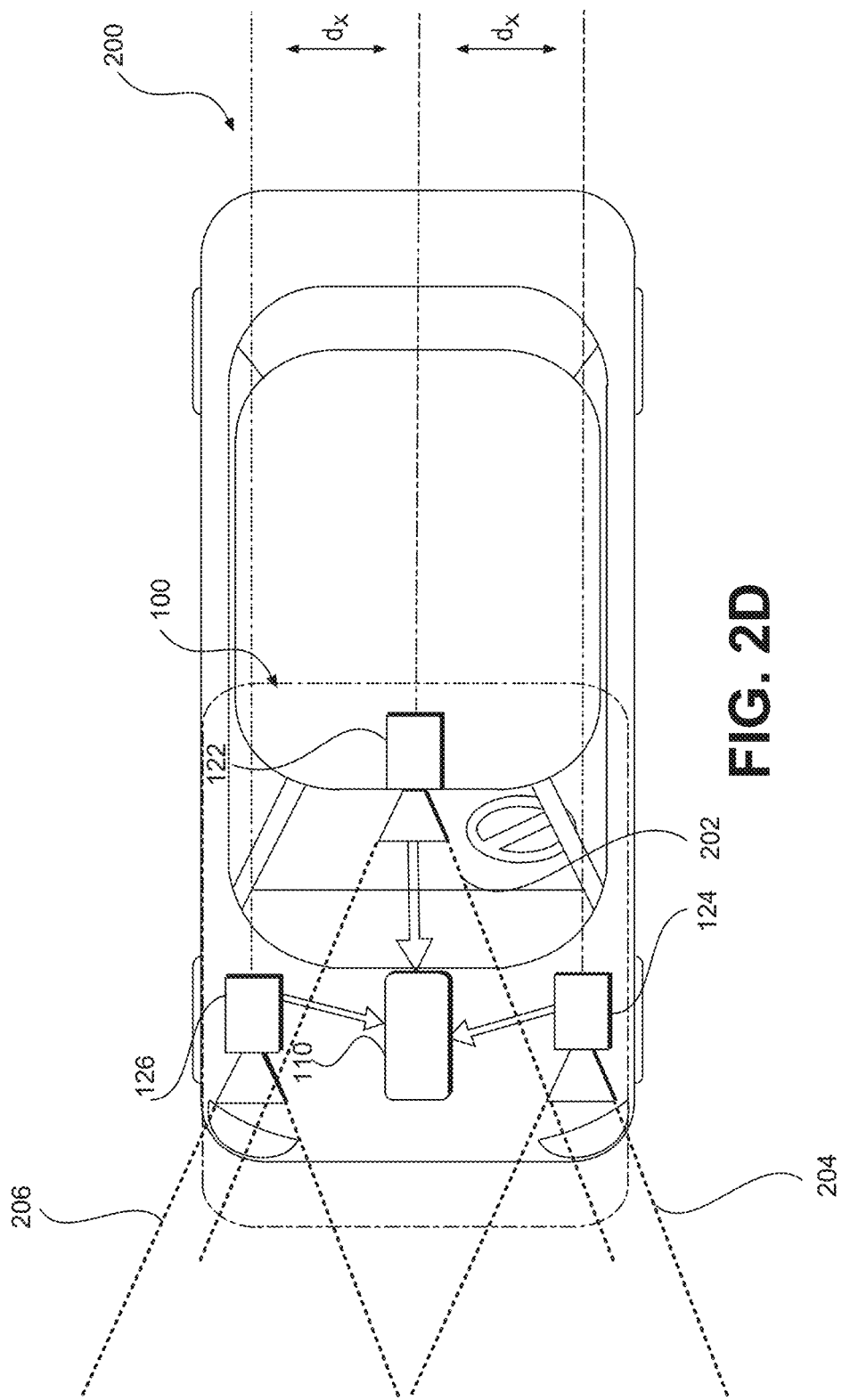
FIG. 2D is a diagrammatic top view representation of yet another embodiment of a vehicle including a system consistent with the disclosed embodiments.
Figure 2E:
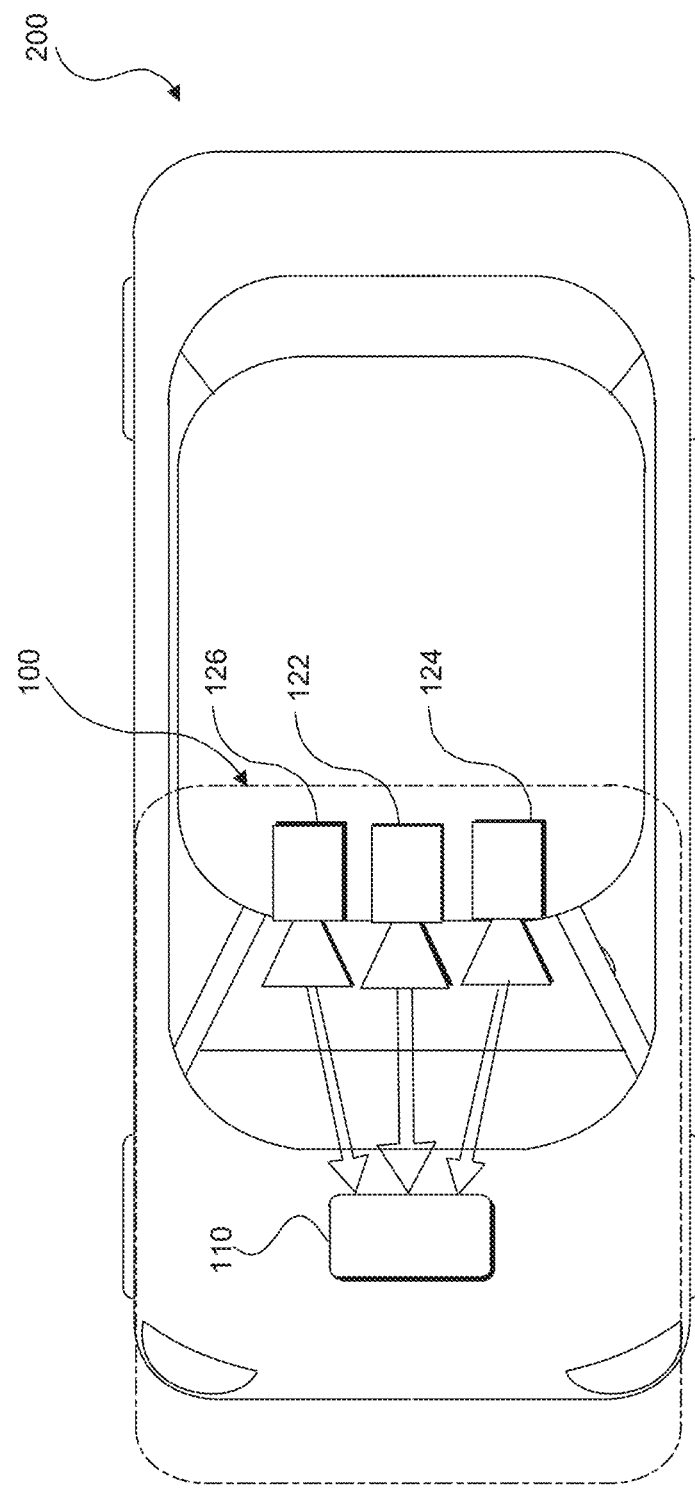
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280× 960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
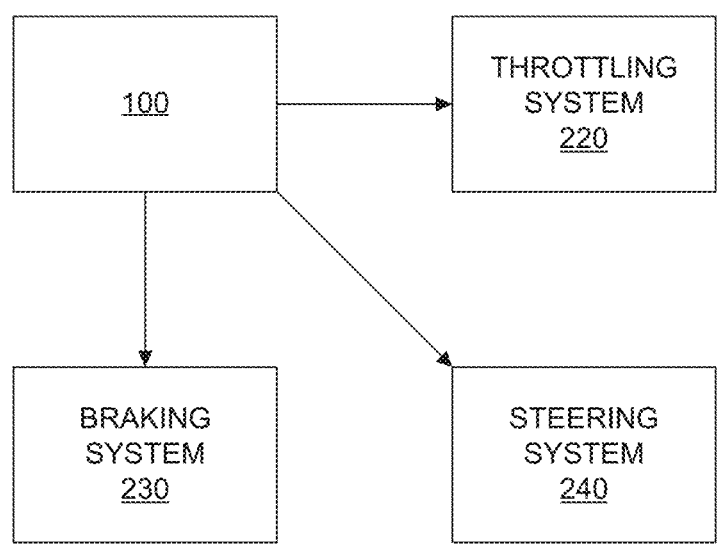
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
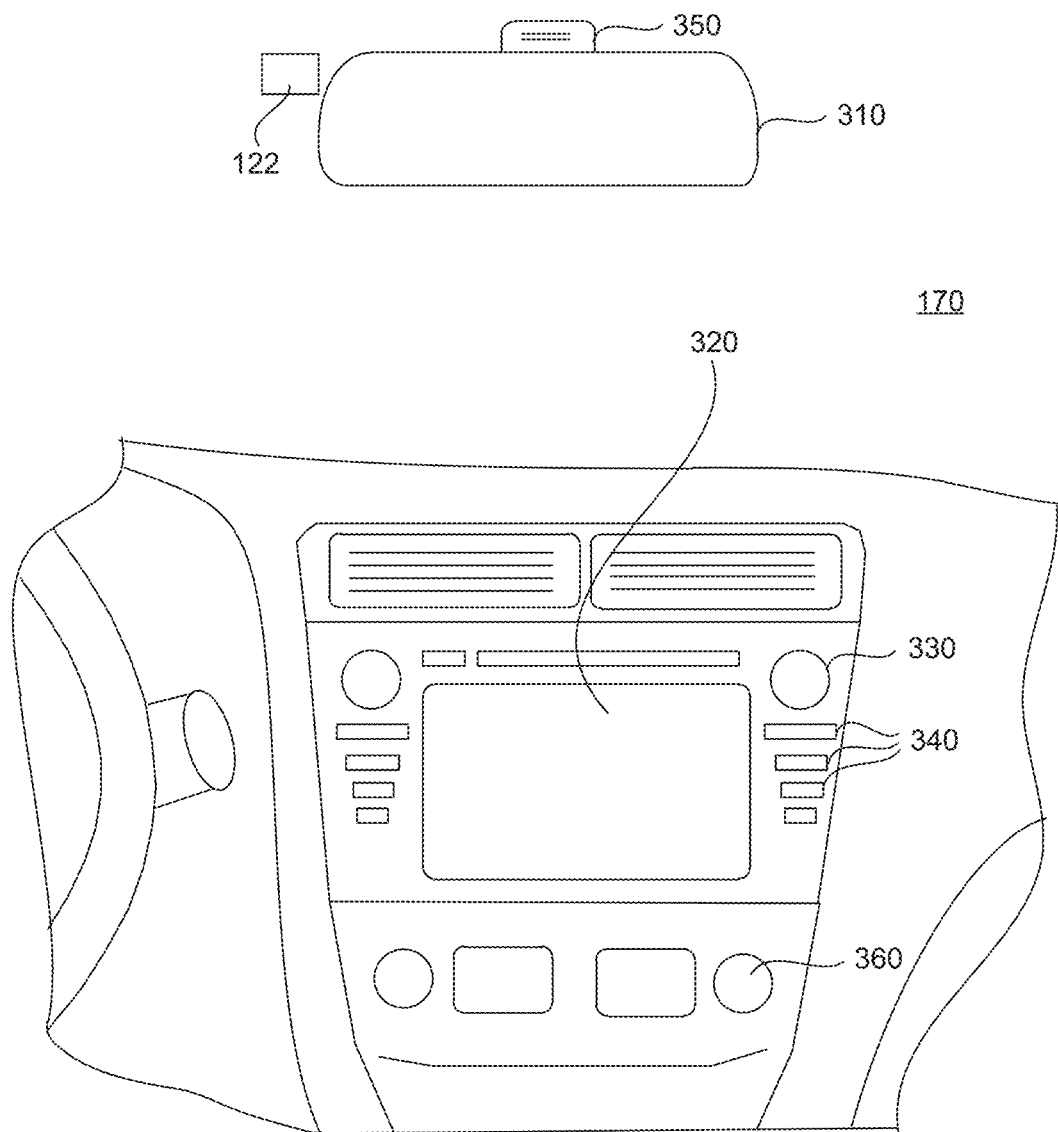
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
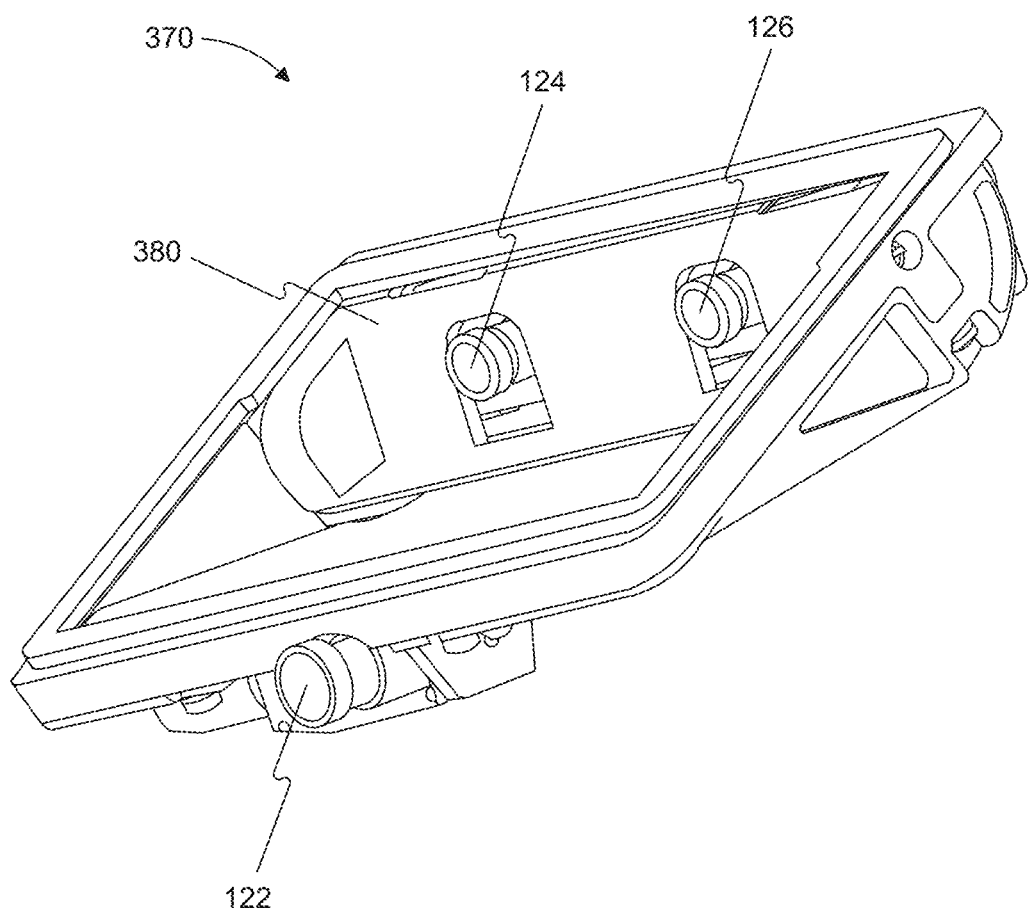
FIG. 3B is an illustration of an example of a camera mount that is configured to be positioned behind a rearview mirror and against a vehicle windshield consistent with the disclosed embodiments.
Figure 3C:
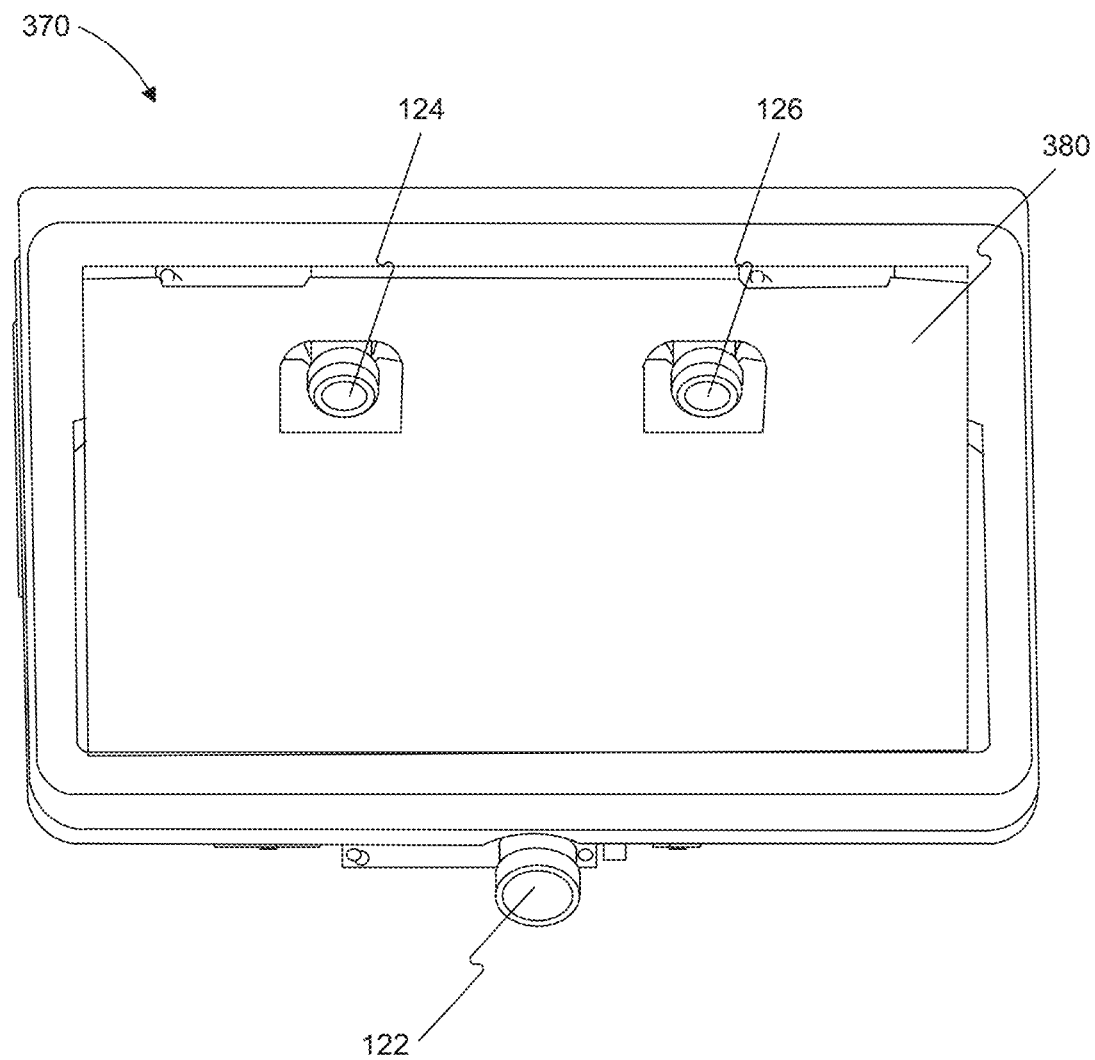
FIG. 3C is an illustration of the camera mount shown in FIG. 3B from a different perspective consistent with the disclosed embodiments.
Figure 3D:
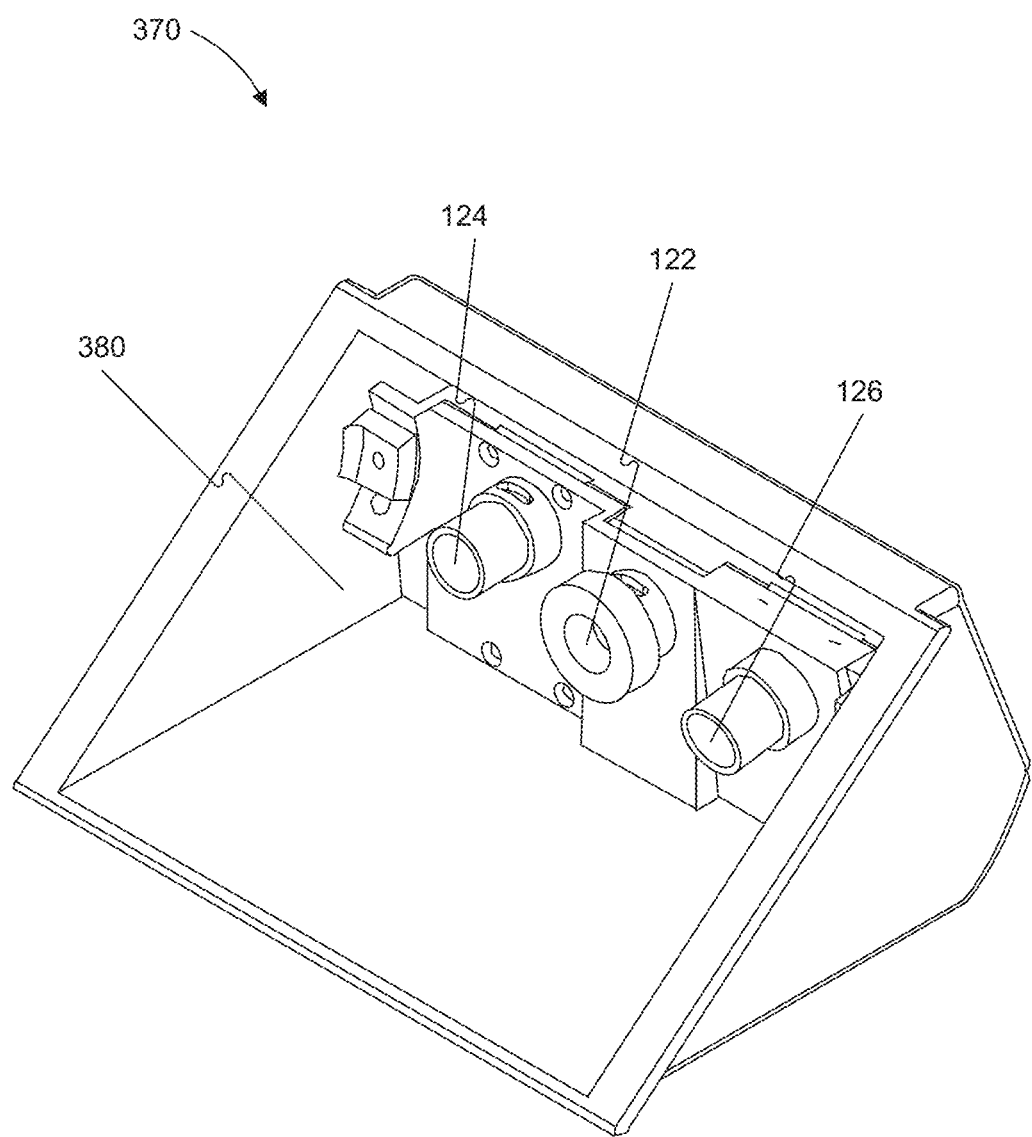
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that the shield aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122, 124, and 126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122, 124, and 126 may be positioned behind rearview mirror 310 and positioned substantially side-by-side (e.g., 6 cm apart). Further, in some embodiments, as discussed above, one or more of image capture devices 122, 124, and 126 may be mounted behind glare shield 380 that is flush with the windshield of vehicle 200. Such shielding may act to minimize the impact of any reflections from inside the car on image capture devices 122, 124, and 126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122, 124, and 126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
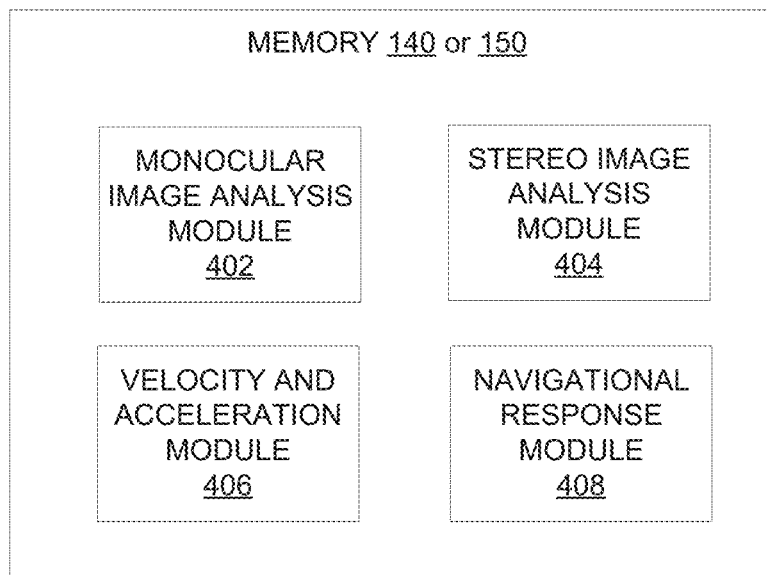
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402, 404, 406, and 408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system, such as a system that may be configured to use computer vision algorithms to detect and/or label objects in an environment from which sensory information was captured and processed. In one embodiment, stereo image analysis module 404 and/or other image processing modules may be configured to use a combination of a trained and untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
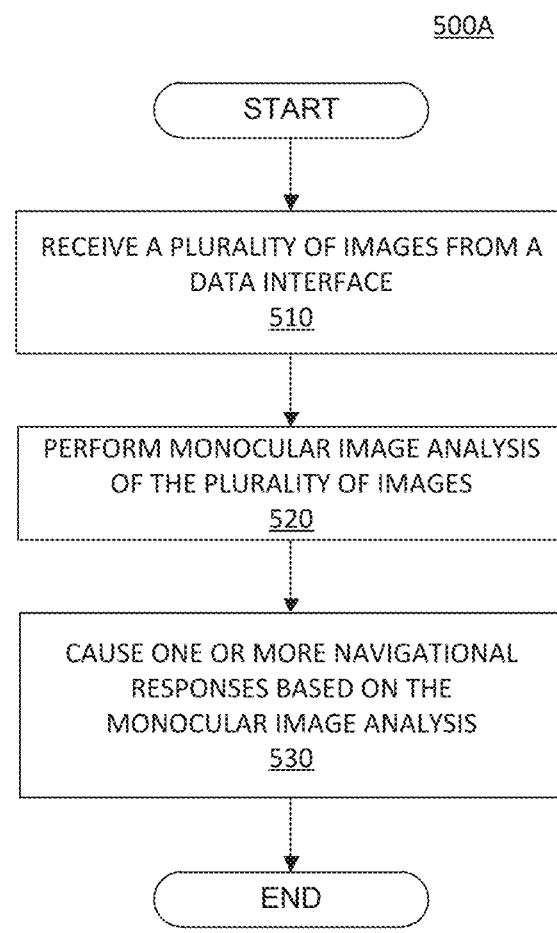
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
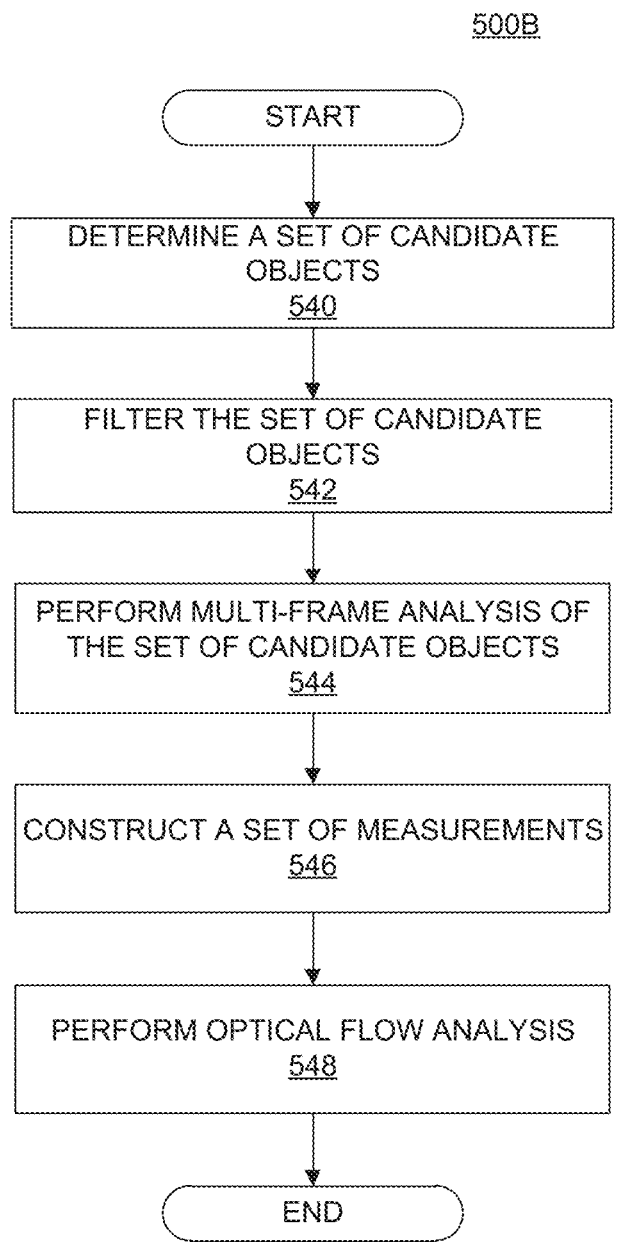
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
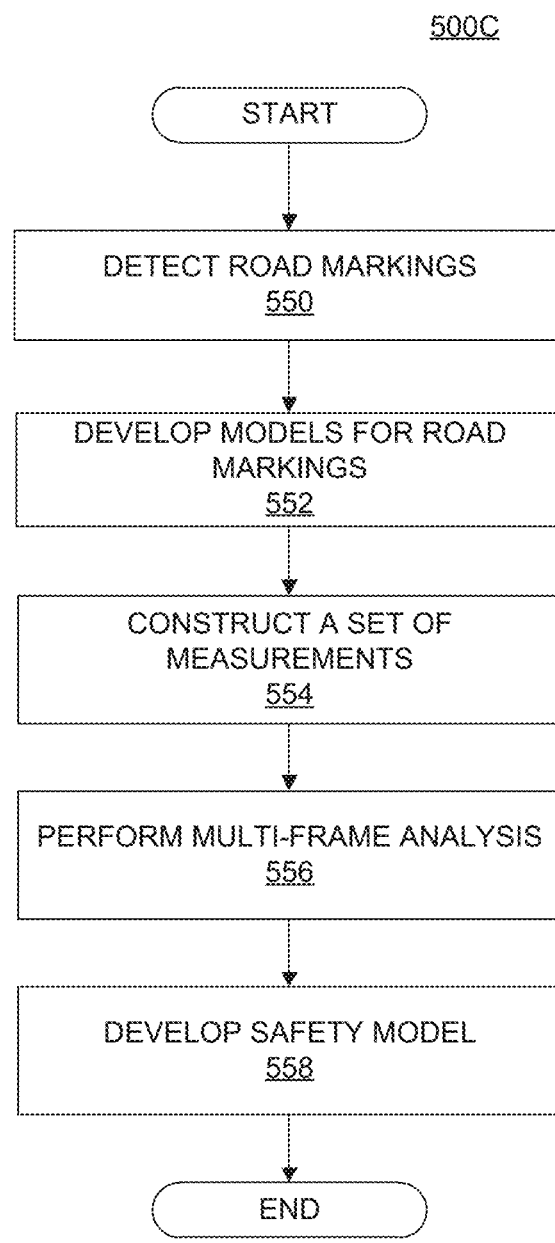
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550, 552, 554, and 556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
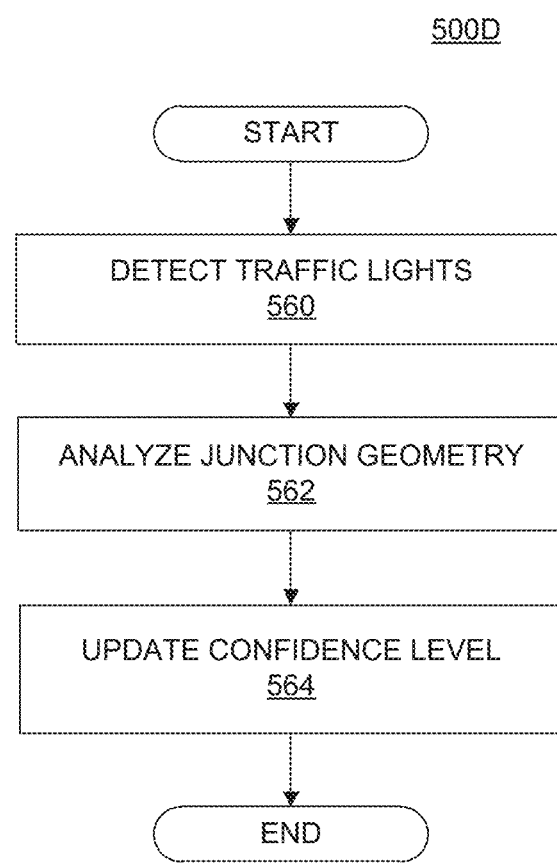
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560, 562, and 564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
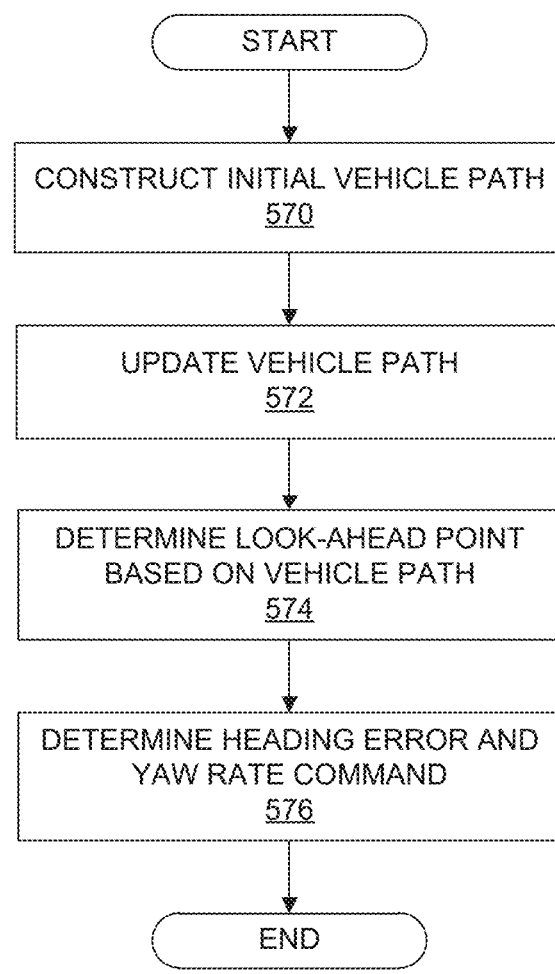
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
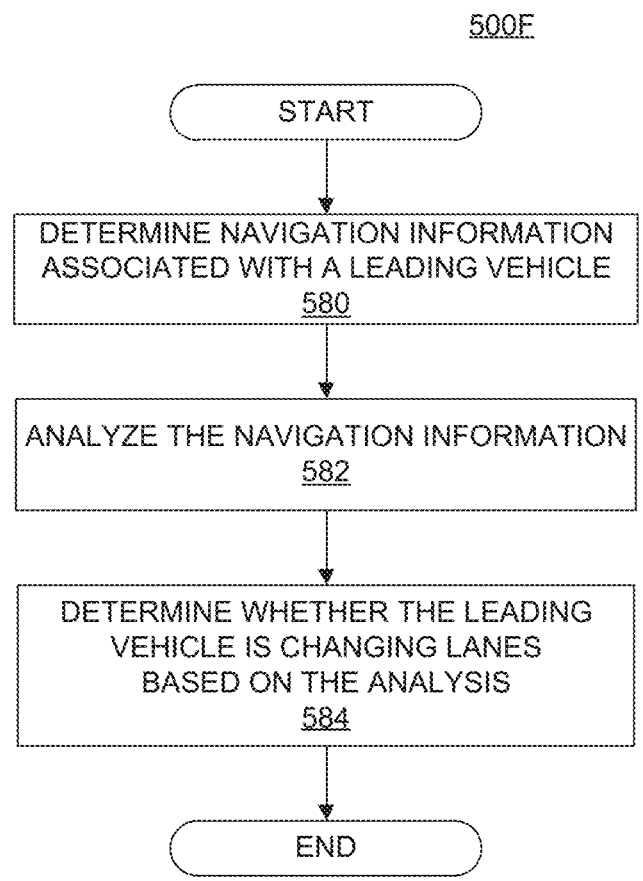
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2 + \delta_x^2)/2(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
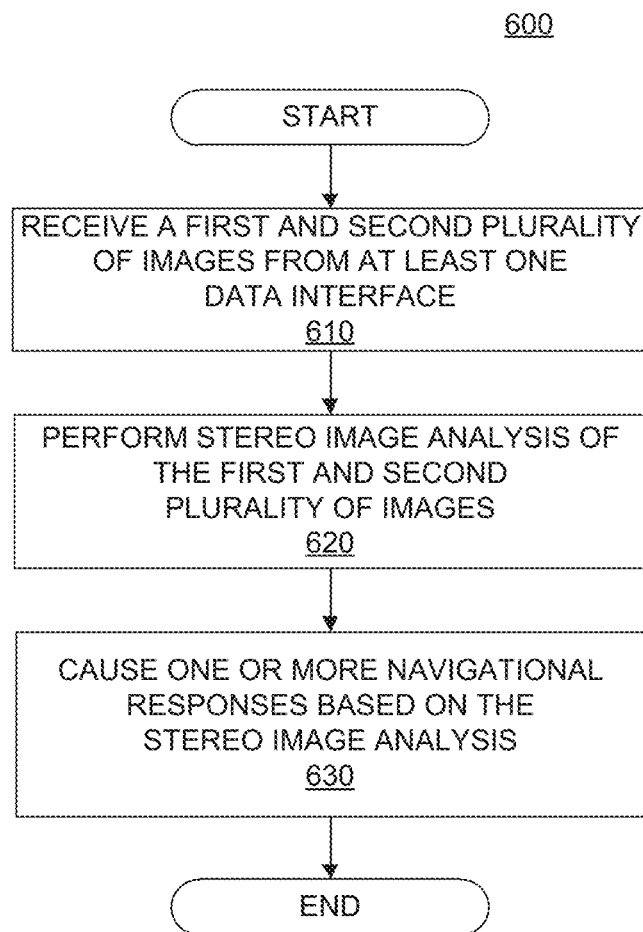
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
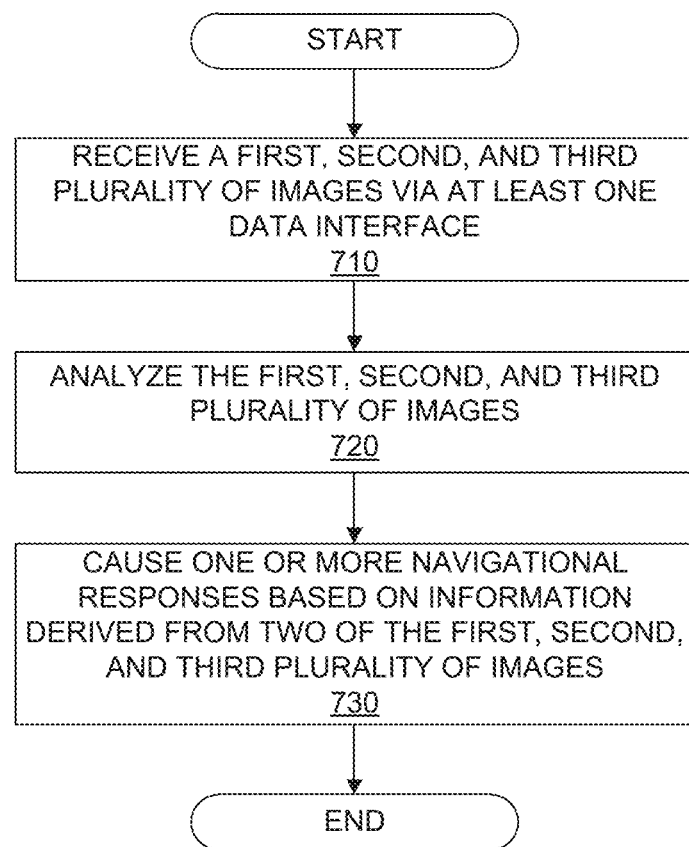
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Sparse Road Model for Autonomous Vehicle Navigation

In some embodiments, the disclosed systems and methods may use a sparse map for autonomous vehicle navigation. In particular, the sparse map may be for autonomous vehicle navigation along a road segment. For example, the sparse map may provide sufficient information for navigating an autonomous vehicle without storing and/or updating a large quantity of data. As discussed below in further detail, an autonomous vehicle may use the sparse map to navigate one or more roads based on one or more stored trajectories.

Sparse Map for Autonomous Vehicle Navigation

In some embodiments, the disclosed systems and methods may generate a sparse map for autonomous vehicle navigation. For example, the sparse map may provide sufficient information for navigation without requiring excessive data storage or data transfer rates. As discussed below in further detail, a vehicle (which may be an autonomous vehicle) may use the sparse map to navigate one or more roads. For example, in some embodiments, the sparse map may include data related to a road and potentially landmarks along the road that may be sufficient for vehicle navigation, but which also exhibit small data footprints. For example, the sparse data maps described in detail below may require significantly less storage space and data transfer bandwidth as compared with digital maps including detailed map information, such as image data collected along a road.

For example, rather than storing detailed representations of a road segment, the sparse data map may store three-dimensional polynomial representations of preferred vehicle paths along a road. These paths may require very little data storage space. Further, in the described sparse data maps, landmarks may be identified and included in the sparse map road model to aid in navigation. These landmarks may be located at any spacing suitable for enabling vehicle navigation, but in some cases, such landmarks need not be identified and included in the model at high densities and short spacings. Rather, in some cases, navigation may be possible based on landmarks that are spaced apart by at least 50 meters, at least 100 meters, at least 500 meters, at least 1 kilometer, or at least 2 kilometers. As will be discussed in more detail in other sections, the sparse map may be generated based on data collected or measured by vehicles equipped with various sensors and devices, such as image capture devices, Global Positioning System sensors, motion sensors, etc., as the vehicles travel along roadways. In some cases, the sparse map may be generated based on data collected during multiple drives of one or more vehicles along a particular roadway. Generating a sparse map using multiple drives of one or more vehicles may be referred to as "crowdsourcing" a sparse map.

Consistent with disclosed embodiments, an autonomous vehicle system may use a sparse map for navigation. For example, the disclosed systems and methods may distribute a sparse map for generating a road navigation model for an autonomous vehicle and may navigate an autonomous vehicle along a road segment using a sparse map and/or a generated road navigation model. Sparse maps consistent with the present disclosure may include one or more three-dimensional contours that may represent predetermined trajectories that autonomous vehicles may traverse as they move along associated road segments.

Sparse maps consistent with the present disclosure may also include data representing one or more road features. Such road features may include recognized landmarks, road signature profiles, and any other road-related features useful in navigating a vehicle. Sparse maps consistent with the present disclosure may enable autonomous navigation of a vehicle based on relatively small amounts of data included in the sparse map. For example, rather than including detailed representations of a road, such as road edges, road curvature, images associated with road segments, or data detailing other physical features associated with a road segment, the disclosed embodiments of the sparse map may require relatively little storage space (and relatively little bandwidth when portions of the sparse map are transferred to a vehicle) but may still adequately provide for autonomous vehicle navigation. The small data footprint of the disclosed sparse maps, discussed in further detail below, may be achieved in some embodiments by storing representations of road-related elements that require small amounts of data but still enable autonomous navigation.

For example, rather than storing detailed representations of various aspects of a road, the disclosed sparse maps may store polynomial representations of one or more trajectories that a vehicle may follow along the road. Thus, rather than storing (or having to transfer) details regarding the physical nature of the road to enable navigation along the road, using the disclosed sparse maps, a vehicle may be navigated along a particular road segment without, in some cases, having to interpret physical aspects of the road, but rather, by aligning its path of travel with a trajectory (e.g., a polynomial spline) along the particular road segment. In this way, the vehicle may be navigated based mainly upon the stored trajectory (e.g., a polynomial spline) that may require much less storage space than an approach involving storage of roadway images, road parameters, road layout, etc.

In addition to the stored polynomial representations of trajectories along a road segment, the disclosed sparse maps may also include small data objects that may represent a road feature. In some embodiments, the small data objects may include digital signatures, which are derived from a digital image (or a digital signal) that was obtained by a sensor (e.g., a camera or other sensor, such as a suspension sensor) onboard a vehicle traveling along the road segment. The digital signature may have a reduced size relative to the signal that was acquired by the sensor. In some embodiments, the digital signature may be created to be compatible with a classifier function that is configured to detect and to identify the road feature from the signal that is acquired by the sensor, for example, during a subsequent drive. In some embodiments, a digital signature may be created such that the digital signature has a footprint that is as small as possible, while retaining the ability to correlate or match the road feature with the stored signature based on an image (or a digital signal generated by a sensor, if the stored signature is not based on an image and/or includes other data) of the road feature that is captured by a camera onboard a vehicle traveling along the same road segment at a subsequent time.

In some embodiments, a size of the data objects may be further associated with a uniqueness of the road feature. For example, for a road feature that is detectable by a camera onboard a vehicle, and where the camera system onboard the vehicle is coupled to a classifier that is capable of distinguishing the image data corresponding to that road feature as being associated with a particular type of road feature, for example, a road sign, and where such a road sign is locally unique in that area (e.g., there is no identical road sign or road sign of the same type nearby), it may be sufficient to store data indicating the type of the road feature and its location.

As will be discussed in further detail below, road features (e.g., landmarks along a road segment) may be stored as small data objects that may represent a road feature in relatively few bytes, while at the same time providing sufficient information for recognizing and using such a feature for navigation. In one example, a road sign may be identified as a recognized landmark on which navigation of a vehicle may be based. A representation of the road sign may be stored in the sparse map to include, e.g., a few bytes of data indicating a type of landmark (e.g., a stop sign) and a few bytes of data indicating a location of the landmark (e.g., coordinates). Navigating based on such data-light representations of the landmarks (e.g., using representations sufficient for locating, recognizing, and navigating based upon the landmarks) may provide a desired level of navigational functionality associated with sparse maps without significantly increasing the data overhead associated with the sparse maps. This lean representation of landmarks (and other road features) may take advantage of the sensors and processors included onboard such vehicles that are configured to detect, identify, and/or classify certain road features.

When, for example, a sign or even a particular type of a sign is locally unique (e.g., when there is no other sign or no other sign of the same type) in a given area, the sparse map may use data indicating a type of a landmark (a sign or a specific type of sign), and during navigation (e.g., autonomous navigation) when a camera onboard an autonomous vehicle captures an image of the area including a sign (or of a specific type of sign), the processor may process the image, detect the sign (if indeed present in the image), classify the image as a sign (or as a specific type of sign), and correlate the location of the image with the location of the sign as stored in the sparse map.

The sparse map may include any suitable representation of objects identified along a road segment. In some cases, the objects may be referred to as semantic objects or non-semantic objects. Semantic objects may include, for example, objects associated with a predetermined type classification. This type classification may be useful in reducing the amount of data required to describe the semantic object recognized in an environment, which can be beneficial both in the harvesting phase (e.g., to reduce costs associated with bandwidth use for transferring drive information from a plurality of harvesting vehicles to a server) and during the navigation phase (e.g., reduction of map data can speed transfer of map tiles from a server to a navigating vehicle and can also reduce costs associated with bandwidth use for such transfers). Semantic object classification types may be assigned to any type of objects or features that are expected to be encountered along a roadway.

Semantic objects may further be divided into two or more logical groups. For example, in some cases, one group of semantic object types may be associated with predetermined dimensions. Such semantic objects may include certain speed limit signs, yield signs, merge signs, stop signs, traffic lights, directional arrows on a roadway, manhole covers, or any other type of object that may be associated with a standardized size. One benefit offered by such semantic objects is that very little data may be needed to represent/fully define the objects. For example, if a standardized size of a speed limit size is known, then a harvesting vehicle may need only identify (through analysis of a captured image) the presence of a speed limit sign (a recognized type) along with an indication of a position of the detected speed limit sign (e.g., a 2D position in the captured image (or, alternatively, a 3D position in real world coordinates) of a center of the sign or a certain corner of the sign) to provide sufficient information for map generation on the server side. Where 2D image positions are transmitted to the server, a position associated with the captured image where the sign was detected may also be transmitted so the server can determine a real-world position of the sign (e.g., through structure in motion techniques using multiple captured images from one or more harvesting vehicles). Even with this limited information (requiring just a few bytes to define each detected object), the server may construct the map including a fully represented speed limit sign based on the type classification (representative of a speed limit sign) received from one or more harvesting vehicles along with the position information for the detected sign.

Semantic objects may also include other recognized object or feature types that are not associated with certain standardized characteristics. Such objects or features may include potholes, tar seams, light poles, non-standardized signs, curbs, trees, tree branches, or any other type of recognized object type with one or more variable characteristics (e.g., variable dimensions). In such cases, in addition to transmitting to a server an indication of the detected object or feature type (e.g., pothole, pole, etc.) and position information for the detected object or feature, a harvesting vehicle may also transmit an indication of a size of the object or feature. The size may be expressed in 2D image dimensions (e.g., with a bounding box or one or more dimension values) or real-world dimensions (determined through structure in motion calculations, based on LIDAR or RADAR system outputs, based on trained neural network outputs, etc.).

Non-semantic objects or features may include any detectable objects or features that fall outside of a recognized category or type, but that still may provide valuable information in map generation. In some cases, such non-semantic features may include a detected corner of a building or a corner of a detected window of a building, a unique stone or object near a roadway, a concrete splatter in a roadway shoulder, or any other detectable object or feature. Upon detecting such an object or feature one or more harvesting vehicles may transmit to a map generation server a location of one or more points (2D image points or 3D real world points) associated with the detected object/feature. Additionally, a compressed or simplified image segment (e.g., an image hash) may be generated for a region of the captured image including the detected object or feature. This image hash may be calculated based on a predetermined image processing algorithm and may form an effective signature for the detected non-semantic object or feature. Such a signature may be useful for navigation relative to a sparse map including the non-semantic feature or object, as a vehicle traversing the roadway may apply an algorithm similar to the algorithm used to generate the image hash in order to confirm/verify the presence in a captured image of the mapped non-semantic feature or object. Using this technique, non-semantic features may add to the richness of the sparse maps (e.g., to enhance their usefulness in navigation) without adding significant data overhead.

As noted, target trajectories may be stored in the sparse map. These target trajectories (e.g., 3D splines) may represent the preferred or recommended paths for each available lane of a roadway, each valid pathway through a junction, for merges and exits, etc. In addition to target trajectories, other road feature may also be detected, harvested, and incorporated in the sparse maps in the form of representative splines. Such features may include, for example, road edges, lane markings, curbs, guardrails, or any other objects or features that extend along a roadway or road segment.

Generating a Sparse Map

In some embodiments, a sparse map may include at least one line representation of a road surface feature extending along a road segment and a plurality of landmarks associated with the road segment. In certain aspects, the sparse map may be generated via "crowdsourcing," for example, through image analysis of a plurality of images acquired as one or more vehicles traverse the road segment.

Figure 8:
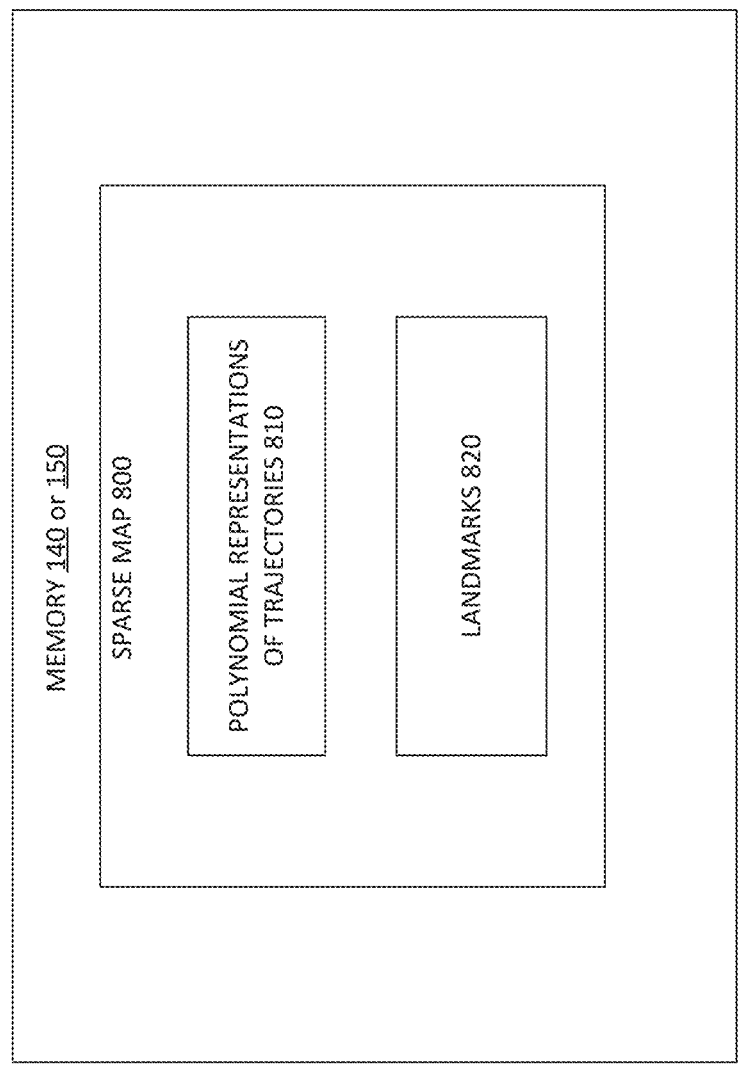
FIG. 8 shows a sparse map for providing autonomous vehicle navigation, consistent with the disclosed embodiments.

FIG. 8 shows a sparse map 800 that one or more vehicles, e.g., vehicle 200 (which may be an autonomous vehicle), may access for providing autonomous vehicle navigation. Sparse map 800 may be stored in a memory, such as memory 140 or 150. Such memory devices may include any types of non-transitory storage devices or computer-readable media. For example, in some embodiments, memory 140 or 150 may include hard drives, compact discs, flash memory, magnetic based memory devices, optical based memory devices, etc. In some embodiments, sparse map 800 may be stored in a database (e.g., map database 160) that may be stored in memory 140 or 150, or other types of storage devices.

In some embodiments, sparse map 800 may be stored on a storage device or a non-transitory computer-readable medium provided onboard vehicle 200 (e.g., a storage device included in a navigation system onboard vehicle 200). A processor (e.g., processing unit 110) provided on vehicle 200 may access sparse map 800 stored in the storage device or computer-readable medium provided onboard vehicle 200 in order to generate navigational instructions for guiding the autonomous vehicle 200 as the vehicle traverses a road segment.

Sparse map 800 need not be stored locally with respect to a vehicle, however. In some embodiments, sparse map 800 may be stored on a storage device or computer-readable medium provided on a remote server that communicates with vehicle 200 or a device associated with vehicle 200. A processor (e.g., processing unit 110) provided on vehicle 200 may receive data included in sparse map 800 from the remote server and may execute the data for guiding the autonomous driving of vehicle 200. In such embodiments, the remote server may store all of sparse map 800 or only a portion thereof. Accordingly, the storage device or computer-readable medium provided onboard vehicle 200 and/or onboard one or more additional vehicles may store the remaining portion(s) of sparse map 800.

Furthermore, in such embodiments, sparse map 800 may be made accessible to a plurality of vehicles traversing various road segments (e.g., tens, hundreds, thousands, or millions of vehicles, etc.). It should be noted also that sparse map 800 may include multiple sub-maps. For example, in some embodiments, sparse map 800 may include hundreds, thousands, millions, or more, of sub-maps (e.g., map tiles) that may be used in navigating a vehicle. Such sub-maps may be referred to as local maps or map tiles, and a vehicle traveling along a roadway may access any number of local maps relevant to a location in which the vehicle is traveling. The local map sections of sparse map 800 may be stored with a Global Navigation Satellite System (GNSS) key as an index to the database of sparse map 800. Thus, while computation of steering angles for navigating a host vehicle in the present system may be performed without reliance upon a GNSS position of the host vehicle, road features, or landmarks, such GNSS information may be used for retrieval of relevant local maps.

In general, sparse map 800 may be generated based on data (e.g., drive information) collected from one or more vehicles as they travel along roadways. For example, using sensors aboard the one or more vehicles (e.g., cameras, speedometers, GPS, accelerometers, etc.), the trajectories that the one or more vehicles travel along a roadway may be recorded, and the polynomial representation of a preferred trajectory for vehicles making subsequent trips along the roadway may be determined based on the collected trajectories travelled by the one or more vehicles. Similarly, data collected by the one or more vehicles may aid in identifying potential landmarks along a particular roadway. Data collected from traversing vehicles may also be used to identify road profile information, such as road width profiles, road roughness profiles, traffic line spacing profiles, road conditions, etc. Using the collected information, sparse map 800 may be generated and distributed (e.g., for local storage or via on-the-fly data transmission) for use in navigating one or more autonomous vehicles. However, in some embodiments, map generation may not end upon initial generation of the map. As will be discussed in greater detail below, sparse map 800 may be continuously or periodically updated based on data collected from vehicles as those vehicles continue to traverse roadways included in sparse map 800.

Data recorded in sparse map 800 may include position information based on Global Positioning System (GPS) data. For example, location information may be included in sparse map 800 for various map elements, including, for example, landmark locations, road profile locations, etc. Locations for map elements included in sparse map 800 may be obtained using GPS data collected from vehicles traversing a roadway. For example, a vehicle passing an identified landmark may determine a location of the identified landmark using GPS position information associated with the vehicle and a determination of a location of the identified landmark relative to the vehicle (e.g., based on image analysis of data collected from one or more cameras on board the vehicle). Such location determinations of an identified landmark (or any other feature included in sparse map 800) may be repeated as additional vehicles pass the location of the identified landmark. Some or all of the additional location determinations may be used to refine the location information stored in sparse map 800 relative to the identified landmark. For example, in some embodiments, multiple position measurements relative to a particular feature stored in sparse map 800 may be averaged together. Any other mathematical operations, however, may also be used to refine a stored location of a map element based on a plurality of determined locations for the map element.

In a particular example, harvesting vehicles may traverse a particular road segment. Each harvesting vehicle captures images of their respective environments. The images may be collected at any suitable frame capture rate (e.g., 9 Hz, etc.). Image analysis processor(s) aboard each harvesting vehicle analyze the captured images to detect the presence of semantic and/or non-semantic features/objects. At a high level, the harvesting vehicles transmit to a mapping-server indications of detections of the semantic and/or non-semantic objects/features along with positions associated with those objects/features. In more detail, type indicators, dimension indicators, etc. may be transmitted together with the position information. The position information may include any suitable information for enabling the mapping server to aggregate the detected objects/features into a sparse map useful in navigation. In some cases, the position information may include one or more 2D image positions (e.g., X-Y pixel locations) in a captured image where the semantic or non-semantic features/objects were detected. Such image positions may correspond to a center of the feature/object, a corner, etc. In this scenario, to aid the mapping server in reconstructing the drive information and aligning the drive information from multiple harvesting vehicles, each harvesting vehicle may also provide the server with a location (e.g., a GPS location) where each image was captured.

In other cases, the harvesting vehicle may provide to the server one or more 3D real world points associated with the detected objects/features. Such 3D points may be relative to a predetermined origin (such as an origin of a drive segment) and may be determined through any suitable technique. In some cases, a structure in motion technique may be used to determine the 3D real world position of a detected object/feature. For example, a certain object such as a particular speed limit sign may be detected in two or more captured images. Using information such as the known ego motion (speed, trajectory, GPS position, etc.) of the harvesting vehicle between the captured images, along with observed changes of the speed limit sign in the captured images (change in X-Y pixel location, change in size, etc.), the real-world position of one or more points associated with the speed limit sign may be determined and passed along to the mapping server. Such an approach is optional, as it requires more computation on the part of the harvesting vehicle systems. The sparse map of the disclosed embodiments may enable autonomous navigation of a vehicle using relatively small amounts of stored data. In some embodiments, sparse map 800 may have a data density (e.g., including data representing the target trajectories, landmarks, and any other stored road features) of less than 2 MB per kilometer of roads, less than 1 MB per kilometer of roads, less than 500 kB per kilometer of roads, or less than 100 kB per kilometer of roads. In some embodiments, the data density of sparse map 800 may be less than 10 kB per kilometer of roads or even less than 2 kB per kilometer of roads (e.g., 1.6 kB per kilometer), or no more than 10 kB per kilometer of roads, or no more than 20 kB per kilometer of roads. In some embodiments, most, if not all, of the roadways of the United States may be navigated autonomously using a sparse map having a total of 4 GB or less of data. These data density values may represent an average over an entire sparse map 800, over a local map within sparse map 800, and/or over a particular road segment within sparse map 800.

As noted, sparse map 800 may include representations of a plurality of target trajectories 810 for guiding autonomous driving or navigation along a road segment. Such target trajectories may be stored as three-dimensional splines. The target trajectories stored in sparse map 800 may be determined based on two or more reconstructed trajectories of prior traversals of vehicles along a particular road segment, for example. A road segment may be associated with a single target trajectory or multiple target trajectories. For example, on a two lane road, a first target trajectory may be stored to represent an intended path of travel along the road in a first direction, and a second target trajectory may be stored to represent an intended path of travel along the road in another direction (e.g., opposite to the first direction). Additional target trajectories may be stored with respect to a particular road segment. For example, on a multi-lane road one or more target trajectories may be stored representing intended paths of travel for vehicles in one or more lanes associated with the multi-lane road. In some embodiments, each lane of a multi-lane road may be associated with its own target trajectory. In other embodiments, there may be fewer target trajectories stored than lanes present on a multi-lane road. In such cases, a vehicle navigating the multi-lane road may use any of the stored target trajectories to guides its navigation by taking into account an amount of lane offset from a lane for which a target trajectory is stored (e.g., if a vehicle is traveling in the left most lane of a three lane highway, and a target trajectory is stored only for the middle lane of the highway, the vehicle may navigate using the target trajectory of the middle lane by accounting for the amount of lane offset between the middle lane and the left-most lane when generating navigational instructions).

In some embodiments, the target trajectory may represent an ideal path that a vehicle should take as the vehicle travels. The target trajectory may be located, for example, at an approximate center of a lane of travel. In other cases, the target trajectory may be located elsewhere relative to a road segment. For example, a target trajectory may approximately coincide with a center of a road, an edge of a road, or an edge of a lane, etc. In such cases, navigation based on the target trajectory may include a determined amount of offset to be maintained relative to the location of the target trajectory. Moreover, in some embodiments, the determined amount of offset to be maintained relative to the location of the target trajectory may differ based on a type of vehicle (e.g., a passenger vehicle including two axles may have a different offset from a truck including more than two axles along at least a portion of the target trajectory).

Sparse map 800 may also include data relating to a plurality of predetermined landmarks 820 associated with particular road segments, local maps, etc. As discussed in greater detail below, these landmarks may be used in navigation of the autonomous vehicle. For example, in some embodiments, the landmarks may be used to determine a current position of the vehicle relative to a stored target trajectory. With this position information, the autonomous vehicle may be able to adjust a heading direction to match a direction of the target trajectory at the determined location.

The plurality of landmarks 820 may be identified and stored in sparse map 800 at any suitable spacing. In some embodiments, landmarks may be stored at relatively high densities (e.g., every few meters or more). In some embodiments, however, significantly larger landmark spacing values may be employed. For example, in sparse map 800, identified (or recognized) landmarks may be spaced apart by 10 meters, 20 meters, 50 meters, 100 meters, 1 kilometer, or 2 kilometers. In some cases, the identified landmarks may be located at distances of even more than 2 kilometers apart.

Between landmarks, and therefore between determinations of vehicle position relative to a target trajectory, the vehicle may navigate based on dead reckoning in which the vehicle uses sensors to determine its ego motion and estimate its position relative to the target trajectory. Because errors may accumulate during navigation by dead reckoning, over time the position determinations relative to the target trajectory may become increasingly less accurate. The vehicle may use landmarks occurring in sparse map 800 (and their known locations) to remove the dead reckoning-induced errors in position determination. In this way, the identified landmarks included in sparse map 800 may serve as navigational anchors from which an accurate position of the vehicle relative to a target trajectory may be determined. Because a certain amount of error may be acceptable in position location, an identified landmark need not always be available to an autonomous vehicle. Rather, suitable navigation may be possible even based on landmark spacings, as noted above, of 10 meters, 20 meters, 50 meters, 100 meters, 500 meters, 1 kilometer, 2 kilometers, or more. In some embodiments, a density of 1 identified landmark every 1 km of road may be sufficient to maintain a longitudinal position determination accuracy within 1 m. Thus, not every potential landmark appearing along a road segment need be stored in sparse map 800.

Moreover, in some embodiments, lane markings may be used for localization of the vehicle during landmark spacings. By using lane markings during landmark spacings, the accumulation of errors during navigation by dead reckoning may be minimized.

Figure 9A:
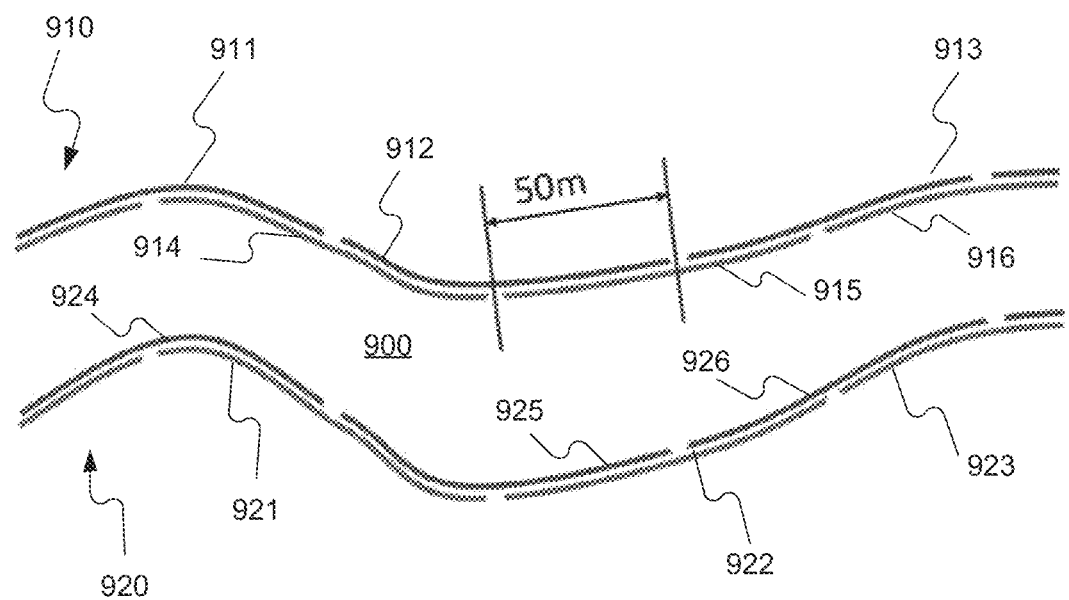
FIG. 9A illustrates a polynomial representation of a portions of a road segment consistent with the disclosed embodiments.

In addition to target trajectories and identified landmarks, sparse map 800 may include information relating to various other road features. For example, FIG. 9A illustrates a representation of curves along a particular road segment that may be stored in sparse map 800. In some embodiments, a single lane of a road may be modeled by a three-dimensional polynomial description of left and right sides of the road. Such polynomials representing left and right sides of a single lane are shown in FIG. 9A. Regardless of how many lanes a road may have, the road may be represented using polynomials in a way similar to that illustrated in FIG. 9A. For example, left and right sides of a multi-lane road may be represented by polynomials similar to those shown in FIG. 9A, and intermediate lane markings included on a multi-lane road (e.g., dashed markings representing lane boundaries, solid yellow lines representing boundaries between lanes traveling in different directions, etc.) may also be represented using polynomials such as those shown in FIG. 9A.

As shown in FIG. 9A, a lane 900 may be represented using polynomials (e.g., a first order, second order, third order, or any suitable order polynomials). For illustration, lane 900 is shown as a two-dimensional lane and the polynomials are shown as two-dimensional polynomials. As depicted in FIG. 9A, lane 900 includes a left side 910 and a right side 920. In some embodiments, more than one polynomial may be used to represent a location of each side of the road or lane boundary. For example, each of left side 910 and right side 920 may be represented by a plurality of polynomials of any suitable length. In some cases, the polynomials may have a length of about 100 m, although other lengths greater than or less than 100 m may also be used. Additionally, the polynomials can overlap with one another in order to facilitate seamless transitions in navigating based on subsequently encountered polynomials as a host vehicle travels along a roadway. For example, each of left side 910 and right side 920 may be represented by a plurality of third order polynomials separated into segments of about 100 meters in length (an example of the first predetermined range), and overlapping each other by about 50 meters. The polynomials representing the left side 910 and the right side 920 may or may not have the same order. For example, in some embodiments, some polynomials may be second order polynomials, some may be third order polynomials, and some may be fourth order polynomials.

In the example shown in FIG. 9A, left side 910 of lane 900 is represented by two groups of third order polynomials. The first group includes polynomial segments 911, 912, and 913. The second group includes polynomial segments 914, 915, and 916. The two groups, while substantially parallel to each other, follow the locations of their respective sides of the road. Polynomial segments 911, 912, 913, 914, 915, and 916 have a length of about 100 meters and overlap adjacent segments in the series by about 50 meters. As noted previously, however, polynomials of different lengths and different overlap amounts may also be used. For example, the polynomials may have lengths of 500 m, 1 km, or more, and the overlap amount may vary from 0 to 50 m, 50 m to 100 m, or greater than 100 m. Additionally, while FIG. 9A is shown as representing polynomials extending in 2D space (e.g., on the surface of the paper), it is to be understood that these polynomials may represent curves extending in three dimensions (e.g., including a height component) to represent elevation changes in a road segment in addition to X-Y curvature. In the example shown in FIG. 9A, right side 920 of lane 900 is further represented by a first group having polynomial segments 921, 922, and 923 and a second group having polynomial segments 924, 925, and 926.

Figure 9B:
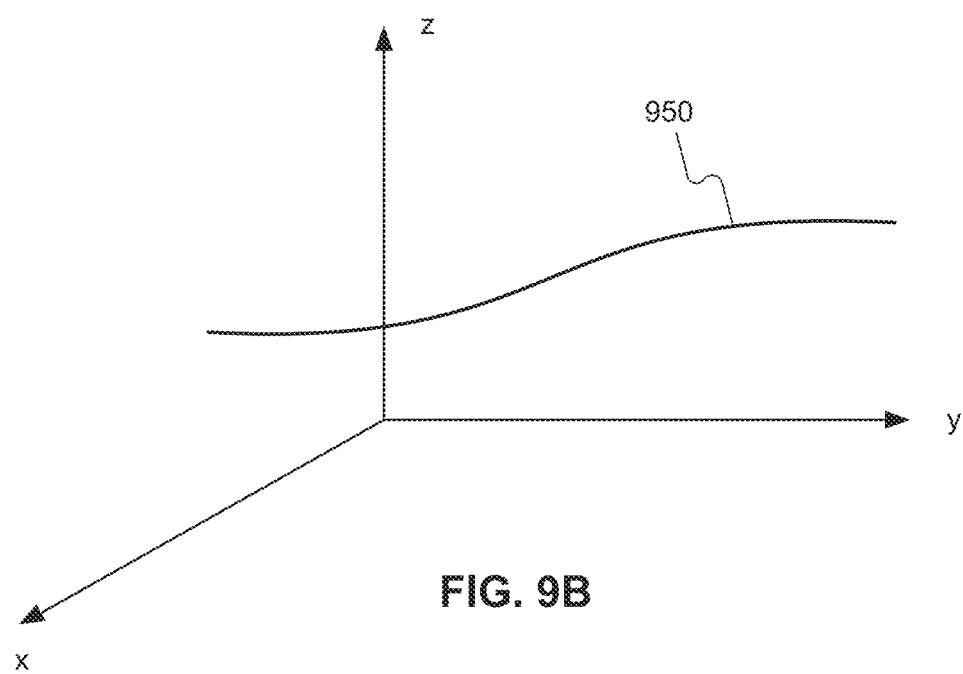
FIG. 9B illustrates a curve in three-dimensional space representing a target trajectory of a vehicle, for a particular road segment, included in a sparse map consistent with the disclosed embodiments.

Returning to the target trajectories of sparse map 800, FIG. 9B shows a three-dimensional polynomial representing a target trajectory for a vehicle traveling along a particular road segment. The target trajectory represents not only the X-Y path that a host vehicle should travel along a particular road segment, but also the elevation change that the host vehicle will experience when traveling along the road segment. Thus, each target trajectory in sparse map 800 may be represented by one or more three-dimensional polynomials, like the three-dimensional polynomial 950 shown in FIG. 9B. Sparse map 800 may include a plurality of trajectories (e.g., millions or billions or more to represent trajectories of vehicles along various road segments along roadways throughout the world). In some embodiments, each target trajectory may correspond to a spline connecting three-dimensional polynomial segments.

Regarding the data footprint of polynomial curves stored in sparse map 800, in some embodiments, each third degree polynomial may be represented by four parameters, each requiring four bytes of data. Suitable representations may be obtained with third degree polynomials requiring about 192 bytes of data for every 100 m. This may translate to approximately 200 kB per hour in data usage/transfer requirements for a host vehicle traveling approximately 100 km/hr.

Sparse map 800 may describe the lanes network using a combination of geometry descriptors and meta-data. The geometry may be described by polynomials or splines as described above. The meta-data may describe the number of lanes, special characteristics (such as a car pool lane), and possibly other sparse labels. The total footprint of such indicators may be negligible.

Accordingly, a sparse map according to embodiments of the present disclosure may include at least one line representation of a road surface feature extending along the road segment, each line representation representing a path along the road segment substantially corresponding with the road surface feature. In some embodiments, as discussed above, the at least one line representation of the road surface feature may include a spline, a polynomial representation, or a curve. Furthermore, in some embodiments, the road surface feature may include at least one of a road edge or a lane marking. Moreover, as discussed below with respect to "crowdsourcing," the road surface feature may be identified through image analysis of a plurality of images acquired as one or more vehicles traverse the road segment.

As previously noted, sparse map 800 may include a plurality of predetermined landmarks associated with a road segment. Rather than storing actual images of the landmarks and relying, for example, on image recognition analysis based on captured images and stored images, each landmark in sparse map 800 may be represented and recognized using less data than a stored, actual image would require. Data representing landmarks may still include sufficient information for describing or identifying the landmarks along a road. Storing data describing characteristics of landmarks, rather than the actual images of landmarks, may reduce the size of sparse map 800.

Figure 10:
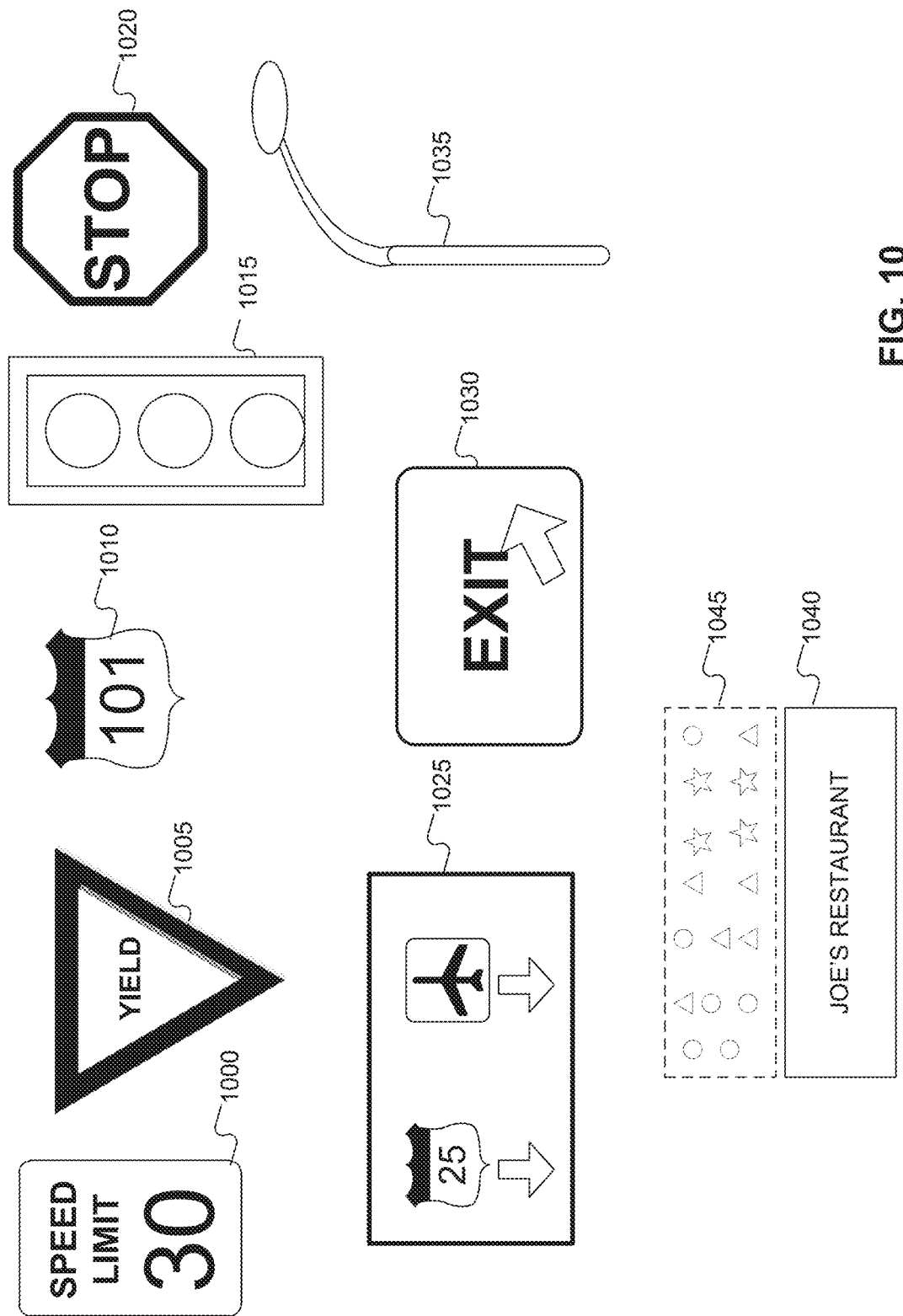
FIG. 10 illustrates example landmarks that may be included in sparse map consistent with the disclosed embodiments.

FIG. 10 illustrates examples of types of landmarks that may be represented in sparse map 800. The landmarks may include any visible and identifiable objects along a road segment. The landmarks may be selected such that they are fixed and do not change often with respect to their locations and/or content. The landmarks included in sparse map 800 may be useful in determining a location of vehicle 200 with respect to a target trajectory as the vehicle traverses a particular road segment. Examples of landmarks may include traffic signs, directional signs, general signs (e.g., rectangular signs), roadside fixtures (e.g., lampposts, reflectors, etc.), and any other suitable category. In some embodiments, lane marks on the road, may also be included as landmarks in sparse map 800.

Examples of landmarks shown in FIG. 10 include traffic signs, directional signs, roadside fixtures, and general signs. Traffic signs may include, for example, speed limit signs (e.g., speed limit sign 1000), yield signs (e.g., yield sign 1005), route number signs (e.g., route number sign 1010), traffic light signs (e.g., traffic light sign 1015), stop signs (e.g., stop sign 1020). Directional signs may include a sign that includes one or more arrows indicating one or more directions to different places. For example, directional signs may include a highway sign 1025 having arrows for directing vehicles to different roads or places, an exit sign 1030 having an arrow directing vehicles off a road, etc. Accordingly, at least one of the plurality of landmarks may include a road sign.

General signs may be unrelated to traffic. For example, general signs may include billboards used for advertisement, or a welcome board adjacent a border between two countries, states, counties, cities, or towns. FIG. 10 shows a general sign 1040 ("Joe's Restaurant"). Although general sign 1040 may have a rectangular shape, as shown in FIG. 10, general sign 1040 may have other shapes, such as square, circle, triangle, etc.

Landmarks may also include roadside fixtures. Roadside fixtures may be objects that are not signs, and may not be related to traffic or directions. For example, roadside fixtures may include lampposts (e.g., lamppost 1035), power line posts, traffic light posts, etc.

Landmarks may also include beacons that may be specifically designed for usage in an autonomous vehicle navigation system. For example, such beacons may include stand-alone structures placed at predetermined intervals to aid in navigating a host vehicle. Such beacons may also include visual/graphical information added to existing road signs (e.g., icons, emblems, bar codes, etc.) that may be identified or recognized by a vehicle traveling along a road segment. Such beacons may also include electronic components. In such embodiments, electronic beacons (e.g., RFID tags, etc.) may be used to transmit non-visual information to a host vehicle. Such information may include, for example, landmark identification and/or landmark location information that a host vehicle may use in determining its position along a target trajectory.

In some embodiments, the landmarks included in sparse map 800 may be represented by a data object of a predetermined size. The data representing a landmark may include any suitable parameters for identifying a particular landmark. For example, in some embodiments, landmarks stored in sparse map 800 may include parameters such as a physical size of the landmark (e.g., to support estimation of distance to the landmark based on a known size/scale), a distance to a previous landmark, lateral offset, height, a type code (e.g., a landmark type—what type of directional sign, traffic sign, etc.), a GPS coordinate (e.g., to support global localization), and any other suitable parameters. Each parameter may be associated with a data size. For example, a landmark size may be stored using 8 bytes of data. A distance to a previous landmark, a lateral offset, and height may be specified using 12 bytes of data. A type code associated with a landmark such as a directional sign or a traffic sign may require about 2 bytes of data. For general signs, an image signature enabling identification of the general sign may be stored using 50 bytes of data storage. The landmark GPS position may be associated with 16 bytes of data storage. These data sizes for each parameter are examples only, and other data sizes may also be used. Representing landmarks in sparse map 800 in this manner may offer a lean solution for efficiently representing landmarks in the database. In some embodiments, objects may be referred to as standard semantic objects or non-standard semantic objects. A standard semantic object may include any class of object for which there's a standardized set of characteristics (e.g., speed limit signs, warning signs, directional signs, traffic lights, etc. having known dimensions or other characteristics). A non-standard semantic object may include any object that is not associated with a standardized set of characteristics (e.g., general advertising signs, signs identifying business establishments, potholes, trees, etc. that may have variable dimensions). Each non-standard semantic object may be represented with 38 bytes of data (e.g., 8 bytes for size; 12 bytes for distance to previous landmark, lateral offset, and height; 2 bytes for a type code; and 16 bytes for position coordinates). Standard semantic objects may be represented using even less data, as size information may not be needed by the mapping server to fully represent the object in the sparse map.

Sparse map 800 may use a tag system to represent landmark types. In some cases, each traffic sign or directional sign may be associated with its own tag, which may be stored in the database as part of the landmark identification. For example, the database may include on the order of 1000 different tags to represent various traffic signs and on the order of about 10000 different tags to represent directional signs. Of course, any suitable number of tags may be used, and additional tags may be created as needed. General purpose signs may be represented in some embodiments using less than about 100 bytes (e.g., about 86 bytes including 8 bytes for size; 12 bytes for distance to previous landmark, lateral offset, and height; 50 bytes for an image signature; and 16 bytes for GPS coordinates).

Thus, for semantic road signs not requiring an image signature, the data density impact to sparse map 800, even at relatively high landmark densities of about 1 per 50 m, may be on the order of about 760 bytes per kilometer (e.g., 20 landmarks per km×38 bytes per landmark=760 bytes). Even for general purpose signs including an image signature component, the data density impact is about 1.72 kB per km (e.g., 20 landmarks per km×86 bytes per landmark=1,720 bytes). For semantic road signs, this equates to about 76 kB per hour of data usage for a vehicle traveling 100 km/hr. For general purpose signs, this equates to about 170 kB per hour for a vehicle traveling 100 km/hr. It should be noted that in some environments (e.g., urban environments) there may be a much higher density of detected objects available for inclusion in the sparse map (perhaps more than one per meter). In some embodiments, a generally rectangular object, such as a rectangular sign, may be represented in sparse map 800 by no more than 100 bytes of data. The representation of the generally rectangular object (e.g., general sign 1040) in sparse map 800 may include a condensed image signature or image hash (e.g., condensed image signature 1045) associated with the generally rectangular object. This condensed image signature/image hash may be determined using any suitable image hashing algorithm and may be used, for example, to aid in identification of a general purpose sign, for example, as a recognized landmark. Such a condensed image signature (e.g., image information derived from actual image data representing an object) may avoid a need for storage of an actual image of an object or a need for comparative image analysis performed on actual images in order to recognize landmarks.

Referring to FIG. 10, sparse map 800 may include or store a condensed image signature 1045 associated with a general sign 1040, rather than an actual image of general sign 1040. For example, after an image capture device (e.g., image capture device 122, 124, or 126) captures an image of general sign 1040, a processor (e.g., image processor 190 or any other processor that can process images either aboard or remotely located relative to a host vehicle) may perform an image analysis to extract/create condensed image signature 1045 that includes a unique signature or pattern associated with general sign 1040. In one embodiment, condensed image signature 1045 may include a shape, color pattern, a brightness pattern, or any other feature that may be extracted from the image of general sign 1040 for describing general sign 1040.

For example, in FIG. 10, the circles, triangles, and stars shown in condensed image signature 1045 may represent areas of different colors. The pattern represented by the circles, triangles, and stars may be stored in sparse map 800, e.g., within the 50 bytes designated to include an image signature. Notably, the circles, triangles, and stars are not necessarily meant to indicate that such shapes are stored as part of the image signature. Rather, these shapes are meant to conceptually represent recognizable areas having discernible color differences, textual areas, graphical shapes, or other variations in characteristics that may be associated with a general purpose sign. Such condensed image signatures can be used to identify a landmark in the form of a general sign. For example, the condensed image signature can be used to perform a same-not-same analysis based on a comparison of a stored condensed image signature with image data captured, for example, using a camera onboard an autonomous vehicle.

Accordingly, the plurality of landmarks may be identified through image analysis of the plurality of images acquired as one or more vehicles traverse the road segment. As explained below with respect to "crowdsourcing," in some embodiments, the image analysis to identify the plurality of landmarks may include accepting potential landmarks when a ratio of images in which the landmark does appear to images in which the landmark does not appear exceeds a threshold. Furthermore, in some embodiments, the image analysis to identify the plurality of landmarks may include rejecting potential landmarks when a ratio of images in which the landmark does not appear to images in which the landmark does appear exceeds a threshold.

Figure 11A:
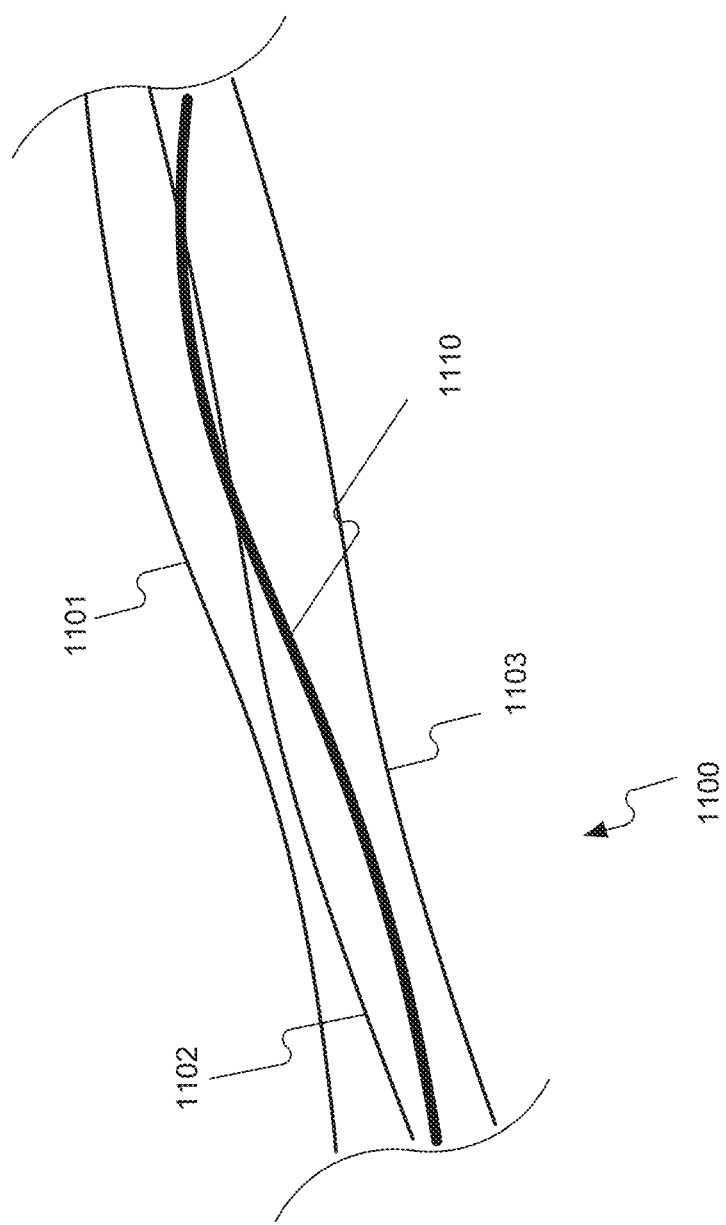
FIG. 11A shows polynomial representations of trajectories consistent with the disclosed embodiments.

Returning to the target trajectories a host vehicle may use to navigate a particular road segment, FIG. 11A shows polynomial representations trajectories capturing during a process of building or maintaining sparse map 800. A polynomial representation of a target trajectory included in sparse map 800 may be determined based on two or more reconstructed trajectories of prior traversals of vehicles along the same road segment. In some embodiments, the polynomial representation of the target trajectory included in sparse map 800 may be an aggregation of two or more reconstructed trajectories of prior traversals of vehicles along the same road segment. In some embodiments, the polynomial representation of the target trajectory included in sparse map 800 may be an average of the two or more reconstructed trajectories of prior traversals of vehicles along the same road segment. Other mathematical operations may also be used to construct a target trajectory along a road path based on reconstructed trajectories collected from vehicles traversing along a road segment.

As shown in FIG. 11A, a road segment 1100 may be travelled by a number of vehicles 200 at different times. Each vehicle 200 may collect data relating to a path that the vehicle took along the road segment. The path traveled by a particular vehicle may be determined based on camera data, accelerometer information, speed sensor information, and/or GPS information, among other potential sources. Such data may be used to reconstruct trajectories of vehicles traveling along the road segment, and based on these reconstructed trajectories, a target trajectory (or multiple target trajectories) may be determined for the particular road segment. Such target trajectories may represent a preferred path of a host vehicle (e.g., guided by an autonomous navigation system) as the vehicle travels along the road segment.

In the example shown in FIG. 11A, a first reconstructed trajectory 1101 may be determined based on data received from a first vehicle traversing road segment 1100 at a first time period (e.g., day 1), a second reconstructed trajectory 1102 may be obtained from a second vehicle traversing road segment 1100 at a second time period (e.g., day 2), and a third reconstructed trajectory 1103 may be obtained from a third vehicle traversing road segment 1100 at a third time period (e.g., day 3). Each trajectory 1101, 1102, and 1103 may be represented by a polynomial, such as a three-dimensional polynomial. It should be noted that in some embodiments, any of the reconstructed trajectories may be assembled onboard the vehicles traversing road segment 1100.

Additionally, or alternatively, such reconstructed trajectories may be determined on a server side based on information received from vehicles traversing road segment 1100. For example, in some embodiments, vehicles 200 may transmit data to one or more servers relating to their motion along road segment 1100 (e.g., steering angle, heading, time, position, speed, sensed road geometry, and/or sensed landmarks, among things). The server may reconstruct trajectories for vehicles 200 based on the received data. The server may also generate a target trajectory for guiding navigation of autonomous vehicle that will travel along the same road segment 1100 at a later time based on the first, second, and third trajectories 1101, 1102, and 1103. While a target trajectory may be associated with a single prior traversal of a road segment, in some embodiments, each target trajectory included in sparse map 800 may be determined based on two or more reconstructed trajectories of vehicles traversing the same road segment. In FIG. 11A, the target trajectory is represented by 1110. In some embodiments, the target trajectory 1110 may be generated based on an average of the first, second, and third trajectories 1101, 1102, and 1103. In some embodiments, the target trajectory 1110 included in sparse map 800 may be an aggregation (e.g., a weighted combination) of two or more reconstructed trajectories.

At the mapping server, the server may receive actual trajectories for a particular road segment from multiple harvesting vehicles traversing the road segment. To generate a target trajectory for each valid path along the road segment (e.g., each lane, each drive direction, each path through a junction, etc.), the received actual trajectories may be aligned. The alignment process may include using detected objects/features identified along the road segment along with harvested positions of those detected objects/features to correlate the actual, harvested trajectories with one another. Once aligned, an average or "best fit" target trajectory for each available lane, etc. may be determined based on the aggregated, correlated/aligned actual trajectories.

Figure 11B:
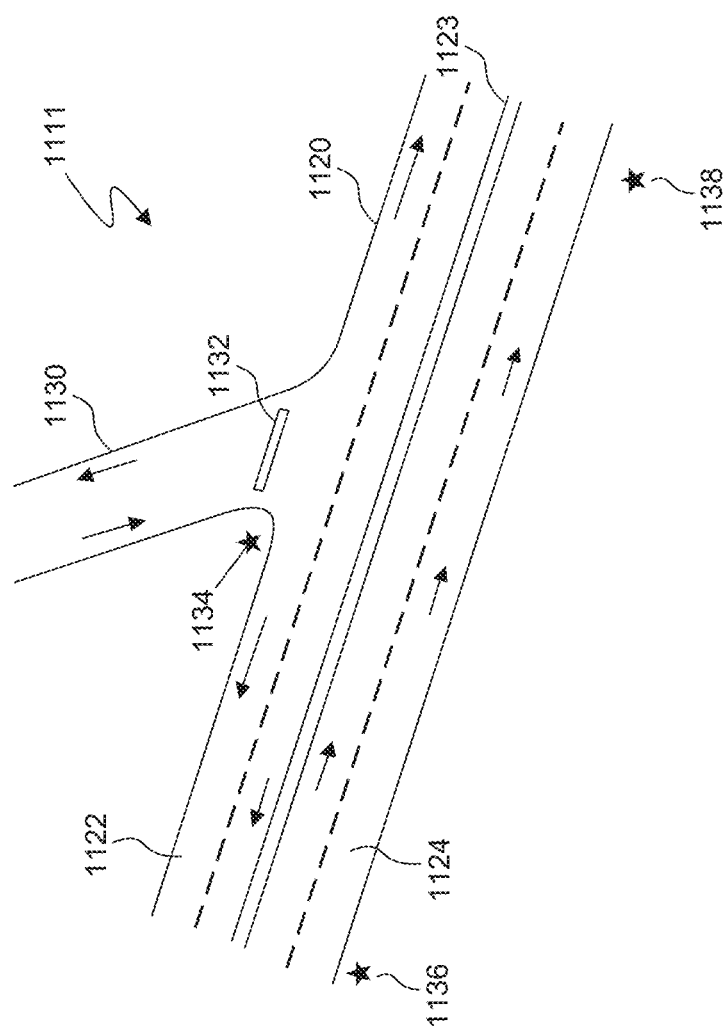
FIGS. 11B and 11C show target trajectories along a multi-lane road consistent with disclosed embodiments.
Figure 11C:
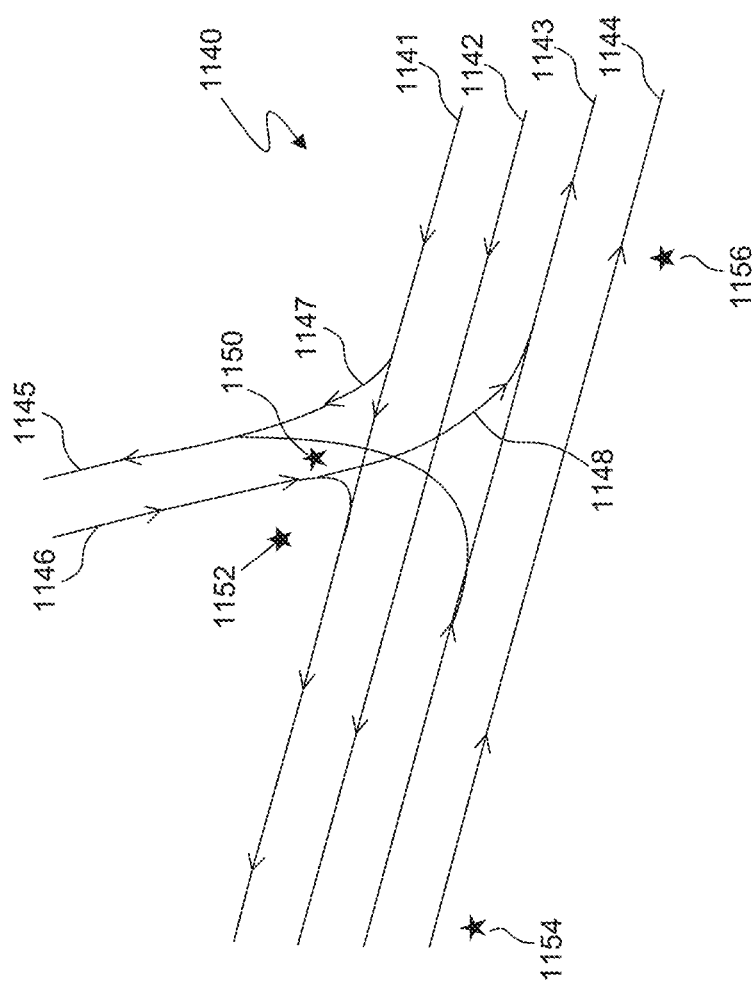

FIGS. 11B and 11C further illustrate the concept of target trajectories associated with road segments present within a geographic region 1111. As shown in FIG. 11B, a first road segment 1120 within geographic region 1111 may include a multilane road, which includes two lanes 1122 designated for vehicle travel in a first direction and two additional lanes 1124 designated for vehicle travel in a second direction opposite to the first direction. Lanes 1122 and lanes 1124 may be separated by a double yellow line 1123. Geographic region 1111 may also include a branching road segment 1130 that intersects with road segment 1120. Road segment 1130 may include a two-lane road, each lane being designated for a different direction of travel. Geographic region 1111 may also include other road features, such as a stop line 1132, a stop sign 1134, a speed limit sign 1136, and a hazard sign 1138.

As shown in FIG. 11C, sparse map 800 may include a local map 1140 including a road model for assisting with autonomous navigation of vehicles within geographic region 1111. For example, local map 1140 may include target trajectories for one or more lanes associated with road segments 1120 and/or 1130 within geographic region 1111. For example, local map 1140 may include target trajectories 1141 and/or 1142 that an autonomous vehicle may access or rely upon when traversing lanes 1122. Similarly, local map 1140 may include target trajectories 1143 and/or 1144 that an autonomous vehicle may access or rely upon when traversing lanes 1124. Further, local map 1140 may include target trajectories 1145 and/or 1146 that an autonomous vehicle may access or rely upon when traversing road segment 1130. Target trajectory 1147 represents a preferred path an autonomous vehicle should follow when transitioning from lanes 1120 (and specifically, relative to target trajectory 1141 associated with a right-most lane of lanes 1120) to road segment 1130 (and specifically, relative to a target trajectory 1145 associated with a first side of road segment 1130. Similarly, target trajectory 1148 represents a preferred path an autonomous vehicle should follow when transitioning from road segment 1130 (and specifically, relative to target trajectory 1146) to a portion of road segment 1124 (and specifically, as shown, relative to a target trajectory 1143 associated with a left lane of lanes 1124.

Sparse map 800 may also include representations of other road-related features associated with geographic region 1111. For example, sparse map 800 may also include representations of one or more landmarks identified in geographic region 1111. Such landmarks may include a first landmark 1150 associated with stop line 1132, a second landmark 1152 associated with stop sign 1134, a third landmark associated with speed limit sign 1154, and a fourth landmark 1156 associated with hazard sign 1138. Such landmarks may be used, for example, to assist an autonomous vehicle in determining its current location relative to any of the shown target trajectories, such that the vehicle may adjust its heading to match a direction of the target trajectory at the determined location.

Figure 11D:
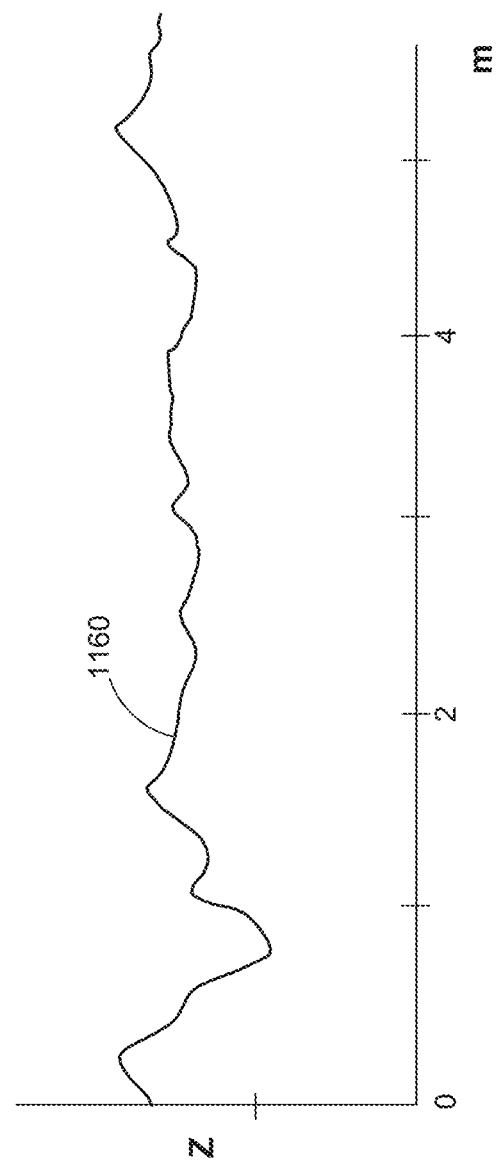
FIG. 11D shows an example road signature profile consistent with disclosed embodiments.

In some embodiments, sparse map 800 may also include road signature profiles. Such road signature profiles may be associated with any discernible/measurable variation in at least one parameter associated with a road. For example, in some cases, such profiles may be associated with variations in road surface information such as variations in surface roughness of a particular road segment, variations in road width over a particular road segment, variations in distances between dashed lines painted along a particular road segment, variations in road curvature along a particular road segment, etc. FIG. 11D shows an example of a road signature profile 1160. While profile 1160 may represent any of the parameters mentioned above, or others, in one example, profile 1160 may represent a measure of road surface roughness, as obtained, for example, by monitoring one or more sensors providing outputs indicative of an amount of suspension displacement as a vehicle travels a particular road segment.

Alternatively or concurrently, profile 1160 may represent variation in road width, as determined based on image data obtained via a camera onboard a vehicle traveling a particular road segment. Such profiles may be useful, for example, in determining a particular location of an autonomous vehicle relative to a particular target trajectory. That is, as it traverses a road segment, an autonomous vehicle may measure a profile associated with one or more parameters associated with the road segment. If the measured profile can be correlated/matched with a predetermined profile that plots the parameter variation with respect to position along the road segment, then the measured and predetermined profiles may be used (e.g., by overlaying corresponding sections of the measured and predetermined profiles) in order to determine a current position along the road segment and, therefore, a current position relative to a target trajectory for the road segment.

In some embodiments, sparse map 800 may include different trajectories based on different characteristics associated with a user of autonomous vehicles, environmental conditions, and/or other parameters relating to driving. For example, in some embodiments, different trajectories may be generated based on different user preferences and/or profiles. Sparse map 800 including such different trajectories may be provided to different autonomous vehicles of different users. For example, some users may prefer to avoid toll roads, while others may prefer to take the shortest or fastest routes, regardless of whether there is a toll road on the route. The disclosed systems may generate different sparse maps with different trajectories based on such different user preferences or profiles. As another example, some users may prefer to travel in a fast moving lane, while others may prefer to maintain a position in the central lane at all times.

Different trajectories may be generated and included in sparse map 800 based on different environmental conditions, such as day and night, snow, rain, fog, etc. Autonomous vehicles driving under different environmental conditions may be provided with sparse map 800 generated based on such different environmental conditions. In some embodiments, cameras provided on autonomous vehicles may detect the environmental conditions, and may provide such information back to a server that generates and provides sparse maps. For example, the server may generate or update an already generated sparse map 800 to include trajectories that may be more suitable or safer for autonomous driving under the detected environmental conditions. The update of sparse map 800 based on environmental conditions may be performed dynamically as the autonomous vehicles are traveling along roads.

Other different parameters relating to driving may also be used as a basis for generating and providing different sparse maps to different autonomous vehicles. For example, when an autonomous vehicle is traveling at a high speed, turns may be tighter. Trajectories associated with specific lanes, rather than roads, may be included in sparse map 800 such that the autonomous vehicle may maintain within a specific lane as the vehicle follows a specific trajectory. When an image captured by a camera onboard the autonomous vehicle indicates that the vehicle has drifted outside of the lane (e.g., crossed the lane mark), an action may be triggered within the vehicle to bring the vehicle back to the designated lane according to the specific trajectory.

Crowdsourcing a Sparse Map

The disclosed sparse maps may be efficiently (and passively) generated through the power of crowdsourcing. For example, any private or commercial vehicle equipped with a camera (e.g., a simple, low resolution camera regularly included as OEM equipment on today's vehicles) and an appropriate image analysis processor can serve as a harvesting vehicle. No special equipment (e.g., high definition imaging and/or positioning systems) are required. As a result of the disclosed crowdsourcing technique, the generated sparse maps may be extremely accurate and may include extremely refined position information (enabling navigation error limits of 10 cm or less) without requiring any specialized imaging or sensing equipment as input to the map generation process. Crowdsourcing also enables much more rapid (and inexpensive) updates to the generated maps, as new drive information is continuously available to the mapping server system from any roads traversed by private or commercial vehicles minimally equipped to also serve as harvesting vehicles. There is no need for designated vehicles equipped with high-definition imaging and mapping sensors. Therefore, the expense associated with building such specialized vehicles can be avoided. Further, updates to the presently disclosed sparse maps may be made much more rapidly than systems that rely upon dedicated, specialized mapping vehicles (which by virtue of their expense and special equipment are typically limited to a fleet of specialized vehicles of far lower numbers than the number of private or commercial vehicles already available for performing the disclosed harvesting techniques).

The disclosed sparse maps generated through crowdsourcing may be extremely accurate because they may be generated based on many inputs from multiple (10 s, hundreds, millions, etc.) of harvesting vehicles that have collected drive information along a particular road segment. For example, every harvesting vehicle that drives along a particular road segment may record its actual trajectory and may determine position information relative to detected objects/features along the road segment. This information is passed along from multiple harvesting vehicles to a server. The actual trajectories are aggregated to generate a refined, target trajectory for each valid drive path along the road segment. Additionally, the position information collected from the multiple harvesting vehicles for each of the detected objects/features along the road segment (semantic or non-semantic) can also be aggregated. As a result, the mapped position of each detected object/feature may constitute an average of hundreds, thousands, or millions of individually determined positions for each detected object/feature. Such a technique may yield extremely accurate mapped positions for the detected objects/features.

In some embodiments, the disclosed systems and methods may generate a sparse map for autonomous vehicle navigation. For example, disclosed systems and methods may use crowdsourced data for generation of a sparse map that one or more autonomous vehicles may use to navigate along a system of roads. As used herein, "crowdsourcing" means that data are received from various vehicles (e.g., autonomous vehicles) travelling on a road segment at different times, and such data are used to generate and/or update the road model, including sparse map tiles. The model or any of its sparse map tiles may, in turn, be transmitted to the vehicles or other vehicles later travelling along the road segment for assisting autonomous vehicle navigation. The road model may include a plurality of target trajectories representing preferred trajectories that autonomous vehicles should follow as they traverse a road segment. The target trajectories may be the same as a reconstructed actual trajectory collected from a vehicle traversing a road segment, which may be transmitted from the vehicle to a server. In some embodiments, the target trajectories may be different from actual trajectories that one or more vehicles previously took when traversing a road segment. The target trajectories may be generated based on actual trajectories (e.g., through averaging or any other suitable operation).

The vehicle trajectory data that a vehicle may upload to a server may correspond with the actual reconstructed trajectory for the vehicle or may correspond to a recommended trajectory, which may be based on or related to the actual reconstructed trajectory of the vehicle, but may differ from the actual reconstructed trajectory. For example, vehicles may modify their actual, reconstructed trajectories and submit (e.g., recommend) to the server the modified actual trajectories. The road model may use the recommended, modified trajectories as target trajectories for autonomous navigation of other vehicles.

In addition to trajectory information, other information for potential use in building a sparse data map 800 may include information relating to potential landmark candidates. For example, through crowd sourcing of information, the disclosed systems and methods may identify potential landmarks in an environment and refine landmark positions. The landmarks may be used by a navigation system of autonomous vehicles to determine and/or adjust the position of the vehicle along the target trajectories.

The reconstructed trajectories that a vehicle may generate as the vehicle travels along a road may be obtained by any suitable method. In some embodiments, the reconstructed trajectories may be developed by stitching together segments of motion for the vehicle, using, e.g., ego motion estimation (e.g., three dimensional translation and three dimensional rotation of the camera, and hence the body of the vehicle). The rotation and translation estimation may be determined based on analysis of images captured by one or more image capture devices along with information from other sensors or devices, such as inertial sensors and speed sensors. For example, the inertial sensors may include an accelerometer or other suitable sensors configured to measure changes in translation and/or rotation of the vehicle body. The vehicle may include a speed sensor that measures a speed of the vehicle.

In some embodiments, the ego motion of the camera (and hence the vehicle body) may be estimated based on an optical flow analysis of the captured images. An optical flow analysis of a sequence of images identifies movement of pixels from the sequence of images, and based on the identified movement, determines motions of the vehicle. The ego motion may be integrated over time and along the road segment to reconstruct a trajectory associated with the road segment that the vehicle has followed.

Data (e.g., reconstructed trajectories) collected by multiple vehicles in multiple drives along a road segment at different times may be used to construct the road model (e.g., including the target trajectories, etc.) included in sparse data map 800. Data collected by multiple vehicles in multiple drives along a road segment at different times may also be averaged to increase an accuracy of the model. In some embodiments, data regarding the road geometry and/or landmarks may be received from multiple vehicles that travel through the common road segment at different times. Such data received from different vehicles may be combined to generate the road model and/or to update the road model.

The geometry of a reconstructed trajectory (and also a target trajectory) along a road segment may be represented by a curve in three dimensional space, which may be a spline connecting three dimensional polynomials. The reconstructed trajectory curve may be determined from analysis of a video stream or a plurality of images captured by a camera installed on the vehicle. In some embodiments, a location is identified in each frame or image that is a few meters ahead of the current position of the vehicle. This location is where the vehicle is expected to travel to in a predetermined time period. This operation may be repeated frame by frame, and at the same time, the vehicle may compute the camera's ego motion (rotation and translation). At each frame or image, a short range model for the desired path is generated by the vehicle in a reference frame that is attached to the camera. The short range models may be stitched together to obtain a three dimensional model of the road in some coordinate frame, which may be an arbitrary or predetermined coordinate frame. The three dimensional model of the road may then be fitted by a spline, which may include or connect one or more polynomials of suitable orders.

To conclude the short range road model at each frame, one or more detection modules may be used. For example, a bottom-up lane detection module may be used. The bottom-up lane detection module may be useful when lane marks are drawn on the road. This module may look for edges in the image and assembles them together to form the lane marks. A second module may be used together with the bottom-up lane detection module. The second module is an end-to-end deep neural network, which may be trained to predict the correct short range path from an input image. In both modules, the road model may be detected in the image coordinate frame and transformed to a three dimensional space that may be virtually attached to the camera.

Although the reconstructed trajectory modeling method may introduce an accumulation of errors due to the integration of ego motion over a long period of time, which may include a noise component, such errors may be inconsequential as the generated model may provide sufficient accuracy for navigation over a local scale. In addition, it is possible to cancel the integrated error by using external sources of information, such as satellite images or geodetic measurements. For example, the disclosed systems and methods may use a GNSS receiver to cancel accumulated errors. However, the GNSS positioning signals may not be always available and accurate. The disclosed systems and methods may enable a steering application that depends weakly on the availability and accuracy of GNSS positioning. In such systems, the usage of the GNSS signals may be limited. For example, in some embodiments, the disclosed systems may use the GNSS signals for database indexing purposes only.

In some embodiments, the range scale (e.g., local scale) that may be relevant for an autonomous vehicle navigation steering application may be on the order of 50 meters, 100 meters, 200 meters, 300 meters, etc. Such distances may be used, as the geometrical road model is mainly used for two purposes: planning the trajectory ahead and localizing the vehicle on the road model. In some embodiments, the planning task may use the model over a typical range of 40 meters ahead (or any other suitable distance ahead, such as 20 meters, 30 meters, 50 meters), when the control algorithm steers the vehicle according to a target point located 1.3 seconds ahead (or any other time such as 1.5 seconds, 1.7 seconds, 2 seconds, etc.). The localization task uses the road model over a typical range of 60 meters behind the car (or any other suitable distances, such as 50 meters, 100 meters, 150 meters, etc.), according to a method called "tail alignment" described in more detail in another section. The disclosed systems and methods may generate a geometrical model that has sufficient accuracy over particular range, such as 100 meters, such that a planned trajectory will not deviate by more than, for example, 30 cm from the lane center.

As explained above, a three dimensional road model may be constructed from detecting short range sections and stitching them together. The stitching may be enabled by computing a six degree ego motion model, using the videos and/or images captured by the camera, data from the inertial sensors that reflect the motions of the vehicle, and the host vehicle velocity signal. The accumulated error may be small enough over some local range scale, such as of the order of 100 meters. All this may be completed in a single drive over a particular road segment.

In some embodiments, multiple drives may be used to average the resulted model, and to increase its accuracy further. The same car may travel the same route multiple times, or multiple cars may send their collected model data to a central server. In any case, a matching procedure may be performed to identify overlapping models and to enable averaging in order to generate target trajectories. The constructed model (e.g., including the target trajectories) may be used for steering once a convergence criterion is met. Subsequent drives may be used for further model improvements and in order to accommodate infrastructure changes.

Sharing of driving experience (such as sensed data) between multiple cars becomes feasible if they are connected to a central server. Each vehicle client may store a partial copy of a universal road model, which may be relevant for its current position. A bidirectional update procedure between the vehicles and the server may be performed by the vehicles and the server. The small footprint concept discussed above enables the disclosed systems and methods to perform the bidirectional updates using a very small bandwidth.

Information relating to potential landmarks may also be determined and forwarded to a central server. For example, the disclosed systems and methods may determine one or more physical properties of a potential landmark based on one or more images that include the landmark. The physical properties may include a physical size (e.g., height, width) of the landmark, a distance from a vehicle to a landmark, a distance between the landmark to a previous landmark, the lateral position of the landmark (e.g., the position of the landmark relative to the lane of travel), the GPS coordinates of the landmark, a type of landmark, identification of text on the landmark, etc. For example, a vehicle may analyze one or more images captured by a camera to detect a potential landmark, such as a speed limit sign.

The vehicle may determine a distance from the vehicle to the landmark or a position associated with the landmark (e.g., any semantic or non-semantic object or feature along a road segment) based on the analysis of the one or more images. In some embodiments, the distance may be determined based on analysis of images of the landmark using a suitable image analysis method, such as a scaling method and/or an optical flow method. As previously noted, a position of the object/feature may include a 2D image position (e.g., an X-Y pixel position in one or more captured images) of one or more points associated with the object/feature or may include a 3D real-world position of one or more points (e.g., determined through structure in motion/optical flow techniques, LIDAR or RADAR information, etc.). In some embodiments, the disclosed systems and methods may be configured to determine a type or classification of a potential landmark. In case the vehicle determines that a certain potential landmark corresponds to a predetermined type or classification stored in a sparse map, it may be sufficient for the vehicle to communicate to the server an indication of the type or classification of the landmark, along with its location. The server may store such indications. At a later time, during navigation, a navigating vehicle may capture an image that includes a representation of the landmark, process the image (e.g., using a classifier), and compare the result landmark in order to confirm detection of the mapped landmark and to use the mapped landmark in localizing the navigating vehicle relative to the sparse map.

In some embodiments, multiple autonomous vehicles travelling on a road segment may communicate with a server. The vehicles (or clients) may generate a curve describing its drive (e.g., through ego motion integration) in an arbitrary coordinate frame. The vehicles may detect landmarks and locate them in the same frame. The vehicles may upload the curve and the landmarks to the server. The server may collect data from vehicles over multiple drives, and generate a unified road model. For example, as discussed below with respect to FIG. 19, the server may generate a sparse map having the unified road model using the uploaded curves and landmarks.

The server may also distribute the model to clients (e.g., vehicles). For example, the server may distribute the sparse map to one or more vehicles. The server may continuously or periodically update the model when receiving new data from the vehicles. For example, the server may process the new data to evaluate whether the data includes information that should trigger an updated, or creation of new data on the server. The server may distribute the updated model or the updates to the vehicles for providing autonomous vehicle navigation.

The server may use one or more criteria for determining whether new data received from the vehicles should trigger an update to the model or trigger creation of new data. For example, when the new data indicates that a previously recognized landmark at a specific location no longer exists, or is replaced by another landmark, the server may determine that the new data should trigger an update to the model. As another example, when the new data indicates that a road segment has been closed, and when this has been corroborated by data received from other vehicles, the server may determine that the new data should trigger an update to the model.

The server may distribute the updated model (or the updated portion of the model) to one or more vehicles that are traveling on the road segment, with which the updates to the model are associated. The server may also distribute the updated model to vehicles that are about to travel on the road segment, or vehicles whose planned trip includes the road segment, with which the updates to the model are associated. For example, while an autonomous vehicle is traveling along another road segment before reaching the road segment with which an update is associated, the server may distribute the updates or updated model to the autonomous vehicle before the vehicle reaches the road segment.

In some embodiments, the remote server may collect trajectories and landmarks from multiple clients (e.g., vehicles that travel along a common road segment). The server may match curves using landmarks and create an average road model based on the trajectories collected from the multiple vehicles. The server may also compute a graph of roads and the most probable path at each node or conjunction of the road segment. For example, the remote server may align the trajectories to generate a crowdsourced sparse map from the collected trajectories.

The server may average landmark properties received from multiple vehicles that travelled along the common road segment, such as the distances between one landmark to another (e.g., a previous one along the road segment) as measured by multiple vehicles, to determine an arc-length parameter and support localization along the path and speed calibration for each client vehicle. The server may average the physical dimensions of a landmark measured by multiple vehicles travelled along the common road segment and recognized the same landmark. The averaged physical dimensions may be used to support distance estimation, such as the distance from the vehicle to the landmark. The server may average lateral positions of a landmark (e.g., position from the lane in which vehicles are travelling in to the landmark) measured by multiple vehicles travelled along the common road segment and recognized the same landmark. The averaged lateral portion may be used to support lane assignment. The server may average the GPS coordinates of the landmark measured by multiple vehicles travelled along the same road segment and recognized the same landmark. The averaged GPS coordinates of the landmark may be used to support global localization or positioning of the landmark in the road model.

In some embodiments, the server may identify model changes, such as constructions, detours, new signs, removal of signs, etc., based on data received from the vehicles. The server may continuously or periodically or instantaneously update the model upon receiving new data from the vehicles. The server may distribute updates to the model or the updated model to vehicles for providing autonomous navigation. For example, as discussed further below, the server may use crowdsourced data to filter out "ghost" landmarks detected by vehicles.

In some embodiments, the server may analyze driver interventions during the autonomous driving. The server may analyze data received from the vehicle at the time and location where intervention occurs, and/or data received prior to the time the intervention occurred. The server may identify certain portions of the data that caused or are closely related to the intervention, for example, data indicating a temporary lane closure setup, data indicating a pedestrian in the road. The server may update the model based on the identified data. For example, the server may modify one or more trajectories stored in the model.

Figure 12:
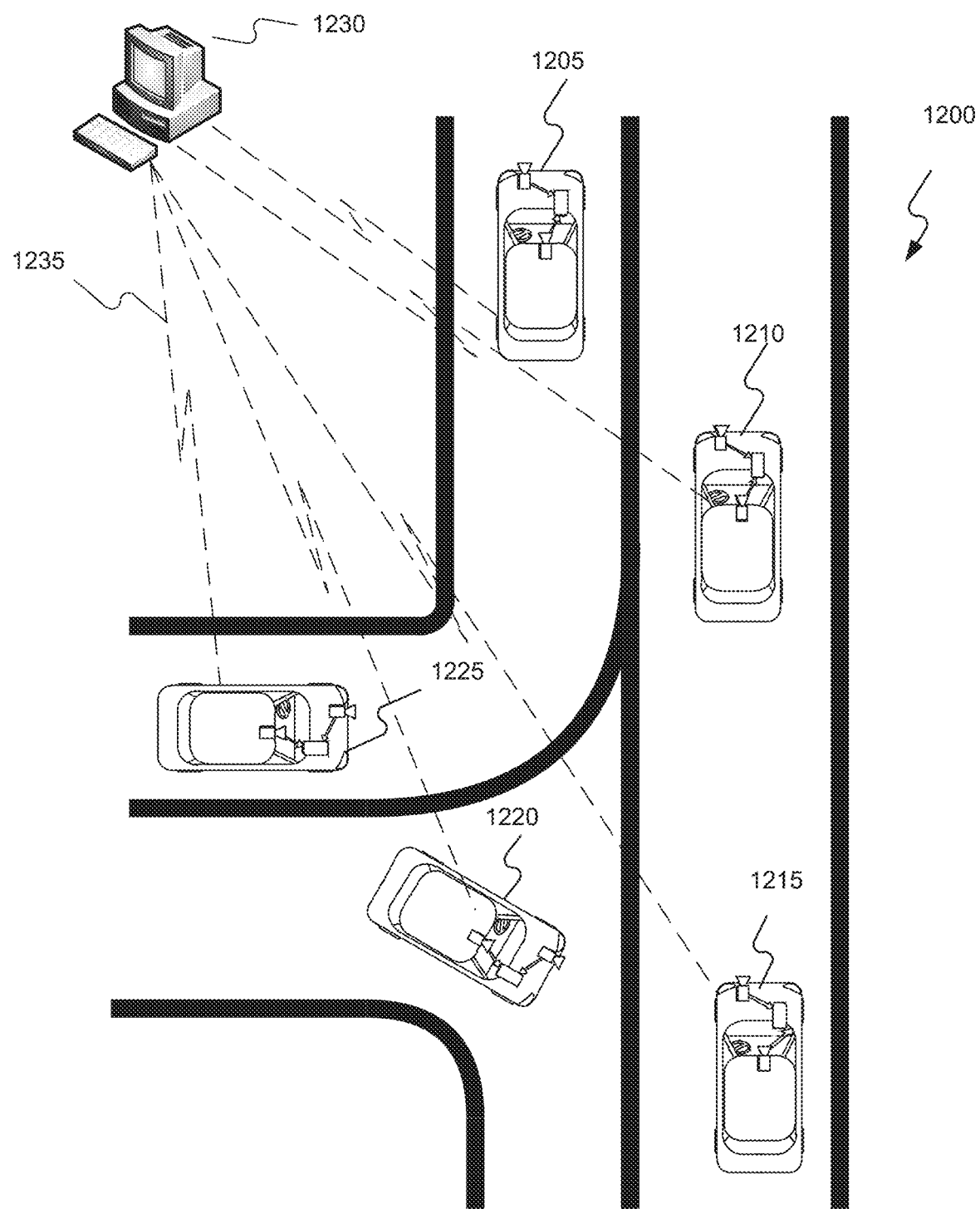
FIG. 12 is a schematic illustration of a system that uses crowd sourcing data received from a plurality of vehicles for autonomous vehicle navigation, consistent with the disclosed embodiments.

FIG. 12 is a schematic illustration of a system that uses crowdsourcing to generate a sparse map (as well as distribute and navigate using a crowdsourced sparse map). FIG. 12 shows a road segment 1200 that includes one or more lanes. A plurality of vehicles 1205, 1210, 1215, 1220, and 1225 may travel on road segment 1200 at the same time or at different times (although shown as appearing on road segment 1200 at the same time in FIG. 12). At least one of vehicles 1205, 1210, 1215, 1220, and 1225 may be an autonomous vehicle. For simplicity of the present example, all of the vehicles 1205, 1210, 1215, 1220, and 1225 are presumed to be autonomous vehicles.

Each vehicle may be similar to vehicles disclosed in other embodiments (e.g., vehicle 200), and may include components or devices included in or associated with vehicles disclosed in other embodiments. Each vehicle may be equipped with an image capture device or camera (e.g., image capture device 122 or camera 122). Each vehicle may communicate with a remote server 1230 via one or more networks (e.g., over a cellular network and/or the Internet, etc.) through wireless communication paths 1235, as indicated by the dashed lines. Each vehicle may transmit data to server 1230 and receive data from server 1230. For example, server 1230 may collect data from multiple vehicles travelling on the road segment 1200 at different times, and may process the collected data to generate an autonomous vehicle road navigation model, or an update to the model. Server 1230 may transmit the autonomous vehicle road navigation model or the update to the model to the vehicles that transmitted data to server 1230. Server 1230 may transmit the autonomous vehicle road navigation model or the update to the model to other vehicles that travel on road segment 1200 at later times.

As vehicles 1205, 1210, 1215, 1220, and 1225 travel on road segment 1200, navigation information collected (e.g., detected, sensed, or measured) by vehicles 1205, 1210, 1215, 1220, and 1225 may be transmitted to server 1230. In some embodiments, the navigation information may be associated with the common road segment 1200. The navigation information may include a trajectory associated with each of the vehicles 1205, 1210, 1215, 1220, and 1225 as each vehicle travels over road segment 1200. In some embodiments, the trajectory may be reconstructed based on data sensed by various sensors and devices provided on vehicle 1205. For example, the trajectory may be reconstructed based on at least one of accelerometer data, speed data, landmarks data, road geometry or profile data, vehicle positioning data, and ego motion data. In some embodiments, the trajectory may be reconstructed based on data from inertial sensors, such as accelerometer, and the velocity of vehicle 1205 sensed by a speed sensor. In addition, in some embodiments, the trajectory may be determined (e.g., by a processor onboard each of vehicles 1205, 1210, 1215, 1220, and 1225) based on sensed ego motion of the camera, which may indicate three dimensional translation and/or three dimensional rotations (or rotational motions). The ego motion of the camera (and hence the vehicle body) may be determined from analysis of one or more images captured by the camera.

In some embodiments, the trajectory of vehicle 1205 may be determined by a processor provided aboard vehicle 1205 and transmitted to server 1230. In other embodiments, server 1230 may receive data sensed by the various sensors and devices provided in vehicle 1205, and determine the trajectory based on the data received from vehicle 1205.

In some embodiments, the navigation information transmitted from vehicles 1205, 1210, 1215, 1220, and 1225 to server 1230 may include data regarding the road surface, the road geometry, or the road profile. The geometry of road segment 1200 may include lane structure and/or landmarks. The lane structure may include the total number of lanes of road segment 1200, the type of lanes (e.g., one-way lane, two-way lane, driving lane, passing lane, etc.), markings on lanes, width of lanes, etc. In some embodiments, the navigation information may include a lane assignment, e.g., which lane of a plurality of lanes a vehicle is traveling in. For example, the lane assignment may be associated with a numerical value "3" indicating that the vehicle is traveling on the third lane from the left or right. As another example, the lane assignment may be associated with a text value "center lane" indicating the vehicle is traveling on the center lane.

Server 1230 may store the navigation information on a non-transitory computer-readable medium, such as a hard drive, a compact disc, a tape, a memory, etc. Server 1230 may generate (e.g., through a processor included in server 1230) at least a portion of an autonomous vehicle road navigation model for the common road segment 1200 based on the navigation information received from the plurality of vehicles 1205, 1210, 1215, 1220, and 1225 and may store the model as a portion of a sparse map. Server 1230 may determine a trajectory associated with each lane based on crowdsourced data (e.g., navigation information) received from multiple vehicles (e.g., 1205, 1210, 1215, 1220, and 1225) that travel on a lane of road segment at different times. Server 1230 may generate the autonomous vehicle road navigation model or a portion of the model (e.g., an updated portion) based on a plurality of trajectories determined based on the crowd sourced navigation data. Server 1230 may transmit the model or the updated portion of the model to one or more of autonomous vehicles 1205, 1210, 1215, 1220, and 1225 traveling on road segment 1200 or any other autonomous vehicles that travel on road segment at a later time for updating an existing autonomous vehicle road navigation model provided in a navigation system of the vehicles. The autonomous vehicle road navigation model may be used by the autonomous vehicles in autonomously navigating along the common road segment 1200.

As explained above, the autonomous vehicle road navigation model may be included in a sparse map (e.g., sparse map 800 depicted in FIG. 8). Sparse map 800 may include sparse recording of data related to road geometry and/or landmarks along a road, which may provide sufficient information for guiding autonomous navigation of an autonomous vehicle, yet does not require excessive data storage. In some embodiments, the autonomous vehicle road navigation model may be stored separately from sparse map 800, and may use map data from sparse map 800 when the model is executed for navigation. In some embodiments, the autonomous vehicle road navigation model may use map data included in sparse map 800 for determining target trajectories along road segment 1200 for guiding autonomous navigation of autonomous vehicles 1205, 1210, 1215, 1220, and 1225 or other vehicles that later travel along road segment 1200. For example, when the autonomous vehicle road navigation model is executed by a processor included in a navigation system of vehicle 1205, the model may cause the processor to compare the trajectories determined based on the navigation information received from vehicle 1205 with predetermined trajectories included in sparse map 800 to validate and/or correct the current traveling course of vehicle 1205.

In the autonomous vehicle road navigation model, the geometry of a road feature or target trajectory may be encoded by a curve in a three-dimensional space. In one embodiment, the curve may be a three dimensional spline including one or more connecting three dimensional polynomials. As one of skill in the art would understand, a spline may be a numerical function that is piece-wise defined by a series of polynomials for fitting data. A spline for fitting the three dimensional geometry data of the road may include a linear spline (first order), a quadratic spline (second order), a cubic spline (third order), or any other splines (other orders), or a combination thereof. The spline may include one or more three dimensional polynomials of different orders connecting (e.g., fitting) data points of the three dimensional geometry data of the road. In some embodiments, the autonomous vehicle road navigation model may include a three dimensional spline corresponding to a target trajectory along a common road segment (e.g., road segment 1200) or a lane of the road segment 1200.

As explained above, the autonomous vehicle road navigation model included in the sparse map may include other information, such as identification of at least one landmark along road segment 1200. The landmark may be visible within a field of view of a camera (e.g., camera 122) installed on each of vehicles 1205, 1210, 1215, 1220, and 1225. In some embodiments, camera 122 may capture an image of a landmark. A processor (e.g., processor 180, 190, or processing unit 110) provided on vehicle 1205 may process the image of the landmark to extract identification information for the landmark. The landmark identification information, rather than an actual image of the landmark, may be stored in sparse map 800. The landmark identification information may require much less storage space than an actual image. Other sensors or systems (e.g., GPS system) may also provide certain identification information of the landmark (e.g., position of landmark). The landmark may include at least one of a traffic sign, an arrow marking, a lane marking, a dashed lane marking, a traffic light, a stop line, a directional sign (e.g., a highway exit sign with an arrow indicating a direction, a highway sign with arrows pointing to different directions or places), a landmark beacon, or a lamppost. A landmark beacon refers to a device (e.g., an RFID device) installed along a road segment that transmits or reflects a signal to a receiver installed on a vehicle, such that when the vehicle passes by the device, the beacon received by the vehicle and the location of the device (e.g., determined from GPS location of the device) may be used as a landmark to be included in the autonomous vehicle road navigation model and/or the sparse map 800.

The identification of at least one landmark may include a position of the at least one landmark. The position of the landmark may be determined based on position measurements performed using sensor systems (e.g., Global Positioning Systems, inertial based positioning systems, landmark beacon, etc.) associated with the plurality of vehicles 1205, 1210, 1215, 1220, and 1225. In some embodiments, the position of the landmark may be determined by averaging the position measurements detected, collected, or received by sensor systems on different vehicles 1205, 1210, 1215, 1220, and 1225 through multiple drives. For example, vehicles 1205, 1210, 1215, 1220, and 1225 may transmit position measurements data to server 1230, which may average the position measurements and use the averaged position measurement as the position of the landmark. The position of the landmark may be continuously refined by measurements received from vehicles in subsequent drives.

The identification of the landmark may include a size of the landmark. The processor provided on a vehicle (e.g., 1205) may estimate the physical size of the landmark based on the analysis of the images. Server 1230 may receive multiple estimates of the physical size of the same landmark from different vehicles over different drives. Server 1230 may average the different estimates to arrive at a physical size for the landmark, and store that landmark size in the road model. The physical size estimate may be used to further determine or estimate a distance from the vehicle to the landmark. The distance to the landmark may be estimated based on the current speed of the vehicle and a scale of expansion based on the position of the landmark appearing in the images relative to the focus of expansion of the camera. For example, the distance to landmark may be estimated by $Z=V*dt*R/D$, where V is the speed of vehicle, R is the distance in the image from the landmark at time t1 to the focus of expansion, and D is the change in distance for the landmark in the image from t1 to t2. dt represents the (t2−t1). For example, the distance to landmark may be estimated by $Z=V*dt*R/D$, where V is the speed of vehicle, R is the distance in the image between the landmark and the focus of expansion, dt is a time interval, and D is the image displacement of the landmark along the epipolar line. Other equations equivalent to the above equation, such as $Z=V*\omega/\Delta\omega$, may be used for estimating the distance to the landmark. Here, V is the vehicle speed, $\omega$ is an image length (like the object width), and $\Delta\omega$ is the change of that image length in a unit of time.

When the physical size of the landmark is known, the distance to the landmark may also be determined based on the following equation: $Z=f*W/\omega$, where f is the focal length, W is the size of the landmark (e.g., height or width), ω is the number of pixels when the landmark leaves the image. From the above equation, a change in distance Z may be calculated using $\Delta Z = f^* W^* \Delta\omega/\omega^2 + f^* \Delta W/\omega$, where $\Delta W$ decays to zero by averaging, and where $\Delta\omega$ is the number of pixels representing a bounding box accuracy in the image. A value estimating the physical size of the landmark may be calculated by averaging multiple observations at the server side. The resulting error in distance estimation may be very small. There are two sources of error that may occur when using the formula above, namely $\Delta W$ and $\Delta\omega$. Their contribution to the distance error is given by $\Delta Z = f^* W^* \Delta\omega/\omega^2 + f^* \Delta W/\omega$. However, $\Delta W$ decays to zero by averaging; hence $\Delta Z$ is determined by $\Delta\omega$ (e.g., the inaccuracy of the bounding box in the image).

For landmarks of unknown dimensions, the distance to the landmark may be estimated by tracking feature points on the landmark between successive frames. For example, certain features appearing on a speed limit sign may be tracked between two or more image frames. Based on these tracked features, a distance distribution per feature point may be generated. The distance estimate may be extracted from the distance distribution. For example, the most frequent distance appearing in the distance distribution may be used as the distance estimate. As another example, the average of the distance distribution may be used as the distance estimate.

Figure 13:
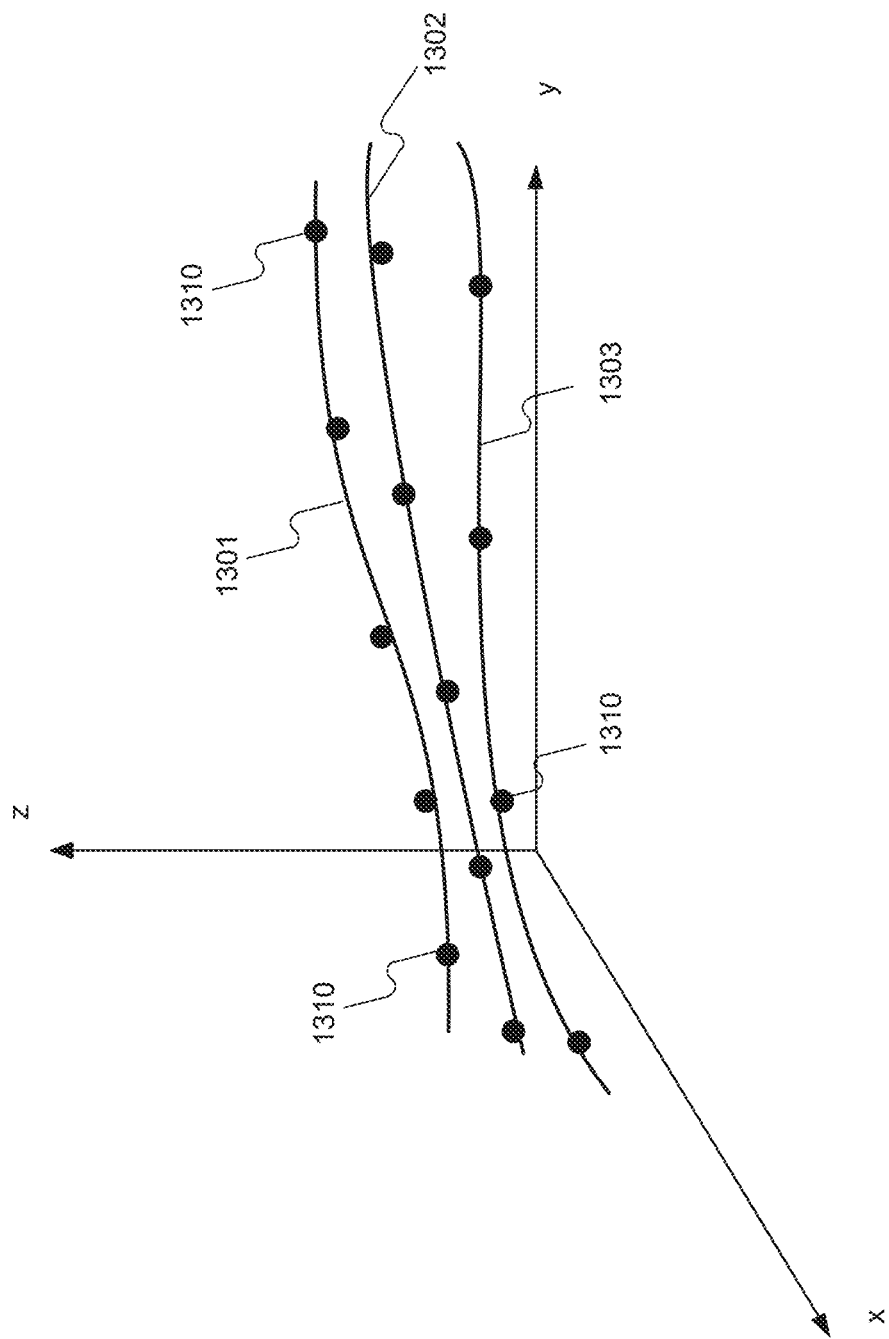
FIG. 13 illustrates an example autonomous vehicle road navigation model represented by a plurality of three dimensional splines, consistent with the disclosed embodiments.

FIG. 13 illustrates an example autonomous vehicle road navigation model represented by a plurality of three dimensional splines 1301, 1302, and 1303. The curves 1301, 1302, and 1303 shown in FIG. 13 are for illustration purpose only. Each spline may include one or more three dimensional polynomials connecting a plurality of data points 1310. Each polynomial may be a first order polynomial, a second order polynomial, a third order polynomial, or a combination of any suitable polynomials having different orders. Each data point 1310 may be associated with the navigation information received from vehicles 1205, 1210, 1215, 1220, and 1225. In some embodiments, each data point 1310 may be associated with data related to landmarks (e.g., size, location, and identification information of landmarks) and/or road signature profiles (e.g., road geometry, road roughness profile, road curvature profile, road width profile). In some embodiments, some data points 1310 may be associated with data related to landmarks, and others may be associated with data related to road signature profiles.

Figure 14:
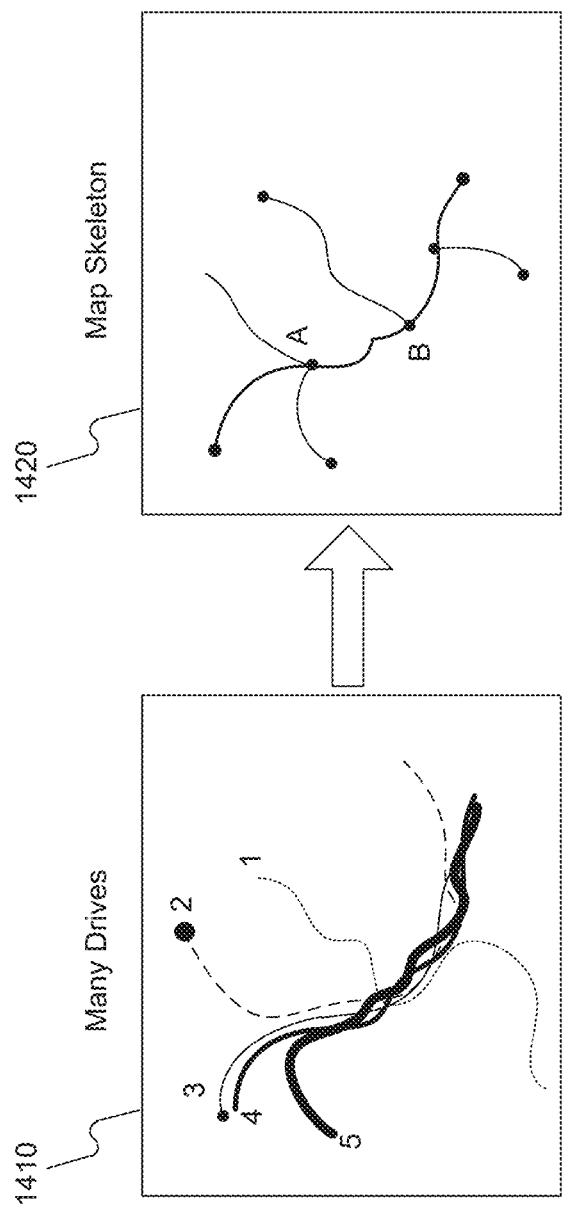
FIG. 14 shows a map skeleton generated from combining location information from many drives, consistent with the disclosed embodiments.

FIG. 14 illustrates raw location data 1410 (e.g., GPS data) received from five separate drives. One drive may be separate from another drive if it was traversed by separate vehicles at the same time, by the same vehicle at separate times, or by separate vehicles at separate times. To account for errors in the location data 1410 and for differing locations of vehicles within the same lane (e.g., one vehicle may drive closer to the left of a lane than another), server 1230 may generate a map skeleton 1420 using one or more statistical techniques to determine whether variations in the raw location data 1410 represent actual divergences or statistical errors. Each path within skeleton 1420 may be linked back to the raw data 1410 that formed the path. For example, the path between A and B within skeleton 1420 is linked to raw data 1410 from drives 2, 3, 4, and 5 but not from drive 1. Skeleton 1420 may not be detailed enough to be used to navigate a vehicle (e.g., because it combines drives from multiple lanes on the same road unlike the splines described above) but may provide useful topological information and may be used to define intersections.

Figure 15:
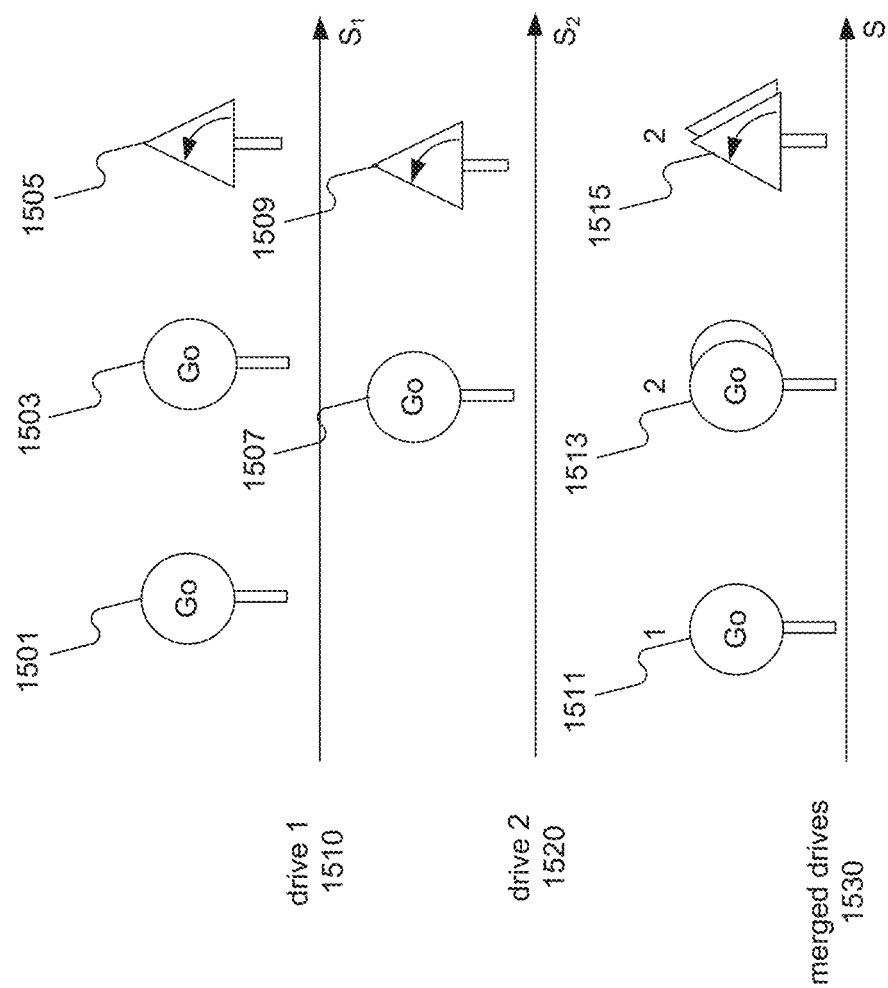
FIG. 15 shows an example of a longitudinal alignment of two drives with example signs as landmarks, consistent with the disclosed embodiments.

FIG. 15 illustrates an example by which additional detail may be generated for a sparse map within a segment of a map skeleton (e.g., segment A to B within skeleton 1420). As depicted in FIG. 15, the data (e.g. ego-motion data, road markings data, and the like) may be shown as a function of position S (or $S_1$ or $S_2$) along the drive. Server 1230 may identify landmarks for the sparse map by identifying unique matches between landmarks 1501, 1503, and 1505 of drive 1510 and landmarks 1507 and 1509 of drive 1520. Such a matching algorithm may result in identification of landmarks 1511, 1513, and 1515. One skilled in the art would recognize, however, that other matching algorithms may be used. For example, probability optimization may be used in lieu of or in combination with unique matching. Server 1230 may longitudinally align the drives to align the matched landmarks. For example, server 1230 may select one drive (e.g., drive 1520) as a reference drive and then shift and/or elastically stretch the other drive(s) (e.g., drive 1510) for alignment.

Figure 16:
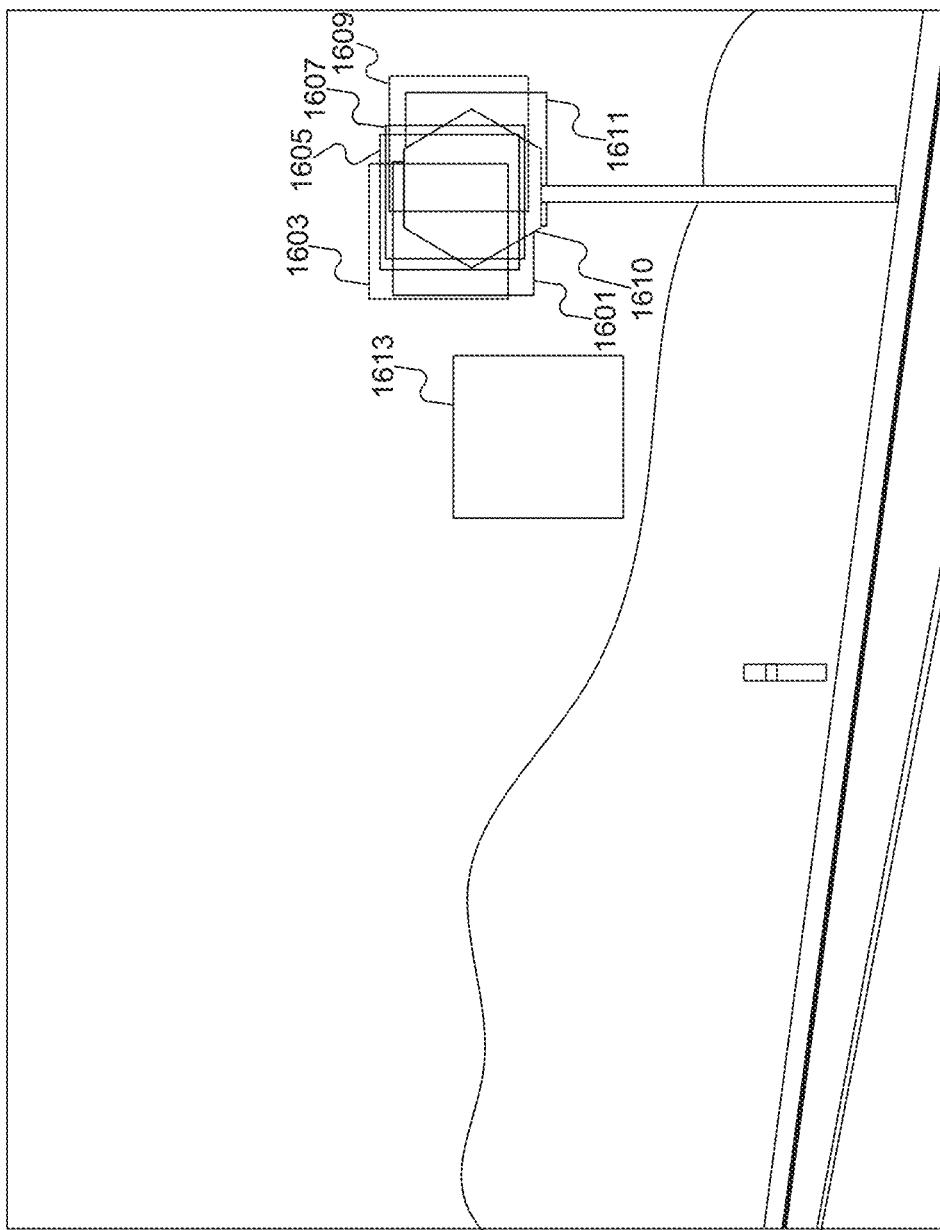
FIG. 16 shows an example of a longitudinal alignment of many drives with an example sign as a landmark, consistent with the disclosed embodiments.

FIG. 16 shows an example of aligned landmark data for use in a sparse map. In the example of FIG. 16, landmark 1610 comprises a road sign. The example of FIG. 16 further depicts data from a plurality of drives 1601, 1603, 1605, 1607, 1609, 1611, and 1613. In the example of FIG. 16, the data from drive 1613 consists of a "ghost" landmark, and the server 1230 may identify it as such because none of drives 1601, 1603, 1605, 1607, 1609, and 1611 include an identification of a landmark in the vicinity of the identified landmark in drive 1613. Accordingly, server 1230 may accept potential landmarks when a ratio of images in which the landmark does appear to images in which the landmark does not appear exceeds a threshold and/or may reject potential landmarks when a ratio of images in which the landmark does not appear to images in which the landmark does appear exceeds a threshold.

Figure 17:
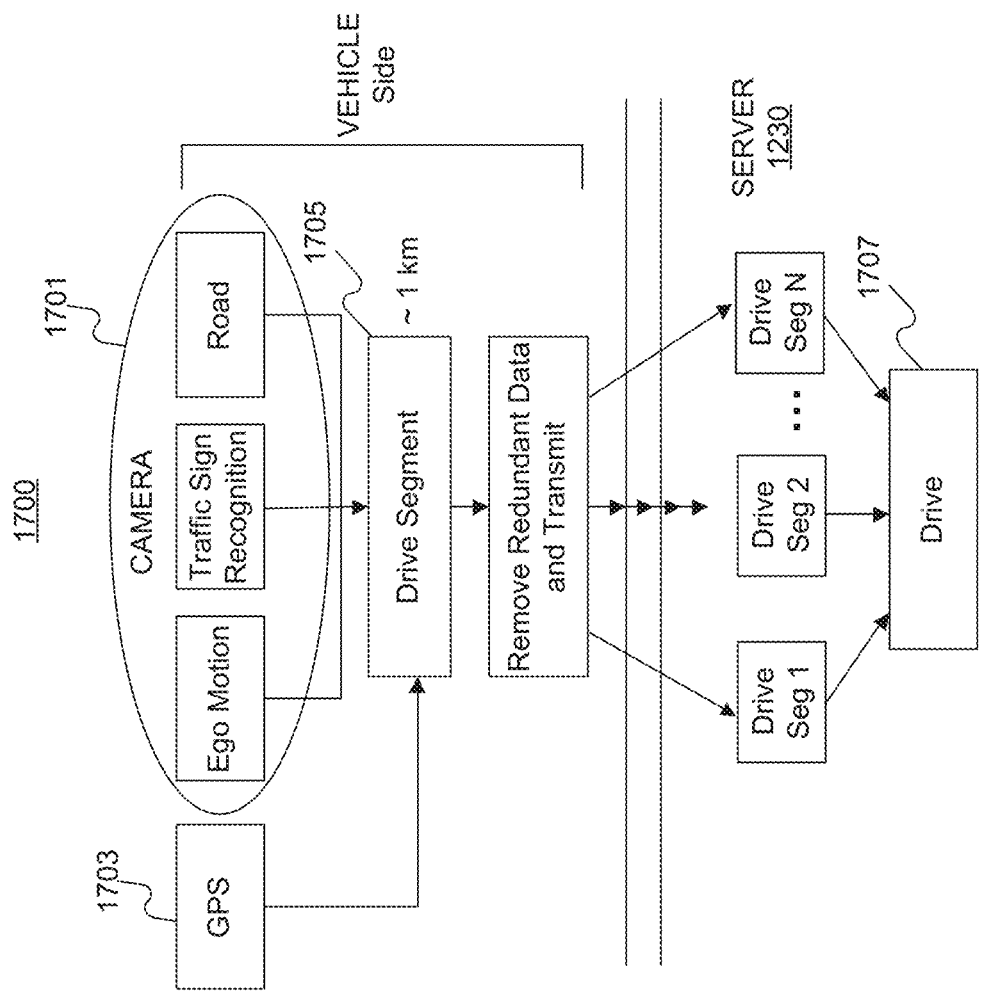
FIG. 17 is a schematic illustration of a system for generating drive data using a camera, a vehicle, and a server, consistent with the disclosed embodiments.

FIG. 17 depicts a system 1700 for generating drive data, which may be used to crowdsource a sparse map. As depicted in FIG. 17, system 1700 may include a camera 1701 and a locating device 1703 (e.g., a GPS locator). Camera 1701 and locating device 1703 may be mounted on a vehicle (e.g., one of vehicles 1205, 1210, 1215, 1220, and 1225). Camera 1701 may produce a plurality of data of multiple types, e.g., ego motion data, traffic sign data, road data, or the like. The camera data and location data may be segmented into drive segments 1705. For example, drive segments 1705 may each have camera data and location data from less than 1 km of driving.

In some embodiments, system 1700 may remove redundancies in drive segments 1705. For example, if a landmark appears in multiple images from camera 1701, system 1700 may strip the redundant data such that the drive segments 1705 only contain one copy of the location of and any metadata relating to the landmark. By way of further example, if a lane marking appears in multiple images from camera 1701, system 1700 may strip the redundant data such that the drive segments 1705 only contain one copy of the location of and any metadata relating to the lane marking.

System 1700 also includes a server (e.g., server 1230). Server 1230 may receive drive segments 1705 from the vehicle and recombine the drive segments 1705 into a single drive 1707. Such an arrangement may allow for reduce bandwidth requirements when transferring data between the vehicle and the server while also allowing for the server to store data relating to an entire drive.

Figure 18:
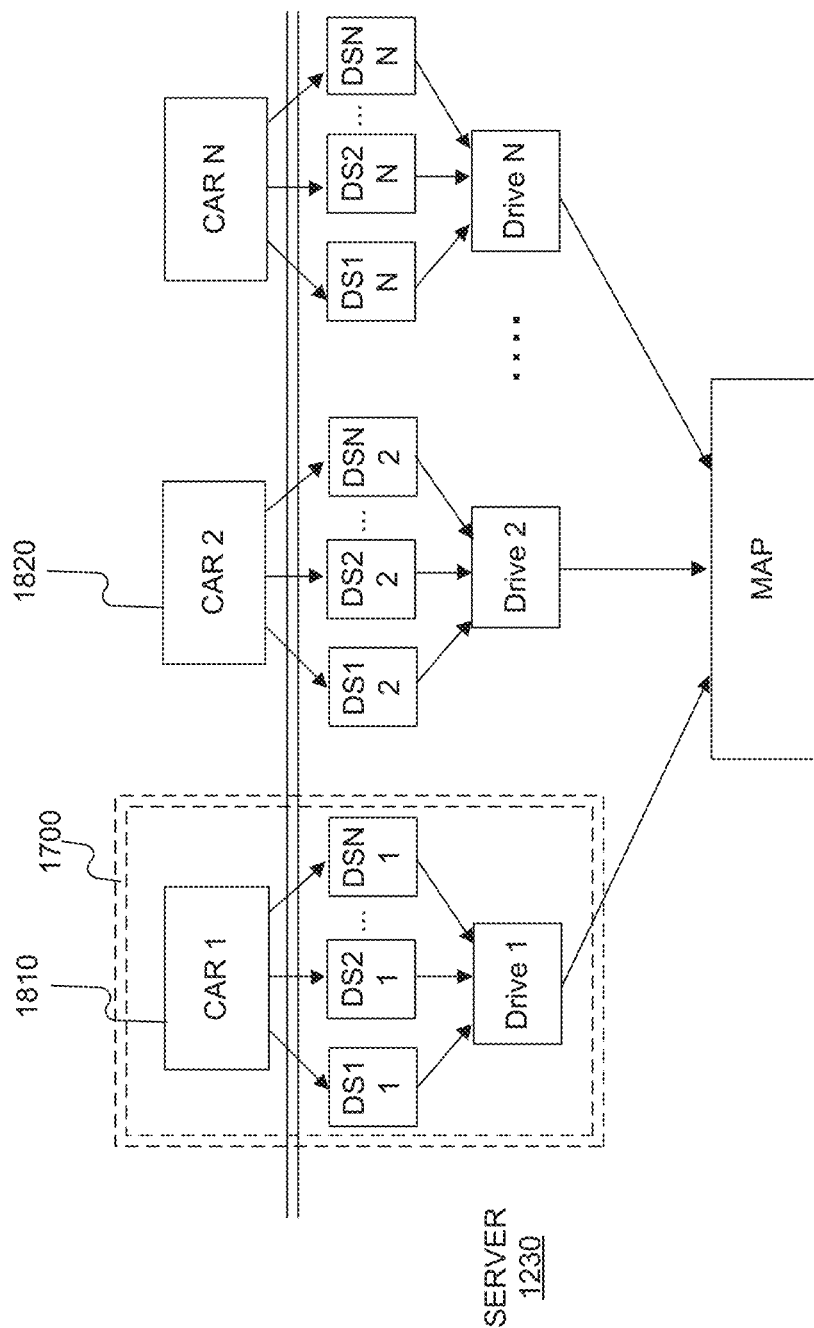
FIG. 18 is a schematic illustration of a system for crowdsourcing a sparse map, consistent with the disclosed embodiments.

FIG. 18 depicts system 1700 of FIG. 17 further configured for crowdsourcing a sparse map. As in FIG. 17, system 1700 includes vehicle 1810, which captures drive data using, for example, a camera (which produces, e.g., ego motion data, traffic sign data, road data, or the like) and a locating device (e.g., a GPS locator). As in FIG. 17, vehicle 1810 segments the collected data into drive segments (depicted as "DS1 1," "DS2 1," "DSN 1" in FIG. 18). Server 1230 then receives the drive segments and reconstructs a drive (depicted as "Drive 1" in FIG. 18) from the received segments.

As further depicted in FIG. 18, system 1700 also receives data from additional vehicles. For example, vehicle 1820 also captures drive data using, for example, a camera (which produces, e.g., ego motion data, traffic sign data, road data, or the like) and a locating device (e.g., a GPS locator). Similar to vehicle 1810, vehicle 1820 segments the collected data into drive segments (depicted as "DS1 2," "DS2 2," "DSN 2" in FIG. 18). Server 1230 then receives the drive segments and reconstructs a drive (depicted as "Drive 2" in FIG. 18) from the received segments. Any number of additional vehicles may be used. For example, FIG. 18 also includes "CAR N" that captures drive data, segments it into drive segments (depicted as "DS1 N," "DS2 N," "DSN N" in FIG. 18), and sends it to server 1230 for reconstruction into a drive (depicted as "Drive N" in FIG. 18).

As depicted in FIG. 18, server 1230 may construct a sparse map (depicted as "MAP") using the reconstructed drives (e.g., "Drive 1," "Drive 2," and "Drive N") collected from a plurality of vehicles (e.g., "CAR 1" (also labeled vehicle 1810), "CAR 2" (also labeled vehicle 1820), and "CAR N").

Figure 19:
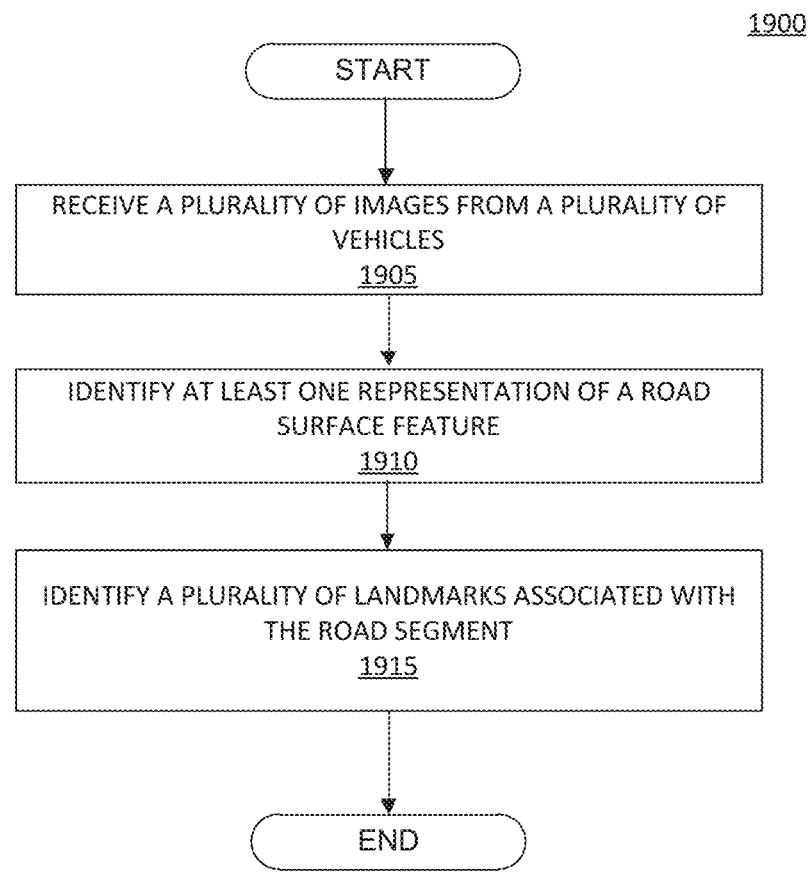
FIG. 19 is a flowchart showing an exemplary process for generating a sparse map for autonomous vehicle navigation along a road segment, consistent with the disclosed embodiments.

FIG. 19 is a flowchart showing an example process 1900 for generating a sparse map for autonomous vehicle navigation along a road segment. Process 1900 may be performed by one or more processing devices included in server 1230.

Process 1900 may include receiving a plurality of images acquired as one or more vehicles traverse the road segment (step 1905). Server 1230 may receive images from cameras included within one or more of vehicles 1205, 1210, 1215, 1220, and 1225. For example, camera 122 may capture one or more images of the environment surrounding vehicle 1205 as vehicle 1205 travels along road segment 1200. In some embodiments, server 1230 may also receive stripped down image data that has had redundancies removed by a processor on vehicle 1205, as discussed above with respect to FIG. 17.

Process 1900 may further include identifying, based on the plurality of images, at least one line representation of a road surface feature extending along the road segment (step 1910). Each line representation may represent a path along the road segment substantially corresponding with the road surface feature. For example, server 1230 may analyze the environmental images received from camera 122 to identify a road edge or a lane marking and determine a trajectory of travel along road segment 1200 associated with the road edge or lane marking. In some embodiments, the trajectory (or line representation) may include a spline, a polynomial representation, or a curve. Server 1230 may determine the trajectory of travel of vehicle 1205 based on camera ego motions (e.g., three dimensional translation and/or three dimensional rotational motions) received at step 1905.

Process 1900 may also include identifying, based on the plurality of images, a plurality of landmarks associated with the road segment (step 1910). For example, server 1230 may analyze the environmental images received from camera 122 to identify one or more landmarks, such as road sign along road segment 1200. Server 1230 may identify the landmarks using analysis of the plurality of images acquired as one or more vehicles traverse the road segment. To enable crowdsourcing, the analysis may include rules regarding accepting and rejecting possible landmarks associated with the road segment. For example, the analysis may include accepting potential landmarks when a ratio of images in which the landmark does appear to images in which the landmark does not appear exceeds a threshold and/or rejecting potential landmarks when a ratio of images in which the landmark does not appear to images in which the landmark does appear exceeds a threshold.

Process 1900 may include other operations or steps performed by server 1230. For example, the navigation information may include a target trajectory for vehicles to travel along a road segment, and process 1900 may include clustering, by server 1230, vehicle trajectories related to multiple vehicles travelling on the road segment and determining the target trajectory based on the clustered vehicle trajectories, as discussed in further detail below. Clustering vehicle trajectories may include clustering, by server 1230, the multiple trajectories related to the vehicles travelling on the road segment into a plurality of clusters based on at least one of the absolute heading of vehicles or lane assignment of the vehicles. Generating the target trajectory may include averaging, by server 1230, the clustered trajectories. By way of further example, process 1900 may include aligning data received in step 1905. Other processes or steps performed by server 1230, as described above, may also be included in process 1900.

The disclosed systems and methods may include other features. For example, the disclosed systems may use local coordinates, rather than global coordinates. For autonomous driving, some systems may present data in world coordinates. For example, longitude and latitude coordinates on the earth surface may be used. In order to use the map for steering, the host vehicle may determine its position and orientation relative to the map. It seems natural to use a GPS device on board, in order to position the vehicle on the map and in order to find the rotation transformation between the body reference frame and the world reference frame (e.g., North, East and Down). Once the body reference frame is aligned with the map reference frame, then the desired route may be expressed in the body reference frame and the steering commands may be computed or generated.

The disclosed systems and methods may enable autonomous vehicle navigation (e.g., steering control) with low footprint models, which may be collected by the autonomous vehicles themselves without the aid of expensive surveying equipment. To support the autonomous navigation (e.g., steering applications), the road model may include a sparse map having the geometry of the road, its lane structure, and landmarks that may be used to determine the location or position of vehicles along a trajectory included in the model. As discussed above, generation of the sparse map may be performed by a remote server that communicates with vehicles travelling on the road and that receives data from the vehicles. The data may include sensed data, trajectories reconstructed based on the sensed data, and/or recommended trajectories that may represent modified reconstructed trajectories. As discussed below, the server may transmit the model back to the vehicles or other vehicles that later travel on the road to aid in autonomous navigation.

Figure 20:
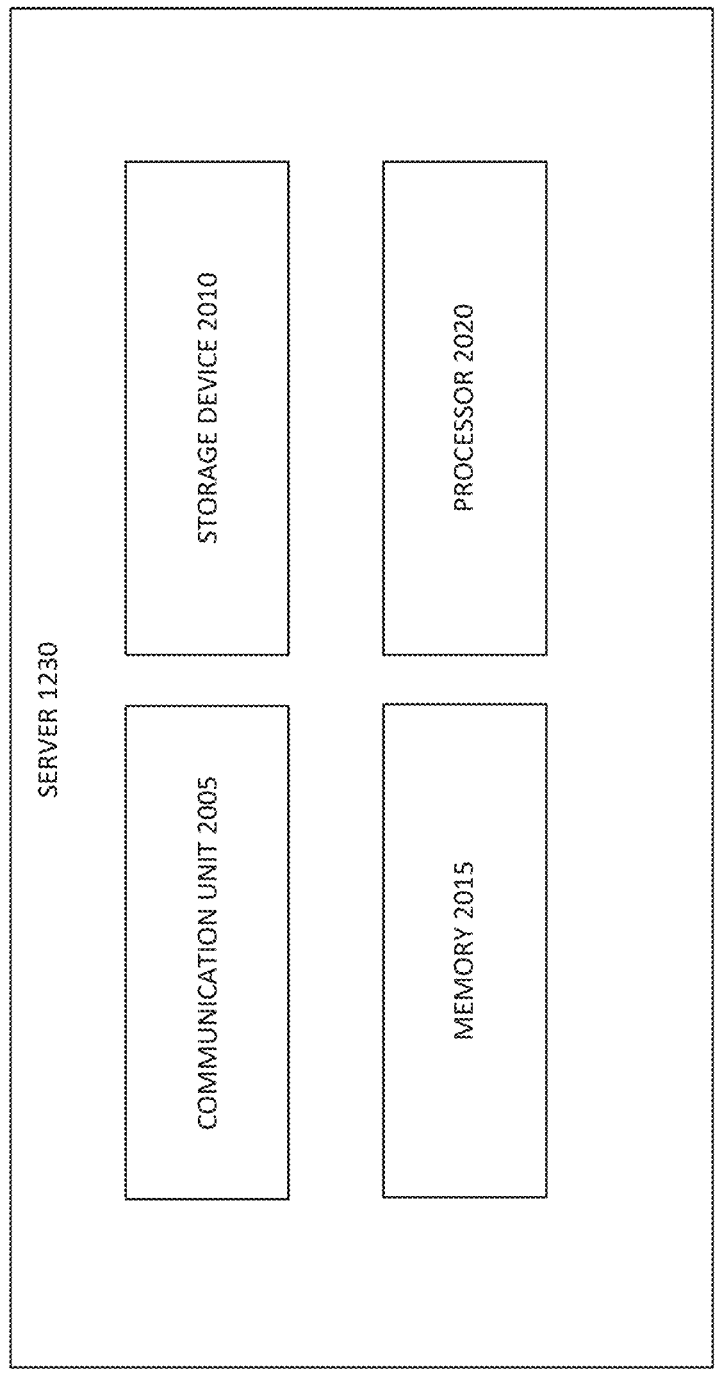
FIG. 20 illustrates a block diagram of a server consistent with the disclosed embodiments.

FIG. 20 illustrates a block diagram of server 1230. Server 1230 may include a communication unit 2005, which may include both hardware components (e.g., communication control circuits, switches, and antenna), and software components (e.g., communication protocols, computer codes). For example, communication unit 2005 may include at least one network interface. Server 1230 may communicate with vehicles 1205, 1210, 1215, 1220, and 1225 through communication unit 2005. For example, server 1230 may receive, through communication unit 2005, navigation information transmitted from vehicles 1205, 1210, 1215, 1220, and 1225. Server 1230 may distribute, through communication unit 2005, the autonomous vehicle road navigation model to one or more autonomous vehicles.

Server 1230 may include at least one non-transitory storage medium 2010, such as a hard drive, a compact disc, a tape, etc. Storage device 1410 may be configured to store data, such as navigation information received from vehicles 1205, 1210, 1215, 1220, and 1225 and/or the autonomous vehicle road navigation model that server 1230 generates based on the navigation information. Storage device 2010 may be configured to store any other information, such as a sparse map (e.g., sparse map 800 discussed above with respect to FIG. 8).

In addition to or in place of storage device 2010, server 1230 may include a memory 2015. Memory 2015 may be similar to or different from memory 140 or 150. Memory 2015 may be a non-transitory memory, such as a flash memory, a random access memory, etc. Memory 2015 may be configured to store data, such as computer codes or instructions executable by a processor (e.g., processor 2020), map data (e.g., data of sparse map 800), the autonomous vehicle road navigation model, and/or navigation information received from vehicles 1205, 1210, 1215, 1220, and 1225.

Server 1230 may include at least one processing device 2020 configured to execute computer codes or instructions stored in memory 2015 to perform various functions. For example, processing device 2020 may analyze the navigation information received from vehicles 1205, 1210, 1215, 1220, and 1225, and generate the autonomous vehicle road navigation model based on the analysis. Processing device 2020 may control communication unit 1405 to distribute the autonomous vehicle road navigation model to one or more autonomous vehicles (e.g., one or more of vehicles 1205, 1210, 1215, 1220, and 1225 or any vehicle that travels on road segment 1200 at a later time). Processing device 2020 may be similar to or different from processor 180, 190, or processing unit 110.

Figure 21:
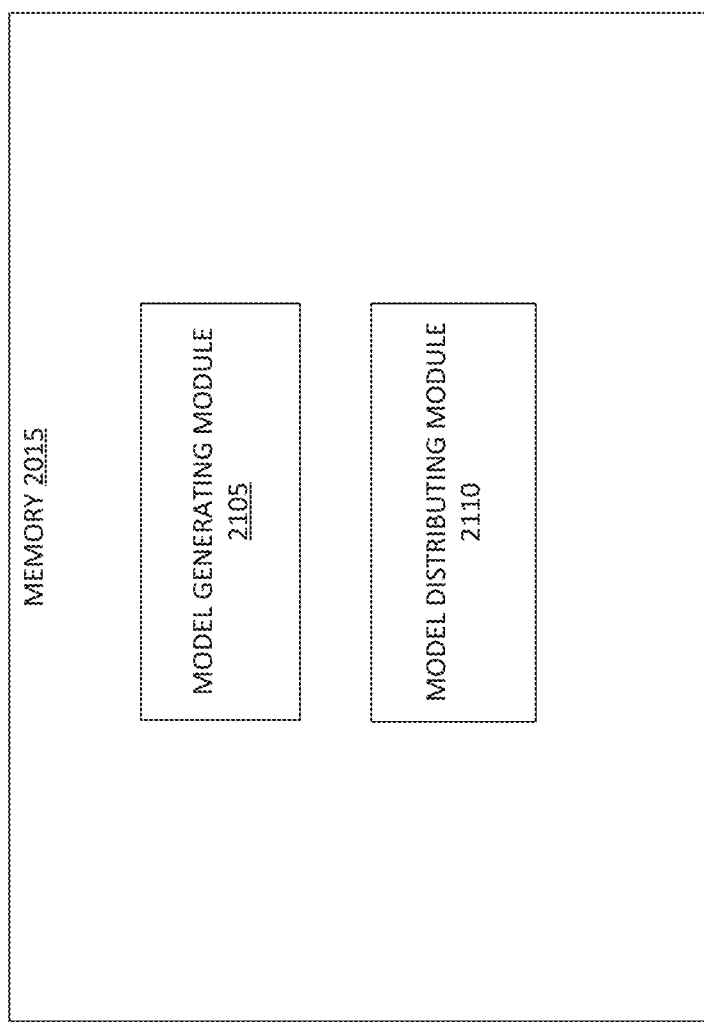
FIG. 21 illustrates a block diagram of a memory consistent with the disclosed embodiments.

FIG. 21 illustrates a block diagram of memory 2015, which may store computer code or instructions for performing one or more operations for generating a road navigation model for use in autonomous vehicle navigation. As shown in FIG. 21, memory 2015 may store one or more modules for performing the operations for processing vehicle navigation information. For example, memory 2015 may include a model generating module 2105 and a model distributing module 2110. Processor 2020 may execute the instructions stored in any of modules 2105 and 2110 included in memory 2015.

Model generating module 2105 may store instructions which, when executed by processor 2020, may generate at least a portion of an autonomous vehicle road navigation model for a common road segment (e.g., road segment 1200) based on navigation information received from vehicles 1205, 1210, 1215, 1220, and 1225. For example, in generating the autonomous vehicle road navigation model, processor 2020 may cluster vehicle trajectories along the common road segment 1200 into different clusters. Processor 2020 may determine a target trajectory along the common road segment 1200 based on the clustered vehicle trajectories for each of the different clusters. Such an operation may include finding a mean or average trajectory of the clustered vehicle trajectories (e.g., by averaging data representing the clustered vehicle trajectories) in each cluster. In some embodiments, the target trajectory may be associated with a single lane of the common road segment 1200.

The road model and/or sparse map may store trajectories associated with a road segment. These trajectories may be referred to as target trajectories, which are provided to autonomous vehicles for autonomous navigation. The target trajectories may be received from multiple vehicles, or may be generated based on actual trajectories or recommended trajectories (actual trajectories with some modifications) received from multiple vehicles. The target trajectories included in the road model or sparse map may be continuously updated (e.g., averaged) with new trajectories received from other vehicles.

Vehicles travelling on a road segment may collect data by various sensors. The data may include landmarks, road signature profile, vehicle motion (e.g., accelerometer data, speed data), vehicle position (e.g., GPS data), and may either reconstruct the actual trajectories themselves, or transmit the data to a server, which will reconstruct the actual trajectories for the vehicles. In some embodiments, the vehicles may transmit data relating to a trajectory (e.g., a curve in an arbitrary reference frame), landmarks data, and lane assignment along traveling path to server 1230. Various vehicles travelling along the same road segment at multiple drives may have different trajectories. Server 1230 may identify routes or trajectories associated with each lane from the trajectories received from vehicles through a clustering process.

Figure 22:
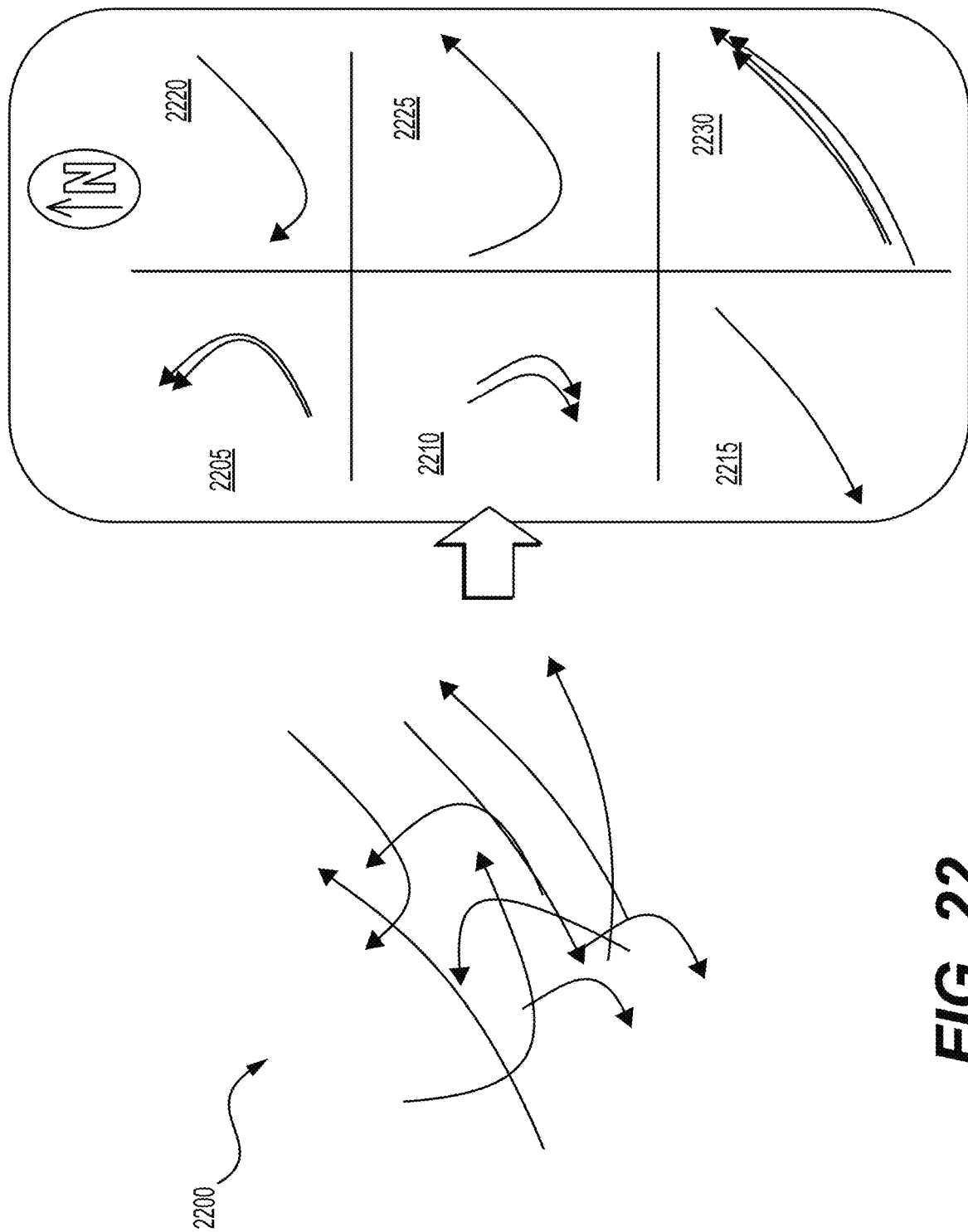
FIG. 22 illustrates a process of clustering vehicle trajectories associated with vehicles, consistent with the disclosed embodiments.

FIG. 22 illustrates a process of clustering vehicle trajectories associated with vehicles 1205, 1210, 1215, 1220, and 1225 for determining a target trajectory for the common road segment (e.g., road segment 1200). The target trajectory or a plurality of target trajectories determined from the clustering process may be included in the autonomous vehicle road navigation model or sparse map 800. In some embodiments, vehicles 1205, 1210, 1215, 1220, and 1225 traveling along road segment 1200 may transmit a plurality of trajectories 2200 to server 1230. In some embodiments, server 1230 may generate trajectories based on landmark, road geometry, and vehicle motion information received from vehicles 1205, 1210, 1215, 1220, and 1225. To generate the autonomous vehicle road navigation model, server 1230 may cluster vehicle trajectories 1600 into a plurality of clusters 2205, 2210, 2215, 2220, 2225, and 2230, as shown in FIG. 22.

Clustering may be performed using various criteria. In some embodiments, all drives in a cluster may be similar with respect to the absolute heading along the road segment 1200. The absolute heading may be obtained from GPS signals received by vehicles 1205, 1210, 1215, 1220, and 1225. In some embodiments, the absolute heading may be obtained using dead reckoning Dead reckoning, as one of skill in the art would understand, may be used to determine the current position and hence heading of vehicles 1205, 1210, 1215, 1220, and 1225 by using previously determined position, estimated speed, etc. Trajectories clustered by absolute heading may be useful for identifying routes along the roadways.

In some embodiments, all the drives in a cluster may be similar with respect to the lane assignment (e.g., in the same lane before and after a junction) along the drive on road segment 1200. Trajectories clustered by lane assignment may be useful for identifying lanes along the roadways. In some embodiments, both criteria (e.g., absolute heading and lane assignment) may be used for clustering.

In each cluster 2205, 2210, 2215, 2220, 2225, and 2230, trajectories may be averaged to obtain a target trajectory associated with the specific cluster. For example, the trajectories from multiple drives associated with the same lane cluster may be averaged. The averaged trajectory may be a target trajectory associate with a specific lane. To average a cluster of trajectories, server 1230 may select a reference frame of an arbitrary trajectory C0. For all other trajectories (C1, . . . , Cn), server 1230 may find a rigid transformation that maps Ci to C0, where i=1, 2, . . . , n, where n is a positive integer number, corresponding to the total number of trajectories included in the cluster. Server 1230 may compute a mean curve or trajectory in the C0 reference frame.

In some embodiments, the landmarks may define an arc length matching between different drives, which may be used for alignment of trajectories with lanes. In some embodiments, lane marks before and after a junction may be used for alignment of trajectories with lanes.

To assemble lanes from the trajectories, server 1230 may select a reference frame of an arbitrary lane. Server 1230 may map partially overlapping lanes to the selected reference frame. Server 1230 may continue mapping until all lanes are in the same reference frame. Lanes that are next to each other may be aligned as if they were the same lane, and later they may be shifted laterally.

Landmarks recognized along the road segment may be mapped to the common reference frame, first at the lane level, then at the junction level. For example, the same landmarks may be recognized multiple times by multiple vehicles in multiple drives. The data regarding the same landmarks received in different drives may be slightly different. Such data may be averaged and mapped to the same reference frame, such as the C0 reference frame. Additionally or alternatively, the variance of the data of the same landmark received in multiple drives may be calculated.

In some embodiments, each lane of road segment 120 may be associated with a target trajectory and certain landmarks. The target trajectory or a plurality of such target trajectories may be included in the autonomous vehicle road navigation model, which may be used later by other autonomous vehicles travelling along the same road segment 1200. Landmarks identified by vehicles 1205, 1210, 1215, 1220, and 1225 while the vehicles travel along road segment 1200 may be recorded in association with the target trajectory. The data of the target trajectories and landmarks may be continuously or periodically updated with new data received from other vehicles in subsequent drives.

For localization of an autonomous vehicle, the disclosed systems and methods may use an Extended Kalman Filter. The location of the vehicle may be determined based on three dimensional position data and/or three dimensional orientation data, prediction of future location ahead of vehicle's current location by integration of ego motion. The localization of vehicle may be corrected or adjusted by image observations of landmarks. For example, when vehicle detects a landmark within an image captured by the camera, the landmark may be compared to a known landmark stored within the road model or sparse map 800. The known landmark may have a known location (e.g., GPS data) along a target trajectory stored in the road model and/or sparse map 800. Based on the current speed and images of the landmark, the distance from the vehicle to the landmark may be estimated. The location of the vehicle along a target trajectory may be adjusted based on the distance to the landmark and the landmark's known location (stored in the road model or sparse map 800). The landmark's position/location data (e.g., mean values from multiple drives) stored in the road model and/or sparse map 800 may be presumed to be accurate.

In some embodiments, the disclosed system may form a closed loop subsystem, in which estimation of the vehicle six degrees of freedom location (e.g., three dimensional position data plus three dimensional orientation data) may be used for navigating (e.g., steering the wheel of) the autonomous vehicle to reach a desired point (e.g., 1.3 second ahead in the stored). In turn, data measured from the steering and actual navigation may be used to estimate the six degrees of freedom location.

In some embodiments, poles along a road, such as lampposts and power or cable line poles may be used as landmarks for localizing the vehicles. Other landmarks such as traffic signs, traffic lights, arrows on the road, stop lines, as well as static features or signatures of an object along the road segment may also be used as landmarks for localizing the vehicle. When poles are used for localization, the x observation of the poles (i.e., the viewing angle from the vehicle) may be used, rather than the y observation (i.e., the distance to the pole) since the bottoms of the poles may be occluded and sometimes they are not on the road plane.

Figure 23:
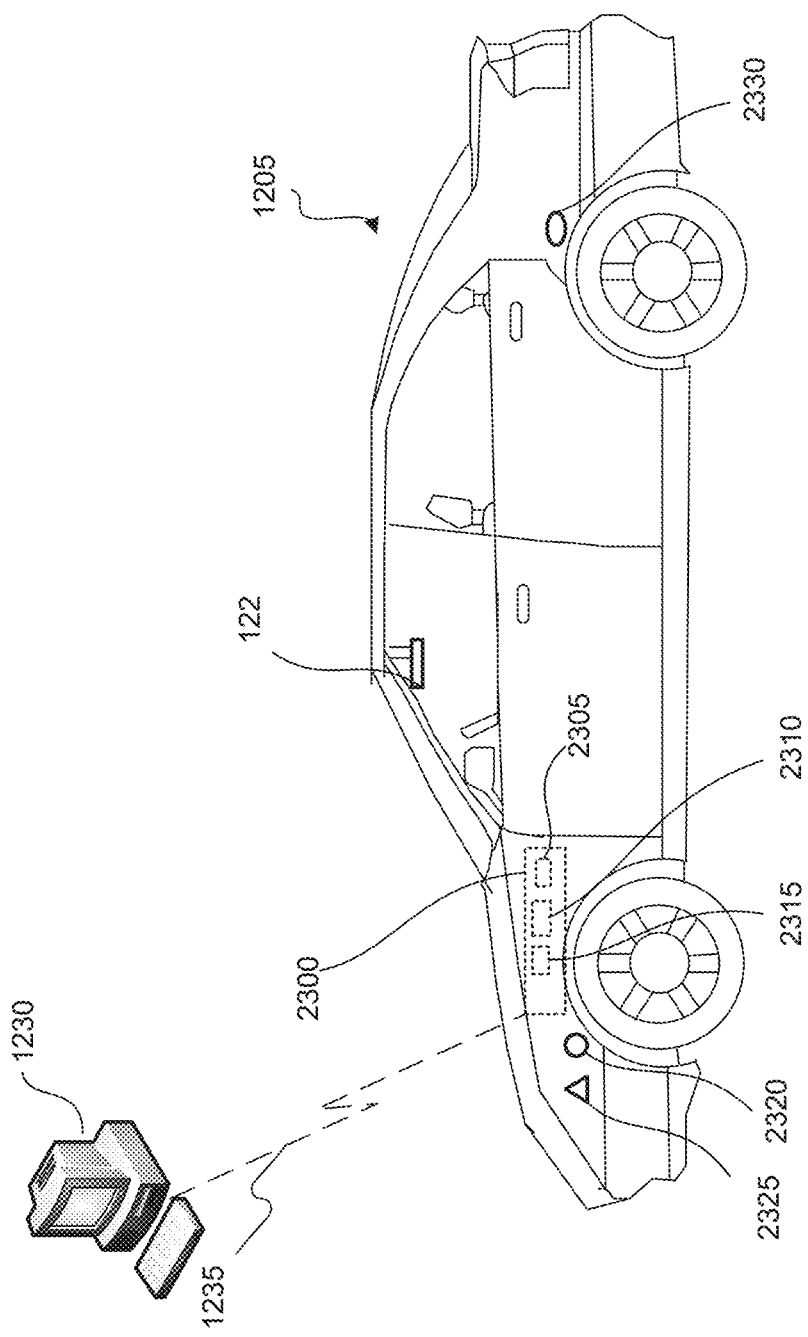
FIG. 23 illustrates a navigation system for a vehicle, which may be used for autonomous navigation, consistent with the disclosed embodiments.

FIG. 23 illustrates a navigation system for a vehicle, which may be used for autonomous navigation using a crowdsourced sparse map. For illustration, the vehicle is referenced as vehicle 1205. The vehicle shown in FIG. 23 may be any other vehicle disclosed herein, including, for example, vehicles 1210, 1215, 1220, and 1225, as well as vehicle 200 shown in other embodiments. As shown in FIG. 12, vehicle 1205 may communicate with server 1230. Vehicle 1205 may include an image capture device 122 (e.g., camera 122). Vehicle 1205 may include a navigation system 2300 configured for providing navigation guidance for vehicle 1205 to travel on a road (e.g., road segment 1200). Vehicle 1205 may also include other sensors, such as a speed sensor 2320 and an accelerometer 2325. Speed sensor 2320 may be configured to detect the speed of vehicle 1205. Accelerometer 2325 may be configured to detect an acceleration or deceleration of vehicle 1205. Vehicle 1205 shown in FIG. 23 may be an autonomous vehicle, and the navigation system 2300 may be used for providing navigation guidance for autonomous driving. Alternatively, vehicle 1205 may also be a non-autonomous, human-controlled vehicle, and navigation system 2300 may still be used for providing navigation guidance.

Navigation system 2300 may include a communication unit 2305 configured to communicate with server 1230 through communication path 1235. Navigation system 2300 may also include a GPS unit 2310 configured to receive and process GPS signals. Navigation system 2300 may further include at least one processor 2315 configured to process data, such as GPS signals, map data from sparse map 800 (which may be stored on a storage device provided onboard vehicle 1205 and/or received from server 1230), road geometry sensed by a road profile sensor 2330, images captured by camera 122, and/or autonomous vehicle road navigation model received from server 1230. The road profile sensor 2330 may include different types of devices for measuring different types of road profile, such as road surface roughness, road width, road elevation, road curvature, etc. For example, the road profile sensor 2330 may include a device that measures the motion of a suspension of vehicle 2305 to derive the road roughness profile. In some embodiments, the road profile sensor 2330 may include radar sensors to measure the distance from vehicle 1205 to road sides (e.g., barrier on the road sides), thereby measuring the width of the road. In some embodiments, the road profile sensor 2330 may include a device configured for measuring the up and down elevation of the road. In some embodiment, the road profile sensor 2330 may include a device configured to measure the road curvature. For example, a camera (e.g., camera 122 or another camera) may be used to capture images of the road showing road curvatures. Vehicle 1205 may use such images to detect road curvatures.

The at least one processor 2315 may be programmed to receive, from camera 122, at least one environmental image associated with vehicle 1205. The at least one processor 2315 may analyze the at least one environmental image to determine navigation information related to the vehicle 1205. The navigation information may include a trajectory related to the travel of vehicle 1205 along road segment 1200. The at least one processor 2315 may determine the trajectory based on motions of camera 122 (and hence the vehicle), such as three dimensional translation and three dimensional rotational motions. In some embodiments, the at least one processor 2315 may determine the translation and rotational motions of camera 122 based on analysis of a plurality of images acquired by camera 122. In some embodiments, the navigation information may include lane assignment information (e.g., in which lane vehicle 1205 is travelling along road segment 1200). The navigation information transmitted from vehicle 1205 to server 1230 may be used by server 1230 to generate and/or update an autonomous vehicle road navigation model, which may be transmitted back from server 1230 to vehicle 1205 for providing autonomous navigation guidance for vehicle 1205.

The at least one processor 2315 may also be programmed to transmit the navigation information from vehicle 1205 to server 1230. In some embodiments, the navigation information may be transmitted to server 1230 along with road information. The road location information may include at least one of the GPS signal received by the GPS unit 2310, landmark information, road geometry, lane information, etc. The at least one processor 2315 may receive, from server 1230, the autonomous vehicle road navigation model or a portion of the model. The autonomous vehicle road navigation model received from server 1230 may include at least one update based on the navigation information transmitted from vehicle 1205 to server 1230. The portion of the model transmitted from server 1230 to vehicle 1205 may include an updated portion of the model. The at least one processor 2315 may cause at least one navigational maneuver (e.g., steering such as making a turn, braking, accelerating, passing another vehicle, etc.) by vehicle 1205 based on the received autonomous vehicle road navigation model or the updated portion of the model.

The at least one processor 2315 may be configured to communicate with various sensors and components included in vehicle 1205, including communication unit 1705, GPS unit 2315, camera 122, speed sensor 2320, accelerometer 2325, and road profile sensor 2330. The at least one processor 2315 may collect information or data from various sensors and components, and transmit the information or data to server 1230 through communication unit 2305. Alternatively or additionally, various sensors or components of vehicle 1205 may also communicate with server 1230 and transmit data or information collected by the sensors or components to server 1230.

In some embodiments, vehicles 1205, 1210, 1215, 1220, and 1225 may communicate with each other, and may share navigation information with each other, such that at least one of the vehicles 1205, 1210, 1215, 1220, and 1225 may generate the autonomous vehicle road navigation model using crowdsourcing, e.g., based on information shared by other vehicles. In some embodiments, vehicles 1205, 1210, 1215, 1220, and 1225 may share navigation information with each other and each vehicle may update its own the autonomous vehicle road navigation model provided in the vehicle. In some embodiments, at least one of the vehicles 1205, 1210, 1215, 1220, and 1225 (e.g., vehicle 1205) may function as a hub vehicle. The at least one processor 2315 of the hub vehicle (e.g., vehicle 1205) may perform some or all of the functions performed by server 1230. For example, the at least one processor 2315 of the hub vehicle may communicate with other vehicles and receive navigation information from other vehicles. The at least one processor 2315 of the hub vehicle may generate the autonomous vehicle road navigation model or an update to the model based on the shared information received from other vehicles. The at least one processor 2315 of the hub vehicle may transmit the autonomous vehicle road navigation model or the update to the model to other vehicles for providing autonomous navigation guidance.

Navigation Based on Sparse Maps

As previously discussed, the autonomous vehicle road navigation model including sparse map 800 may include a plurality of mapped lane marks and a plurality of mapped objects/features associated with a road segment. As discussed in greater detail below, these mapped lane marks, objects, and features may be used when the autonomous vehicle navigates. For example, in some embodiments, the mapped objects and features may be used to localized a host vehicle relative to the map (e.g., relative to a mapped target trajectory). The mapped lane marks may be used (e.g., as a check) to determine a lateral position and/or orientation relative to a planned or target trajectory. With this position information, the autonomous vehicle may be able to adjust a heading direction to match a direction of a target trajectory at the determined position.

Vehicle 200 may be configured to detect lane marks in a given road segment. The road segment may include any markings on a road for guiding vehicle traffic on a roadway. For example, the lane marks may be continuous or dashed lines demarking the edge of a lane of travel. The lane marks may also include double lines, such as a double continuous lines, double dashed lines or a combination of continuous and dashed lines indicating, for example, whether passing is permitted in an adjacent lane. The lane marks may also include freeway entrance and exit markings indicating, for example, a deceleration lane for an exit ramp or dotted lines indicating that a lane is turn-only or that the lane is ending. The markings may further indicate a work zone, a temporary lane shift, a path of travel through an intersection, a median, a special purpose lane (e.g., a bike lane, HOV lane, etc.), or other miscellaneous markings (e.g., crosswalk, a speed hump, a railway crossing, a stop line, etc.).

Vehicle 200 may use cameras, such as image capture devices 122 and 124 included in image acquisition unit 120, to capture images of the surrounding lane marks. Vehicle 200 may analyze the images to detect point locations associated with the lane marks based on features identified within one or more of the captured images. These point locations may be uploaded to a server to represent the lane marks in sparse map 800. Depending on the position and field of view of the camera, lane marks may be detected for both sides of the vehicle simultaneously from a single image. In other embodiments, different cameras may be used to capture images on multiple sides of the vehicle. Rather than uploading actual images of the lane marks, the marks may be stored in sparse map 800 as a spline or a series of points, thus reducing the size of sparse map 800 and/or the data that must be uploaded remotely by the vehicle.

Figure 24A:
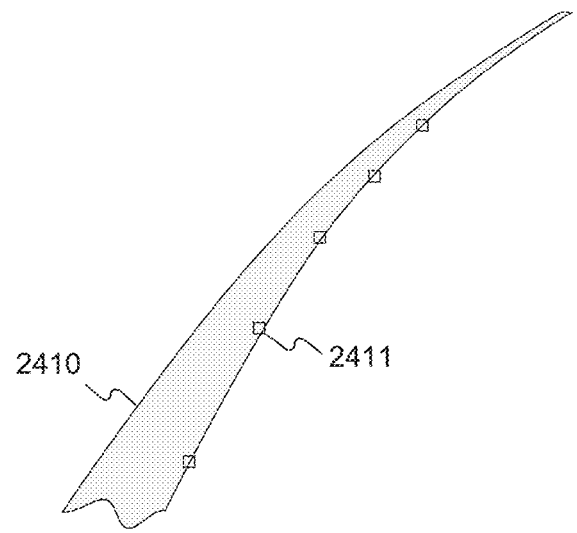
FIGS. 24A, 24B, 24C, and 24D illustrate exemplary lane marks that may be detected consistent with the disclosed embodiments.

FIGS. 24A-24D illustrate exemplary point locations that may be detected by vehicle 200 to represent particular lane marks. Similar to the landmarks described above, vehicle 200 may use various image recognition algorithms or software to identify point locations within a captured image. For example, vehicle 200 may recognize a series of edge points, corner points or various other point locations associated with a particular lane mark. FIG. 24A shows a continuous lane mark 2410 that may be detected by vehicle 200. Lane mark 2410 may represent the outside edge of a roadway, represented by a continuous white line. As shown in FIG. 24A, vehicle 200 may be configured to detect a plurality of edge location points 2411 along the lane mark. Location points 2411 may be collected to represent the lane mark at any intervals sufficient to create a mapped lane mark in the sparse map. For example, the lane mark may be represented by one point per meter of the detected edge, one point per every five meters of the detected edge, or at other suitable spacings. In some embodiments, the spacing may be determined by other factors, rather than at set intervals such as, for example, based on points where vehicle 200 has a highest confidence ranking of the location of the detected points. Although FIG. 24A shows edge location points on an interior edge of lane mark 2410, points may be collected on the outside edge of the line or along both edges. Further, while a single line is shown in FIG. 24A, similar edge points may be detected for a double continuous line. For example, points 2411 may be detected along an edge of one or both of the continuous lines.

Figure 24B:
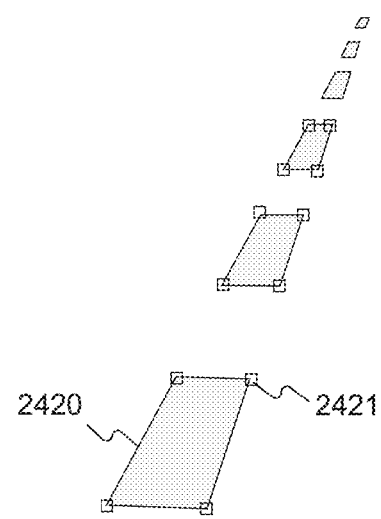

Vehicle 200 may also represent lane marks differently depending on the type or shape of lane mark. FIG. 24B shows an exemplary dashed lane mark 2420 that may be detected by vehicle 200. Rather than identifying edge points, as in FIG. 24A, vehicle may detect a series of corner points 2421 representing corners of the lane dashes to define the full boundary of the dash. While FIG. 24B shows each corner of a given dash marking being located, vehicle 200 may detect or upload a subset of the points shown in the figure. For example, vehicle 200 may detect the leading edge or leading corner of a given dash mark, or may detect the two corner points nearest the interior of the lane. Further, not every dash mark may be captured, for example, vehicle 200 may capture and/or record points representing a sample of dash marks (e.g., every other, every third, every fifth, etc.) or dash marks at a predefined spacing (e.g., every meter, every five meters, every 10 meters, etc.) Corner points may also be detected for similar lane marks, such as markings showing a lane is for an exit ramp, that a particular lane is ending, or other various lane marks that may have detectable corner points. Corner points may also be detected for lane marks consisting of double dashed lines or a combination of continuous and dashed lines.

Figure 24C:
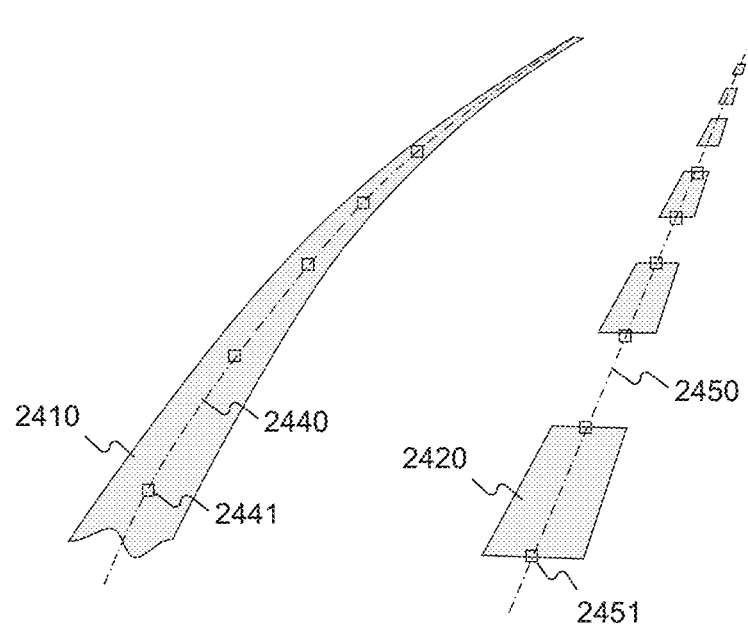

In some embodiments, the points uploaded to the server to generate the mapped lane marks may represent other points besides the detected edge points or corner points. FIG. 24C illustrates a series of points that may represent a centerline of a given lane mark. For example, continuous lane 2410 may be represented by centerline points 2441 along a centerline 2440 of the lane mark. In some embodiments, vehicle 200 may be configured to detect these center points using various image recognition techniques, such as convolutional neural networks (CNN), scale-invariant feature transform (SIFT), histogram of oriented gradients (HOG) features, or other techniques. Alternatively, vehicle 200 may detect other points, such as edge points 2411 shown in FIG. 24A, and may calculate centerline points 2441, for example, by detecting points along each edge and determining a midpoint between the edge points. Similarly, dashed lane mark 2420 may be represented by centerline points 2451 along a centerline 2450 of the lane mark. The centerline points may be located at the edge of a dash, as shown in FIG. 24C, or at various other locations along the centerline. For example, each dash may be represented by a single point in the geometric center of the dash. The points may also be spaced at a predetermined interval along the centerline (e.g., every meter, 5 meters, 10 meters, etc.). The centerline points 2451 may be detected directly by vehicle 200, or may be calculated based on other detected reference points, such as corner points 2421, as shown in FIG. 24B. A centerline may also be used to represent other lane mark types, such as a double line, using similar techniques as above.

Figure 24D:
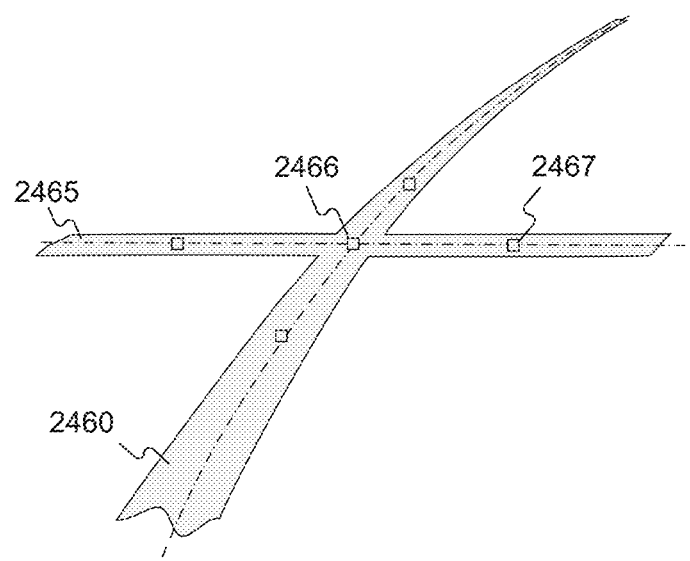

In some embodiments, vehicle 200 may identify points representing other features, such as a vertex between two intersecting lane marks. FIG. 24D shows exemplary points representing an intersection between two lane marks 2460 and 2465. Vehicle 200 may calculate a vertex point 2466 representing an intersection between the two lane marks. For example, one of lane marks 2460 or 2465 may represent a train crossing area or other crossing area in the road segment. While lane marks 2460 and 2465 are shown as crossing each other perpendicularly, various other configurations may be detected. For example, the lane marks 2460 and 2465 may cross at other angles, or one or both of the lane marks may terminate at the vertex point 2466. Similar techniques may also be applied for intersections between dashed or other lane mark types. In addition to vertex point 2466, various other points 2467 may also be detected, providing further information about the orientation of lane marks 2460 and 2465.

Vehicle 200 may associate real-world coordinates with each detected point of the lane mark. For example, location identifiers may be generated, including coordinate for each point, to upload to a server for mapping the lane mark. The location identifiers may further include other identifying information about the points, including whether the point represents a corner point, an edge point, center point, etc. Vehicle 200 may therefore be configured to determine a real-world position of each point based on analysis of the images. For example, vehicle 200 may detect other features in the image, such as the various landmarks described above, to locate the real-world position of the lane marks. This may involve determining the location of the lane marks in the image relative to the detected landmark or determining the position of the vehicle based on the detected landmark and then determining a distance from the vehicle (or target trajectory of the vehicle) to the lane mark. When a landmark is not available, the location of the lane mark points may be determined relative to a position of the vehicle determined based on dead reckoning. The real-world coordinates included in the location identifiers may be represented as absolute coordinates (e.g., latitude/longitude coordinates), or may be relative to other features, such as based on a longitudinal position along a target trajectory and a lateral distance from the target trajectory. The location identifiers may then be uploaded to a server for generation of the mapped lane marks in the navigation model (such as sparse map 800). In some embodiments, the server may construct a spline representing the lane marks of a road segment. Alternatively, vehicle 200 may generate the spline and upload it to the server to be recorded in the navigational model.

Figure 24E:
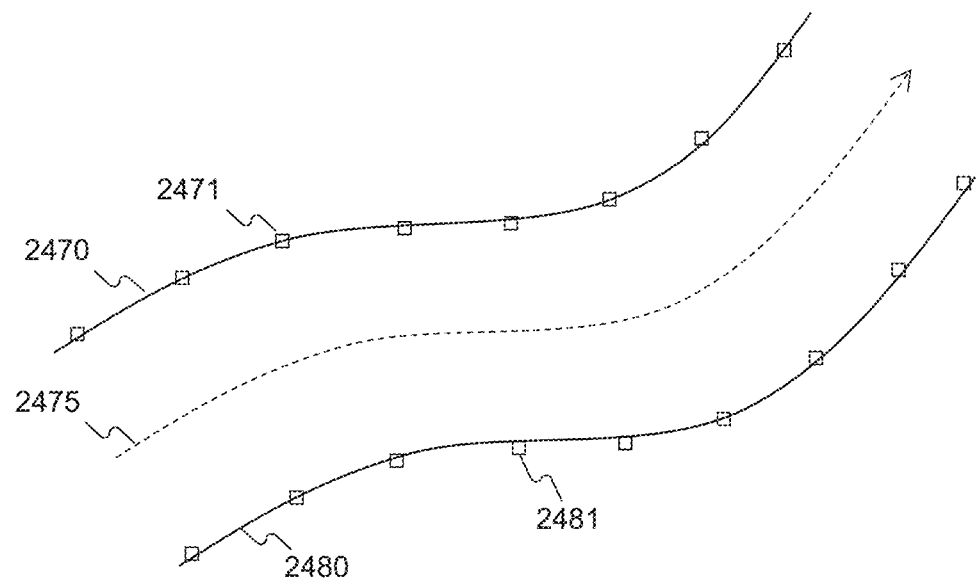
FIG. 24E shows exemplary mapped lane marks consistent with the disclosed embodiments.

FIG. 24E shows an exemplary navigation model or sparse map for a corresponding road segment that includes mapped lane marks. The sparse map may include a target trajectory 2475 for a vehicle to follow along a road segment. As described above, target trajectory 2475 may represent an ideal path for a vehicle to take as it travels the corresponding road segment, or may be located elsewhere on the road (e.g., a centerline of the road, etc.). Target trajectory 2475 may be calculated in the various methods described above, for example, based on an aggregation (e.g., a weighted combination) of two or more reconstructed trajectories of vehicles traversing the same road segment.

In some embodiments, the target trajectory may be generated equally for all vehicle types and for all road, vehicle, and/or environment conditions. In other embodiments, however, various other factors or variables may also be considered in generating the target trajectory. A different target trajectory may be generated for different types of vehicles (e.g., a private car, a light truck, and a full trailer). For example, a target trajectory with relatively tighter turning radii may be generated for a small private car than a larger semi-trailer truck. In some embodiments, road, vehicle and environmental conditions may be considered as well. For example, a different target trajectory may be generated for different road conditions (e.g., wet, snowy, icy, dry, etc.), vehicle conditions (e.g., tire condition or estimated tire condition, brake condition or estimated brake condition, amount of fuel remaining, etc.) or environmental factors (e.g., time of day, visibility, weather, etc.). The target trajectory may also depend on one or more aspects or features of a particular road segment (e.g., speed limit, frequency and size of turns, grade, etc.). In some embodiments, various user settings may also be used to determine the target trajectory, such as a set driving mode (e.g., desired driving aggressiveness, economy mode, etc.).

The sparse map may also include mapped lane marks 2470 and 2480 representing lane marks along the road segment. The mapped lane marks may be represented by a plurality of location identifiers 2471 and 2481. As described above, the location identifiers may include locations in real world coordinates of points associated with a detected lane mark. Similar to the target trajectory in the model, the lane marks may also include elevation data and may be represented as a curve in three-dimensional space. For example, the curve may be a spline connecting three dimensional polynomials of suitable order the curve may be calculated based on the location identifiers. The mapped lane marks may also include other information or metadata about the lane mark, such as an identifier of the type of lane mark (e.g., between two lanes with the same direction of travel, between two lanes of opposite direction of travel, edge of a roadway, etc.) and/or other characteristics of the lane mark (e.g., continuous, dashed, single line, double line, yellow, white, etc.). In some embodiments, the mapped lane marks may be continuously updated within the model, for example, using crowdsourcing techniques. The same vehicle may upload location identifiers during multiple occasions of travelling the same road segment or data may be selected from a plurality of vehicles (such as 1205, 1210, 1215, 1220, and 1225) travelling the road segment at different times. Sparse map 800 may then be updated or refined based on subsequent location identifiers received from the vehicles and stored in the system. As the mapped lane marks are updated and refined, the updated road navigation model and/or sparse map may be distributed to a plurality of autonomous vehicles.

Figure 24F:
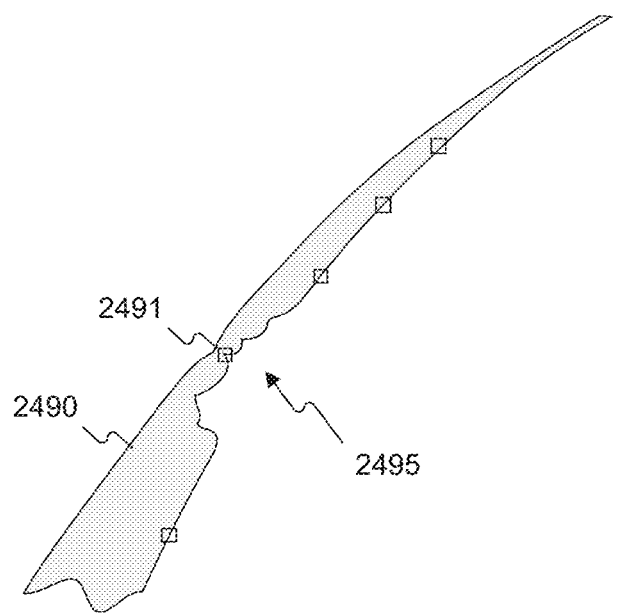
FIG. 24F shows an exemplary anomaly associated with detecting a lane mark consistent with the disclosed embodiments.

Generating the mapped lane marks in the sparse map may also include detecting and/or mitigating errors based on anomalies in the images or in the actual lane marks themselves. FIG. 24F shows an exemplary anomaly 2495 associated with detecting a lane mark 2490. Anomaly 2495 may appear in the image captured by vehicle 200, for example, from an object obstructing the camera's view of the lane mark, debris on the lens, etc. In some instances, the anomaly may be due to the lane mark itself, which may be damaged or worn away, or partially covered, for example, by dirt, debris, water, snow or other materials on the road. Anomaly 2495 may result in an erroneous point 2491 being detected by vehicle 200. Sparse map 800 may provide the correct the mapped lane mark and exclude the error. In some embodiments, vehicle 200 may detect erroneous point 2491 for example, by detecting anomaly 2495 in the image, or by identifying the error based on detected lane mark points before and after the anomaly. Based on detecting the anomaly, the vehicle may omit point 2491 or may adjust it to be in line with other detected points. In other embodiments, the error may be corrected after the point has been uploaded, for example, by determining the point is outside of an expected threshold based on other points uploaded during the same trip, or based on an aggregation of data from previous trips along the same road segment.

The mapped lane marks in the navigation model and/or sparse map may also be used for navigation by an autonomous vehicle traversing the corresponding roadway. For example, a vehicle navigating along a target trajectory may periodically use the mapped lane marks in the sparse map to align itself with the target trajectory. As mentioned above, between landmarks the vehicle may navigate based on dead reckoning in which the vehicle uses sensors to determine its ego motion and estimate its position relative to the target trajectory. Errors may accumulate over time and vehicle's position determinations relative to the target trajectory may become increasingly less accurate. Accordingly, the vehicle may use lane marks occurring in sparse map 800 (and their known locations) to reduce the dead reckoning-induced errors in position determination. In this way, the identified lane marks included in sparse map 800 may serve as navigational anchors from which an accurate position of the vehicle relative to a target trajectory may be determined.

FIG. 25A shows an exemplary image 2500 of a vehicle's surrounding environment that may be used for navigation based on the mapped lane marks. Image 2500 may be captured, for example, by vehicle 200 through image capture devices 122 and 124 included in image acquisition unit 120. Image 2500 may include an image of at least one lane mark 2510, as shown in FIG. 25A. Image 2500 may also include one or more landmarks 2521, such as road sign, used for navigation as described above. Some elements shown in FIG. 25A, such as elements 2511, 2530, and 2520 which do not appear in the captured image 2500 but are detected and/or determined by vehicle 200 are also shown for reference.

Using the various techniques described above with respect to FIGS. 24A-D and 24F, a vehicle may analyze image 2500 to identify lane mark 2510. Various points 2511 may be detected corresponding to features of the lane mark in the image. Points 2511, for example, may correspond to an edge of the lane mark, a corner of the lane mark, a midpoint of the lane mark, a vertex between two intersecting lane marks, or various other features or locations. Points 2511 may be detected to correspond to a location of points stored in a navigation model received from a server. For example, if a sparse map is received containing points that represent a centerline of a mapped lane mark, points 2511 may also be detected based on a centerline of lane mark 2510.

The vehicle may also determine a longitudinal position represented by element 2520 and located along a target trajectory. Longitudinal position 2520 may be determined from image 2500, for example, by detecting landmark 2521 within image 2500 and comparing a measured location to a known landmark location stored in the road model or sparse map 800. The location of the vehicle along a target trajectory may then be determined based on the distance to the landmark and the landmark's known location. The longitudinal position 2520 may also be determined from images other than those used to determine the position of a lane mark. For example, longitudinal position 2520 may be determined by detecting landmarks in images from other cameras within image acquisition unit 120 taken simultaneously or near simultaneously to image 2500. In some instances, the vehicle may not be near any landmarks or other reference points for determining longitudinal position 2520. In such instances, the vehicle may be navigating based on dead reckoning and thus may use sensors to determine its ego motion and estimate a longitudinal position 2520 relative to the target trajectory. The vehicle may also determine a distance 2530 representing the actual distance between the vehicle and lane mark 2510 observed in the captured image(s). The camera angle, the speed of the vehicle, the width of the vehicle, or various other factors may be accounted for in determining distance 2530.

Figure 25B:
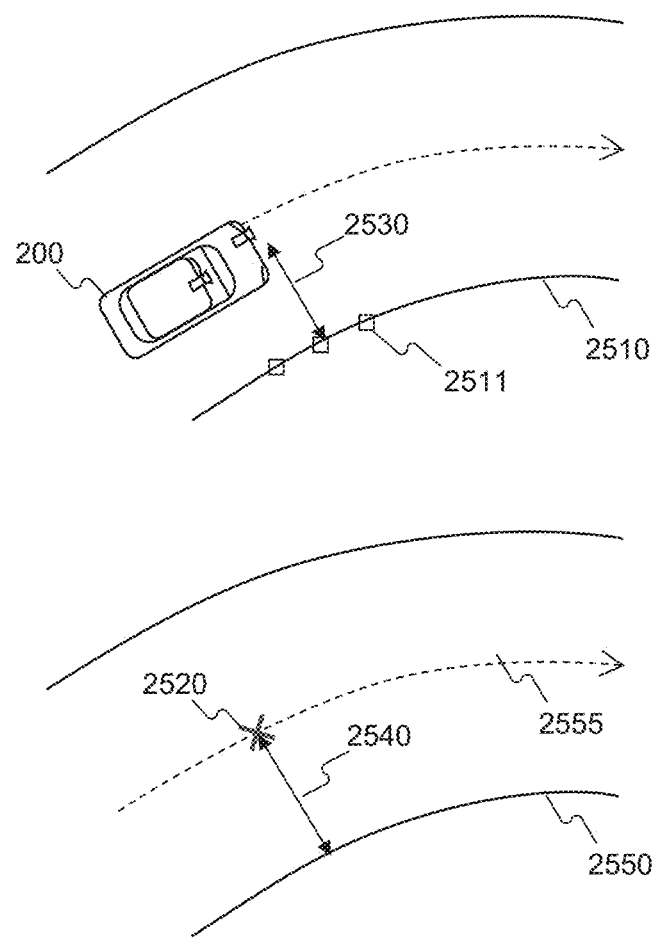
FIG. 25B illustrates a lateral localization correction of a vehicle based on mapped lane marks in a road navigation model consistent with the disclosed embodiments.

FIG. 25B illustrates a lateral localization correction of the vehicle based on the mapped lane marks in a road navigation model. As described above, vehicle 200 may determine a distance 2530 between vehicle 200 and a lane mark 2510 using one or more images captured by vehicle 200. Vehicle 200 may also have access to a road navigation model, such as sparse map 800, which may include a mapped lane mark 2550 and a target trajectory 2555. Mapped lane mark 2550 may be modeled using the techniques described above, for example using crowdsourced location identifiers captured by a plurality of vehicles. Target trajectory 2555 may also be generated using the various techniques described previously. Vehicle 200 may also determine or estimate a longitudinal position 2520 along target trajectory 2555 as described above with respect to FIG. 25A. Vehicle 200 may then determine an expected distance 2540 based on a lateral distance between target trajectory 2555 and mapped lane mark 2550 corresponding to longitudinal position 2520. The lateral localization of vehicle 200 may be corrected or adjusted by comparing the actual distance 2530, measured using the captured image(s), with the expected distance 2540 from the model.

Figure 25C:
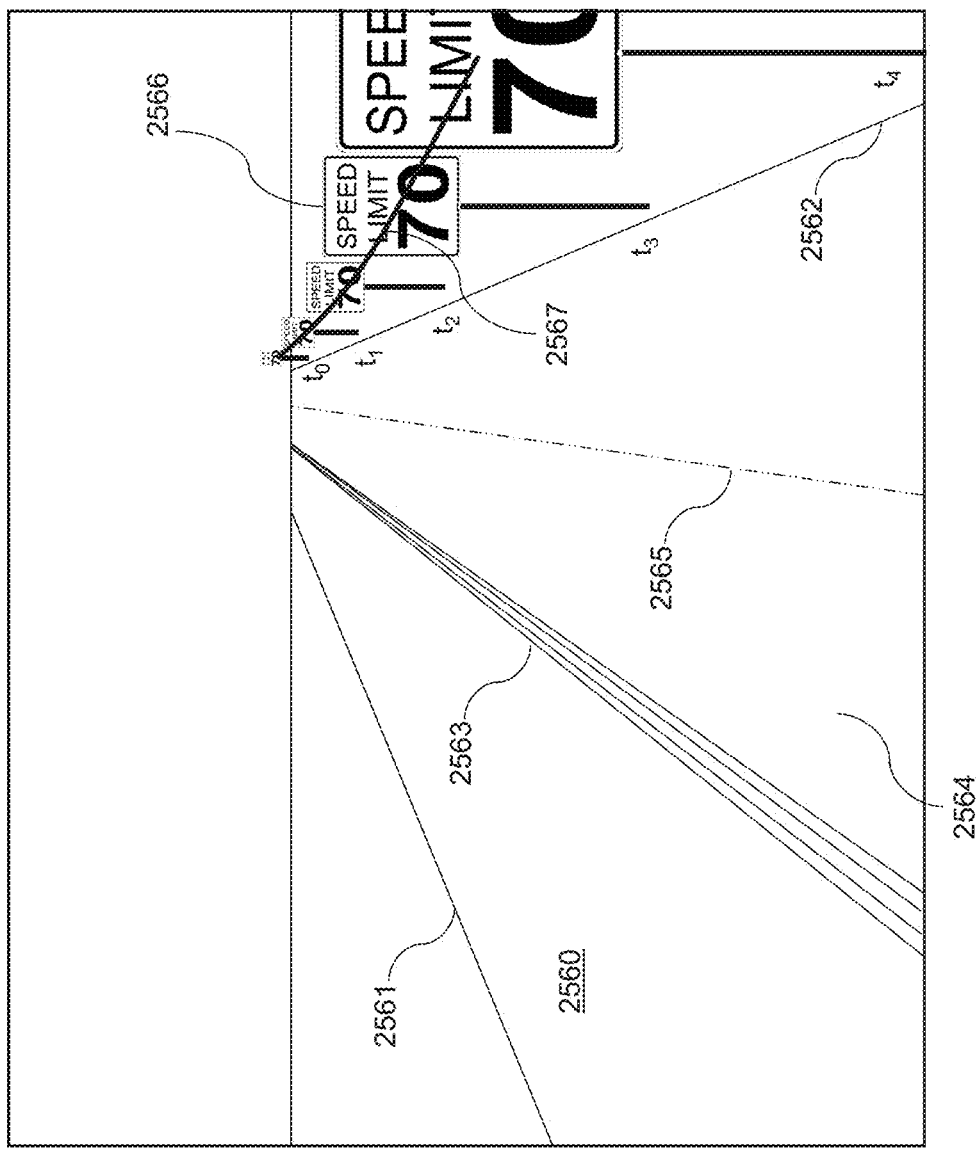
FIGS. 25C and 25D provide conceptual representations of a localization technique for locating a host vehicle along a target trajectory using mapped features included in a sparse map.
Figure 25D:
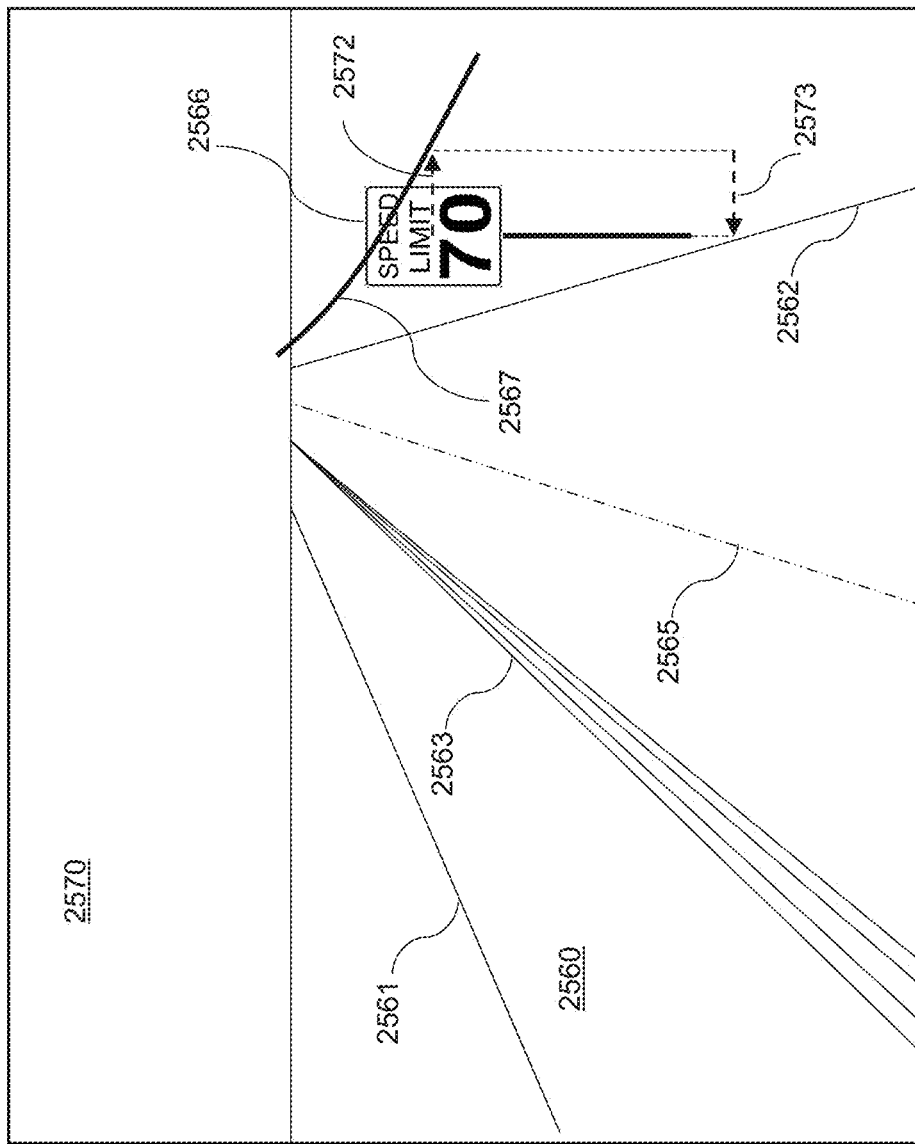

FIGS. 25C and 25D provide illustrations associated with another example for localizing a host vehicle during navigation based on mapped landmarks/objects/features in a sparse map. FIG. 25C conceptually represents a series of images captured from a vehicle navigating along a road segment 2560. In this example, road segment 2560 includes a straight section of a two-lane divided highway delineated by road edges 2561 and 2562 and center lane marking 2563. As shown, the host vehicle is navigating along a lane 2564, which is associated with a mapped target trajectory 2565. Thus, in an ideal situation (and without influencers such as the presence of target vehicles or objects in the roadway, etc.) the host vehicle should closely track the mapped target trajectory 2565 as it navigates along lane 2564 of road segment 2560. In reality, the host vehicle may experience drift as it navigates along mapped target trajectory 2565. For effective and safe navigation, this drift should be maintained within acceptable limits (e.g., +/−10 cm of lateral displacement from target trajectory 2565 or any other suitable threshold). To periodically account for drift and to make any needed course corrections to ensure that the host vehicle follows target trajectory 2565, the disclosed navigation systems may be able to localize the host vehicle along the target trajectory 2565 (e.g., determine a lateral and longitudinal position of the host vehicle relative to the target trajectory 2565) using one or more mapped features/objects included in the sparse map.

As a simple example, FIG. 25C shows a speed limit sign 2566 as it may appear in five different, sequentially captured images as the host vehicle navigates along road segment 2560. For example, at a first time, $t_0$, sign 2566 may appear in a captured image near the horizon. As the host vehicle approaches sign 2566, in subsequentially captured images at times $t_1$, $t_2$, $t_3$, and $t_4$, sign 2566 will appear at different 2D X-Y pixel locations of the captured images. For example, in the captured image space, sign 2566 will move downward and to the right along curve 2567 (e.g., a curve extending through the center of the sign in each of the five captured image frames). Sign 2566 will also appear to increase in size as it is approached by the host vehicle (i.e., it will occupy a great number of pixels in subsequently captured images).

These changes in the image space representations of an object, such as sign 2566, may be exploited to determine a localized position of the host vehicle along a target trajectory. For example, as described in the present disclosure, any detectable object or feature, such as a semantic feature like sign 2566 or a detectable non-semantic feature, may be identified by one or more harvesting vehicles that previously traversed a road segment (e.g., road segment 2560). A mapping server may collect the harvested drive information from a plurality of vehicles, aggregate and correlate that information, and generate a sparse map including, for example, a target trajectory 2565 for lane 2564 of road segment 2560. The sparse map may also store a location of sign 2566 (along with type information, etc.). During navigation (e.g., prior to entering road segment 2560), a host vehicle may be supplied with a map tile including a sparse map for road segment 2560. To navigate in lane 2564 of road segment 2560, the host vehicle may follow mapped target trajectory 2565.

The mapped representation of sign 2566 may be used by the host vehicle to localize itself relative to the target trajectory. For example, a camera on the host vehicle will capture an image 2570 of the environment of the host vehicle, and that captured image 2570 may include an image representation of sign 2566 having a certain size and a certain X-Y image location, as shown in FIG. 25D. This size and X-Y image location can be used to determine the host vehicle's position relative to target trajectory 2565. For example, based on the sparse map including a representation of sign 2566, a navigation processor of the host vehicle can determine that in response to the host vehicle traveling along target trajectory 2565, a representation of sign 2566 should appear in captured images such that a center of sign 2566 will move (in image space) along line 2567. If a captured image, such as image 2570, shows the center (or other reference point) displaced from line 2567 (e.g., the expected image space trajectory), then the host vehicle navigation system can determine that at the time of the captured image it was not located on target trajectory 2565. From the image, however, the navigation processor can determine an appropriate navigational correction to return the host vehicle to the target trajectory 2565. For example, if analysis shows an image location of sign 2566 that is displaced in the image by a distance 2572 to the left of the expected image space location on line 2567, then the navigation processor may cause a heading change by the host vehicle (e.g., change the steering angle of the wheels) to move the host vehicle leftward by a distance 2573. In this way, each captured image can be used as part of a feedback loop process such that a difference between an observed image position of sign 2566 and expected image trajectory 2567 may be minimized to ensure that the host vehicle continues along target trajectory 2565 with little to no deviation. Of course, the more mapped objects that are available, the more often the described localization technique may be employed, which can reduce or eliminate drift-induced deviations from target trajectory 2565.

The process described above may be useful for detecting a lateral orientation or displacement of the host vehicle relative to a target trajectory. Localization of the host vehicle relative to target trajectory 2565 may also include a determination of a longitudinal location of the target vehicle along the target trajectory. For example, captured image 2570 includes a representation of sign 2566 as having a certain image size (e.g., 2D X-Y pixel area). This size can be compared to an expected image size of mapped sign 2566 as it travels through image space along line 2567 (e.g., as the size of the sign progressively increases, as shown in FIG. 25C). Based on the image size of sign 2566 in image 2570, and based on the expected size progression in image space relative to mapped target trajectory 2565, the host vehicle can determine its longitudinal position (at the time when image 2570 was captured) relative to target trajectory 2565. This longitudinal position coupled with any lateral displacement relative to target trajectory 2565, as described above, allows for full localization of the host vehicle relative to target trajectory 2565, as the host vehicle navigates along road 2560.

FIGS. 25C and 25D provide just one example of the disclosed localization technique using a single mapped object and a single target trajectory. In other examples, there may be many more target trajectories (e.g., one target trajectory for each viable lane of a multi-lane highway, urban street, complex junction, etc.) and there may be many more mapped available for localization. For example, a sparse map representative of an urban environment may include many objects per meter available for localization.

Figure 26A:
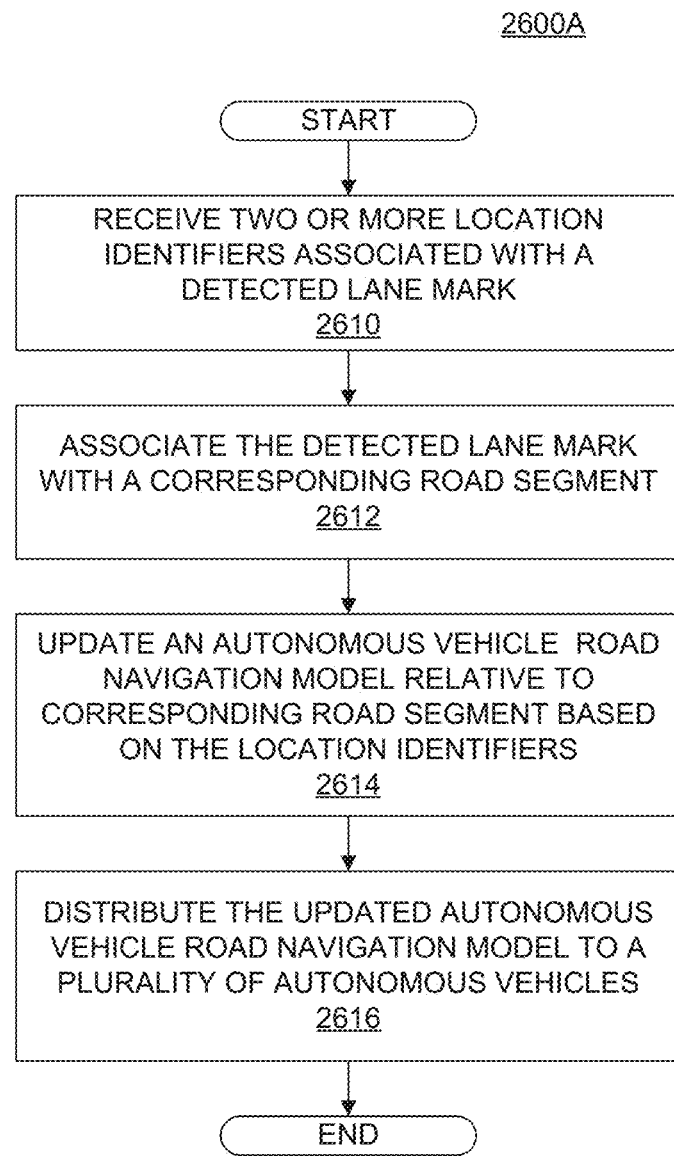
FIG. 26A is a flowchart showing an exemplary process for mapping a lane mark for use in autonomous vehicle navigation consistent with disclosed embodiments.

FIG. 26A is a flowchart showing an exemplary process 2600A for mapping a lane mark for use in autonomous vehicle navigation, consistent with disclosed embodiments. At step 2610, process 2600A may include receiving two or more location identifiers associated with a detected lane mark. For example, step 2610 may be performed by server 1230 or one or more processors associated with the server. The location identifiers may include locations in real-world coordinates of points associated with the detected lane mark, as described above with respect to FIG. 24E. In some embodiments, the location identifiers may also contain other data, such as additional information about the road segment or the lane mark. Additional data may also be received during step 2610, such as accelerometer data, speed data, landmarks data, road geometry or profile data, vehicle positioning data, ego motion data, or various other forms of data described above. The location identifiers may be generated by a vehicle, such as vehicles 1205, 1210, 1215, 1220, and 1225, based on images captured by the vehicle. For example, the identifiers may be determined based on acquisition, from a camera associated with a host vehicle, of at least one image representative of an environment of the host vehicle, analysis of the at least one image to detect the lane mark in the environment of the host vehicle, and analysis of the at least one image to determine a position of the detected lane mark relative to a location associated with the host vehicle. As described above, the lane mark may include a variety of different marking types, and the location identifiers may correspond to a variety of points relative to the lane mark. For example, where the detected lane mark is part of a dashed line marking a lane boundary, the points may correspond to detected corners of the lane mark. Where the detected lane mark is part of a continuous line marking a lane boundary, the points may correspond to a detected edge of the lane mark, with various spacings as described above. In some embodiments, the points may correspond to the centerline of the detected lane mark, as shown in FIG. 24C, or may correspond to a vertex between two intersecting lane marks and at least one two other points associated with the intersecting lane marks, as shown in FIG. 24D.

At step 2612, process 2600A may include associating the detected lane mark with a corresponding road segment. For example, server 1230 may analyze the real-world coordinates, or other information received during step 2610, and compare the coordinates or other information to location information stored in an autonomous vehicle road navigation model. Server 1230 may determine a road segment in the model that corresponds to the real-world road segment where the lane mark was detected.

At step 2614, process 2600A may include updating an autonomous vehicle road navigation model relative to the corresponding road segment based on the two or more location identifiers associated with the detected lane mark. For example, the autonomous road navigation model may be sparse map 800, and server 1230 may update the sparse map to include or adjust a mapped lane mark in the model. Server 1230 may update the model based on the various methods or processes described above with respect to FIG. 24E. In some embodiments, updating the autonomous vehicle road navigation model may include storing one or more indicators of position in real world coordinates of the detected lane mark. The autonomous vehicle road navigation model may also include a at least one target trajectory for a vehicle to follow along the corresponding road segment, as shown in FIG. 24E.

At step 2616, process 2600A may include distributing the updated autonomous vehicle road navigation model to a plurality of autonomous vehicles. For example, server 1230 may distribute the updated autonomous vehicle road navigation model to vehicles 1205, 1210, 1215, 1220, and 1225, which may use the model for navigation. The autonomous vehicle road navigation model may be distributed via one or more networks (e.g., over a cellular network and/or the Internet, etc.), through wireless communication paths 1235, as shown in FIG. 12.

In some embodiments, the lane marks may be mapped using data received from a plurality of vehicles, such as through a crowdsourcing technique, as described above with respect to FIG. 24E. For example, process 2600A may include receiving a first communication from a first host vehicle, including location identifiers associated with a detected lane mark, and receiving a second communication from a second host vehicle, including additional location identifiers associated with the detected lane mark. For example, the second communication may be received from a subsequent vehicle travelling on the same road segment, or from the same vehicle on a subsequent trip along the same road segment. Process 2600A may further include refining a determination of at least one position associated with the detected lane mark based on the location identifiers received in the first communication and based on the additional location identifiers received in the second communication. This may include using an average of the multiple location identifiers and/or filtering out "ghost" identifiers that may not reflect the real-world position of the lane mark.

Figure 26B:
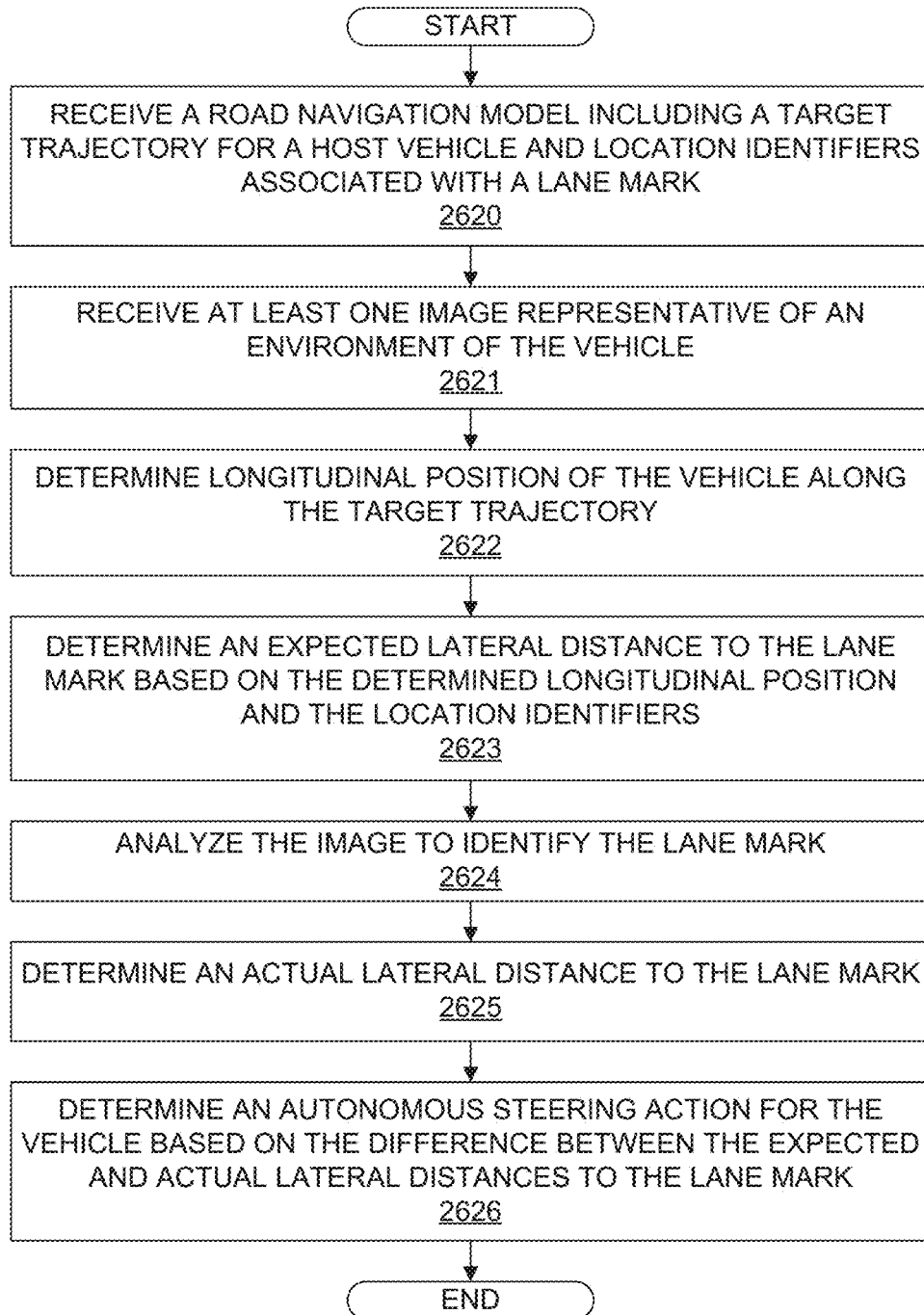
FIG. 26B is a flowchart showing an exemplary process for autonomously navigating a host vehicle along a road segment using mapped lane marks consistent with disclosed embodiments.

FIG. 26B is a flowchart showing an exemplary process 2600B for autonomously navigating a host vehicle along a road segment using mapped lane marks. Process 2600B may be performed, for example, by processing unit 110 of autonomous vehicle 200. At step 2620, process 2600B may include receiving from a server-based system an autonomous vehicle road navigation model. In some embodiments, the autonomous vehicle road navigation model may include a target trajectory for the host vehicle along the road segment and location identifiers associated with one or more lane marks associated with the road segment. For example, vehicle 200 may receive sparse map 800 or another road navigation model developed using process 2600A. In some embodiments, the target trajectory may be represented as a three-dimensional spline, for example, as shown in FIG. 9B. As described above with respect to FIGS. 24A-F, the location identifiers may include locations in real world coordinates of points associated with the lane mark (e.g., corner points of a dashed lane mark, edge points of a continuous lane mark, a vertex between two intersecting lane marks and other points associated with the intersecting lane marks, a centerline associated with the lane mark, etc.).

At step 2621, process 2600B may include receiving at least one image representative of an environment of the vehicle. The image may be received from an image capture device of the vehicle, such as through image capture devices 122 and 124 included in image acquisition unit 120. The image may include an image of one or more lane marks, similar to image 2500 described above.

At step 2622, process 2600B may include determining a longitudinal position of the host vehicle along the target trajectory. As described above with respect to FIG. 25A, this may be based on other information in the captured image (e.g., landmarks, etc.) or by dead reckoning of the vehicle between detected landmarks.

At step 2623, process 2600B may include determining an expected lateral distance to the lane mark based on the determined longitudinal position of the host vehicle along the target trajectory and based on the two or more location identifiers associated with the at least one lane mark. For example, vehicle 200 may use sparse map 800 to determine an expected lateral distance to the lane mark. As shown in FIG. 25B, longitudinal position 2520 along a target trajectory 2555 may be determined in step 2622. Using spare map 800, vehicle 200 may determine an expected distance 2540 to mapped lane mark 2550 corresponding to longitudinal position 2520.

At step 2624, process 2600B may include analyzing the at least one image to identify the at least one lane mark. Vehicle 200, for example, may use various image recognition techniques or algorithms to identify the lane mark within the image, as described above. For example, lane mark 2510 may be detected through image analysis of image 2500, as shown in FIG. 25A.

At step 2625, process 2600B may include determining an actual lateral distance to the at least one lane mark based on analysis of the at least one image. For example, the vehicle may determine a distance 2530, as shown in FIG. 25A, representing the actual distance between the vehicle and lane mark 2510. The camera angle, the speed of the vehicle, the width of the vehicle, the position of the camera relative to the vehicle, or various other factors may be accounted for in determining distance 2530.

At step 2626, process 2600B may include determining an autonomous steering action for the host vehicle based on a difference between the expected lateral distance to the at least one lane mark and the determined actual lateral distance to the at least one lane mark. For example, as described above with respect to FIG. 25B, vehicle 200 may compare actual distance 2530 with an expected distance 2540. The difference between the actual and expected distance may indicate an error (and its magnitude) between the vehicle's actual position and the target trajectory to be followed by the vehicle. Accordingly, the vehicle may determine an autonomous steering action or other autonomous action based on the difference. For example, if actual distance 2530 is less than expected distance 2540, as shown in FIG. 25B, the vehicle may determine an autonomous steering action to direct the vehicle left, away from lane mark 2510. Thus, the vehicle's position relative to the target trajectory may be corrected. Process 2600B may be used, for example, to improve navigation of the vehicle between landmarks.

Processes 2600A and 2600B provide examples only of techniques that may be used for navigating a host vehicle using the disclosed sparse maps. In other examples, processes consistent with those described relative to FIGS. 25C and 25D may also be employed.

Ego Motion Correction of LIDAR Output

As described elsewhere in this disclosure, a vehicle or a driver may navigate a vehicle along a road segment in the environment. The vehicle may collect various types of information related to the road. For example, the vehicle may be equipped with a LIDAR system to collect LIDAR reflections from one or more objects from its environment and/or one or more cameras to capture images from the environment. Because of the host vehicle's own movement, a non-moving object (e.g., a light pole) may move in the field of view of the LIDAR system, which may appear in the collected data (e.g., a point cloud generated based on reflections of the laser emissions by the object) as a moving object even if the object itself does not move. As such, in some instances, in complex, cluttered scenes, small objects and slow moving objects may be difficult to detect. Also, a traditional LIDAR system may mis-identify smaller objects as moving objects. Similarly, a traditional LIDAR system may mis-identify a moving object (e.g., a target vehicle) that is moving along with the host vehicle as a non-moving object. Therefore, it may be desirable to reduce or eliminate the possibility of misidentification of a non-moving object as a moving object (or vice versa). This disclosure describes systems and methods that may correlate LIDAR points across two or more frames and remove the depth effects caused by the ego motion of the host vehicle. After the effects caused by the ego motion are removed, static objects (e.g., non-moving background objects) may show no velocity (i.e., the velocity thereof equals zero), and moving objects may be identified as those having points that include a velocity greater than zero.

This disclosure provides, for example, a system that may determine at least one indicator of ego motion of the host vehicle. The ego motion of the host vehicle may refer to any environmental displacement of the host vehicle with respect to a non-moving reference point or object. For example, as described elsewhere in this disclosure, the ego motion of the camera (and hence the vehicle body) may be estimated based on an optical flow analysis of captured images. An optical flow analysis of a sequence of images identifies movement of pixels from the sequence of images, and based on the identified movement, determines motions of the vehicle. The system may also be configured to receive, from a LIDAR system associated with the host vehicle and based on a first LIDAR scan of a field of view of the LIDAR system, a first point cloud at, for example, a first time point. The first point cloud may include a first representation of at least a portion of an object. The system may further be configured to receive, from the LIDAR system and based on a second LIDAR scan of the field of view of the LIDAR system, a second point cloud at, for example, a second time point. The second point cloud may include a second representation of the at least a portion of the object. The system may also determine a velocity of the object based on the at least one indicator of ego motion of the host vehicle, and based on a comparison of the first point cloud, including the first representation of the at least a portion of the object, and the second point cloud, including the second representation of the at least a portion of the object.

Figure 27:
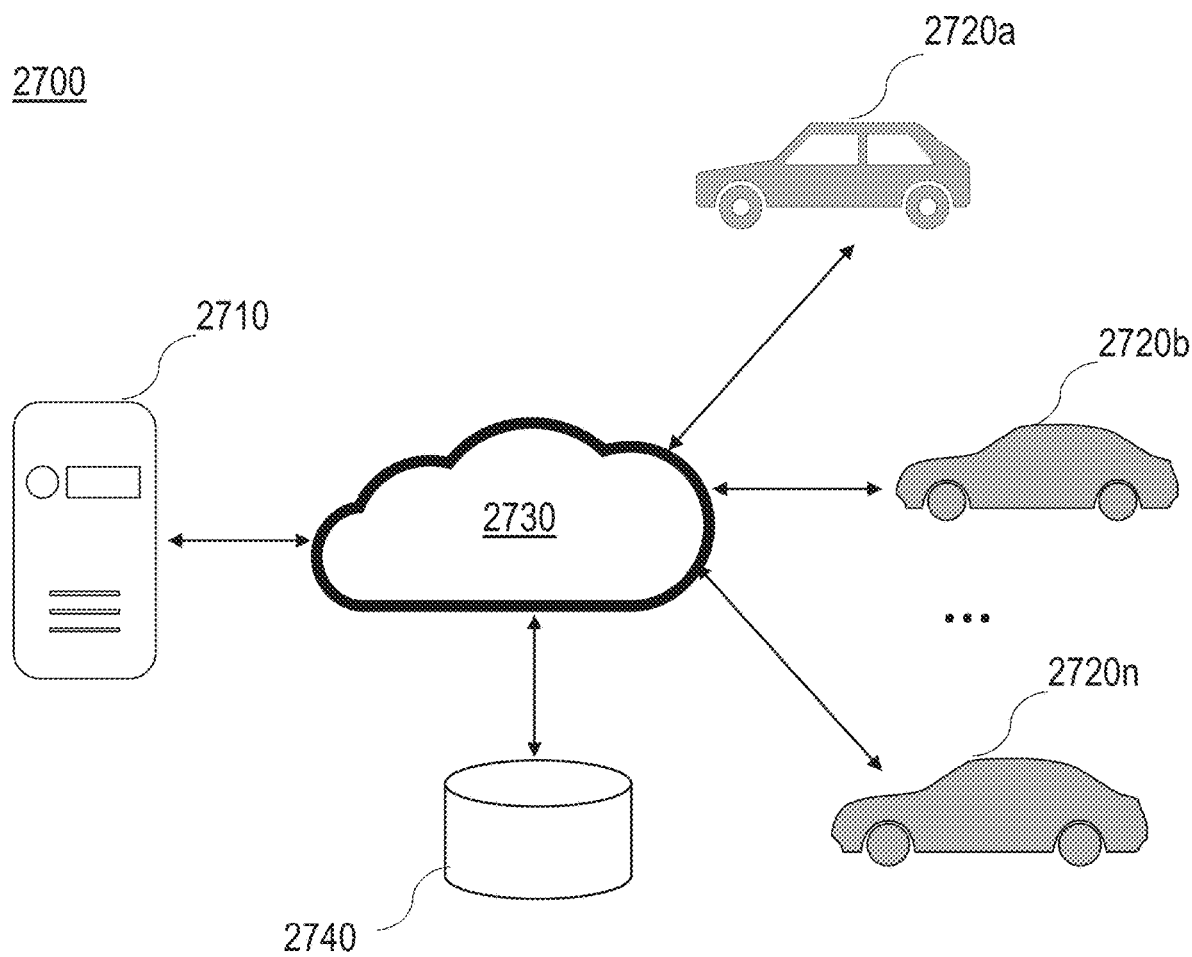
FIG. 27 illustrates an exemplary system for determining a velocity of an object consistent with disclosed embodiments.

FIG. 27 illustrates an exemplary system 2700 for detecting one or more objects in the environment of the host vehicle consistent with disclosed embodiments. As illustrated in FIG. 27, system 2700 may include a server 2710, one or more vehicles 2720 (e.g., vehicle 2720a, vehicle 2720b, . . . , vehicle 2720n), a network 2730, and a database 2740.

A vehicle 2720 may collect information from its environment and transmit the collected information to server 2710 via, for example, network 2730. For example, vehicle 2720 may include one or more sensors configured to collect data and information from its environment. Vehicle 2720 may transmit the data and information (or the derived data therefrom) to server 2710. By way of example, vehicle 2720 may include an image sensor (e.g., a camera) configured to capture one or more images of its environment. As another example, vehicle 2720 may include a LIDAR system configured to gather LIDAR reflection information within a 360-degree field of view around vehicle 2720 or from any sub-segment of the 360-degree field of view (e.g., one or more FOVs each representing less than 360 degrees). In some embodiments, vehicle 2720 may include a LIDAR system and one or more cameras.

Server 2710 may process data and/or information received from one or more vehicles 2720. For example, server 2710 may receive from a vehicle 2720 information relating to an object (e.g., the location of the object). Server 2710 may update a map to add the object into the map (or remove the object from the map). In some embodiments, server 2710 may transmit the updated map (or at least a portion thereof) to one or more vehicles 2720.

While FIG. 27 illustrates one server 2710, one skilled in the art would understand that system 300 may include one or more servers 2710 that, individually or in combination, perform the functions of server 2710 disclosed in this application. For example, server 2710 may constitute a cloud server group comprising two or more servers that perform the functions disclosed herein. The term "cloud server" refers to a computer platform that provides services via a network, such as the Internet. In this example configuration, server 2710 may use virtual machines that may not correspond to individual hardware. For example, computational and/or storage capabilities may be implemented by allocating appropriate portions of computation/storage power from a scalable repository, such as a data center or a distributed computing environment. In one example, server 2710 may implement the methods described herein using customized hard-wired logic, one or more Application Specific Integrated Circuits (ASICs) or Field Programmable Gate Arrays (FPGAs), firmware, and/or program logic which, in combination with the computer system, cause server 2710 to be a special-purpose machine.

Network 2730 may be configured to facilitate communications among the components of system 2700. Network 2730 may include wired and wireless communication networks, such as a local-area network (LAN), a wide-area network (WAN), a computer network, a wireless network, a telecommunications network, or the like, or a combination thereof.

Database 2740 may be configured to store information and data for one or more components of system 2700. For example, database 2740 may store the data (e.g., map data) for server 2710. One or more vehicles 2720 may obtain the map data stored in database 2740 via, for example, network 2730.

Figure 28:
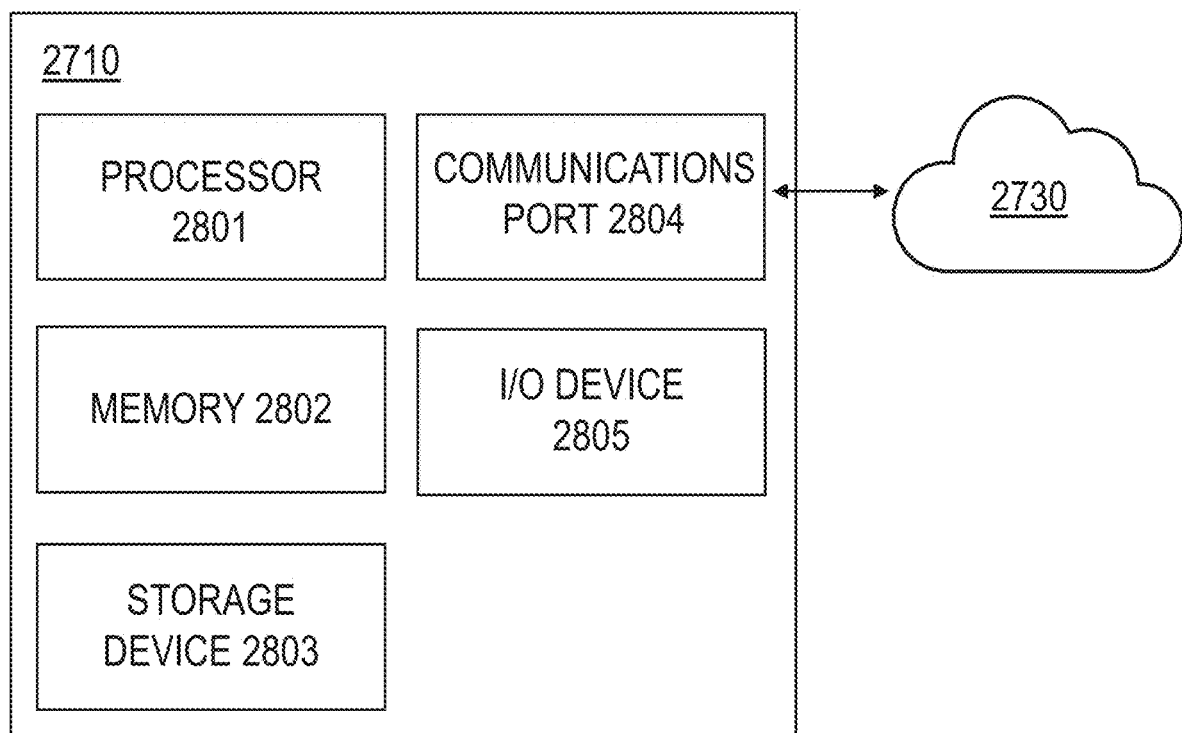
FIG. 28 illustrates an exemplary server consistent with disclosed embodiments.

FIG. 28 is a block diagram of an exemplary server 2710 consistent with the disclosed embodiments. As illustrated in FIG. 28, server 2710 may include at least one processor (e.g., processor 2801), a memory 2802, at least one storage device (e.g., storage device 2803), a communications port 2804, and an I/O device 2805.

Processor 2801 may be configured to perform one or more functions of server 2710 described in this disclosure. Processor 2801 may include a microprocessor, preprocessors (such as an image preprocessor), a graphics processing unit (GPU), a central processing unit (CPU), support circuits, digital signal processors, integrated circuits, memory, or any other types of devices suitable for running applications or performing a computing task. In some embodiments, processor 2801 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.). Any of the processing devices disclosed herein may be configured to perform certain functions. Configuring a processing device, such as any of the described processors or other controller or microprocessor, to perform certain functions may include programming of computer-executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

Server 2710 may also include a memory 2802 that may store instructions for various components of server 2710. For example, memory 2802 may store instructions that, when executed by processor 2801, may be configured to cause processor 2801 to perform one or more functions described herein. Memory 2802 may include any number of random-access memories, read-only memories, flash memories, disk drives, optical storage, tape storage, removable storage, and other types of storage. In one instance, memory 2802 may be separate from processor 2801. In another instance, memory 2802 may be integrated into processor 2801.

Storage device 2803 may be configured to store various data and information for one or more components of server 2710. For example, storage device 2803 may store map data.

Server 2710 may update the map data based on the data and/or information received from one or more vehicles 2720. Server 2710 may also store the updated map data into storage device 2803. Storage device 2803 may include one or more hard drives, tapes, one or more solid-state drives, any device suitable for writing and read data, or the like, or a combination thereof.

Communications port 2804 may be configured to facilitate data communications between server 2710 and one or more components of system 2700 via network 2730. For example, communications port 2804 may be configured to receive data from and transmit data to one or more components of system 100 via one or more public or private networks, including the Internet, an Intranet, a WAN (Wide-Area Network), a MAN (Metropolitan-Area Network), a wireless network compliant with the IEEE 802.11a/b/g/n Standards, a leased line, or the like.

I/O device 2805 may be configured to receive input from the user of server 2710, and one or more components of server 2710 may perform one or more functions in response to the input received. In some embodiments, I/O device 2805 may include an interface displayed on a touchscreen. I/O device 2805 may also be configured to output information and/or data to the user. For example, I/O device 2805 may include a display configured to display map data.

Figure 29:
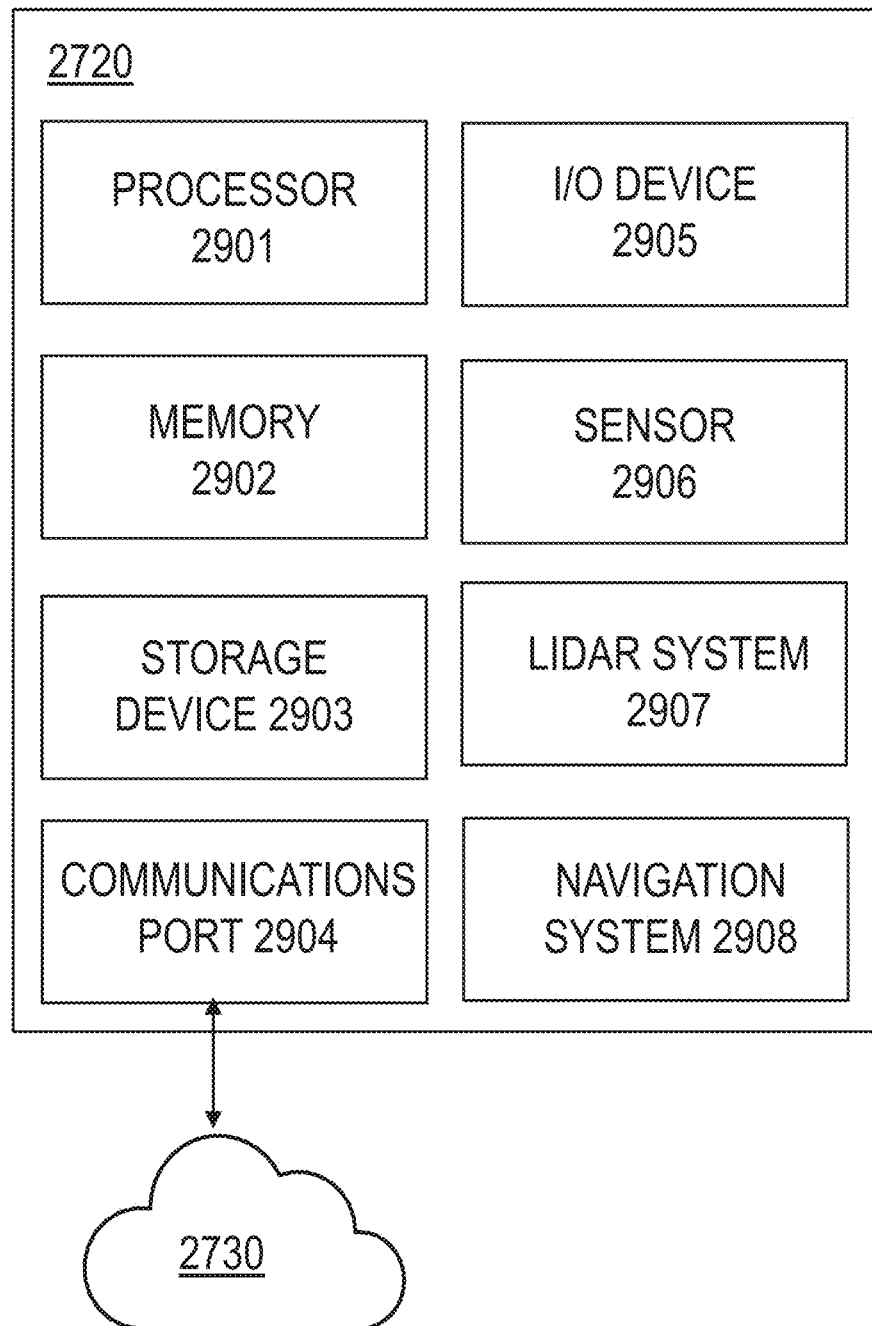
FIG. 29 illustrates an exemplary vehicle consistent with disclosed embodiments.

FIG. 29 is a block diagram of an exemplary vehicle 2720 consistent with the disclosed embodiments. As illustrated in FIG. 29, vehicle 2720 may include at least one processor (e.g., processor 2901), a memory 2902, at least one storage device (e.g., storage device 2903), a communications port 2904, an I/O device 2905, one or more sensors 2906, a LIDAR system 2907, and a navigation system 2908.

Processor 2901 may be configured to perform one or more functions of vehicle 2720 described in this disclosure. Processor 2901 may include a microprocessor, preprocessors (such as an image preprocessor), a graphics processing unit (GPU), a central processing unit (CPU), support circuits, digital signal processors, integrated circuits, memory, or any other types of devices suitable for running applications or performing a computing task. In some embodiments, processor 2901 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.). Any of the processing devices disclosed herein may be configured to perform certain functions. Configuring a processing device, such as any of the described processors or other controller or microprocessor, to perform certain functions may include programming of computer-executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

Vehicle 2720 may also include a memory 2902 that may store instructions for various components of server 2710. For example, memory 2902 may store instructions that, when executed by processor 2901, may be configured to cause processor 2901 to perform one or more functions described herein. Memory 2902 may include any number of random-access memories, read-only memories, flash memories, disk drives, optical storage, tape storage, removable storage, and other types of storage. In one instance, memory 2902 may be separate from processor 2901. In another instance, memory 2902 may be integrated into processor 2901. In some embodiments, memory 2902 may include software for performing one or more computing tasks, as well as a trained system, such as a neural network, or a deep neural network.

Storage device 2903 may be configured to store various data and information for one or more components of vehicle 2720. Storage device 2903 may include one or more hard drives, tapes, one or more solid-state drives, any device suitable for writing and read data, or the like, or a combination thereof.

Communications port 2904 may be configured to facilitate data communications between vehicle 2720 and one or more components of system 2700 via network 2730. For example, communications port 2904 may be configured to receive data from and transmit data to server 2710 via one or more public or private networks, including the Internet, an Intranet, a WAN (Wide-Area Network), a MAN (Metropolitan-Area Network), a wireless network compliant with the IEEE 802.11a/b/g/n Standards, a leased line, or the like.

I/O device 2905 may be configured to receive input from the user of server 2710, and one or more components of server 2710 may perform one or more functions in response to the input received. In some embodiments, I/O device 2905 may include an interface displayed on a touchscreen. I/O device 2905 may also be configured to output information and/or data to the user. For example, I/O device 2905 may include a display configured to display a map. In some embodiments, vehicle 2720 may receive data of the map (or at least a portion thereof) from server 2710 via, for example, network 2730.

Sensor 2906 may be configured to collect information relating to vehicle 2720 and/or the environment of vehicle 2720. Sensor 2906 may include one or more of an image sensor (e.g., a camera), a positioning device (e.g., a Global Positioning System (GPS) device), an accelerometer, a gyro sensor, a speedometer, or the like, or a combination thereof. For example, vehicle 2720 may include an image sensor (e.g., a camera) configured to capture one or more images of its environment, which may include representation of an object (or at least a portion thereof). As another example, vehicle 2720 may include a GPS device configured to collect positioning data associated with positions of vehicle 2720 over a period of time.

LIDAR system 2907 may include one or more LIDAR units. In some embodiments, the one or more LIDAR units may be positioned on a roof of vehicle 2720. Such a unit may include a rotating unit configured to gather LIDAR reflection information within a 360-degree field of view around vehicle 2720 or from any sub-segment of the 360-degree field of view (e.g., one or more FOVs each representing less than 360 degrees). In some embodiments, a LIDAR unit may be positioned at a forward location on vehicle 2720 (e.g., near the headlights, in the front grill, near the fog lamps, in a forward bumper, or at any other suitable location). In some cases, one or more LIDAR units installed on a forward portion of vehicle 2720 may collect reflection information from a field of view in an environment forward of vehicle 2720. The data collected by LIDAR system 2907 may be provided to processor 2901. Alternatively or additionally, the data may be transmitted to server 2710 and/or database 2740 via network 2730.

Any suitable type of LIDAR unit may be included on vehicle 2720. In some cases, LIDAR system 2907 may include one or more flash LIDAR units (e.g., 3D flash LIDAR) where an entire LIDAR field of view (FOV) is illuminated with a single laser pulse, and a sensor including rows and columns of pixels to record returned light intensity and time of flight/depth information. Such flash systems may illuminate a scene and collect LIDAR "images" multiple times per second. Scanning LIDAR units may also be employed. Such scanning LIDAR units may rely on one or more techniques for dispersing a laser beam over a particular FOV. In some cases, a scanning LIDAR unit may include a scanning mirror that deflects and directs a laser beam toward objects within the FOV Scanning mirrors may rotate through a full 360 degrees or may rotate along a single axis or multiple axes over less than 360 degrees to direct the laser toward a predetermined FOV. In some cases, LIDAR units may scan one horizontal line. In other cases, a LIDAR unit may scan multiple horizontal lines within an FOV, effectively rastering a particular FOV multiple times per second.

The LIDAR units in LIDAR system 2907 may include any suitable laser source. In some embodiments, the LIDAR units may employ a continuous laser. In other cases, the LIDAR units may rely upon pulsed laser emissions. Additionally, any suitable laser wavelength may be employed. In some cases, a wavelength of between about 600 nm to about 1000 nm may be used.

The LIDAR unit(s) in LIDAR system 2907 may also include any suitable type of sensor and provide any suitable type of output. In some cases, sensors of the LIDAR units may include solid state photodetectors, such as one or more photodiodes or photomultipliers. The sensors may also include one or more CMOS or CCD devices including any number of pixels. These sensors may be sensitive to laser light reflected from a scene within the LIDAR FOV. The sensors may enable various types of output from a LIDAR unit. In some cases, a LIDAR unit may output raw light intensity values and time of flight information representative of the reflected laser light collected at each sensor or at each pixel or sub-component of a particular sensor. Additionally or alternatively, a LIDAR unit may output a point cloud (e.g., a 3D point cloud) that may include light intensity and depth/distance information relative to each collected point). LIDAR units may also output various types of depth maps representative of light reflection amplitude and distance to points within a field of view. LIDAR units may provide depth or distance information relative to particular points within an FOV by noting a time at which light from the LIDAR's light source was initially projected toward the FOV and recording a time at which the incident laser light is received by a sensor in the LIDAR unit. The time difference may represent a time of flight, which may be directly related to the round trip distance that the incident laser light traveled from the laser source to a reflecting object and back to the LIDAR unit. Monitoring the time of flight information associated with individual laser spots or small segments of a LIDAR FOV may provide accurate distance information for a plurality of points within the FOV (e.g., mapping to even very small features of objects within the FOV). In some cases, LIDAR units may output more complex information, such as classification information that correlates one or more laser reflections with a type of object from which the laser reflection was acquired.

Navigation system 2908 may be configured to assist a driver of vehicle 2720 to operate vehicle 2720. For example, navigation system 2908 may generate an alert when an object (e.g., another vehicle) is within a predetermined distance from the body of vehicle 2720. As another example, navigation system 2908 may include an autonomous vehicle navigation system configured to control the movement of vehicle 2720 as described elsewhere in this disclosure. In some embodiments, navigation system 2908 may include an advanced driver-assistance system (ADAS) system.

Figure 30A:
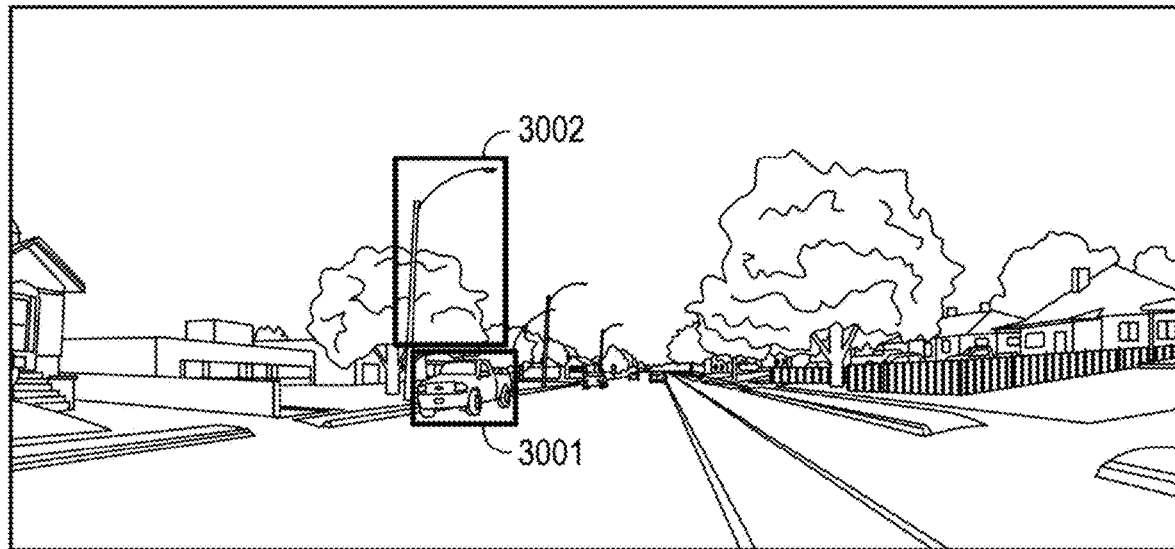
FIG. 30A illustrates exemplary objects in a field of view associated with a navigation system consistent with disclosed embodiments.
Figure 30B:
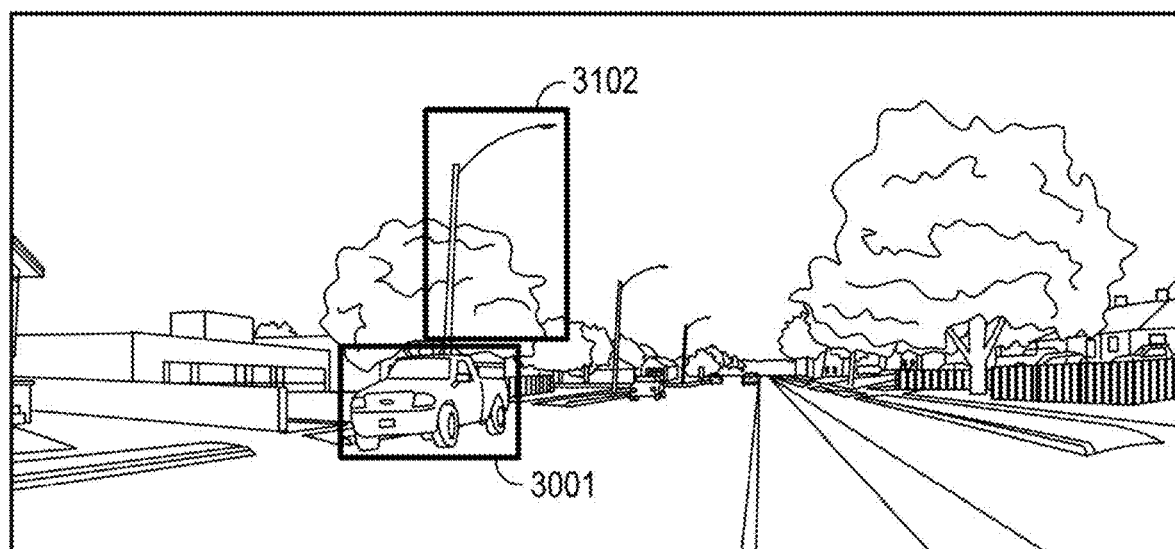
FIG. 30B illustrates exemplary objects in the field of view associated with a navigation system consistent with disclosed embodiments.

FIG. 31 is a flowchart showing an exemplary process 3100 for consistent with disclosed embodiments. Reference is also made to FIGS. 30A and 30B, which are schematic illustrations of exemplary objects in a field of view associated with a navigation system consistent with disclosed embodiments. While process 3100 is described below using vehicle 2720 as an example, one skilled in the art would understand that server 2710 can also be configured to perform one or more steps of process 3100.

At step 3101, processor 2901 of vehicle 2720 may determine at least one indicator of ego motion of the host vehicle (i.e., vehicle 2720). Ego motion of the host vehicle may refer to any environmental displacement of the host vehicle with respect to a non-moving reference point or object. An indicator of ego motion of the host vehicle may include any information indicating that the host vehicle moves with respect to a non-moving reference point or object (e.g., a building, a sideline of a road segment, an electricity pole, a light pole, a tree, etc.).

For example, vehicle 2720 may include an onboard camera configured to capture a plurality of images from its environment. Processor 2901 may be configured to receive the plurality of images and determine whether the vehicle is moving with respect to a rigid structure (i.e., an indicator of ego motion of the vehicle) based on the analysis of the plurality of images. By way of example, a camera of vehicle 2720 may capture image 3000A illustrated in FIG. 30A and then capture image 3000B illustrated in FIG. 30B. Processor 2901 may receive and analyze images 3000A and 3000B to determine that the vehicle is moving ahead with respect to a non-moving object (e.g., object 3002, a light pole). By way of example, processor 2901 may determine that the size of object 3002 appearing in image 3000B may be greater than that in image 3000A. Processor 2901 may also determine that vehicle 2720 is moving toward object 3002. Alternatively or additionally, the at least one indicator of ego motion of the host vehicle may be determined based on the analysis of map information. For example, processor 2901 may determine the first position of vehicle 2720 on a map and determine the second position of vehicle 2720 on the map, and compare the first position with the second position. Processor 2901 may also determine at least one indicator of ego motion of the host vehicle based on the comparison (e.g., the first position being different from the second position). Alternatively or additionally, the at least one indicator of ego motion of the host vehicle may be determined based on a heading direction of the host vehicle. For example, vehicle 2720 may include a sensor (e.g., a compass) configured to determine a heading direction of vehicle 2720. Processor 2901 may determine whether the heading direction changes over time, and if so, processor 2901 may determine that the host vehicle is moving (i.e., one indicator of ego motion of the host vehicle). Alternatively or additionally, the at least one indicator of ego motion of the host vehicle may be determined based on an analysis of an output from one or more of a speedometer (e.g., indicating that the mileage of the host vehicle changes over time), an accelerometer (e.g., detecting an acceleration of the host vehicle), and a GPS device (e.g., detecting the position of the host vehicle changes based on GPS signals received over time). Alternatively or additionally, the at least one indicator of ego motion of the host vehicle may be determined based on a series of point clouds collected over time. For example, LIDAR system 2907 may generate a first point cloud collected at a first time point, which may include a first point cloud representation of a non-moving project (e.g., a light pole). LIDAR system 2907 may generate a second point cloud collected at a second time point after the first time point, which may also include a second point cloud representation of the same non-moving project. Processor 2901 may determine at least at least one indicator of ego motion of the host vehicle based on the difference in the first point cloud representation and the second point cloud representation (e.g., indicating the host vehicle moved toward the light pole from the first time point to the second time point). Alternatively or additionally, the at least one indicator of ego motion of the host vehicle may be determined based on a combination of point clouds and images. For example, processor 2901 may obtain a first point cloud and a first image captured at a first time point, and a second point cloud and a second image captured at a second time. Processor 2901 may also determine at least one indicator of ego motion of the host vehicle based on the difference between the first and second point clouds, and the difference between the first and second images.

At step 3102, processor 2901 may receive, from a LIDAR system associated with the host vehicle (e.g., LIDAR system 2907) and based on a first LIDAR scan of a field of view of the LIDAR system, a first point cloud. The first point cloud may include a first representation of at least a portion of an object within the field of view of the LIDAR system. In some embodiments, the first point cloud may be collected at a first time point.

As elsewhere in this disclosure, LIDAR system 2907 may include a laser source configured to emit a laser (e.g., a continuous laser or pulsed laser emissions) into the field of view of LIDAR system 2907. LIDAR system 2907 may include one or more sensors configured to detect the reflections of the laser from one or more objects in the field of view. LIDAR system 2907 may generate a point cloud (e.g., a 3D point cloud) that includes light intensity and depth/distance information relative to each collected point by the sensor(s).

LIDAR system 2907 may generate a first point cloud including three-dimensional coordinates for a plurality of locations in the field of view of LIDAR system 2907 at which a plurality of laser reflections are detected by LIDAR system 2907 at the first time point. LIDAR system 2907 may also transmit the generated first point cloud to processor 2901 for further processing. The first point cloud may include a first representation of at least a portion of an object within the field of view of LIDAR system 2907. A representation of at least a portion of an object included in a point cloud refers to a collection of information relating to laser reflections by the at least a portion of the object detected by one or more sensors of LIDAR system 2907.

In some embodiments, LIDAR system 2907 may also output to processor 2901 various types of depth maps representative of light reflection amplitude and distance to points within the field of view.

At step 3103, processor 2901 may receive, from LIDAR system 2907 and based on a second LIDAR scan of the field of view of LIDAR system 2907, a second point cloud including a second representation of the at least a portion of the object. The second point cloud may include a second representation of at least a portion of an object within the field of view of LIDAR system 2907. In some embodiments, the second point cloud may be collected at a second time point. The second time point may occur after the first time point.

In some embodiments, the second point cloud may include three-dimensional coordinates for a plurality of locations in the field of view of LIDAR system 2907 at which a plurality of laser reflections are detected by LIDAR system 2907.

At step 3104, processor 2901 may determine a velocity of the object based on the at least one indicator of ego motion of the host vehicle, and based on a comparison of the first point cloud (which may include the first representation of the at least a portion of the object) and the second point cloud (which may include the second representation of the at least a portion of the object). In some embodiments, determining the velocity of the host vehicle may include determining a speed of the object and/or a direction of the object.

In some embodiments, processor 2901 may determine the velocity of the object based on at least one actual point cloud difference between the first and second point clouds. An actual point cloud difference between two point clouds refers to the differences in the data of the two point clouds. As described elsewhere in this disclosure, a point cloud is a collection of light intensity and depth/distance information relative to each collected point by the sensor(s) of LIDAR system 2907. Processor 2901 may subtract the data of the first point cloud from the data the second point cloud to determine an actual point cloud difference.

In some embodiments, processor 2901 may also determine an expected point cloud difference between the first and second point clouds due to the ego motion of the host vehicle. As explained above, when the host vehicle moves, an object may move in the field of view of LIDAR system 2907. For example, the location of a non-moving object in the field of view of LIDAR system 2907 may change if the host vehicle moves. Processor 2901 may determine an expected point cloud difference between the first point cloud and the second point cloud based on the velocity and/or direction of the host vehicle (which may be determined as described elsewhere in this disclosure). An expected point cloud difference refers to the differences between the first point cloud, which may be a measured data set measured at the first time point) and an expected point cloud at the second time point, which may be calculated based on the first point cloud and the determined ego motion of the host vehicle (e.g., the velocity and/or direction of the host vehicle). For example, processor 2901 may determine an expected point cloud difference based on a change of a location of object 3002 (or at least a portion thereof) relative to a field of view of LIDAR system 2907 from the first time point to the second time point, based on the velocity and direction of the host vehicle and the first point cloud. By way of example, the location of object 3002 (illustrated in image 3000A and image 3000B) may be expected to shift toward upper and right in the field of view of LIDAR system 2907 when the host vehicle is moving straight. Processor 2901 may determine an expected point cloud difference relating to the change of the location of object 3002 based on the velocity and/or direction of the host vehicle and the location of object 3001 in the first point cloud. Alternatively or additionally, processor 2901 may determine an expected change of the size of object 3002 (or at least a portion thereof) appearing in an expected second point cloud at the second time point (which may be a calculated data set compared to the measured second point cloud) relative to the first point cloud representation of object 3002 in the first point cloud. For example, the size of object 3002 appearing in the expected second point cloud at the second time point may increase compared to the size of object 3002 appearing in the first point cloud at the first time point. Processor 2901 may also determine an expected point cloud difference based on the expected change of the size of object 3002 (or at least a portion thereof). Processor 2901 may further determine the velocity of the object based on a comparison of the actual and expected point cloud differences. For example, if processor 2901 determines that there is no difference between the actual and expected point clouds (or the difference between the actual and expected point clouds is less than a threshold), processor 2901 may determine that the velocity of object 3002 equals zero (i.e., object 3002 is not moving). As another example, as described above, processor 2901 may determine a change of the size of the point cloud representation of object 3001 in the expected second point cloud (which may be a calculated point cloud at the second time point based on the first point cloud and the velocity and/or direction of the host vehicle) relative to the first point cloud representation of object 3001 in first point cloud based on the velocity and/or direction of the host vehicle. As another example, processor 2901 may determine the velocity of object 3001 (a moving vehicle) based on a comparison of the actual and expected point cloud differences relating to object 3001, similar to the determination of the velocity of object 3002 described above. Processor 2901 may also determine that the actual and expected point cloud differences relating to object 3001 may indicate the velocity of object 3001 is not zero.

In some embodiments, processor 2901 may determine the velocity of the host vehicle based on a comparison of two or images and the at least one indicator of ego motion of the host vehicle. For example, a camera of vehicle 2720 may capture image 3000A illustrated in FIG. 30A at the first time point and then capture image 3000B illustrated in FIG. 30B at the second time point. Image 3000A may include a first image representation of at least a portion of object 3002 (and at least a portion of object 3001), and image 3000B may include a second image representation of the at least a portion of object 3002 (and at least a portion of object 3001). Processor 2901 may determine a velocity of object 3002 based on a comparison of image 3000A and image 3000B, (and/or the at least one indicator of ego motion of the host vehicle, and based on a comparison of the first point cloud and the second point cloud). In some embodiments, processor 2901 may determine a velocity of object 3001 based on a comparison of image 3000A and image 3000B, each of which may include image representations of object 3001, similar to the determination of the velocity of object 3002 described above.

In some embodiments, processor 2901 may determine the velocity of an object based on the comparison between an actual image difference and an expected image difference. An actual image difference between two images refers to the differences in the data of the two images. An image captured by a camera may include pixels having light intensity (or other types of information) corresponding to the points in the field of view of the camera. Processor 2901 may subtract the pixel data of the first image from the pixel data of the second image to determine an actual image difference. For example, processor 2901 may determine at least one actual image difference between image 3000A and image 3000B by, for example, subtracting the first image from the second image.

Processor 2901 may also determine an expected image difference between the first image (which is a collection of measured data at the first time point) and an expected second image (which may be a collection of calculated data at the second time point) based on the at least one indicator of ego motion of the host vehicle (e.g., the velocity and/or direction of the host vehicle determined as described elsewhere in this disclosure). For example, when the host vehicle moves, an object may move in the field of view an onboard camera of the host vehicle. Processor 2901 may calculate a difference between image 3000A (which may be captured at the first time point) and an expected image at the second time point (which may be calculated based on the ego motion of the host vehicle) based on the at least one indicator of ego motion of the host vehicle. For example, processor 2901 may determine an expected image difference based on a change of a location of object 3002 (or at least a portion thereof) relative to a field of view of the camera (e.g., the view of image 3000A) based on the velocity and direction of the host vehicle. By way of example, as illustrated in FIGS. 30A and 30B, the location of object 3002 (i.e., a non-moving object at the right side of the field of view of the camera) is expected to shift toward upper and right in the field of view of the camera when the host vehicle is moving straight. Processor 2901 may determine an expected image difference relating to the change of the location of object 3002 based on the velocity and/or direction of the host vehicle and the location of object 3001 in image 3000A. Alternatively or additionally, processor 2901 may determine an expected image difference based on a change of the size of the image representation of object 3002 in an expected image at the second time point relative to the first image representation of object 3002 in image 3000A (e.g., an expected increase in the size appearing in image 3000B compared to the size appearing in image 3000A). Processor 2901 may further determine the velocity of the object based on a comparison of the actual and expected image differences. For example, if processor 2901 determines that there is no difference between the actual and expected images (or the difference between the actual and expected images is less than a threshold), processor 2901 may determine that the velocity of object 3002 equals zero (i.e., object 3002 is not moving). As another example, processor 2901 may determine an expected change of the size of the second image representation of object 3001 in image 3000B relative to the first image representation of object 3001 in image 3000A based on the velocity and/or direction of the host vehicle. As another example, processor 2901 may determine the velocity of object 3001 (a moving vehicle) based on a comparison of the actual and expected image differences relating to object 3001, similar to the determination of the velocity of object 3002 described above.

In some embodiments, processor 2901 may determine the velocity of an object based on the comparison of the actual and expected point cloud differences and the comparison of the actual and expected image differences. For example, processor 2901 may determine a first preliminary velocity of an object based on the actual and expected point cloud differences (as described elsewhere in this disclosure) and determine a second preliminary velocity of the object and the comparison of the actual and expected image differences (as described elsewhere in this disclosure). Processor 2901 may also determine the velocity of the object based on the first preliminary velocity and the second preliminary velocity. For example, processor 2901 may determine an average velocity of the first preliminary velocity and the second preliminary velocity) as the velocity of the object. As another example, in determining the velocity of the object, processor 2901 may assign a first weight to a result of the comparison of the actual and expected point cloud differences (e.g., the first preliminary velocity) and assign a second weight to a result of the comparison of the actual and expected image differences (e.g., the second preliminary velocity). Processor 2901 may also determine the velocity of the object based on, for example, a weighted average based on the sum of the product of the first weight times the first preliminary velocity and the product of the second weight times second preliminary velocity. In some embodiments, the first and second weights may be different. Alternatively, the first and second weights may be equal.

In some embodiments, processor 2901 may determine whether the object is moving based on the velocity of the object. For example, processor 2901 may determine the velocity of object 3001 illustrated in FIGS. 30A and 30B is not zero (which may be determined based on one or more steps as described elsewhere in this disclosure) and determine that object 3001 is moving.

In some embodiments, processor 2901 may determine at least one navigational action for the host vehicle based on the velocity of the object. For example, processor 2901 may determine that an object is moving towards the host vehicle based on the determined velocity (which may include a speed and a direction). Processor 2901 may also determine at least one navigational action for the host vehicle. For example, processor 2901 may determine a navigational action for the host vehicle, including, for example, at least one of accelerating, braking, or turning the host vehicle), to avoid a collision with the object. Processor 2901 may also instruct navigation system 2908 to implement the at least one navigational action.

In some embodiments, processor 2901 may determine whether to update (or cause an update to) a map based on the velocity of the object. For example, processor 2901 may determine that object 3002 is a non-moving object based on the velocity of object 3002 and determine not to update a map. On the other hand, assuming that processor 2901 determines that object 3002 is a moving object based on the velocity of object 3002, processor 2901 may update a map stored in a local storage device by removing object 3002 from the map (if object 3002 is included in the map). Alternatively or additionally, processor 2901 may transmit the information of object 3002 (e.g., being a moving object) to server 2710, which may update a map based on the received information.

In some embodiments, processor 2901 may determine the location of the object based on the velocity of the object. For example, processor 2901 may determine that the velocity of object 3002 illustrated in FIGS. 30A and 30B is zero and determine the location of object 3002. Processor 2901 may also transmit the location of object 3002 to server 2710 (e.g., GPS coordinates of object 3002 and/or a location relative to a known object) via, for example, network 2730. Server 2710 may be configured to update a map based on the received location of object 3002. For example, server 2710 may add the location of object 3002 into a map or modify the location of object 3002 in a map based on the received location of object 3002. As another example, processor 2901 may determine that the velocity of an object is not zero (i.e., the object was moving at least during the period of detecting) and determine a location or locations of the object. Processor 2901 may also transmit the location(s) of the object to server 2710, which may modify a map based on the received location(s) of the object. For example, a map may previously indicate the object is a non-moving object (e.g., a road sign). Server 2710 may receive the location(s) of the object to server 2710 indicating that the location of the object changed. Server 2710 may update the map by, for example, modifying the location of the object or removing the object from the map. In some embodiments, server 2710 may receive location information of an object from a plurality of vehicles 2720. Server 2710 may update a map based on the location information received from the plurality of vehicles 2720. For example, server 2710 may be configured to update a map only when a percentage of the location information received from the plurality of vehicles 2720 indicating that the object is moving is equal to or greater than a threshold.

LIDAR Sparse Map Localization

This disclosure provides systems and methods for determining a position of a host vehicle based on LIDAR data captured by a LIDAR system onboard the host vehicle. In one embodiment, a system may analyze LIDAR data captured by the LIDAR system to identify a landmark associated with a road segment in an environment of the host vehicle. The system may also determine whether the identified landmark matches a landmark in a sparse map (which is also referred to herein as a mapped landmark) received by the system from a server. The sparse map may be generated by the server based on data collected by multiple vehicles, as described elsewhere in this disclosure. The system may further determine a position of the host vehicle by, for example, comparing the representation of the landmark in the LIDAR data captured by the LIDAR system with the mapped landmark in the sparse map.

Figure 32:
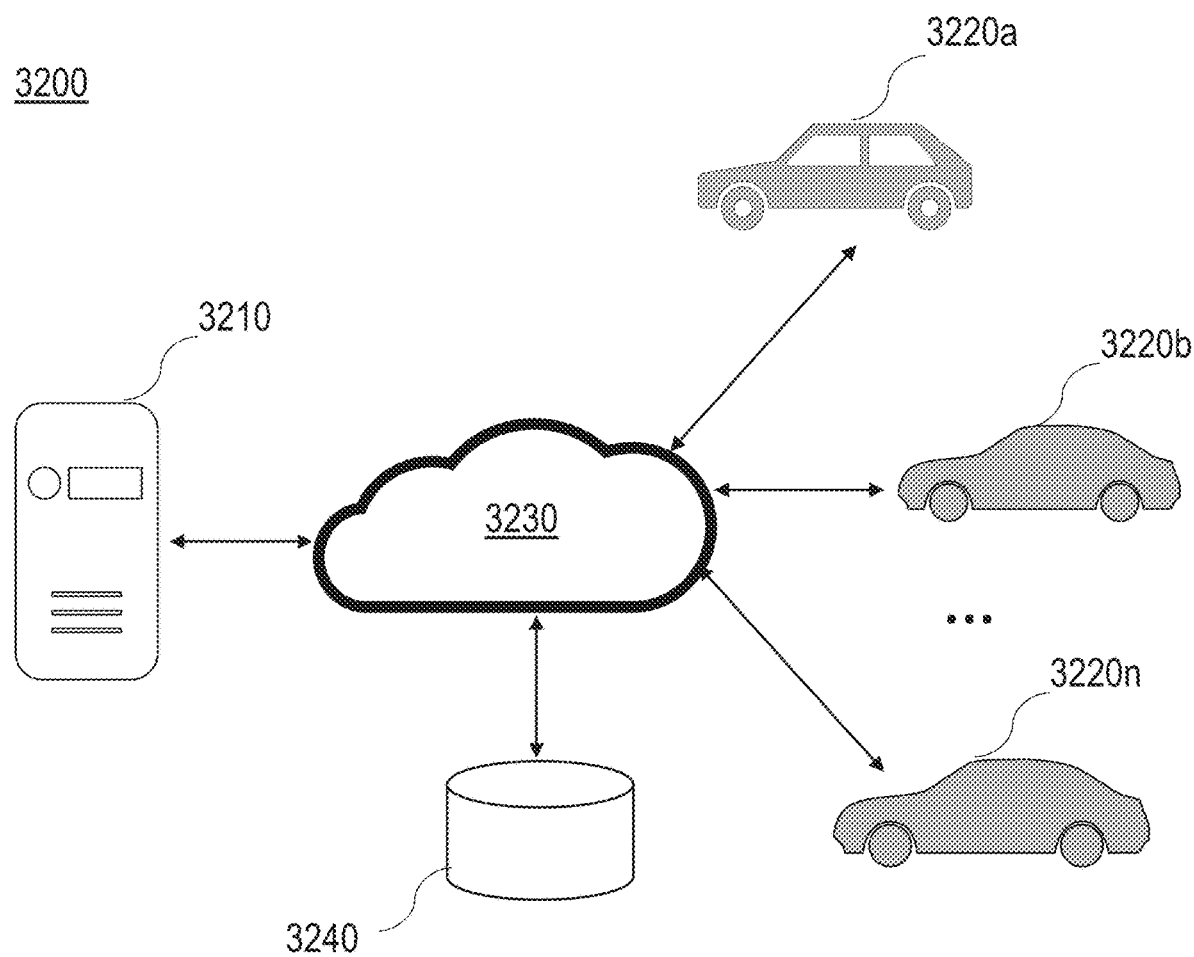
FIG. 32 illustrates an exemplary system for determining a navigational action for a host vehicle consistent with disclosed embodiments.

FIG. 32 illustrates an exemplary system 3200 for generating a sparse map based on information collected by a plurality of vehicles consistent with disclosed embodiments. As illustrated in FIG. 32, system 3200 may include a server 3210, one or more vehicles 3220 (e.g., vehicle 3220a, vehicle 3220b, . . . , vehicle 3220n), a network 3230, and a database 3240.

Vehicle 3220 may collect information from its environment and transmit the collected information to server 3210 via, for example, network 3230. In one example, vehicle 3220 may include one or more sensors (e.g., a camera, a speedometer, a GPS device, an accelerometer, etc.) configured to collect data and information from its environment. Vehicle 3220 may transmit the data and information (or the derived data therefrom) to server 3210. By way of example, vehicle 3220 may include an image sensor (e.g., a camera) configured to capture one or more images of its environment. Alternatively or additionally, vehicle 3220 may include a LIDAR system configured to gather LIDAR reflection information within a 360-degree field of view around vehicle 3220 or from any sub-segment of the 360-degree field of view (e.g., one or more FOVs each representing less than 360 degrees). Alternatively or additionally, an onboard sensor (e.g., a GPS device, an imaging sensor, etc.) may record data relating to the trajectory of vehicle 3220 along one or more road segments. Vehicle 3220 may further be configured to transmit collected data/information to server 3210 via network 3230.

Server 3210 may process data/information received from one or more vehicles 3220. For example, server 3210 may generate or update a map (e.g., a sparse map) based on the received data/information, as described elsewhere in this disclosure. In one example, server 3210 may be configured to receive from vehicle 3220 data relating to a landmark associated with a road segment (e.g., the landmark's location, type, size, shape, semantic property (if any), etc.). Server 3210 may update a map to add or modify the landmark based on the received information from vehicle 3220. As another example, server 3210 may be configured to receive from vehicle 3220 data relating to a trajectory of vehicle 3220 along a road segment. Server 3210 may also be configured to update a sparse map by updating a target trajectory associated with the road segment based on the received data. Server 3210 may further be configured to transmit map data of one or more sparse maps to one or more vehicles (e.g., vehicle 3220, vehicle 3400, etc.).

In some embodiments, a sparse map may include one or more target trajectories associated with one or more road segments. For example, a sparse map may include one or more target trajectories, each of which may be represented in the sparse map by a three-dimensional spline similar to three-dimensional spline 950 illustrated in FIG. 9B and described above.

In some embodiments, a sparse map may include information relating to a landmark associated with a road segment. For example, as described above, a LIDAR system onboard a host vehicle (e.g., vehicle 3220 illustrated in FIG. 32) may capture reflection information from its field of view in the environment of the vehicle. The reflection information may include information relating to reflections by a landmark in the field of view. Vehicle 3220 may transmit the captured LIDAR data to server 3210, which may analyze the LIDAR data and identify the landmark in the LIDAR data (e.g., in the form of point cloud information). Server 3210 may also be configured to include the representation of the identified landmark in the point cloud information in a sparse map. Alternatively or additionally, server 3210 may determine the size, shape, and/or location of the landmark based on the point cloud information, and include the size, shape, and/or location of the landmark in the sparse map.

In some embodiments, a landmark may be represented in a sparse map by a point location. Alternatively, a landmark may be represented in a sparse map by multiple point locations. For example, a landmark may be a speed-limit sign fixed to one side of a bridge over a road segment having lanes in two opposite directions. The landmark may be represented in a sparse map by two point locations, each of which may be associated with one of the directions of the road segment. Alternatively or additionally, a landmark may be represented in a sparse map by an object type classification. For example, a semantic sign (i.e., a landmark), which may include any class of signs for which there's a standardized meaning (e.g., speed limit signs, warning signs, directional signs, etc.), may be represented in a sparse map by an object type classification (e.g., a stop sign, a speed-limit sign, etc.). Alternatively or additionally, a landmark may be represented in a sparse map by one or more object descriptors. For example, a non-semantic sign, which may include any sign that is not associated with a standardized meaning (e.g., general advertising signs, signs identifying business establishments, etc.), may be represented in a sparse map by one or more object descriptors (e.g., the content of the advertising sign).

In some embodiments, a sparse map may include LIDAR data and/or image data relating to a landmark. For example, as described above, a vehicle (e.g., vehicle 3220) may transmit LIDAR data and/or image data, which may include representation of a landmark in LIDAR data and/or image data, to server 3210. Server 3210 may analyze the data and identify a landmark in the LIDAR data (e.g., in the form of point cloud information) and/or image data (e.g., in the form of one or more images). Server 3210 may also associate relevant LIDAR and/or image data with the identified image and include the relevant LIDAR and/or image data into a sparse map. For example, server 3210 may include representation of a landmark in point cloud information and/or one or more images captured from a point in a target trajectory (e.g., target trajectory 3531 illustrated in FIG. 35B) into a sparse map (e.g., sparse map 3500).

While FIG. 32 illustrates one server 3210, one skilled in the art would understand that system 3200 may include one or more servers 3210 that, individually or in combination, perform the functions of server 3210 disclosed in this application. For example, server 3210 may constitute a cloud server group comprising two or more servers that perform the functions disclosed herein. The term "cloud server" refers to a computer platform that provides services via a network, such as the Internet. In this example configuration, server 3210 may use virtual machines that may not correspond to individual hardware. For example, computational and/or storage capabilities may be implemented by allocating appropriate portions of computation/storage power from a scalable repository, such as a data center or a distributed computing environment. In one example, server 3210 may implement the methods described herein using customized hard-wired logic, one or more Application Specific Integrated Circuits (ASICs) or Field Programmable Gate Arrays (FPGAs), firmware, and/or program logic which, in combination with the computer system, cause server 3210 to be a special-purpose machine.

Network 3230 may be configured to facilitate communications among the components of system 3200. Network 3230 may include wired and wireless communication networks, such as a local-area network (LAN), a wide-area network (WAN), a computer network, a wireless network, a telecommunications network, or the like, or a combination thereof.

Database 3240 may be configured to store information and data for one or more components of system 3200. For example, database 3240 may store data (e.g., map data) for server 3210. One or more vehicles 3220 may obtain map data stored in database 3240 via, for example, network 3230.

Figure 33:
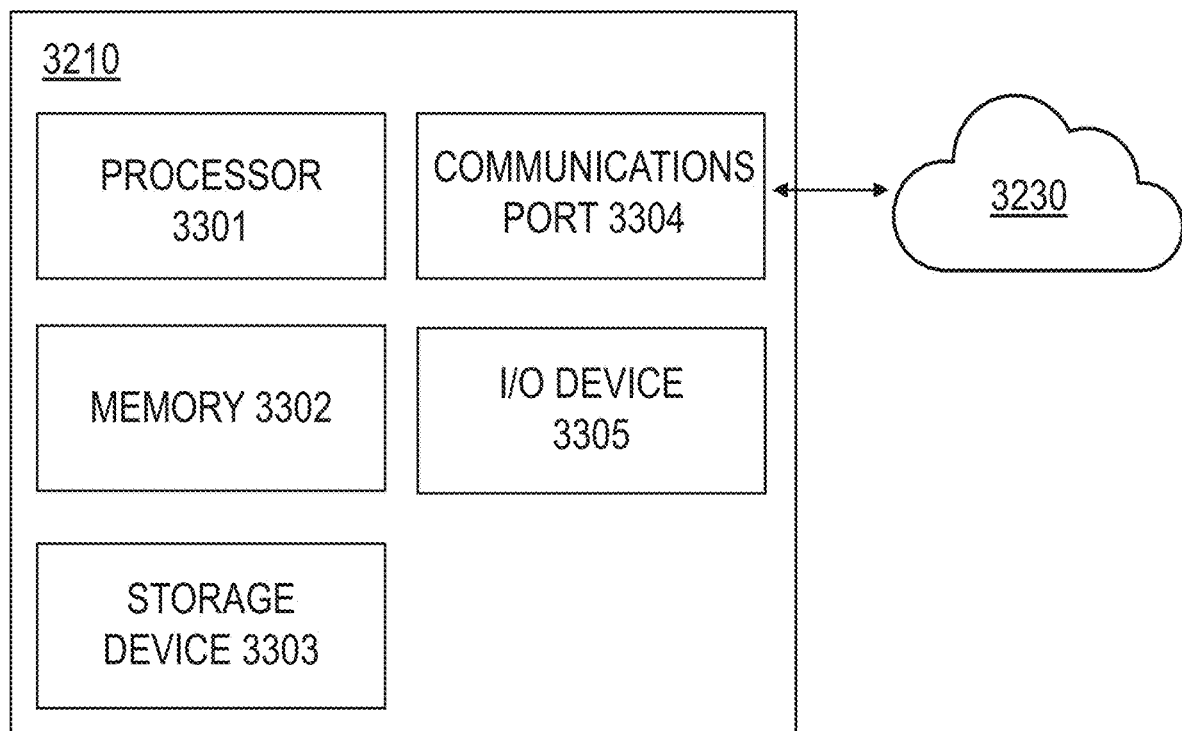
FIG. 33 illustrates an exemplary server consistent with disclosed embodiments.

FIG. 33 illustrates an exemplary server 3210 consistent with disclosed embodiments. As illustrated in FIG. 28, server 2710 may include at least one processor (e.g., processor 2801), a memory 2802, at least one storage device (e.g., storage device 2803), a communications port 2804, and an I/O device 2805.

Processor 3301 may be configured to perform one or more functions of server 3210 described in this disclosure. Processor 3301 may include a microprocessor, preprocessors (such as an image preprocessor), a graphics processing unit (GPU), a central processing unit (CPU), support circuits, digital signal processors, integrated circuits, memory, or any other types of devices suitable for running applications or performing a computing task. In some embodiments, processor 3301 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.). Any of the processing devices disclosed herein may be configured to perform certain functions. Configuring a processing device, such as any of the described processors or other controller or microprocessor, to perform certain functions may include programming of computer-executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

Server 3210 may also include a memory 3302 that may store instructions for various components of server 3210. For example, memory 3302 may store instructions that, when executed by processor 3301, may be configured to cause processor 3301 to perform one or more functions described herein. Memory 3302 may include any number of random-access memories, read-only memories, flash memories, disk drives, optical storage, tape storage, removable storage, and other types of storage. In one instance, memory 3302 may be separate from processor 3301. In another instance, memory 3302 may be integrated into processor 3301.

Storage device 3303 may be configured to store various data and information for one or more components of server 3210. For example, storage device 3303 may store map data. Server 3210 may update the map data based on the data and/or information received from one or more vehicles 3220. Server 3210 may also store the updated map data into storage device 3303. Storage device 3303 may include one or more hard drives, tapes, one or more solid-state drives, any device suitable for writing and read data, or the like, or a combination thereof.

Communications port 3304 may be configured to facilitate data communications between server 3210 and one or more components of system 3200 via network 3230. For example, communications port 3304 may be configured to receive data from and transmit data to one or more components of system 100 via one or more public or private networks, including the Internet, an Intranet, a WAN (Wide-Area Network), a MAN (Metropolitan-Area Network), a wireless network compliant with the IEEE 802.11a/b/g/n Standards, a leased line, or the like.

I/O device 3305 may be configured to receive input from the user of server 3210, and one or more components of server 3210 may perform one or more functions in response to the input received. In some embodiments, I/O device 3305 may include an interface displayed on a touchscreen. I/O device 3305 may also be configured to output information and/or data to the user. For example, I/O device 3305 may include a display configured to display map data.

Figure 34:
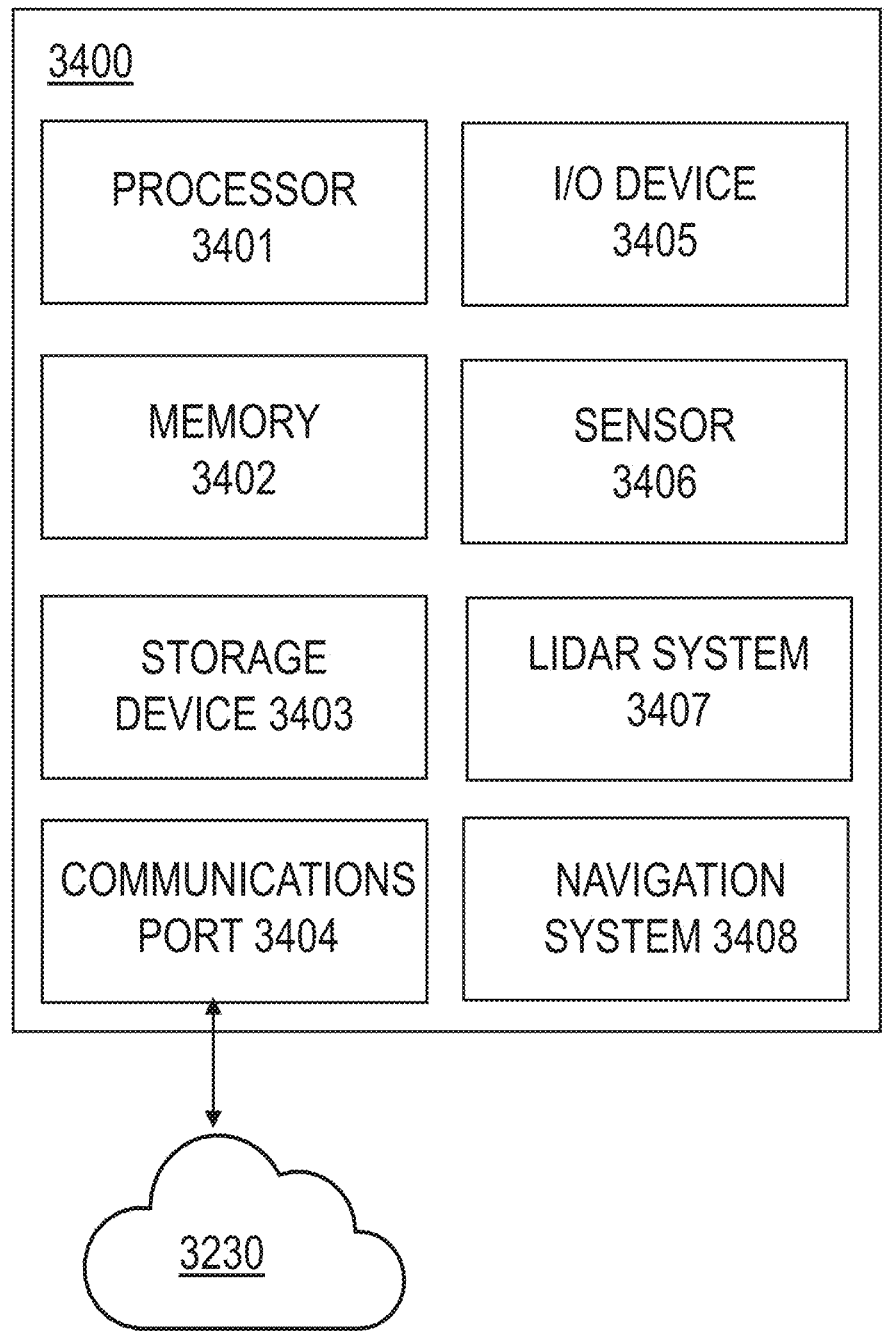
FIG. 34 illustrates an exemplary vehicle consistent with disclosed embodiments.

FIG. 34 illustrates an exemplary vehicle 3400 consistent with disclosed embodiments. As illustrated in FIG. 34, vehicle 3400 may include at least one processor (e.g., processor 3401), a memory 3402, at least one storage device (e.g., storage device 3403), a communications port 3404, an I/O device 3405, one or more sensors 3406, a LIDAR system 3407, and a navigation system 3408. In some embodiments, one or more vehicles 3220 may be implemented using one or more components of vehicle 3400.

Processor 3401 may be programmed to perform one or more functions of vehicle 3400 described in this disclosure. Processor 3401 may include a microprocessor, preprocessors (such as an image preprocessor), a graphics processing unit (GPU), a central processing unit (CPU), support circuits, digital signal processors, integrated circuits, memory, or any other types of devices suitable for running applications or performing a computing task. In some embodiments, processor 3401 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.). Any of the processing devices disclosed herein may be configured to perform certain functions. Configuring a processing device, such as any of the described processors or other controller or microprocessor, to perform certain functions may include programming of computer-executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

Vehicle 3400 may also include a memory 3402 that may store instructions for various components of vehicle 3400. For example, memory 3402 may store instructions that, when executed by processor 3401, may be configured to cause processor 3401 to perform one or more functions of processor 3401 described herein. Memory 3402 may include any number of random-access memories, read-only memories, flash memories, disk drives, optical storage, tape storage, removable storage, and other types of storage. In one instance, memory 3402 may be separate from processor 3401. In another instance, memory 3402 may be integrated into processor 3401. In some embodiments, memory 3402 may include software for performing one or more computing tasks, as well as a trained system, such as a neural network, or a deep neural network.

Storage device 3403 may be configured to store various data and information for one or more components of vehicle 3400. Storage device 3403 may include one or more hard drives, tapes, one or more solid-state drives, any device suitable for writing and read data, or the like, or a combination thereof. For example, storage device 3403 may be configured to store data of one or more maps. By way of example, storage device 3403 may store data of a sparse map, which may include one or more landmarks associated with a road segment and one or more target trajectories associated with the road segment.

Communications port 3404 may be configured to facilitate data communications between vehicle 3400 and one or more components of system 3200 via network 3230. For example, communications port 3404 may be configured to receive data from and transmit data to server 3210 via one or more public or private networks, including the Internet, an Intranet, a WAN (Wide-Area Network), a MAN (Metropolitan-Area Network), a wireless network compliant with the IEEE 802.11a/b/g/n Standards, a leased line, or the like.

I/O device 3405 may be configured to receive input from the user of server 3210, and one or more components of server 3210 may perform one or more functions in response to the input received. In some embodiments, I/O device 3405 may include an interface displayed on a touchscreen. I/O device 3405 may also be configured to output information and/or data to the user. For example, I/O device 3405 may include a display configured to display a map. In some embodiments, vehicle 3400 may receive data of the map (or at least a portion thereof) from server 3210 via, for example, network 3230.

Sensor 3406 may be configured to collect information relating to vehicle 3400 and/or the environment of vehicle 3400. Sensor 3406 may include one or more of an image sensor (e.g., a camera), a positioning device (e.g., a Global Positioning System (GPS) device), an accelerometer, a gyro sensor, a speedometer, or the like, or a combination thereof. For example, vehicle 3400 may include an image sensor (e.g., a camera) configured to capture one or more images of its environment, which may include a representation of a landmark (or at least a portion thereof). As another example, vehicle 3400 may include a GPS device configured to collect positioning data associated with positions of vehicle 3400 over a period of time.

LIDAR system 3407 may include one or more LIDAR units. In some embodiments, the one or more LIDAR units may be positioned on a roof of vehicle 3400. Such a unit may include a rotating unit configured to gather LIDAR reflection information within a 360-degree field of view around vehicle 3400 or from any sub-segment of the 360-degree field of view (e.g., one or more FOVs each representing less than 360 degrees). In some embodiments, a LIDAR unit may be positioned at a forward location on vehicle 3400 (e.g., near the headlights, in the front grill, near the fog lamps, in a forward bumper, or at any other suitable location). In some cases, one or more LIDAR units installed on a forward portion of vehicle 3400 may collect reflection information from a field of view in an environment forward of vehicle 3400. The data collected by LIDAR system 3407 may be provided to processor 3401. Alternatively or additionally, the data may be transmitted to server 3210 and/or database 3240 via network 3230.

Any suitable type of LIDAR unit may be included on vehicle 3400. In some cases, LIDAR system 3407 may include one or more flash LIDAR units (e.g., 3D flash LIDAR) where an entire LIDAR field of view (FOV) is illuminated with a single laser pulse, and a sensor including rows and columns of pixels to record returned light intensity and time of flight/depth information. Such flash systems may illuminate a scene and collect LIDAR "images" multiple times per second. Scanning LIDAR units may also be employed. Such scanning LIDAR units may rely on one or more techniques for dispersing a laser beam over a particular FOV. In some cases, a scanning LIDAR unit may include a scanning mirror that deflects and directs a laser beam toward objects within the FOV. Scanning mirrors may rotate through a full 360 degrees or may rotate along a single axis or multiple axes over less than 360 degrees to direct the laser toward a predetermined FOV. In some cases, LIDAR units may scan one horizontal line. In other cases, a LIDAR unit may scan multiple horizontal lines within an FOV, effectively rastering a particular FOV multiple times per second.

The LIDAR units in LIDAR system 3407 may include any suitable laser source. In some embodiments, the LIDAR units may employ a continuous laser. In other cases, the LIDAR units may use pulsed laser emissions. Additionally, any suitable laser wavelength may be employed. In some cases, a wavelength of between about 600 nm to about 1000 nm may be used.

The LIDAR unit(s) in LIDAR system 3407 may also include any suitable type of sensor and provide any suitable type of output. In some cases, sensors of the LIDAR units may include solid state photodetectors, such as one or more photodiodes or photomultipliers. The sensors may also include one or more CMOS or CCD devices including any number of pixels. These sensors may be sensitive to laser light reflected from a scene within the LIDAR FOV. The sensors may enable various types of output from a LIDAR unit. In some cases, a LIDAR unit may output raw light intensity values and time of flight information representative of the reflected laser light collected at each sensor or at each pixel or sub-component of a particular sensor. Additionally or alternatively, a LIDAR unit may output a point cloud (e.g., a 3D point cloud) that may include light intensity and depth/distance information relative to each collected point). LIDAR units may also output various types of depth maps representative of light reflection amplitude and distance to points within a field of view. LIDAR units may provide depth or distance information relative to particular points within an FOV by noting a time at which light from the LIDAR's light source was initially projected toward the FOV and recording a time at which the incident laser light is received by a sensor in the LIDAR unit. The time difference may represent a time of flight, which may be directly related to the round trip distance that the incident laser light traveled from the laser source to a reflecting object and back to the LIDAR unit. Monitoring the time of flight information associated with individual laser spots or small segments of a LIDAR FOV may provide accurate distance information for a plurality of points within the FOV (e.g., mapping to even very small features of objects within the FOV). In some cases, LIDAR units may output more complex information, such as classification information that correlates one or more laser reflections with a type of object from which the laser reflection was acquired.

Navigation system 3408 may be configured to assist a driver of vehicle 3400 to operate vehicle 3400. For example, navigation system 3408 may determine that vehicle 3400 is currently deviating from a target trajectory and generate a notification to the driver indicating the deviation from the target trajectory, which may be displayed on a display (e.g., displaying the target trajectory and an estimated travel path determined based on vehicle 3400's current position and heading direction). Alternatively, navigation system 3408 may include an autonomous vehicle navigation system configured to control the movement of vehicle 3400, as described elsewhere in this disclosure. For example, navigation system 3408 may implement a navigation action determined by processor 3401 as vehicle 3400 traverses a road segment (e.g., one or more of steering, braking, or acceleration of the vehicle). In some embodiments, navigation system 3408 may include an advanced driver-assistance system (ADAS) system. In some embodiments, navigation system 3408 may access a sparse map stored in the storage device or computer-readable medium provided onboard vehicle 3400 in order to generate navigational instructions for guiding vehicle 3400 as the vehicle traverses a road segment.

Figure 35A:
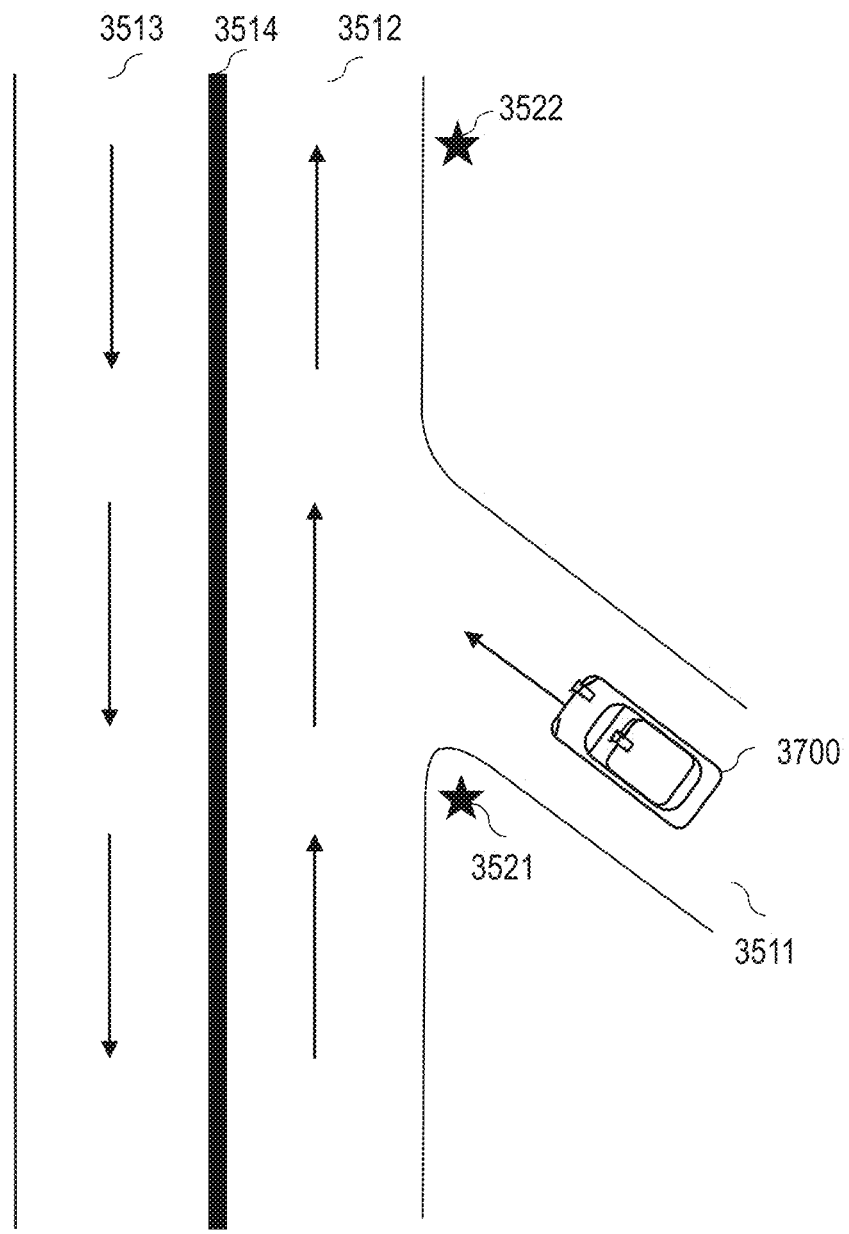
FIG. 35A illustrates an exemplary road segment consistent with disclosed embodiments.

FIG. 35A illustrates an exemplary road segment consistent with disclosed embodiments. As illustrated in FIG. 35A, vehicle 3400 drives in lane 3511, moving toward and merging into lane 3512. Lane 3512 and lane 3513 are separated by a lane divider 3514, and vehicles in lane 3512 and vehicles in lane 3513 may move in opposite directions. A landmark 3521 may locate near the intersection of lane 3511 and lane 3512, and a landmark 3522 may locate along lane 3512. By way of example, landmark 3521 may be a stop sign, and landmark 3522 may be a speed-limit sign.

Figure 35B:
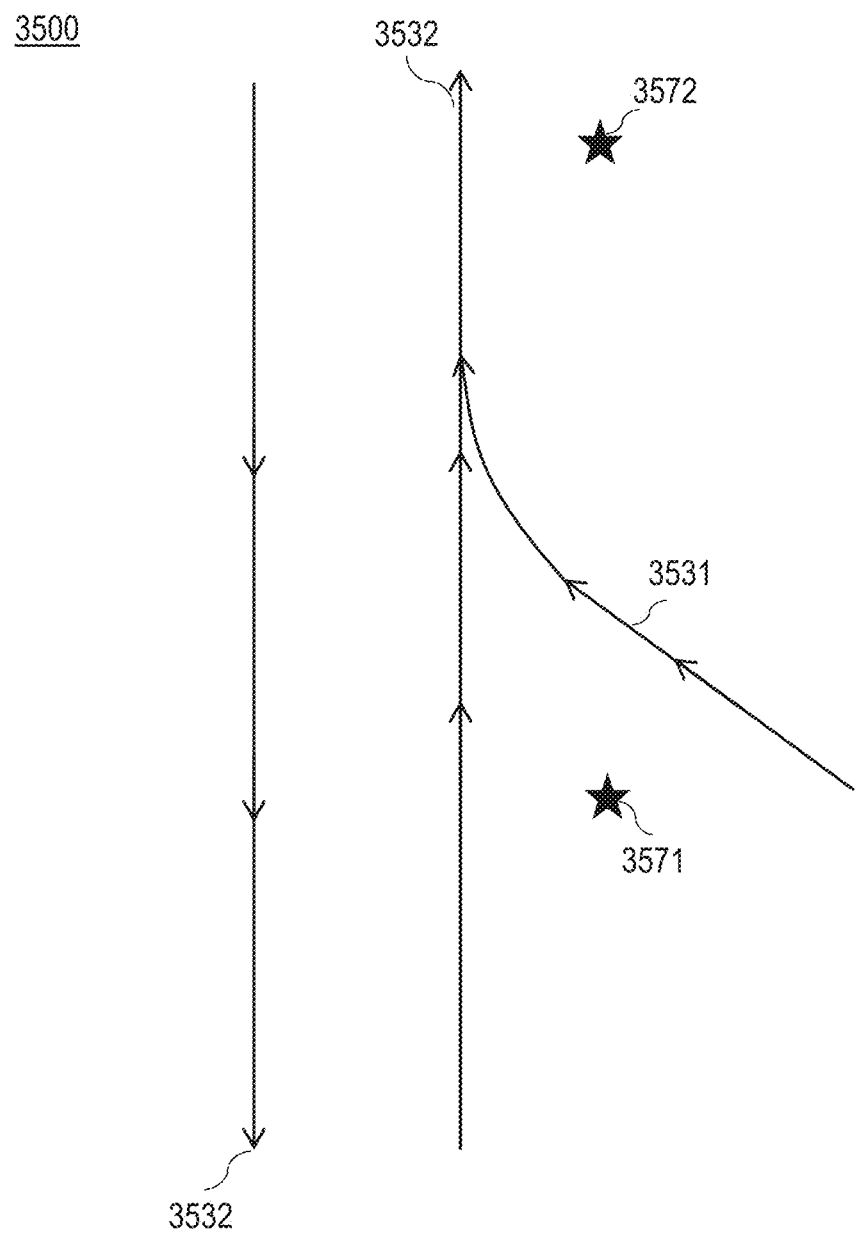
FIG. 35B illustrates an exemplary sparse map associated with an exemplary road segment consistent with disclosed embodiments.

Vehicle 3400 may receive a sparse map 3500 illustrated in FIG. 35B from, for example, server 3210 consistent with disclosed embodiments. Sparse map 3500 may include a mapped navigational landmark 3571 and a mapped navigational landmark 3572, which may respectively correspond to landmark 3521 and landmark 3522 illustrated in FIG. 35A. Sparse map 3500 may also include a target trajectory 3531 for a vehicle merging from lane 3511 into lane 3512, a target trajectory 3532 for a vehicle moving in lane 3512, and a target trajectory 3532 for a vehicle moving in lane 3513. In some embodiments, sparse map 3500 may be similar to other sparse maps provided in this disclosure (e.g., sparse map 800 described above) and may be generated based on various methods as described elsewhere in this disclosure (e.g., the method for generating sparse map 800 described above).

Figure 35C:
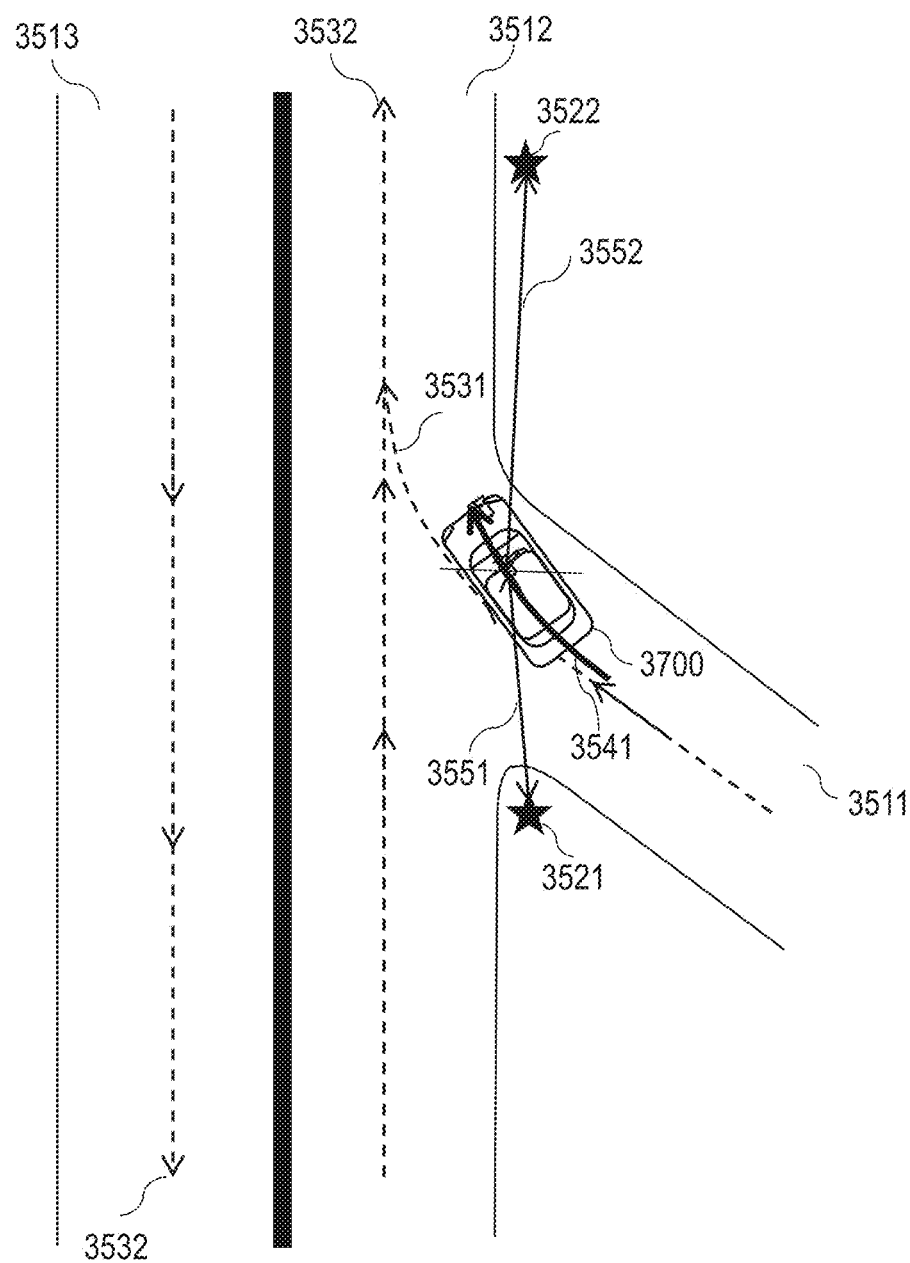
FIG. 35C illustrates an exemplary road segment consistent with disclosed embodiments.

FIG. 35C illustrates vehicle 3400 merging into lane 3512 consistent with disclosed embodiments. Vehicle 3400 may be configured to receive point cloud information from LIDAR system 3407 (which may be onboard vehicle 3400). The point cloud information may be representative of distances to various objects in the environment of vehicle 3400. For example, the point cloud information may include information reprehensive of a distance 3551 to landmark 3521 and a distance 3552 to landmark 3522. Vehicle 3400 may be configured to compare the received point cloud information with at least one of the mapped navigational landmarks in sparse map 3500 to provide a LIDAR-based localization of vehicle 3400 relative to target trajectory 3531. For example, vehicle 3400 may determine a current position of vehicle 3400 relative to target trajectory 3531 based on distance 3551 and distance 3552 (which may be determined based on the received point cloud information). Vehicle 3400 may also be configured to determine at least one navigational action for vehicle 3400 based on the LIDAR-based localization relative to target trajectory 3531. For example, as described above, vehicle 3400 may be configured to determine its current position shown in FIG. 35C (along actual trajectory 3541) in relative to target trajectory 3531 and determine that it deviates from target trajectory 3531 (e.g., on the right side of target trajectory 3531). Vehicle 3400 may also determine at least one navigational action, including, for example, steering in the left direction to the extent that vehicle 3400 may follow target trajectory 3531 (and target trajectory 3532 once it has merged into lane 3512). Vehicle 3400 may further cause navigation system 3408 to implement the determined navigation action, including, for example, steering in the left direction.

FIG. 36 is a flowchart showing an exemplary process 3600 for determining a navigational action for a host vehicle consistent with disclosed embodiments. At step 3601, processor 3401 may be programmed to receive, from an entity remotely located relative to vehicle 3400, a sparse map associated with at least one road segment to be traversed by vehicle 3400. For example, processor 3401 may receive sparse map 3500 from server 3210 via network 3230. As illustrated in FIG. 35B, sparse map 3500 may include mapped navigational landmark 3571 and mapped navigational landmark 3572. Sparse map 3500 may also include a target trajectory 3531 for a vehicle merging from lane 3511 into lane 3512, a target trajectory 3532 for a vehicle moving in lane 3512, and a target trajectory 3532 for a vehicle moving in lane 3513. In some embodiments, sparse map 3500 (including mapped navigational landmarks 3571 and mapped navigational landmark 3572, and target trajectories 3531, 3532, and 3532) may be generated by server 3210 based on drive information collected from a plurality of vehicles that traveled previously along the at least one road segment, as described elsewhere in this disclosure (e.g., in connection with the descriptions of sparse map 800 provided above).

At step 3602, processor 3401 may be programmed to receive point cloud information from LIDAR system 3407 onboard vehicle 3400. In some embodiments, the point cloud information may include information representative of distances to various objects in the environment of vehicle 3400. As elsewhere in this disclosure, LIDAR system 3407 may include a laser source configured to emit a laser (e.g., a continuous laser or pulsed laser emissions) into the field of view of LIDAR system 3407. LIDAR system 3407 may include one or more sensors configured to detect the reflections of the laser from one or more objects in the field of view. LIDAR system 2907 may generate a point cloud (e.g., a 3D point cloud) that includes light intensity and depth/distance information relative to each collected point by the sensor(s). By way of example, processor 3401 may be programmed to receive point cloud information representative of distance 3551 to landmark 3521 and distance 3552 to landmark 3522 illustrated in FIG. 35C.

In some embodiments, the point cloud information received by processor 3401 at step 3602 may include depth (or distance) information relating to certain types of objects to preserve processing bandwidth. For example, the point cloud information may include point cloud information associated with one or more vertically oriented objects in the environment of vehicle 3400. Vertically oriented objects may be less likely to move compared to horizontally oriented objects such as vehicles. By way of example, the point cloud information may include at least one of a sign post, a lamp post, a road divider stanchion, a guard rail support, and a tree trunk.

At step 3603, processor 3401 may be programmed to compare the received point cloud information with at least one of the plurality of mapped navigational landmarks in the sparse map to provide a LIDAR-based localization of vehicle 3400 relative to the at least one target trajectory. The LIDAR-based localization of vehicle 3400 refers to determining a position of vehicle 3400 based on data captured by LIDAR system 3407 (and in some embodiments in combination with other types of data). For example, LIDAR system 3407 may collect reflection information from its field of view in the environment of vehicle 3400 and transmit the collected LIDAR data to processor 3401 for further processing. Processor 3401 may be programmed to determine a distance of vehicle 3400 to a landmark (e.g., landmark 3521 illustrated in FIG. 35C) based on the LIDAR data. Processor 3401 may also be programmed to identify representations in the point cloud information of a mapped navigational landmark in a sparse map (e.g., mapped navigational landmark 3571 illustrated in FIG. 35B) and determine the position of vehicle 3400 in relative to a target trajectory (e.g., target trajectory 3531 illustrated in FIG. 35C) based on the determined distance of vehicle 3400 to landmark 3521 (e.g., distance 3551 illustrated in FIG. 35C).

In some embodiments, processor 3401 may be programmed to provide a LIDAR-based localization of vehicle 3400 relative to a target trajectory based on one or more aspects of a mapped navigational landmark represented in the point cloud information. For example, processor 3401 may be programmed to identify a representation in the point cloud information of a mapped navigational landmark (e.g., mapped navigational landmark 3571 illustrated in FIG. 35B). Processor 3401 may also be programmed to determine one or more aspects of the mapped navigational landmark. For example, processor 3401 may determine at least one of a size or a two-dimensional location within a LIDAR scan frame of the representation of the mapped navigational landmark in the point cloud information captured by LIDAR system 3407. Processor 3401 may also be programmed to an expected set of characteristics for the mapped navigational landmark determined based on the sparse map (which may include the size, the location, and/or the shape of the landmark). An expected characteristic of a mapped navigational landmark refers to a characteristic of the mapped navigational landmark that would be represented in point cloud information viewed from a point on a target trajectory. For example, processor 3401 may determine a point on target trajectory 3531 (illustrated in FIG. 35C) that may potentially correspond to the current position of vehicle 3400 and determine an expected set of characteristics for mapped navigational landmark 3571 (e.g., including, for example, the size and the two-dimensional location thereof) viewed from that point on target trajectory 3531. By way of example, as described above, processor 3401 may determine a distance of vehicle 3400 to landmark 3521 based on the point cloud information captured by LIDAR system 3407. Processor 3401 may also determine a point on target trajectory 3531 having the same distance from mapped navigational landmark 3571 in sparse map 3500. Processor 3401 may further determine an expected set of characteristics for mapped navigational landmark 3571 (including, for example, the size and/or the two-dimensional location of landmark 3521) viewed from that point on target trajectory 3531. Processor 3401 may compare one or more aspects of the mapped navigational landmark represented in the point cloud information (e.g., a size of mapped navigational landmark 3571 appearing in the point cloud information) to an expected set of characteristics for the mapped navigational landmark determined based on the sparse map (e.g., an expected size of mapped navigational landmark 3571). Processor 3401 may also determine a current position of vehicle 3400 relative to a target trajectory (e.g., target trajectory 3531 illustrated in FIG. 35C) based on the comparison. For example, if the difference between the size of mapped navigational landmark 3571 appearing in the point cloud information and the expected size of mapped navigational landmark 3571 is less than a threshold, processor 3401 may determine that the current position of vehicle 3400 falls on target trajectory 3531. On the other hand, if the difference is greater than a threshold, processor 3401 may determine the current position of vehicle 3400 is off from target trajectory 3531. By way of example, if the size of mapped navigational landmark 3571 appearing in the point cloud information is smaller than the expected size of mapped navigational landmark 3571, processor 3401 may determine that the current position of vehicle 3400 is on the right side of target trajectory 3531 (as illustrated in FIG. 35C) because vehicle 3400 is further away from landmark 3521 than from an expected position in target trajectory 3531.

In some embodiments, processor 3401 may be programmed to provide a LIDAR-based localization of vehicle 3400 relative to a target trajectory based on two or more landmarks detected from the environment of vehicle 3400. For example, processor 3401 may be programmed to identify representations in the point cloud information of two mapped navigational landmarks. Processor 3401 may also be programmed to determining, based on the point cloud information, relative distances between a reference point associated with vehicle 3400 and each of mapped navigational landmark 3571 and mapped navigational landmark 3522. In some embodiments, the reference point may be located on LIDAR system 3407 onboard vehicle 3400 (e.g., LIDAR system 3407 may be installed on the top of vehicle 3400). Processor 3401 may further be programmed to determine the current position of vehicle 3400 relative to a target trajectory (e.g., target trajectory 3531 illustrated in FIG. 35C) based on the relative distances between the reference point associated with vehicle 3400 and each of the mapped navigational landmarks (e.g., distance 3551 to mapped navigational landmark 3571 and distance 3552 to mapped navigational landmarks 3572).

In some embodiments, processor 3401 may identify representations in the point cloud information of two mapped navigational landmarks using a trained neural network. The trained neural network may be obtained from server 3210 via network 3230 or a local storage. The trained neural network may be trained using a plurality of training samples.

In some embodiments, processor 3401 may be programmed to provide a LIDAR-based localization of vehicle 3400 relative to a target trajectory based on two or more LIDAR scans. For example, LIDAR system 3407 may capture LIDAR data in a first LIDAR scan during a first time period (and referred herein as the first LIDAR scan point cloud) and capture LIDAR data in a second LIDAR scan during a second time period (and referred herein as the second LIDAR scan point cloud). Processor 3401 may be programmed to identify a representation in the first LIDAR scan point cloud of a mapped navigational landmark, and determine, based on the first LIDAR scan point cloud, a first relative distance between a reference point associated with vehicle 3400 (e.g., from LIDAR system 3407) and the mapped navigational landmark. Processor 3401 may also be programmed to identify a representation in the second LIDAR scan point cloud of the mapped navigational landmark, and determine, based on the second scan point cloud, a second relative distance between the reference point associated with vehicle 3400 and the mapped navigational landmark. Processor 3401 may further determine a current position of vehicle 3400 relative to a target trajectory based on the first and second relative distances. For example, processor 3401 may determine the position of vehicle 3400 relative to a target trajectory based on the two relative distances obtained at the two LIDAR scans according to triangulation (i.e., determining the location of a point by forming triangles to vehicle 3400 from known points).

In some embodiments, in determining a LIDAR-based localization of vehicle 3400 relative to a target trajectory based on two or more LIDAR scans, processor 3401 may be programmed to take in account ego motion of vehicle 3400 between a first time associated with acquisition of the first LIDAR scan point cloud and a second time associated with acquisition of the second LIDAR scan point cloud. As described elsewhere in this disclosure, the ego motion of the host vehicle may refer to any environmental displacement of the host vehicle with respect to a non-moving reference point or object. For example, as described elsewhere in this disclosure, the ego motion of the vehicle body may be estimated based on an optical flow analysis of captured images by a camera onboard vehicle 3400 (or other methods described in this disclosure). Processor 3401 may be programmed to subtract the ego motion between the first time and the second time when determining a position of vehicle 3400.

In some embodiments, processor 3401 may be programmed to provide an image-based localization of vehicle 3400 relative to a target trajectory based on image data. For example, processor 3401 may be programmed to receive, from a camera onboard vehicle 3400, at least one captured image including a representation of at least a portion of an environment of vehicle 3400. Processor 3401 may also be programmed to identify representations in the at least one captured image of one or more mapped navigational landmarks (e.g., an image including landmark 3522). Processor 3401 may further be programmed to determine a position of vehicle 3400 relative to a target trajectory (e.g., target trajectory 3531) based on sparse map 3500 and based on the representations in the at least one captured image (which may include landmark 3522) to provide an image-based localization. For example, as described elsewhere in this disclosure, a sparse map may include image representation of a landmark (e.g., landmark 3522) captured from a point in target trajectory 3531. Processor 3401 may compare the image representation of landmark 3522 in sparse map 3500 with the image representation of landmark 3522 in the captured image by the camera onboard vehicle 3400 to determine a position of vehicle 3400 relative to target trajectory 3531. By way of example, if the image representation of landmark 3522 in the captured image by the camera onboard vehicle 3400 appears bigger than the image representation of landmark 3522 in sparse map 3500, processor 3401 may determine that vehicle 3400 is on the right side of target trajectory 3531 (as illustrated in FIG. 35C).

In some embodiments, processor 3401 may be programmed to determine a position of vehicle 3400 based on a LIDAR-based localization and an image-based localization. For example, processor 3401 may be programmed to a LIDAR-based localization based on LIDAR data and determine an image-based localization based on image data as described elsewhere in this disclosure. Processor 3401 may also be programmed to determine a position of vehicle 3400 based on the position obtained from the LIDAR-based localization and the position obtained from the image-based localization by, for example, determining an average position between the two positions. In some embodiments, processor 3401 may be programmed to apply weights to the each of the LIDAR-based localization and the image-based localization to determine two weighted positions. Processor 3401 may also be programmed to determine a position of vehicle 3400 based on the weighted positions. The weight applied to a LIDAR-based localization and the weight applied to an image-based localization may be the same or different. In some embodiments, the weight applied to a LIDAR-based localization and/or the weight applied to an image-based localization may be adjusted based on one or more current environment conditions of vehicle 3400. For example, if vehicle 3400 is in a foggy environment, which may affect detection of objects using LIDAR data, the weight applied to a LIDAR-based localization may be decreased by processor 3401. As another example, if it is at night, which may affect detection of objects using image data, the weight applied to an image-based localization may be decreased by processor 3401.

In some embodiments, processor 3401 may also determine a difference associated with the LIDAR-based localization and the image-based localization (e.g., a difference between the position of vehicle 3400 determined based on LIDAR data and the position of vehicle 3400 determined based on image data). Processor 3401 may further determine whether the difference between the two positions exceeds a predetermined threshold. A position difference exceeding the predetermined threshold may indicate a potential issue with LIDAR system 3407 and/or the camera. Processor 3401 may implement at least one remedial action if the difference exceeds a predetermined threshold. For example, processor 3401 may implement at least one of slowing vehicle 3400, stopping vehicle 3400, and issuing a warning of a system irregularity. In some embodiments, processor 3401 may be programmed to determine a reason for the difference. For example, processor 3401 may receive information relating to the weather condition (e.g., via a weather sensor onboard vehicle 3400 and/or from server 3210) and determine that it is snowing. Processor 3401 may determine that a difference between the position of vehicle 3400 determined based on LIDAR data and the position determined based on image data may be caused by the snow. In some embodiments, processor 3401 may also provide the determined reason to the driver (and/or a passenger) with an alert displayed on a display onboard or via a speaker of vehicle 3400.

At step 3604, processor 3401 may be programmed to determine at least one navigational action for vehicle 3400 based on the LIDAR-based localization of vehicle 3400 relative to the at least one target trajectory. In one example, if processor 3401 determines that vehicle 3400 is expected to follow target trajectory 3531 (illustrated in FIG. 35B) based on the LIDAR-based localization of vehicle 3400 relative to target trajectory 3531 and determine a navigational action of maintaining a current heading direction for vehicle 3400 such that vehicle 3400 may continue to follow target trajectory 3531. On the other hand, if processor 3401 determines that vehicle 3400 is off from target trajectory 3531 (as illustrated in FIG. 35C), processor 3401 may be programmed to determine a navigational action of changing a current heading direction for vehicle 3400 to reduce a distance between vehicle 3400 and target trajectory 3531. For example, processor 3401 may be programmed to determine a navigational action of steering vehicle 3400 to the left direction such that the distance between vehicle 3400 and target trajectory 3531 may be reduced.

Referring FIG. 36, at step 3605, processor 3401 may be programmed to cause the at least one navigational action to be taken by vehicle 3400. For example, processor 3401 may cause navigation system 3408 to implement the determined navigational action (e.g., steering vehicle 3400 to the left direction).

LIDAR-Camera Fusion Based on Ego Motion

This disclosure provides systems and methods for correlating LIDAR depth information captured by a LIDAR system onboard a host vehicle with an image by an onboard camera to provide depth information for each of pixels of the image (or a portion thereof). Since there may be 6 degrees of freedom between the camera and LIDAR system, the movement of the host vehicle may need to be taken into account for correlating LIDAR depth information with an image. This disclosure provides a solution to determine the host vehicle's ego motion and to use the determined ego motion over time to correlate captured LIDAR depth information with captured images. Based on the per-pixel depth information added into the image, the system may cause one or more navigational responses in the host vehicle, such as maintaining or changing a current heading direction.

Figure 37:
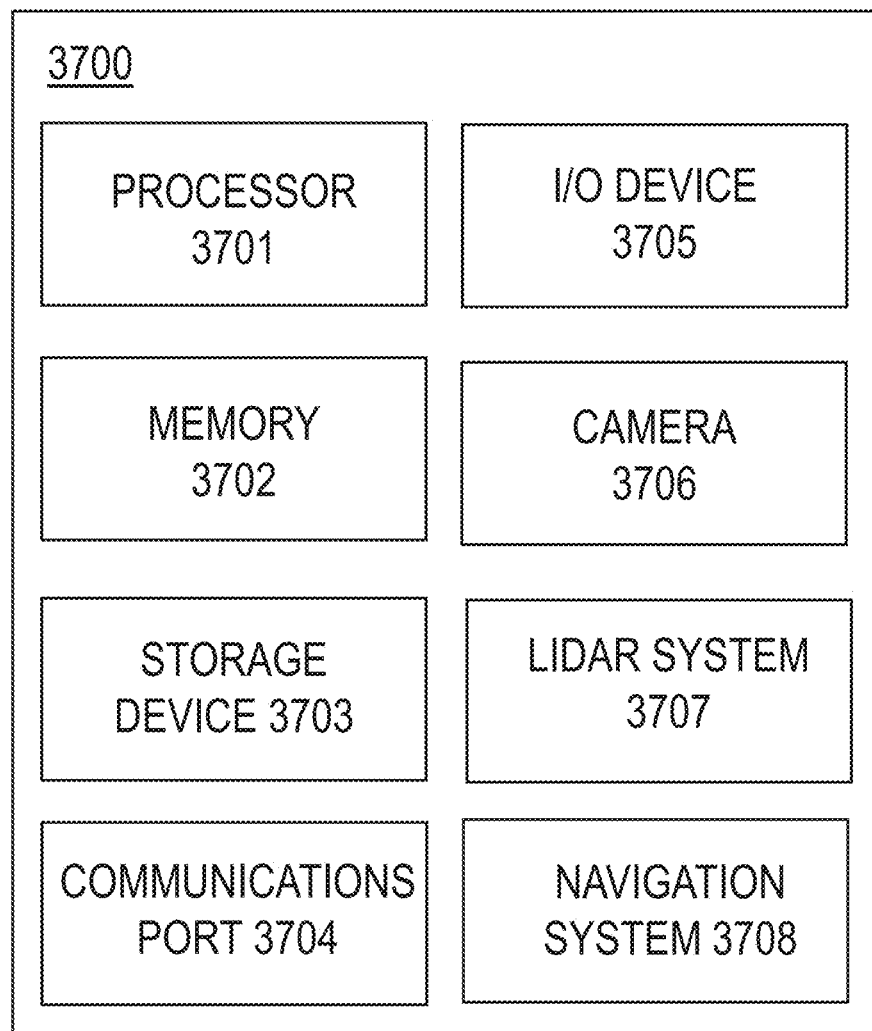
FIG. 37 illustrates an exemplary vehicle consistent with disclosed embodiments.

FIG. 37 illustrates an exemplary vehicle 3700 consistent with disclosed embodiments. The disclosed systems and methods may be implemented using one or more components of vehicle 3700. As illustrated in FIG. 37, vehicle 3700 may include at least one processor (e.g., processor 3701), a memory 3702, at least one storage device (e.g., storage device 3703), a communications port 3704, an I/O device 3705, a camera 3706, a LIDAR system 3707, and a navigation system 3708.

Processor 3701 may be programmed to perform one or more functions of vehicle 3700 described in this disclosure. Processor 3701 may include a microprocessor, preprocessors (such as an image preprocessor), a graphics processing unit (GPU), a central processing unit (CPU), support circuits, digital signal processors, integrated circuits, memory, or any other types of devices suitable for running applications or performing a computing task. In some embodiments, processor 3701 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.). Any of the processing devices disclosed herein may be configured to perform certain functions. Configuring a processing device, such as any of the described processors or other controller or microprocessor, to perform certain functions may include programming of computer-executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

Vehicle 3700 may also include memory 3702 that may store instructions for various components of vehicle 3700. For example, memory 3702 may store instructions that, when executed by processor 3701, may be configured to cause processor 3701 to perform one or more functions of processor 3701 described herein. Memory 3702 may include any number of random-access memories, read-only memories, flash memories, disk drives, optical storage, tape storage, removable storage, and other types of storage. In one instance, memory 3702 may be separate from processor 3701. In another instance, memory 3702 may be integrated into processor 3701. In some embodiments, memory 3702 may include software for performing one or more computing tasks, as well as a trained system, such as a neural network, or a deep neural network.

Storage device 3703 may be configured to store various data and information for one or more components of vehicle 3700. Storage device 3703 may include one or more hard drives, tapes, one or more solid-state drives, any device suitable for writing and read data, or the like, or a combination thereof. For example, storage device 3703 may be configured to store data of one or more maps. By way of example, storage device 3703 may store data of a sparse map, which may include one or more landmarks associated with a road segment and one or more target trajectories associated with the road segment. As another example, storage device 3703 may be configured to store images captured by camera 3706 and/or LIDAR data captured by LIDAR system 3707. Storage device 3703 may also one or more images with correlated per-pixel depth information described in this disclosure.

Communications port 3704 may be configured to facilitate data communications between vehicle 3700 and other devices. For example, communications port 3704 may be configured to receive data from and transmit data to a server (e.g., one or more servers described in this disclosure) via one or more public or private networks, including the Internet, an Intranet, a WAN (Wide-Area Network), a MAN (Metropolitan-Area Network), a wireless network compliant with the IEEE 802.11a/b/g/n Standards, a leased line, or the like.

I/O device 3705 may be configured to receive input from the user of vehicle 3700, and one or more components of vehicle 3700 may perform one or more functions in response to the input received. In some embodiments, I/O device 3705 may include an interface displayed on a touchscreen. I/O device 3705 may also be configured to output information and/or data to the user. For example, I/O device 3705 may include a display configured to display a map.

Camera 3706 may be configured to capture one or more images of the environment of vehicle 3700. In some embodiments, camera 3706 may include an image sensor with a global shutter, an image sensor with a rolling shutter, or the like, or a combination thereof. For example, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame. The use of a rolling shutter may result in pixels in different rows being exposed and captured at different times, which may cause skew and other image artifacts in the captured image frame. On the other hand, when camera 3706 is configured to operate with a global or synchronous shutter, all of the pixels may be exposed for the same amount of time and during a common exposure period. As a result, the image data in a frame collected from a system employing a global shutter represents a snapshot of the entire FOV at a particular time. In contrast, in a rolling shutter application, each row in a frame is exposed and data is capture at different times. Thus, moving objects may appear distorted in an image capture device having a rolling shutter. This phenomenon is described in greater detail elsewhere in this disclosure. In some embodiments, camera 3706 may include a plurality of cameras configured to capture images of the environment of vehicle 3700. While the descriptions below are provided with reference to a camera, one skilled in the art will understand that the disclosed systems and methods may also be implemented using two or more cameras.

LIDAR system 3707 may include one or more LIDAR units. In some embodiments, the one or more LIDAR units may be positioned on a roof of vehicle 3700. Such a unit may include a rotating unit configured to gather LIDAR reflection information within a 360-degree field of view around vehicle 3700 or from any sub-segment of the 360-degree field of view (e.g., one or more FOVs each representing less than 360 degrees). In some embodiments, a LIDAR unit may be positioned at a forward location on vehicle 3700 (e.g., near the headlights, in the front grill, near the fog lamps, in a forward bumper, or at any other suitable location). In some cases, one or more LIDAR units installed on a forward portion of vehicle 3700 may collect reflection information from a field of view in an environment forward of vehicle 3700. The data collected by LIDAR system 3707 may be provided to processor 3701. Alternatively or additionally, the data may be transmitted to a server described in this disclosure via a network.

Any suitable type of LIDAR unit may be included on vehicle 3700. In some cases, LIDAR system 3707 may include one or more flash (also referred to herein as static) LIDAR units (e.g., 3D flash LIDAR) where an entire LIDAR field of view (FOV) is illuminated with a single laser pulse, and a sensor including rows and columns of pixels to record returned light intensity and time of flight/depth information. Such flash systems may illuminate a scene and collect LIDAR "images" multiple times per second. Accordingly, for a static LIDAR system, the whole set of LIDAR data of a LIDAR "image" may have the same timestamp. Scanning LIDAR units may also be employed. Such scanning LIDAR units may rely on one or more techniques for dispersing a laser beam over a particular FOV. In some cases, a scanning LIDAR unit may include a scanning mirror that deflects and directs a laser beam toward objects within the FOV. Scanning mirrors may rotate through a full 360 degrees or may rotate along a single axis or multiple axes over less than 360 degrees to direct the laser toward a predetermined FOV. In some cases, LIDAR units may scan one horizontal line. In other cases, a LIDAR unit may scan multiple horizontal lines within an FOV, effectively rastering a particular FOV multiple times per second. In some embodiments, for a scanning LIDAR system, each scan line may be acquired at a different time and thus have a different timestamp.

The LIDAR units in LIDAR system 3707 may include any suitable laser source. In some embodiments, the LIDAR units may employ a continuous laser. In other cases, the LIDAR units may use pulsed laser emissions. Additionally, any suitable laser wavelength may be employed. In some cases, a wavelength of between about 600 nm to about 1000 nm may be used.

The LIDAR unit(s) in LIDAR system 3707 may also include any suitable type of sensor and provide any suitable type of output. In some cases, sensors of the LIDAR units may include solid state photodetectors, such as one or more photodiodes or photomultipliers. The sensors may also include one or more CMOS or CCD devices including any number of pixels. These sensors may be sensitive to laser light reflected from a scene within the LIDAR FOV. The sensors may enable various types of output from a LIDAR unit. In some cases, a LIDAR unit may output raw light intensity values and time of flight information representative of the reflected laser light collected at each sensor or at each pixel or sub-component of a particular sensor. Additionally or alternatively, a LIDAR unit may output a point cloud (e.g., a 3D point cloud) that may include light intensity and depth/distance information relative to each collected point). LIDAR units may also output various types of depth maps representative of light reflection amplitude and distance to points within a field of view. LIDAR units may provide depth or distance information relative to particular points within an FOV by noting a time at which light from the LIDAR's light source was initially projected toward the FOV and recording a time at which the incident laser light is received by a sensor in the LIDAR unit. The time difference may represent a time of flight, which may be directly related to the round trip distance that the incident laser light traveled from the laser source to a reflecting object and back to the LIDAR unit. Monitoring the time of flight information associated with individual laser spots or small segments of a LIDAR FOV may provide accurate distance information for a plurality of points within the FOV (e.g., mapping to even very small features of objects within the FOV). In some cases, LIDAR units may output more complex information, such as classification information that correlates one or more laser reflections with a type of object from which the laser reflection was acquired.

Navigation system 3708 may be configured to assist a driver of vehicle 3700 to operate vehicle 3700. For example, navigation system 3708 may determine that vehicle 3700 is currently deviating from a target trajectory and generate a notification to the driver indicating the deviation from the target trajectory, which may be displayed on a display (e.g., displaying the target trajectory and an estimated travel path determined based on vehicle 3700's current position and heading direction). Alternatively, navigation system 3708 may include an autonomous vehicle navigation system configured to control the movement of vehicle 3700, as described elsewhere in this disclosure. For example, navigation system 3708 may implement a navigation action determined by processor 3701 as vehicle 3700 traverses a road segment (e.g., one or more of steering, braking, or acceleration of the vehicle). In some embodiments, navigation system 3708 may include an advanced driver-assistance system (ADAS) system. In some embodiments, navigation system 3708 may be configured to cause activation of one or more actuators associated with a steering system, a braking system, or a drive system of vehicle 3700 according to one or more navigational actions.

In some embodiments, vehicle 3700 may also include one or more sensors configured to collect information relating to vehicle 3700 and/or the environment of vehicle 3700. Exemplary sensors may include a positioning device (e.g., a Global Positioning System (GPS) device), an accelerometer, a gyro sensor, a speedometer, or the like, or a combination thereof. For example, vehicle 3700 may include a GPS device configured to collect positioning data associated with positions of vehicle 3700 over a period of time.

Figure 38:
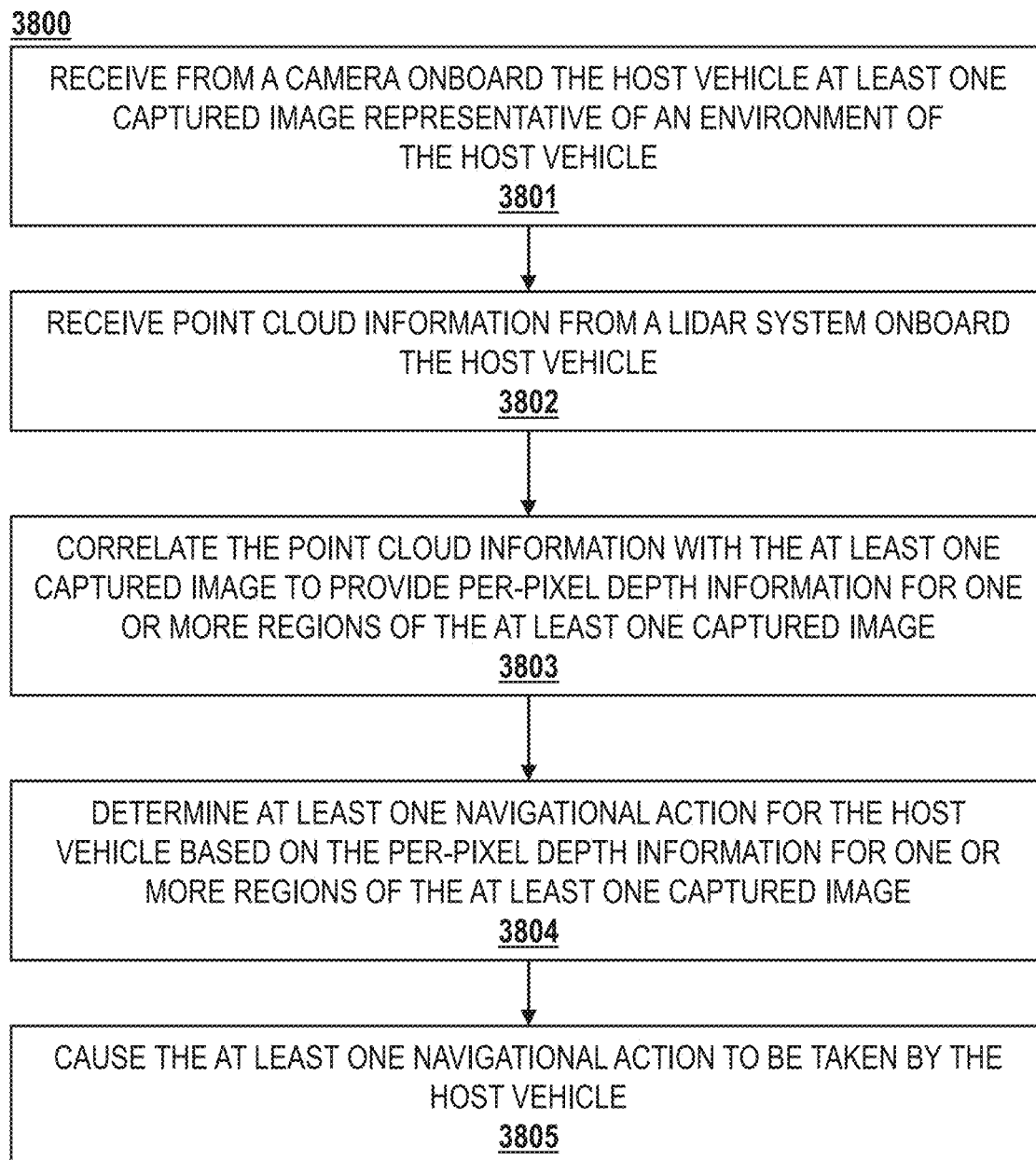
FIG. 38 is a flowchart showing an exemplary process for determining a navigational action for a host vehicle consistent with disclosed embodiments.
Figure 39A:
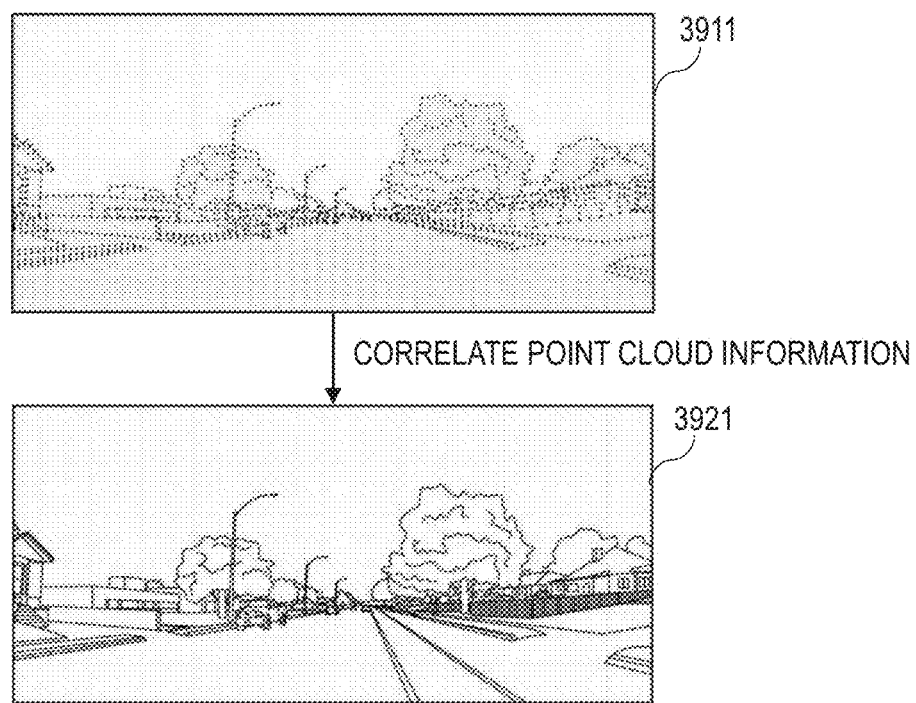
FIGS. 39A and 39B illustrate exemplary point cloud information and images consistent with disclosed embodiments.
Figure 39B:
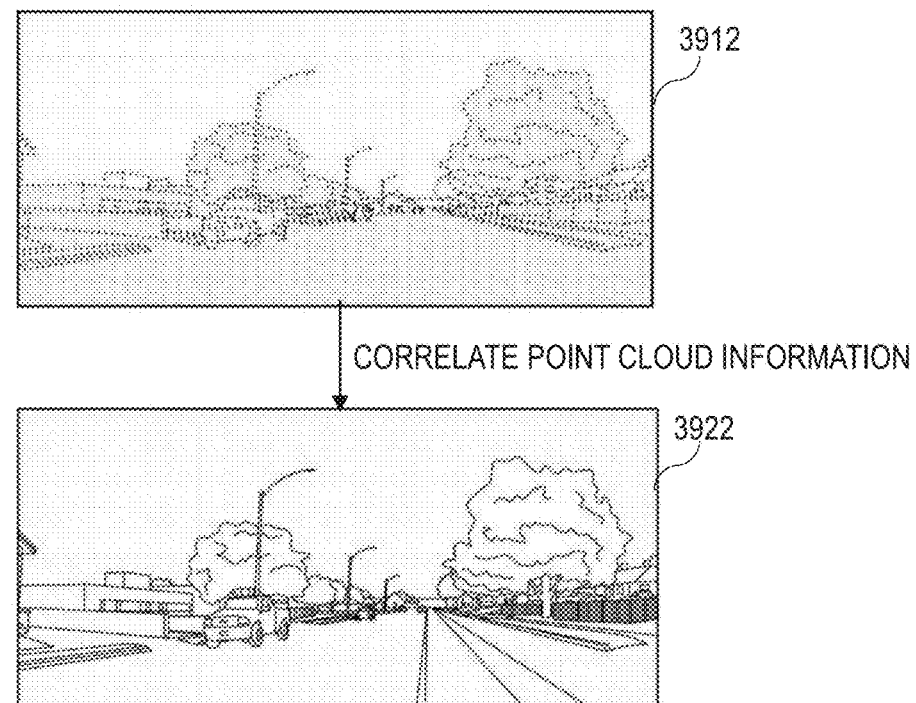

FIG. 38 is a flowchart showing an exemplary process 3800 for determining a navigational action for a host vehicle consistent with disclosed embodiments. Reference is also made to FIGS. 39A and 39B, which are schematic illustrations of exemplary point cloud information and images. While process 3800 is described below using vehicle 3700 as an example, one skilled in the art would understand that a server (e.g., one or more servers described in this disclosure) can also be configured to perform one or more steps of process 3800. For example, vehicle 3700 may transmit an image captured by camera 3706 and LIDAR data captured by LIDAR system 3707 to a server via a network. The server may be configured to correlate the LIDAR data with the image to provide per-pixel depth information for one or more regions of the image. The server may also be configured to transmit the per-pixel depth information to vehicle 3700 for further processing.

At step 3801, processor 3701 may be programmed to receive from camera 3706 at least one captured image representative of an environment of vehicle 3700. For example, camera 3706 may be configured to capture an image 3921 illustrated in FIG. 39A at a first time point (or over a first time period if the image is captured by a rolling shutter camera). Camera 3706 may also be configured to capture an image 3922 illustrated in FIG. 39B at a second time point after the first time point (or over a second time period after the first time period if the image is captured by a rolling shutter camera).

In some embodiments, as described above, camera 3706 may include a global shutter camera (i.e., a camera equipped with an image sensor with a global shutter). When camera 3706 is configured to operate with a global or synchronous shutter, all of the pixels may be exposed for the same amount of time and during a common exposure period. As a result, all of the pixels in a frame collected from a global shutter camera employing may have a same timestamp. Alternatively or additionally, camera 3706 may include a rolling shutter camera (i.e., a camera equipped with an image sensor with a rolling shutter). For example, camera 3706 may include a camera having a rolling shutter, such that each pixel in a row may read one at a time, and scanning of the rows proceeds on a row-by-row basis until an entire image frame has been captured. In some embodiments, the rows may be captured sequentially from top to bottom (or from bottom to top) relative to the frame. Accordingly, the image data of one row may have a timestamp different from the image data of another row.

In some embodiments, processor 3701 may be programmed to receive information of the capture time of each pixel of an image from camera 3706. For example, for an image captured by a global shutter camera, the capture time may be the same for all pixels, and processor 3701 may obtain the capture time from camera 3706. For an image captured by a rolling shutter camera, in some embodiments, at least some row(s) of the image may have a capture time different from that of other rows. Processor 3701 may obtain the capture time for each of the rows of the image from camera 3706.

Referring to FIG. 38, at step 3802, processor 3701 may be programmed to receive point cloud information from a LIDAR system onboard the host vehicle. The point cloud information may be representative of distances to various objects in the environment of vehicle 3700. LIDAR system 3707 may capture reflection information from its field of view in the environment of vehicle 3700. The reflection information may include information relating to reflections by various objects in the field of view. For example, LIDAR system 3707 may capture reflection information from various objects in its field of view at a third time point if the LIDAR data is captured by a static LIDAR system (or over a third time period the LIDAR data is captured by a scanning LIDAR system), which may be represented by a point cloud "image" 3911 illustrated in FIG. 39A. LIDAR system 3707 may capture reflection information from various objects in its field of view at a fourth time point after the third time point if the LIDAR data is captured by the static LIDAR system (or over a fourth time period after the third time period the LIDAR data is captured by a scanning LIDAR system), which may be represented by a point cloud "image" 3912 illustrated in FIG. 39B.

In some embodiments, processor 3701 may be programmed to obtain receive information of the capture time of each point of the point cloud information from LIDAR system 3707. For example, for point cloud information captured by a static LIDAR system, the capture time may be the same for all points of the point cloud information, and processor 3701 may obtain the capture time from LIDAR system 3707 and use the obtained capture time for all the points in the point cloud information. For point cloud information captured by a scanning LIDAR system, in some embodiments, at least some line(s) of points in the point cloud information may have a capture time different from that of other lines. For example, as described elsewhere in this disclosure, LIDAR system 3707 may include a scanning LIDAR system configured to one horizontal line at a time, and the points of each line of the point cloud information captured by the scanning LIDAR system may have a different capture time. As another example, LIDAR system 3707 may include a scanning LIDAR system configured to scan multiple horizontal lines (and referred to herein as a scanning group of lines) within an FOV at a time, and the points of each scanning group of lines may have a different capture time than that of other groups of lines. Processor 3701 may obtain a capture time of each line (or a capture time of each scanning group of lines) from LIDAR system 3707.

In some embodiments, the point cloud information may be accumulated based on LIDAR data over a period of time (e.g., LIDAR data captured over multiple frames). For example, LIDAR system 3707 may capture a plurality of frames and generate point cloud information by accumulating LIDAR data of the frames (e.g., accumulating depth information of the frames). Alternatively, processor 3701 may be programmed to receive LIDAR data of the frames and accumulate the LIDAR data to generate point cloud information, which may provide a dense point cloud.

In some embodiments, the point cloud information may be acquired at the same time point when the image was captured. In other embodiments, prior to (or after) the timestamp at which the captured image was acquired. For example, point cloud "image" 3911 may be acquired prior to (or after) the timestamp at which image 3921. Alternatively, some of the point cloud information was acquired prior to the timestamp at which the at least one captured image was acquired and some of the point cloud information was acquired after the timestamp at which the at least one captured image was acquired. For example, for point cloud information captured by a scanning LIDAR system, which may scan a horizontal line at a time, some of the lines may be captured at prior to the timestamp at which the captured image was acquired, and the other lines may be captured after the timestamp at which the captured image was acquired.

Referring to FIG. 38, at step 3803, processor 3701 may be programmed to correlate the point cloud information with the at least one captured image to provide per-pixel depth information for one or more regions of the at least one captured image. For example, processor 3701 may be programmed to identify a region in the point cloud information corresponding to a region of the image and map the points of the region in the point cloud information to the corresponding pixels of the region of the image by, for example, assigning the depth information of the points to the corresponding pixels in the image.

In some embodiments, processor 3701 may adjust the region in the point cloud information and/or the corresponding region of the image before correlating the depth information with the pixels of the image. For example, processor 3701 may stretch or shrink one or more regions of the image to fit the corresponding regions of the point cloud information before correlating depth information of the point cloud information with the image.

In some embodiments, the capture times of the point cloud information and the image may be different. Processor 3701 may be programmed to warp (or map) the point cloud information to a timestamp at which the captured image was acquired. For example, LIDAR system 3707 may capture the point cloud information at a first capture time, and the point cloud information may include a first timestamp. Camera 3706 may capture the image at the second capture time after the first capture time. The image may include a second timestamp. Processor 3701 may correlate the depth information of the point cloud information with the image. In some embodiments, the first and second timestamps may be the same or different.

In some embodiments, processor 3701 may select one of multiple sets of point cloud information to correlate with an image. For example, when no point cloud information has the same capture time as an image to be correlated, processor 3701 may select the point cloud information having a capture time that is the closest to the capture time of the image and correlate the depth information of the selected point cloud information with the image to provide a per-pixel depth information for one or more regions of the image. Alternatively or additionally, processor 3701 may determine an estimated set of point cloud information based on two sets of point cloud information and correlate the depth information of the estimated set of point cloud information with the image. For example, processor 3701 may obtain a first set of point cloud information that was acquired before the image was acquired and obtain a second set of point cloud information that was acquired after the image was acquired. Processor 3701 may determine an estimated (or interpolated) set of point cloud information (by, e.g., average the depths of the two sets of point cloud information to obtain an average depth at each point). Processor 3701 may also correlate the depth information of the estimated set of point cloud information with the image.

In some embodiments, when the first and second timestamps are different, in correlating depth information of the point cloud information with the image, processor 3701 may account for ego motion of vehicle 3700. In some instances, a direct correlation of the depth information of the point cloud information with the image may not be accurate if the point cloud information and the image were acquired at different times. Processor 3701 may determine the ego motion over the time period between the capture time of the point cloud information and the capture time of the image, and adjust the depth information of the point cloud information accordingly. For example, processor 3701 may be programmed to add (or subtract) a distance or depth caused by the ego motion of vehicle 3700 (over the time period between the capture times of the point cloud information and the image) to the depth information of the point cloud information representing objects in the moving direction of vehicle 3700. In some embodiments, processor 3701 may determine the ego motion of vehicle 3700 based on an output of one or more sensors representing the position change over the time period between the capture times of the point cloud information and the image. For example, vehicle 3700 may include one or more sensors (e.g., at least one of a speedometer, an accelerometer, or a GPS sensor) configured to track the position of vehicle 3700 over the time period. Processor 3701 may determine the ego motion of vehicle 3700 over the time period based on the output from the one or more sensors. Alternatively or additionally, processor 3701 may determine the ego motion based on an optical flow of objects observed between two or more images captured by camera 3706. For example, processor 3701 may compare the location of a non-moving object (e.g., a light pole) in a first image with the location of the non-moving object in a second image to determine the ego motion of vehicle 3700. In some embodiments, processor 3701 may determine the ego motion based on a combination of an optical flow of objects observed between two or more images captured by camera 3706 and an output of one or more sensors associated with vehicle 3700.

In some embodiments, the ego motion of vehicle 3700 may be determined based on one or more methods described as described elsewhere in this disclosure (e.g., one or more methods for determining an ego motion of a host vehicle provided in connection with FIG. 31 and the descriptions thereof).

At step 3804, processor 3701 may be programmed to determine at least one navigational action for vehicle 3700 based on the per-pixel depth information for one or more regions of the at least one captured image. Exemplary navigational actions may include at least one of maintaining a current heading direction and speed for vehicle 3700, changing a current heading direction for vehicle 3700, or changing a speed of vehicle 3700. For example, processor 3701 may analyze the one or more regions of the at least one captured image and the per-pixel depth information for the one or more regions of the at least one captured image to identify an object that is within a predetermined safety distance. Processor 3701 may also be configured to determine a navigational action for vehicle 3700 to slow vehicle 3700 or steer away from the identified object.

At step 3805, processor 3701 may be programmed to cause the at least one navigational action to be taken by vehicle 3700. For example, processor 3701 may be programmed to cause the at least one navigational action to be taken by vehicle 3700 by causing activation of one or more actuators associated with a steering system (e.g., maintaining or changing a current heading direction), a braking system (e.g., reducing a current speed) or a drive system of vehicle 3700 (e.g., accelerating, deaccelerating, reducing a current speed).

LIDAR-Camera Fusion Where LIDAR and Camera Validly Detect Different Things

In some cases, a host vehicle may be equipped with a LIDAR system and a camera. The LIDAR system and the camera may have different fields of view and capture different scene information from the environment of the host vehicle due to differences in physical location relative to the host vehicle. For example, the LIDAR system may be located on a roof of the host vehicle, and a camera may be located behind the windshield. As a result, in some instances, the LIDAR system may detect an object (e.g., a target vehicle) that the camera does not capture (e.g., the object may be obscured by a vehicle immediately ahead of the host vehicle). These differences can cause problems when the system attempts to align the sensed information by the LIDAR system with the sensed information by the camera, which may lead to a possibility of discarding such information as potentially erroneous. This disclosure provides systems and methods for determining a potential action that the host vehicle may take when a difference between the sensed information by the LIDAR system and the sensed information by the camera is detected. For example, if the LIDAR and/or camera detects a vehicle immediately ahead of the host, then it may be understood that this vehicle may obscure objects further forward within a region that only a higher-mounted LIDAR system can detect. In such cases, the disclosed systems and methods may use information collected by the LIDAR system and the camera to detect an object and determine what action the host vehicle may take in response to the detection of the object.

Figure 40:
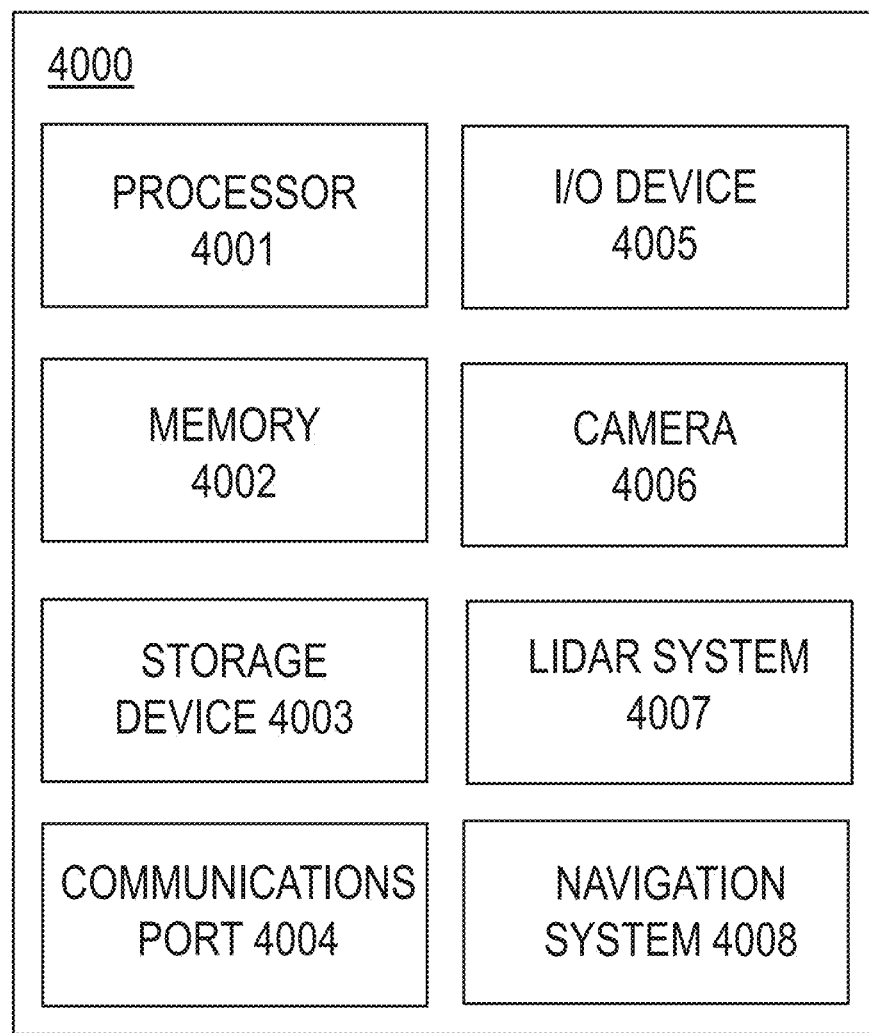
FIG. 40 illustrates an exemplary vehicle consistent with disclosed embodiments.

FIG. 40 illustrates an exemplary vehicle 4000 consistent with disclosed embodiments. The disclosed systems and methods may be implemented using one or more components of vehicle 4000. As illustrated in FIG. 40, vehicle 4000 may include at least one processor (e.g., processor 4001), a memory 4002, at least one storage device (e.g., storage device 4003), a communications port 4004, an I/O device 4005, a camera 4006, a LIDAR system 4007, and a navigation system 4008.

Processor 4001 may be programmed to perform one or more functions of vehicle 4000 described in this disclosure. Processor 4001 may include a microprocessor, preprocessors (such as an image preprocessor), a graphics processing unit (GPU), a central processing unit (CPU), support circuits, digital signal processors, integrated circuits, memory, or any other types of devices suitable for running applications or performing a computing task. In some embodiments, processor 4001 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.). Any of the processing devices disclosed herein may be configured to perform certain functions. Configuring a processing device, such as any of the described processors or other controller or microprocessor, to perform certain functions may include programming of computer-executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

Vehicle 4000 may also include a memory 4002 that may store instructions for various components of vehicle 4000. For example, memory 4002 may store instructions that, when executed by processor 4001, may be configured to cause processor 4001 to perform one or more functions of processor 4001 described herein. Memory 4002 may include any number of random-access memories, read-only memories, flash memories, disk drives, optical storage, tape storage, removable storage, and other types of storage. In one instance, memory 4002 may be separate from processor 4001. In another instance, memory 4002 may be integrated into processor 4001. In some embodiments, memory 4002 may include software for performing one or more computing tasks, as well as a trained system, such as a neural network, or a deep neural network.

Storage device 4003 may be configured to store various data and information for one or more components of vehicle 4000. Storage device 4003 may include one or more hard drives, tapes, one or more solid-state drives, any device suitable for writing and read data, or the like, or a combination thereof. For example, storage device 4003 may be configured to store data of one or more maps. By way of example, storage device 4003 may store data of a sparse map, which may include one or more landmarks associated with a road segment and one or more target trajectories associated with the road segment. As another example, storage device 4003 may be configured to store images captured by camera 4006 and/or LIDAR data captured by LIDAR system 4007.

Communications port 4004 may be configured to facilitate data communications between vehicle 4000 and other devices. For example, communications port 4004 may be configured to receive data from and transmit data to a server (e.g., one or more servers described in this disclosure) via one or more public or private networks, including the Internet, an Intranet, a WAN (Wide-Area Network), a MAN (Metropolitan-Area Network), a wireless network compliant with the IEEE 802.11a/b/g/n Standards, a leased line, or the like.

I/O device 4005 may be configured to receive input from the user of vehicle 4000, and one or more components of vehicle 4000 may perform one or more functions in response to the input received. In some embodiments, I/O device 4005 may include an interface displayed on a touchscreen. I/O device 4005 may also be configured to output information and/or data to the user. For example, I/O device 4005 may include a display configured to display a map.

Camera 4006 may be configured to capture one or more images of the environment of vehicle 4000. Camera 4006 may include any type of device suitable for capturing at least one image from an environment. In some embodiments, camera 4006 may be similar to image capture devices 122, 124, and 126 illustrated in FIG. 1 and described above. In some embodiments, camera 4006 may include a plurality of cameras configured to capture images of the environment of vehicle 4000. While the descriptions below are provided with reference to a camera, one skilled in the art will understand that the disclosed systems and methods may also be implemented using two or more cameras.

Camera 4006 may be positioned at any suitable location on vehicle 4000. For example, camera 4006 may be located behind a windshield of vehicle 4000, in a vicinity of a front bumper of vehicle 4000, a vicinity of the rearview mirror of vehicle 4000, one or both of the side mirrors of vehicle 4000, on the roof of vehicle 4000, on the hood of vehicle 4000, on the trunk of vehicle 4000, on the sides of vehicle 4000, mounted on, positioned behind, or positioned in front of any of the windows of vehicle 4000, and mounted in or near light figures on the front and/or back of vehicle 4000, etc.

LIDAR system 4007 may include one or more LIDAR units. In some embodiments, the one or more LIDAR units may be positioned on a roof of vehicle 4000. Such a unit may include a rotating unit configured to gather LIDAR reflection information within a 360-degree field of view around vehicle 4000 or from any sub-segment of the 360-degree field of view (e.g., one or more FOVs each representing less than 360 degrees). The data collected by LIDAR system 4007 may be provided to processor 4001. Alternatively or additionally, the data may be transmitted to a server described in this disclosure via a network.

In some embodiments, a LIDAR unit may be positioned at a forward location on vehicle 4000 (e.g., near the headlights, in the front grill, near the fog lamps, in a forward bumper, or at any other suitable location). In some cases, one or more LIDAR units installed on a forward portion of vehicle 4000 may collect reflection information from a field of view in an environment forward of vehicle 4000. In other embodiments, a LIDAR unit may be located in other locations. For example, a LIDAR unit may be located behind a windshield of vehicle 4000, in a vicinity of a front bumper of vehicle 4000, a vicinity of the rearview mirror of vehicle 4000, one or both of the side mirrors of vehicle 4000, on the roof of vehicle 4000, on the hood of vehicle 4000, on the trunk of vehicle 4000, on the sides of vehicle 4000, mounted on, positioned behind, or positioned in front of any of the windows of vehicle 4000, and mounted in or near light figures on the front and/or back of vehicle 4000, etc.

In some embodiments, LIDAR system 4007 may be located in a location different from a location of camera 4006. For example, camera 4006 may be located behind a windshield of vehicle 4000, and LIDAR system 4007 may be mounted on a roof of vehicle 4000. As another example, camera 4006 be located in a vicinity of a front bumper of vehicle 4000, and LIDAR system 4007 is mounted on a roof of vehicle 4000. As another example, camera 4006 be located behind a windshield of vehicle 4000, and LIDAR system 4007 be located in a vicinity of a front bumper of vehicle 4000. In some embodiments, camera 4006 may have an FOV different from the FOV of LIDAR system 4007, but the FOV of camera 4006 may at least partially overlap with a FOV of LIDAR system 4007 to provide a shared field of view region.

Any suitable type of LIDAR unit may be included in vehicle 4000. In some cases, LIDAR system 4007 may include one or more flash (also referred to herein as static) LIDAR units (e.g., 3D flash LIDAR) where an entire LIDAR field of view (FOV) is illuminated with a single laser pulse, and a sensor including rows and columns of pixels to record returned light intensity and time of flight/depth information. Such flash systems may illuminate a scene and collect LIDAR "images" multiple times per second. Scanning LIDAR units may also be employed. Such scanning LIDAR units may rely on one or more techniques for dispersing a laser beam over a particular FOV. In some cases, a scanning LIDAR unit may include a scanning mirror that deflects and directs a laser beam toward objects within the FOV. Scanning mirrors may rotate through a full 360 degrees or may rotate along a single axis or multiple axes over less than 360 degrees to direct the laser toward a predetermined FOV. In some cases, LIDAR units may scan one horizontal line. In other cases, a LIDAR unit may scan multiple horizontal lines within an FOV, effectively rastering a particular FOV multiple times per second.

The LIDAR units in LIDAR system 4007 may include any suitable laser source. In some embodiments, the LIDAR units may employ a continuous laser. In other cases, the LIDAR units may use pulsed laser emissions. Additionally, any suitable laser wavelength may be employed. In some cases, a wavelength of between about 600 nm to about 1000 nm may be used.

The LIDAR unit(s) in LIDAR system 4007 may also include any suitable type of sensor and provide any suitable type of output. In some cases, sensors of the LIDAR units may include solid state photodetectors, such as one or more photodiodes or photomultipliers. The sensors may also include one or more CMOS or CCD devices including any number of pixels. These sensors may be sensitive to laser light reflected from a scene within the LIDAR FOV. The sensors may enable various types of output from a LIDAR unit. In some cases, a LIDAR unit may output raw light intensity values and time of flight information representative of the reflected laser light collected at each sensor or at each pixel or sub-component of a particular sensor. Additionally or alternatively, a LIDAR unit may output a point cloud (e.g., a 3D point cloud) that may include light intensity and depth/distance information relative to each collected point). LIDAR units may also output various types of depth maps representative of light reflection amplitude and distance to points within a field of view. LIDAR units may provide depth or distance information relative to particular points within an FOV by noting a time at which light from the LIDAR's light source was initially projected toward the FOV and recording a time at which the incident laser light is received by a sensor in the LIDAR unit. The time difference may represent a time of flight, which may be directly related to the round trip distance that the incident laser light traveled from the laser source to a reflecting object and back to the LIDAR unit. Monitoring the time of flight information associated with individual laser spots or small segments of a LIDAR FOV may provide accurate distance information for a plurality of points within the FOV (e.g., mapping to even very small features of objects within the FOV). In some cases, LIDAR units may output more complex information, such as classification information that correlates one or more laser reflections with a type of object from which the laser reflection was acquired.

Navigation system 4008 may be configured to assist a driver of vehicle 4000 to operate vehicle 4000. For example, navigation system 4008 may determine that vehicle 4000 is currently deviating from a target trajectory and generate a notification to the driver indicating the deviation from the target trajectory, which may be displayed on a display (e.g., displaying the target trajectory and an estimated travel path determined based on vehicle 4000's current position and heading direction). Alternatively, navigation system 4008 may include an autonomous vehicle navigation system configured to control the movement of vehicle 4000, as described elsewhere in this disclosure. For example, navigation system 4008 may implement a navigation action determined by processor 4001 as vehicle 4000 traverses a road segment (e.g., one or more of steering, braking, or acceleration of the vehicle). In some embodiments, navigation system 4008 may include an advanced driver-assistance system (ADAS) system. In some embodiments, navigation system 4008 may be configured to cause activation of one or more actuators associated with a steering system, a braking system, or a drive system of vehicle 4000 according to one or more navigational actions.

In some embodiments, vehicle 4000 may also include one or more sensors configured to collect information relating to vehicle 4000 and/or the environment of vehicle 4000. Exemplary sensors may include a positioning device (e.g., a Global Positioning System (GPS) device), an accelerometer, a gyro sensor, a speedometer, or the like, or a combination thereof. For example, vehicle 4000 may include a GPS device configured to collect positioning data associated with positions of vehicle 4000 over a period of time.

Figure 41:
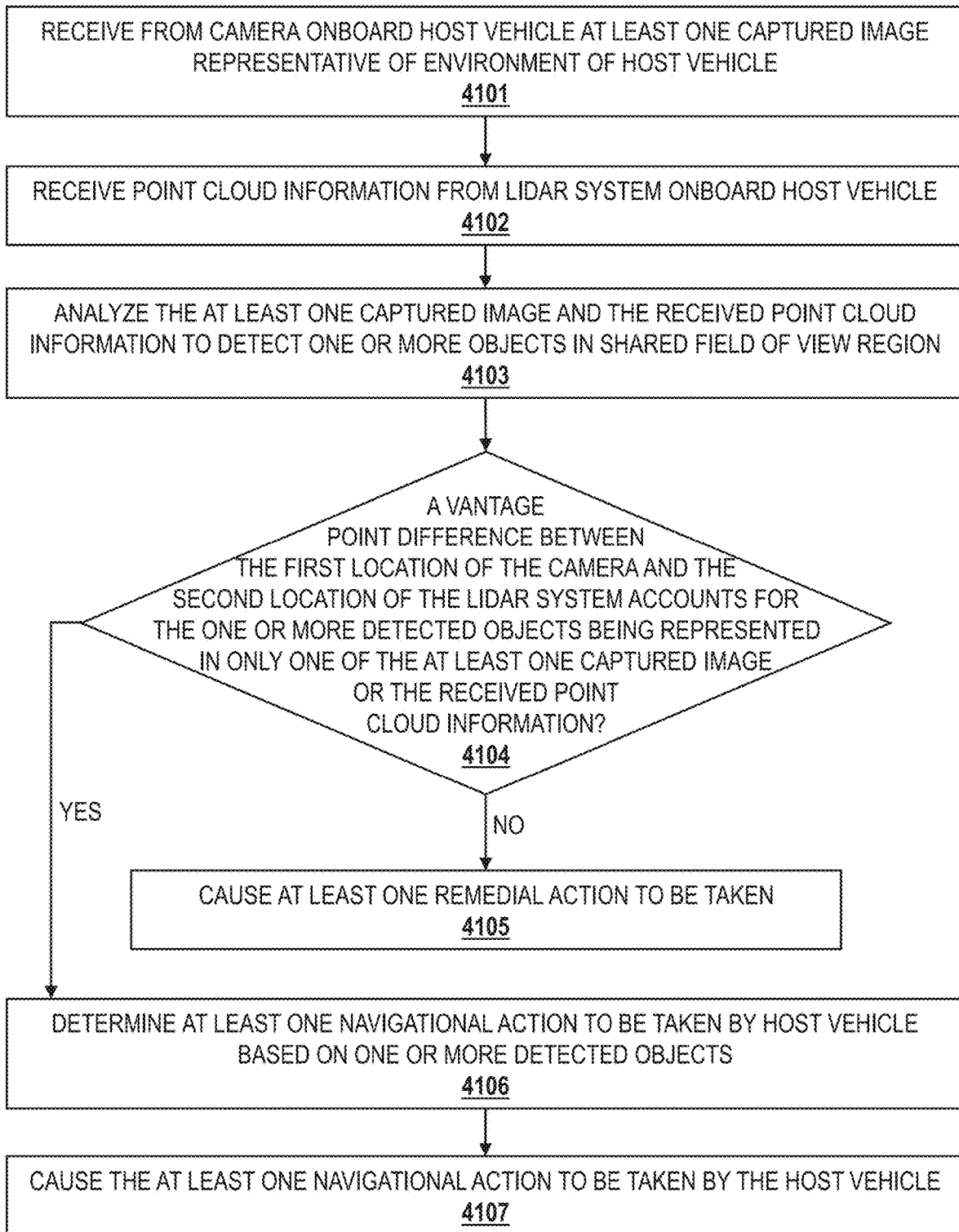
FIG. 41 is a flowchart showing an exemplary process for determining a navigational action for a host vehicle consistent with disclosed embodiments.
Figure 42:
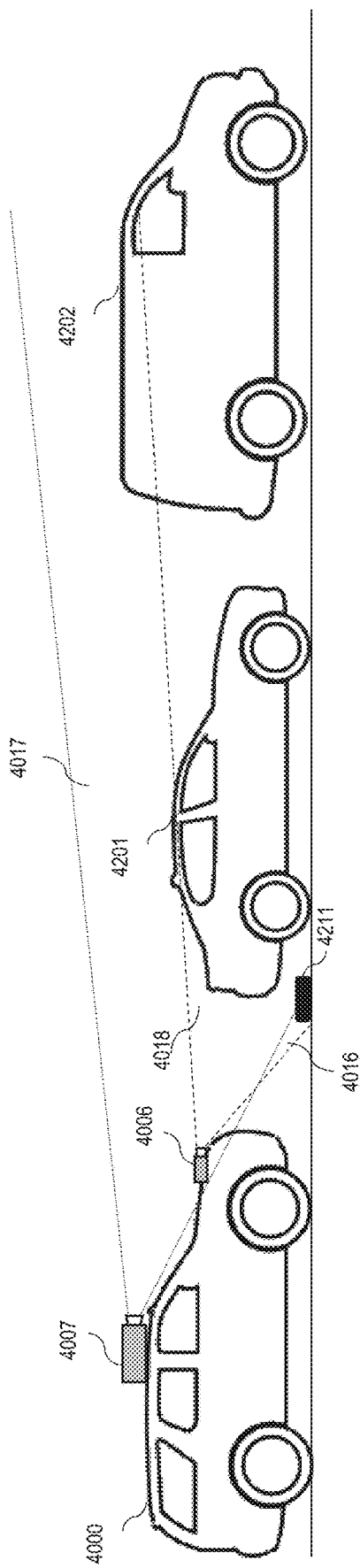
FIG. 42 illustrates a host vehicle in an exemplary environment consistent with disclosed embodiments.

FIG. 41 is a flowchart showing an exemplary process 4100 for determining a navigational action for a host vehicle consistent with disclosed embodiments. Reference is also made to FIG. 42, which is a schematic illustration of an exemplary environment of vehicle 4000.

At step 4101, processor 4001 may be programmed to receive from camera 4006 onboard vehicle 4000 at least one captured image representative of an environment of vehicle 4000. In some embodiments, camera 4006 may be configured to capture one or more images presentative of the environment of vehicle 4000 similar to one or more processes for capturing images as described elsewhere in this disclosure.

Camera 4006 may be positioned at a first location relative to vehicle 4000. For example, camera 4006 may be located behind a windshield of vehicle 4000, in a vicinity of a front bumper of vehicle 4000, a vicinity of the rearview mirror of vehicle 4000, one or both of the side mirrors of vehicle 4000, on the roof of vehicle 4000, on the hood of vehicle 4000, on the trunk of vehicle 4000, on the sides of vehicle 4000, mounted on, positioned behind, or positioned in front of any of the windows of vehicle 4000, and mounted in or near light figures on the front and/or back of vehicle 4000, etc. By way of example, as illustrated in FIG. 42, camera 4006 may be located in a vicinity of the front bumper of vehicle 4000.

In some embodiments, camera 4006 may be configured to capture a plurality of captured images over a period of time, which may indicate the movement of vehicle 4000 relative to one or more objects in the environment (e.g., deacceleration of a leading vehicle).

Referring to FIG. 41, at step 4102, processor 4001 may be programmed to receive point cloud information from a LIDAR system onboard the host vehicle. As described elsewhere in this disclosure, point cloud information may be representative of distances to various objects in the environment of the host vehicle. LIDAR system 4007 may capture reflection information from its field of view in the environment of vehicle 4000. The reflection information may include information relating to reflections by various objects in the field of view. In some embodiments, the point cloud information may include multiple, captured LIDAR frames. A LIDAR frame may refer to LIDAR data captured during a scanning cycle. In one example, a typical frame-time may last less than a second. In some embodiments, LIDAR system 4007 may have a fixed frame rate (e.g. 10 frames per second, 25 frames per second, 50 frames per second) or the frame rate may be dynamic. Similar to a series of images captured by camera 4006 over a period of time described above, multiple, captured LIDAR frames may also be used by processor 4001 to determine the movement of vehicle 4000 relative to one or more objects in the environment (e.g., deacceleration of a leading vehicle).

In some embodiments, LIDAR system 4007 may be positioned at a second location relative to vehicle 4000. For example, LIDAR system 4007 may be positioned at a forward location on vehicle 4000 (e.g., near the headlights, in the front grill, near the fog lamps, in a forward bumper, or at any other suitable location). In some cases, LIDAR system 4007 installed on a forward portion of vehicle 4000 may collect reflection information from a field of view in an environment forward of vehicle 4000. In other embodiments, LIDAR system 4007 may be located in other locations. For example, LIDAR system 4007 may be located behind a windshield of vehicle 4000, in a vicinity of a front bumper of vehicle 4000, a vicinity of the rearview mirror of vehicle 4000, one or both of the side mirrors of vehicle 4000, on the roof of vehicle 4000, on the hood of vehicle 4000, on the trunk of vehicle 4000, on the sides of vehicle 4000, mounted on, positioned behind, or positioned in front of any of the windows of vehicle 4000, and mounted in or near light figures on the front and/or back of vehicle 4000, etc.

In some embodiments, the second location (at which LIDAR system 4007 is positioned) and the first location (at which camera 4006 is positioned) may be different. For example, camera 4006 may be located behind a windshield of vehicle 4000, and LIDAR system 4007 may be mounted on a roof of vehicle 4000. As another example, camera 4006 be located in a vicinity of a front bumper of vehicle 4000, and LIDAR system 4007 is mounted on a roof of vehicle 4000. As another example, camera 4006 be located behind a windshield of vehicle 4000, and LIDAR system 4007 be located in a vicinity of a front bumper of vehicle 4000. In some embodiments, camera 4006 may have an FOV different from the FOV of LIDAR system 4007, but the FOV of camera 4006 may at least partially overlap with a FOV of LIDAR system 4007 to provide a shared field of view region. In some embodiments, a field of view of camera 4006 may at least partially overlap with a field of view of LIDAR system 4007 to provide a shared field of view region. By way of example, as illustrated in FIG. 42, camera 4006 is located in a vicinity of a front bumper of vehicle 4000, and LIDAR system 4007 is mounted on a roof of vehicle 4000. LIDAR system 4007 has a LIDAR FOV 4017, and camera 4006 has a camera FOV 4016, which may at least partially overlap with a field of view of LIDAR system 4007 to provide a shared FOV region 4018. A shared FOV region may refer to a region that both camera 4006 and LIDAR system 4007 may sense, but their vantage point difference may lead to differences in what they can detect in the shared FOV region. By way of example, as illustrated in FIG. 42, a lower positioned camera 4006 (e.g., located in the vicinity of the front bumper of vehicle 4000) may sense only one leading vehicle (e.g., first vehicle 4201), but a higher positioned LIDAR system 4007 (e.g., located on the roof of vehicle 4000) may sense an object beyond the leading vehicle (e.g., second vehicle 4202). In another example, on the other hand, a camera positioned in the grill of the host vehicle may sense objects very close to the host vehicle (e.g., object 4211 on the ground illustrated in FIG. 42, where a LIDAR system mounted on the roof of the host vehicle may be obscured by the hood of the host vehicle. As another example, a LIDAR system may have a better view of closer objects that may be obscured from the captured camera images by the hood of the host vehicle.

Referring to FIG. 41, at step 4103, processor 4001 may be programmed to analyze the at least one captured image and the received point cloud information to detect one or more objects in the shared field of view region (e.g., shared FOV region 4018 illustrated in FIG. 42). The detected one or more objects may be represented in only one of the at least one captured image or the received point cloud information. By way of example, as illustrated in FIG. 42, processor 4001 may be programmed to analyze the at least one captured image and the received point cloud information and detect an object 4211 on the ground, which may be in shared FOV region 4018. Object 4211, however, may appear in the at least one captured image, but not in the point cloud information, given that the view of LIDAR system 4007 the LIDAR may be obscured by the hood of vehicle 4000. In some embodiments, a detected object by processor 4001 at step 4103 may include an object located ahead of a target vehicle forward of the host vehicle. In one example, as illustrated in FIG. 42, although second vehicle 4202 may also appear in camera FOV 4016 (and second vehicle 4202), second vehicle 4202 is blocked from the view of camera 4006 by first vehicle 4201 (i.e., the leading vehicle or a target vehicle). As a result, second vehicle 4202 may appear in the point cloud information, but not in the one or more captured images. a detected object by processor 4001 at step 4103 may include a static object in a roadway (e.g., a speed bump on the roadway). In some embodiments, a detected object by processor 4001 at step 4103 may include an object located ahead of vehicle 4000 but close enough that a portion of vehicle 4000 (e.g., the front of vehicle 4000) obscures the one or more objects from either the at least one captured image or the point cloud information. By way of example, as illustrated in FIG. 42, processor 4001 may detect object 4211 on the ground that may be block by the hood of vehicle 4000 and may only appear in the captured image.

At step 4104, processor 4001 may be programmed to determine whether a vantage point difference between the first location of camera 4006 and the second location of LIDAR system 4007 accounts for the one or more detected objects being represented in only one of the at least one captured image or the received point cloud information. For example, processor 4001 may determine a vantage point difference based on the FOVs and/or the locations of camera 4006 and LIDAR system 4007. Processor 4001 may also determine whether the non-appearance of an object (at step 4103) in one of the at least one captured image or the received point cloud information but not in the other is due to the vantage point difference.

If processor 4001 determines that the vantage point difference does not account for the one or more detected objects being represented in only one of the at least one captured image or the received point cloud information, then process 4100 proceeds to step 4105. At step 4105, processor 4001 may be programmed to cause at least one remedial action to be taken. A remedial action may include at least one of issuing a warning to a passenger and/or a driver of vehicle 4000 (e.g., after detecting a speed bump on a roadway) or disregarding the one or more detected objects in navigation of the host vehicle (e.g., after detecting a small object on the ground).

In some embodiments, the at least one remedial action may include applying different weights to an image-based detection path based on analysis of the at least one captured image and a LIDAR-based detection path based on analysis of the point cloud information. In some cases, a difference in detection results by camera 4006 and LIDAR system may not be due to a vantage point difference between camera 4006 and LIDAR system 4007, but due to other reasons. For example, the difference in detection results may be due to certain environmental conditions. By way of example, LIDAR system 4007 may perform better in a sun glare environment than (or a highly reflective environment, or a low light condition during a night time without street lights, etc.) camera 4006. As a result, processor 4001 may detect an object in the point cloud information, but not in the images captured by camera 4006 even if the object appears in both views of camera 4006 and LIDAR system 4007. On the other hand, camera 4006 may perform better on a foggy or rainy day than LIDAR system 4007. As a result, processor 4001 may detect an object in the images, but not in the point cloud information. If processor 4001 determines that the vantage point difference does not account for the one or more detected objects being represented in only one of the at least one captured image or the received point cloud information, processor 4001 may apply different weights to an image-based detection path based on analysis of the at least one captured image and a LIDAR-based detection path based on analysis of the point cloud information. For example, if processor 4001 determines that the non-detection of an object in the point cloud information is due to a weather condition (e.g., a rainy day), processor 4001 may apply a weight to an image-based detection path higher than that to a LIDAR-based detection path, which may give more an accurate detection result. As another example, if processor 4001 determines that the non-detection of an object in the image(s) is due to lighting conditions (e.g., vehicle 4000 is navigating during the night time without street lights), processor 4001 may apply a weight to an image-based detection path lower than that to a LIDAR-based detection path.

If processor 4001 determines that the vantage point difference does account for the one or more detected objects being represented in only one of the at least one captured image or the received point cloud information, process 4100 may proceed to step 4106. At step 4106, processor 4001 may be programmed to determine at least one navigational action to be taken by vehicle 4000 based on the one or more detected objects and, at step 4107 cause the at least one navigational action to be taken by vehicle 4000. As described elsewhere in this disclosure, a navigational action determined by a processor and taken by vehicle 4000 may include maintaining or changing a current heading direction, increasing or reducing a current speed, or the like, or a combination thereof. Processor 4001 may also be programmed to cause the at least one navigational action to be taken by vehicle 4000 according to one or more methods for controlling a navigation system described elsewhere in this disclosure. For example, processor 4001 may be programmed to cause the at least one navigational action to be taken by vehicle 4000 by causing activation of one or more actuators associated with a steering system (e.g., maintaining or changing a current heading direction), a braking system (e.g., reducing a current speed) or a drive system of vehicle 4000 (e.g., accelerating, deaccelerating, reducing a current speed).

In some embodiments, processor 4001 may determine the at least one navigational action based on a detected action or movement of the detected object(s). For example, as described above, processor 4001 may detect second vehicle 4202 illustrated in FIG. 42 (which is ahead of first vehicle 4201, a target vehicle) in the point cloud information captured by LIDAR system 4007. Processor 4001 may be programmed to determine a navigational action based on a detected action of second vehicle 4202 although first vehicle 4201. For example, processor 4001 may be programmed to detect a slowing of second vehicle 4202 based on, for example, multiple LIDAR frames of point cloud information, although the target vehicle is not detected to be slowing. Processor 4001 may also be programmed to determine a navigational action of braking vehicle 4000. Processor 4001 may also be programmed to cause navigation system 4008 to brake vehicle 4000.

Pseudo LIDAR

This disclosure provides systems and methods that may infer depth information in the pixels of images captured by one or more groups of cameras. For example, in some embodiments, a host vehicle may include a group of cameras, which may include three cameras, namely, a center camera, a left surround camera, and a right surround camera. The FOV of the center camera may at least partially overlap with both a FOV of the left surround camera and a FOV of the right surround camera. The center camera may be configured to capture one or more images (also referred to herein as center images) of at least in a portion of the environment of the host vehicle in the FOV of the center camera. The left surround camera may be configured to capture one or more images (also referred to herein as left surround images) of at least in a portion of the environment of the host vehicle in the FOV of the left surround camera. The right surround camera may be configured to capture one or more images (also referred to herein as right surround images) of at least in a portion of the environment of the host vehicle in the FOV of the right surround camera. The host vehicle may receive a captured center image from the center camera, a captured left surround image from the left surround camera, and a captured right surround image from the right surround camera. The host vehicle may also provide the received images to an analysis module, which may be configured to generate an output relative to the center image based on analysis of the center, left surround, and right surround images. In some embodiments, the generated output may include per-pixel depth information for at least one region of the center image. The host vehicle may further take at least one navigational action based on the generated output including the per-pixel depth information for the at least one region of the center image.

Figure 43:
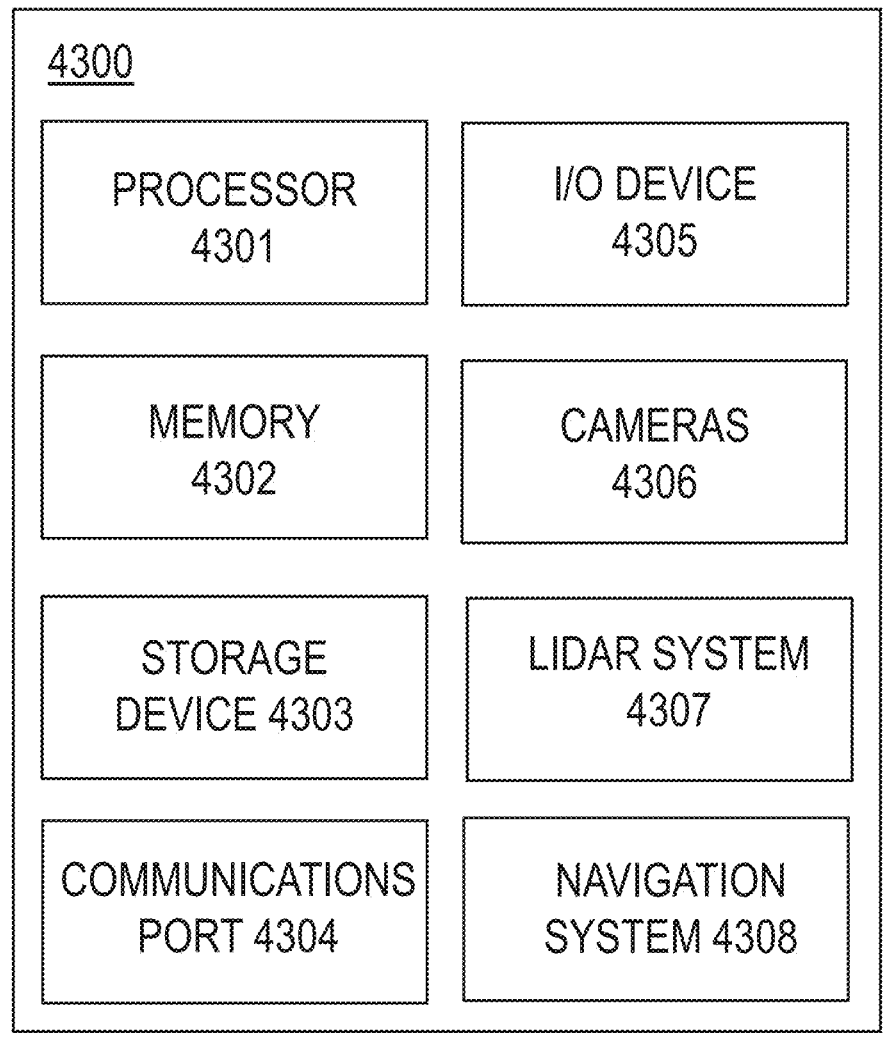
FIG. 43 illustrates an exemplary vehicle consistent with disclosed embodiments.

FIG. 43 illustrates an exemplary vehicle 4300 consistent with disclosed embodiments. The disclosed systems and methods may be implemented using one or more components of vehicle 4300. As illustrated in FIG. 43, vehicle 4300 may include at least one processor (e.g., processor 4301), memory 4302, at least one storage device (e.g., storage device 4303), a communications port 4304, an I/O device 4305, a plurality of cameras 4306, a LIDAR system 4307, and a navigation system 4308.

Processor 4301 may be programmed to perform one or more functions of vehicle 4300 described in this disclosure. Processor 4301 may include a microprocessor, preprocessors (such as an image preprocessor), a graphics processing unit (GPU), a central processing unit (CPU), support circuits, digital signal processors, integrated circuits, memory, or any other types of devices suitable for running applications or performing a computing task. In some embodiments, processor 4301 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.). Any of the processing devices disclosed herein may be configured to perform certain functions. Configuring a processing device, such as any of the described processors or other controller or microprocessor, to perform certain functions may include programming of computer-executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

Vehicle 4300 may also include memory 4302 that may store instructions for various components of vehicle 4300. For example, memory 4302 may store instructions that, when executed by processor 4301, may be configured to cause processor 4301 to perform one or more functions of processor 4301 described herein. Memory 4302 may include any number of random-access memories, read-only memories, flash memories, disk drives, optical storage, tape storage, removable storage, and other types of storage. In one instance, memory 4302 may be separate from processor 4301. In another instance, memory 4302 may be integrated into processor 4301. In some embodiments, memory 4302 may include software for performing one or more computing tasks, as well as a trained system, such as a neural network (e.g., a trained deep neural network), or a deep neural network. For example, memory 4302 may include an analysis module accessible by processor 4301 for receiving images and generating output relative to one of the images, as described elsewhere in this disclosure.

In some embodiments, the analysis module may include at least one trained model trained based on training data including a combination of a plurality of images captured by cameras with at least partially overlapping fields and LIDAR point cloud information corresponding with at least some of the plurality of images. For example, each of the training data sets may include three images, each of which may be captured by one of a group of cameras (including a center camera, a left surround camera, and a right surround camera) mounted on a training vehicle. The FOV of the center camera may at least partially overlap with the FOV of the left surround camera and the FOV of the right surround camera. The training data set may also include point cloud information captured by a LIDAR system mounted on the same vehicle, which may provide measured depth information associated with the images captured by the group of cameras. The point cloud information may be treated as the reference depth information (or true depth values) for training the neural network. The images in the training data set (and/or extracted image features) may be input into a preliminary (or untrained) neural network, which may generate an output including calculated per-pixel depth information for at least one region of the center image. The calculated per-pixel depth information may be compared with the corresponding depth information of the point cloud information to determine whether the neural network has the model parameters or weights meeting or exceeding a predetermined accuracy level for generating per-pixel depth information. For example, the training system for training the neural network may generate an accuracy score of the neural network based on the comparison of the calculated depth information and the corresponding depth information in the point cloud information (included in training data sets). If the accuracy score equals or exceeds a threshold, the training process may stop, and the training system may save the trained neural network into a local storage device and/or transmit the trained neural network to one or more vehicles (e.g., vehicle 4300). On the other hand, if the accuracy score is below the threshold, the training system may adjust one or more parameters or weights of the neural network and repeat the training process using training data sets until an accuracy score of the neural network equal to or exceeding the threshold is reached (and/or a predetermined number of training cycles has been reached).

In some embodiments, when training a neural network, a combination of score functions (or losses) may be used, which may include a photometric loss providing a score for the depth information calculated by the network based on the images of the training data set. For the proper depth, the difference in appearance between corresponding image patches may be minimized, which may provide guidance in image regions in which there exist texture features. Additionally, a sparser score function may be computed using a projection of LIDAR point measurements collected by the LIDAR system of the training vehicle. These points may be aggregated on one or more static objects in the scene using the vehicle's computed ego-motion. The projection may account for the time differences between the moment at which the pixel intensity of the image in which the depth information is to be calculated by the neural network during the training process may be recorded, and the capture time of the LIDAR data may also be recorded. Static objects may be determined based on monocular image object detectors to minimize the false negative rate (at the price of a large false positive rate). In some embodiments, the neural network may also be trained to predict a confidence score of the calculated depth information by regressing the magnitude of its own geometric error, which may be optimized at training time using the LIDAR's geometric labeling.

In some embodiments, vehicle 4300 may receive the analysis module from a server via a network and store the analysis module in memory 4302 and/or storage device 4303.

Storage device 4303 may be configured to store various data and information for one or more components of vehicle 4300. Storage device 4303 may include one or more hard drives, tapes, one or more solid-state drives, any device suitable for writing and read data, or the like, or a combination thereof. For example, storage device 4303 may be configured to store data of one or more maps. By way of example, storage device 4303 may store data of a sparse map, which may include one or more landmarks associated with a road segment and one or more target trajectories associated with the road segment. As another example, storage device 4303 may be configured to store images captured by camera 4306 and/or LIDAR data captured by LIDAR system 4307.

Communications port 4304 may be configured to facilitate data communications between vehicle 4300 and other devices. For example, communications port 4304 may be configured to receive data from and transmit data to a server (e.g., one or more servers described in this disclosure) via one or more public or private networks, including the Internet, an Intranet, a WAN (Wide-Area Network), a MAN (Metropolitan-Area Network), a wireless network compliant with the IEEE 802.11a/b/g/n Standards, a leased line, or the like.

I/O device 4305 may be configured to receive input from the user of vehicle 4300, and one or more components of vehicle 4300 may perform one or more functions in response to the input received. In some embodiments, I/O device 4305 may include an interface displayed on a touchscreen. I/O device 4305 may also be configured to output information and/or data to the user. For example, I/O device 4305 may include a display configured to display a map.

Cameras 4306 may be configured to capture one or more images of the environment of vehicle 4300. Cameras 4306 may include any type of device suitable for capturing at least one image from an environment. In some embodiments, cameras 4306 may be similar to image capture devices 122, 124, and 126 illustrated in FIG. 1 and described above. For purposes of brevity, detailed descriptions are not repeated here.

Cameras 4306 may be positioned at any suitable location on vehicle 4300. For example, a camera 4306 may be located behind a windshield of vehicle 4300, in a vicinity of a front bumper of vehicle 4300, a vicinity of the rearview mirror of vehicle 4300, one or both of the side mirrors of vehicle 4300, on the roof of vehicle 4300, on the hood of vehicle 4300, on the trunk of vehicle 4300, on the sides of vehicle 4300, mounted on, positioned behind, or positioned in front of any of the windows of vehicle 4300, and mounted in or near light figures on the front and/or back of vehicle 4300, etc.

Figure 44:
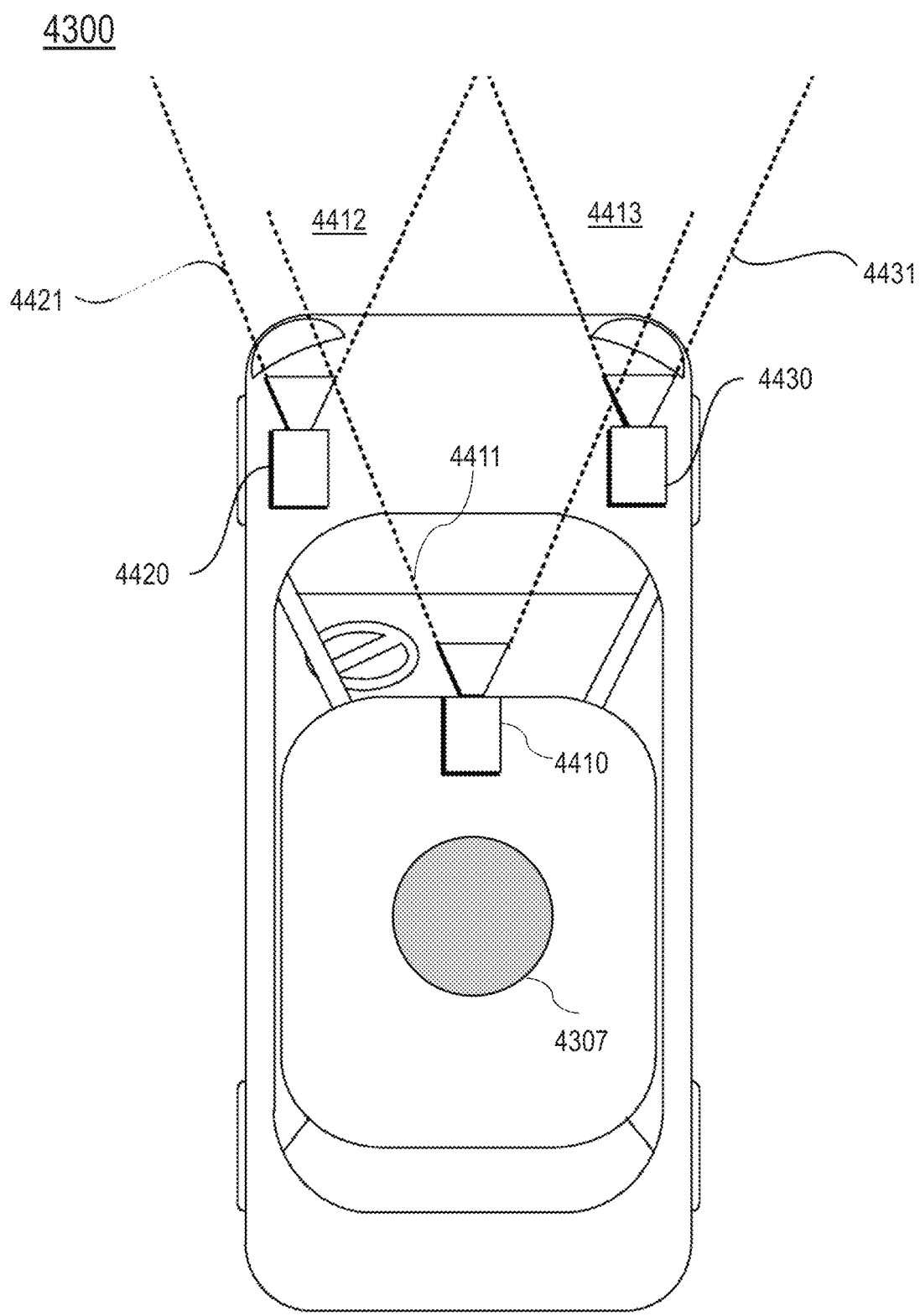
FIG. 44 illustrates an exemplary vehicle consistent with disclosed embodiments.

In some embodiments, cameras 4306 may include one or more groups of cameras. Each group of cameras may include three cameras, namely a center camera, a left surround camera, and a right surround camera. By way of example, as illustrated in FIG. 44, vehicle 4300 may include a group of cameras, including a center camera 4410, a left surround camera 4420, and a right surround camera 4430. Center camera 4410 may be positioned in the vicinity of the rearview mirror and/or near the driver of vehicle 4300. Left surround camera 4420 and right surround camera 4430 may be positioned on or in a bumper region of vehicle 4300. Other configurations are also possible. For example, center camera 4410, left surround camera 4420, and right surround camera 4430 may be positioned in the vicinity of the rearview mirror and/or near the driver seat of vehicle 4300.

In some embodiments, the FOV of center camera 4410 may at least partially overlap with both the FOV of left surround camera 4420 and a FOV of right surround camera 4430. By way of example, as illustrated in FIG. 44, center camera 4410 may have a center camera FOV 4411, left surround camera 4420 may have a left surround FOV 4421, and right surround camera 4430 may have a right surround FOV 4431. Center camera FOV 4411 may at least partially overlap with left surround FOV 4421 and right surround FOV 4431. For example, there may be an overlapping region 4412 of center camera FOV 4411 and left surround FOV 4421, and an overlapping region 4413 of center camera FOV 4411 and right surround FOV 4431. In some embodiments, two or more of center camera 4410, left surround camera 4420, and right surround camera 4430 may have different FOVs (as illustrated in FIG. 44).

In some embodiments, two or more of center camera 4410, left surround camera 4420, and right surround camera 4430 may have different focal lengths. In some embodiments, the focal lengths of center camera 4410, left surround camera 4420, and right surround camera 4430 may be selected with a wide range of angular overlap between adjacent FOVs such that the system can infer depth information from the images captured by center camera 4410, left surround camera 4420, and right surround camera 4430.

In some embodiments, vehicle 4300 may include two or more groups of cameras. For example, vehicle 4300 may include a first group of cameras, including center camera 4410, left surround camera 4420, and right surround camera 4430. Vehicle 4300 may also include a second group of cameras, including a center camera located in a vicinity of the rearview mirror of vehicle 4300, a left surround camera located at the left, back side of vehicle 4300, and a right surround camera located at the right, back side of vehicle 4300. In some embodiments, the FOVs of the (two or more) groups of cameras may form a total FOV covering 360 degrees.

In some embodiments, the groups of cameras may share at least one camera. For example, instead of having another center camera in the example provided above, the second group of cameras may include center camera 4410 (of the first group) as the center camera of the second group of cameras. As another example, vehicle 4300 may include three or more groups of cameras, and the right surround camera of the first camera group may serve as the left surround camera of the second camera group and the left surround camera of the first camera group may server as a right surround camera of a third camera group. Alternatively or additionally, at least one of the left surround camera or the right surround camera of the first camera group may serve as a center camera for a camera group other than the first camera group. One skilled in the art will understand that the above examples of the configurations of the cameras are for illustration purposes only and they are not intended to limit the scope of the disclosure; other configurations of cameras and/or camera groups may also be used for implementing the disclosed systems and methods.

LIDAR system 4307 may include one or more LIDAR units. In some embodiments, the one or more LIDAR units may be positioned on a roof of vehicle 4300. Such a unit may include a rotating unit configured to gather LIDAR reflection information within a 360-degree field of view around vehicle 4300 or from any sub-segment of the 360-degree field of view (e.g., one or more FOVs each representing less than 360 degrees). The data collected by LIDAR system 4307 may be provided to processor 4301. Alternatively or additionally, the data may be transmitted to a server described in this disclosure via a network.

In some embodiments, a LIDAR unit may be positioned at a forward location on vehicle 4300 (e.g., near the headlights, in the front grill, near the fog lamps, in a forward bumper, or at any other suitable location). In some cases, one or more LIDAR units installed on a forward portion of vehicle 4300 may collect reflection information from a field of view in an environment forward of vehicle 4300. In other embodiments, a LIDAR unit may be located in other locations. For example, a LIDAR unit may be located behind a windshield of vehicle 4300, in a vicinity of a front bumper of vehicle 4300, a vicinity of the rearview mirror of vehicle 4300, one or both of the side mirrors of vehicle 4300, on the roof of vehicle 4300, on the hood of vehicle 4300, on the trunk of vehicle 4300, on the sides of vehicle 4300, mounted on, positioned behind, or positioned in front of any of the windows of vehicle 4300, and mounted in or near light figures on the front and/or back of vehicle 4300, etc. By way of example, LIDAR system 4307 may be located on the roof of vehicle 4300, as illustrated in FIG. 44.

Any suitable type of LIDAR unit may be included in vehicle 4300. In some cases, LIDAR system 4307 may include one or more flash (also referred to herein as static) LIDAR units (e.g., 3D flash LIDAR) where an entire LIDAR field of view (FOV) is illuminated with a single laser pulse, and a sensor including rows and columns of pixels to record returned light intensity and time of flight/depth information. Such flash systems may illuminate a scene and collect LIDAR "images" multiple times per second. Scanning LIDAR units may also be employed. Such scanning LIDAR units may rely on one or more techniques for dispersing a laser beam over a particular FOV. In some cases, a scanning LIDAR unit may include a scanning mirror that deflects and directs a laser beam toward objects within the FOV Scanning mirrors may rotate through a full 360 degrees or may rotate along a single axis or multiple axes over less than 360 degrees to direct the laser toward a predetermined FOV. In some cases, LIDAR units may scan one horizontal line. In other cases, a LIDAR unit may scan multiple horizontal lines within an FOV, effectively rastering a particular FOV multiple times per second.

The LIDAR units in LIDAR system 4307 may include any suitable laser source. In some embodiments, the LIDAR units may employ a continuous laser. In other cases, the LIDAR units may use pulsed laser emissions. Additionally, any suitable laser wavelength may be employed. In some cases, a wavelength of between about 600 nm to about 1000 nm may be used.

The LIDAR unit(s) in LIDAR system 4307 may also include any suitable type of sensor and provide any suitable type of output. In some cases, sensors of the LIDAR units may include solid state photodetectors, such as one or more photodiodes or photomultipliers. The sensors may also include one or more CMOS or CCD devices including any number of pixels. These sensors may be sensitive to laser light reflected from a scene within the LIDAR FOV. The sensors may enable various types of output from a LIDAR unit. In some cases, a LIDAR unit may output raw light intensity values and time of flight information representative of the reflected laser light collected at each sensor or at each pixel or sub-component of a particular sensor. Additionally or alternatively, a LIDAR unit may output a point cloud (e.g., a 3D point cloud) that may include light intensity and depth/distance information relative to each collected point). LIDAR units may also output various types of depth maps representative of light reflection amplitude and distance to points within a field of view. LIDAR units may provide depth or distance information relative to particular points within an FOV by noting a time at which light from the LIDAR's light source was initially projected toward the FOV and recording a time at which the incident laser light is received by a sensor in the LIDAR unit. The time difference may represent a time of flight, which may be directly related to the round trip distance that the incident laser light traveled from the laser source to a reflecting object and back to the LIDAR unit. Monitoring the time of flight information associated with individual laser spots or small segments of a LIDAR FOV may provide accurate distance information for a plurality of points within the FOV (e.g., mapping to even very small features of objects within the FOV). In some cases, LIDAR units may output more complex information, such as classification information that correlates one or more laser reflections with a type of object from which the laser reflection was acquired.

Navigation system 4308 may be configured to assist a driver of vehicle 4300 to operate vehicle 4300. For example, navigation system 4308 may determine that vehicle 4300 is currently deviating from a target trajectory and generate a notification to the driver indicating the deviation from the target trajectory, which may be displayed on a display (e.g., displaying the target trajectory and an estimated travel path determined based on vehicle 4300's current position and heading direction). Alternatively, navigation system 4308 may include an autonomous vehicle navigation system configured to control the movement of vehicle 4300, as described elsewhere in this disclosure. For example, navigation system 4308 may implement a navigation action determined by processor 4301 as vehicle 4300 traverses a road segment (e.g., one or more of steering, braking, or acceleration of the vehicle). In some embodiments, navigation system 4308 may include an advanced driver-assistance system (ADAS) system. In some embodiments, navigation system 4308 may be configured to cause activation of one or more actuators associated with a steering system, a braking system, or a drive system of vehicle 4300 according to one or more navigational actions.

In some embodiments, vehicle 4300 may also include one or more sensors configured to collect information relating to vehicle 4300 and/or the environment of vehicle 4300. Exemplary sensors may include a positioning device (e.g., a Global Positioning System (GPS) device), an accelerometer, a gyro sensor, a speedometer, or the like, or a combination thereof. For example, vehicle 4300 may include a GPS device configured to collect positioning data associated with positions of vehicle 4300 over a period of time.

FIG. 45 is a flowchart showing an exemplary process 4500 for determining a navigational action for a host vehicle consistent with disclosed embodiments. While some of the descriptions of process 4500 below are provided with reference to center camera 4410, left surround camera 4420, and right surround camera 4430 illustrated in FIG. 44, one skilled in the art will understand that one or more of cameras 4306 may be located in other locations of vehicle 4300.

At step 4501, processor 4301 may be programmed to receive from center camera 4410 at least one captured center image, which may include a representation of at least a portion of an environment of vehicle 4300. Processor 4301 may also be configured to receive from left surround camera 4420 at least one captured left surround image, which may include a representation of at least a portion of the environment of vehicle 4300. Processor 4301 may further be configured to receive from right surround camera 4430 at least one captured right surround image, which may include a representation of at least a portion of the environment of vehicle 4300. In some embodiments, the FOV of center camera 4410 may at least partially overlap with both the FOV of left surround camera 4420 and a FOV of right surround camera 4430. By way of example, as illustrated in FIG. 44, center camera 4410 may include a center camera FOV 4411, left surround camera 4420 may include a left surround FOV 4421, and right surround camera 4430 may include a right surround FOV 4431. Center camera FOV 4411 may at least partially overlap with left surround FOV 4421 and right surround FOV 4431. For example, there may be an overlapping region 4412 of center camera FOV 4411 and left surround FOV 4421, and an overlapping region 4413 of center camera FOV 4411 and right surround FOV 4431.

Referring to FIG. 45, at step 4502, processor 4301 may be programmed to provide the at least one captured center image, the at least one captured left surround image, and the at least one captured right surround image to an analysis module configured to generate an output relative to the at least one captured center image based on analysis of the at least one captured center image, the at least one captured left surround image, and the at least one captured right surround image. The generated output may include per-pixel depth information for at least one region of the captured center image.

In some embodiments, the analysis module may include at least one trained model. The trained model may include a trained neural network, which may be trained based on training data including a combination of a plurality of images captured by cameras with at least partially overlapping fields and LIDAR point cloud information corresponding with at least some of the plurality of images. For example, each of the training data sets may include three images, each of which may be captured by one of a group of cameras (including a center camera, a left surround camera, and a right surround camera) mounted on a training vehicle. The FOV of the center camera may at least partially overlap with the FOV of the left surround camera and the FOV of the right surround camera. The training data set may also include point cloud information captured by a LIDAR system mounted on the same vehicle, which may provide measured depth information associated with the images captured by the group of cameras. The point cloud information may be treated as the reference depth information (or true depth values) for training the neural network. The images in the training data set (and/or extracted image features) may be input into a preliminary (or untrained) neural network, which may generate an output including calculated per-pixel depth information for at least one region of the center image. The calculated per-pixel depth information may be compared with the corresponding depth information of the point cloud information to determine whether the neural network has the model parameters or weights meeting or exceeding a predetermined accuracy level for generating per-pixel depth information. For example, the training system for training the neural network may generate an accuracy score of the neural network based on the comparison of the calculated depth information and the corresponding depth information in the point cloud information (included in training data sets). If the accuracy score equals or exceeds a threshold, the training process may stop, and the training system may save the trained neural network into a local storage device and/or transmit the trained neural network to one or more vehicles (e.g., vehicle 4300). On the other hand, if the accuracy score is below the threshold, the training system may adjust one or more parameters or weights of the neural network and repeat the training process using training data sets until an accuracy score of the neural network equal to or exceeding the threshold is reached (and/or a predetermined number of training cycles has been reached).

In some embodiments, before providing the images to the analysis module, processor 4301 may generate a set of synthetic pinhole images sharing the orientations of the image axes and the direction of the images' principal axes, based on the images and the parameters of the cameras (e.g., the orientations of their image axes and the direction of their principal axis). This preprocess step may allow for an efficient warp (homogeneous image scale-translate). Processor 4301 may also input the generated synthetic pinhole images (rather than the original images) into the analysis module to generate an output.

In some embodiments, processor 4301 may input the images into the analysis module, which may be run by processor 4301. The analysis module may generate an output including per-pixel depth information for at least one region of the captured center image.

In some embodiments, vehicle 4300 may receive the analysis module from a server via a network and store the analysis module in memory 4302 and/or storage device 4303.

In some embodiments, the generated output by the analysis module may include per-pixel depth information for at least one region (or all regions) of the captured center image. In some embodiments, the per-pixel depth information for the at least one region of the captured center image may provide or include depth information for one or more objects represented in the captured center image. In some cases, the one or more objects may not contact a ground surface (e.g., a road surface). For monocular systems, a ground plane may be needed to obtain the depth information through a process such as structure in motion, which may not be needed in the disclosed systems herein. In some embodiments, the one or more objects may be associated with a target vehicle (or being carried by the target vehicle).

In some embodiments, the per-pixel depth information for the at least one region of the captured center image may provide or include depth information for a surface of at least one object represented in the captured center image, and the surface of the at least one object may include a reflection of one or more other objects, as the analysis module may recognize surfaces based at least in part on edges of the surfaces and can recognize that reflections are on the surface and not indicative of a farther object beyond the surface.

In some embodiments, the per-pixel depth information for the at least one region of the captured center image may provide or include depth information relative to an object that is at least partially obscured from view in one or more of the at least one captured center image, the at least one captured left surround image, or the at least one captured right surround image, as the analysis module may provide depth information even where an object is partially occluded from view in one or more of the captured images.

In some embodiments, as described above, vehicle 4300 may include two or more groups of cameras. For example, vehicle 4300 may include a first group of cameras, including center camera 4410, left surround camera 4420, and right surround camera 4430. Vehicle 4300 may also include a second group of cameras, including a center camera located in a vicinity of the rearview mirror of vehicle 4300, a left surround camera located at the left, back side of vehicle 4300, and a right surround camera located at the right, back side of vehicle 4300. The analysis module may be further configured to generate another output relative to at least one center image captured by the center camera of the second camera group, based on analysis of at least one captured center image, at least one captured left surround image, and at least one captured right surround image received from the cameras of the second camera group, and the another generated output may include per-pixel depth information for at least one region of the center image captured by the center camera of the second camera group. In some embodiments, the analysis module may be configured to generate per pixel depth information for at least one image captured by at least one camera in each of the first camera group and the at least a second camera group, to provide a 360-degree image-generated point cloud surrounding vehicle.

At step 4503, processor 4301 may be programmed to cause at least one navigational action by vehicle 4300 based on the generated output including the per-pixel depth information for the at least one region of the captured center image. For example, processor 4301 may analyze the generated output including the per-pixel depth information for the at least one region of the captured center image and detect one or more objects based on the generated output. Processor 4301 may also be configured to determine at least one navigational action by vehicle 4300 based on the detected object(s), as described elsewhere in this disclosure. Processor 4301 may further be configured to cause vehicle 4300 to implement the determined navigational action, as described elsewhere in this disclosure. For example, processor 4301 may determine at least one of maintaining a current heading direction and speed for vehicle 4300, changing a current heading direction for vehicle 4300 (e.g., turning vehicle 4300), or changing a speed of vehicle 4300 (e.g., accelerating or braking vehicle 4300). By way of example, processor 4301 may analyze the generated output and identify an object that is within a predetermined safety distance based on the analysis of the generated output. Processor 4301 may also be configured to determine a navigational action for vehicle 4300 to slow vehicle 4300 or steer away from the identified object. Processor 4301 may further be configured to control navigation system 4308 to cause activation of one or more actuators associated with a steering system, a braking system, or a drive system of vehicle 4300 according to one or more navigational actions.

In some embodiments, processor 4301 may be configured to determine the at least one navigational action based on a combination of the per-pixel depth information for the at least one region of the captured center image and point cloud information received from LIDAR system 4307. In some embodiments, processor 4301 may average the depth values associated with an object appearing in both the per-pixel depth information for the at least one region of the captured center image and corresponding point cloud information received from LIDAR system 4307 to obtain averaged depths values associated with the object. Processor 4301 may also determine a navigational action based on the averaged depths associated with the object (e.g., maintaining the current speed and the heading direction). Alternatively or additionally, processor 4301 may apply different weights to the depth values obtained from the per-pixel depth information for the at least one region of the captured center image and the depth values obtained from point cloud information received from LIDAR system 4307 (which may be similar to a process described in connection with step 4104 above). Processor 4301 may also be configured to determine at least one navigational action based on weighted depth values. For example, as described above, a LIDAR system may perform better in a sun glare environment (or a highly reflective environment, or a low light condition during night time without street lights, etc.) than cameras. In a sun glare environment (or a highly reflective environment, or a low light condition during night time without street lights, etc.), processor 4301 may apply a higher weight to the depth values obtained based on the point cloud information received from LIDAR system 4307 than the weight applied to the depth values obtained from the per-pixel depth information for the at least one region of the captured center image. On the other hand, cameras may perform better on a foggy or rainy day than a LIDAR system, and in such an environment, processor 4301 apply a lower weight to the depth values obtained based on the point cloud information received from LIDAR system 4307 than the weight applied to the depth values obtained from the per-pixel depth information for the at least one region of the captured center image.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer-readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A navigation system for a host vehicle, the navigation system comprising:
   at least one processor programmed to:
   receive from a camera onboard the host vehicle at least one captured image representative of an environment of the host vehicle, wherein the camera is positioned at a first location relative to the host vehicle;
   receive point cloud information from a LIDAR system onboard the host vehicle, wherein the point cloud information is representative of distances to various objects in an environment of the host vehicle, wherein the LIDAR system is positioned at a second location relative to the host vehicle, wherein the second location is different from the first location, and wherein a field of view of the camera at least partially overlaps with a field of view of the LIDAR system to provide a shared field of view region;
   analyze the at least one captured image and the received point cloud information to detect one or more objects in the shared field of view region, wherein the detected one or more objects are represented in only one of the at least one captured image or the received point cloud information;
   determine whether a vantage point difference between the first location of the camera and the second location of the LIDAR system accounts for the one or more detected objects being represented in only one of the at least one captured image or the received point cloud information;
   if the vantage point difference does not account for the one or more detected objects being represented in only one of the at least one captured image or the received point cloud information, then cause at least one remedial action to be taken; and
   if the vantage point difference does account for the one or more detected objects being represented in only one of the at least one captured image or the received point cloud information, then determine at least one navigational action to be taken by the host vehicle based on the one or more detected objects and cause the at least one navigational action to be taken by the host vehicle.

2. The navigation system of claim 1, wherein the at least one navigational action includes at least one of maintaining a current heading direction and speed for the host vehicle, changing a current heading direction for the host vehicle, or changing a speed of the host vehicle.

3. The navigation system of claim 1, wherein the at least one processor is programmed to cause the at least one navigational action to be taken by the host vehicle by causing activation of one or more actuators associated with a steering system, a braking system, or a drive system of the host vehicle.

4. The navigation system of claim 1, wherein the one or more detected objects include an object located ahead of a target vehicle forward of the host vehicle.

5. The navigation system of claim 4, wherein the object located ahead of the target vehicle includes a static object in a roadway.

6. The navigation system of claim 4, wherein the object located ahead of the target vehicle includes a second target vehicle.

7. The navigation system of claim 6, wherein the at least one navigational action is determined based on a detected action of the second target vehicle.

8. The navigation system of claim 7, wherein the at least one navigational action includes braking the host vehicle based on a detected slowing of the second target vehicle.

9. The navigation system of claim 8, wherein the target vehicle is not detected to be slowing.

10. The navigation system of claim 1, wherein the one or more detected objects include an object located ahead of the host vehicle but close enough that a portion of the host vehicle obscures the one or more objects from either the at least one captured image or the point cloud information.

11. The navigation system of claim 10, wherein the portion of the host vehicle includes a hood of the host vehicle.

12. The navigation system of claim 1, wherein the camera is located behind a windshield of the host vehicle, and the LIDAR system is mounted on a roof of the host vehicle.

13. The navigation system of claim 1, wherein the camera is located in a vicinity of a front bumper of the host vehicle, and the LIDAR system is mounted on a roof of the host vehicle.

14. The navigation system of claim 1, wherein the camera is located behind a windshield of the host vehicle, and the LIDAR system is located in a vicinity of a front bumper of the host vehicle.

15. The navigation system of claim 1, wherein the at least one remedial action includes issuing a warning to a passenger of the host vehicle.

16. The navigation system of claim 1, wherein the at least one remedial action includes disregarding the one or more detected objects in navigation of the host vehicle.

17. The navigation system of claim 1, wherein the at least one remedial action includes applying different weights to an image-based detection path based on analysis of the at least one captured image and a LIDAR-based detection path based on analysis of the point cloud information.

18. The navigation system of claim 17, wherein the different weights are determined based on detected weather conditions.

19. The navigation system of claim 17, wherein the different weights are determined based on detected lighting conditions.

20. The navigation system of claim 1, wherein the point cloud information includes multiple, captured LIDAR frames.

21. The navigation system of claim 1, wherein the at least one captured image includes a plurality of captured images.

22. A method for determining a navigational action for a host vehicle, the method comprising:
receiving from a camera onboard the host vehicle at least one captured image representative of an environment of the host vehicle, wherein the camera is positioned at a first location relative to the host vehicle;
receiving point cloud information from a LIDAR system onboard the host vehicle, wherein the point cloud information is representative of distances to various objects in an environment of the host vehicle, wherein the LIDAR system is positioned at a second location relative to the host vehicle, wherein the second location is different from the first location, and wherein a field of view of the camera at least partially overlaps with a field of view of the LIDAR system to provide a shared field of view region;
analyzing the at least one captured image and the received point cloud information to detect one or more objects in the shared field of view region, wherein the detected one or more objects are represented in only one of the at least one captured image or the received point cloud information;
determining whether a vantage point difference between the first location of the camera and the second location of the LIDAR system accounts for the one or more detected objects being represented in only one of the at least one captured image or the received point cloud information;
if the vantage point difference does not account for the one or more detected objects being represented in only one of the at least one captured image or the received point cloud information, then causing at least one remedial action to be taken; and
if the vantage point difference does account for the one or more detected objects being represented in only one of the at least one captured image or the received point cloud information, then determining at least one navigational action to be taken by the host vehicle based on the one or more detected objects and cause the at least one navigational action to be taken by the host vehicle.

23. A computer-readable medium storing instructions that when executed by at least one processor, are configured to cause the at least one processor programmed to:
receive from a camera onboard the host vehicle at least one captured image representative of an environment of the host vehicle, wherein the camera is positioned at a first location relative to the host vehicle;
receive point cloud information from a LIDAR system onboard the host vehicle, wherein the point cloud information is representative of distances to various objects in an environment of the host vehicle, wherein the LIDAR system is positioned at a second location relative to the host vehicle, wherein the second location is different from the first location, and wherein a field of view of the camera at least partially overlaps with a field of view of the LIDAR system to provide a shared field of view region;
analyze the at least one captured image and the received point cloud information to detect one or more objects in the shared field of view region, wherein the detected one or more objects are represented in only one of the at least one captured image or the received point cloud information;
determine whether a vantage point difference between the first location of the camera and the second location of the LIDAR system accounts for the one or more detected objects being represented in only one of the at least one captured image or the received point cloud information;

if the vantage point difference does not account for the one or more detected objects being represented in only one of the at least one captured image or the received point cloud information, then cause at least one remedial action to be taken; and if the vantage point difference does account for the one or more detected objects being represented in only one of the at least one captured image or the received point cloud information, then determine at least one navigational action to be taken by the host vehicle based on the one or more detected objects and cause the at least one navigational action to be taken by the host vehicle.

* * * * *